(12) United States Patent
Bahramshahry et al.

(10) Patent No.: US 10,956,222 B2
(45) Date of Patent: Mar. 23, 2021

(54) SYSTEMS, METHODS, AND APPARATUSES FOR IMPLEMENTING A SCHEDULER AND WORKLOAD MANAGER WITH DYNAMIC WORKLOAD TERMINATION BASED ON COST-BENEFIT ANALYSIS

(71) Applicants: Armin Bahramshahry, Vancouver (CA); Piranavan Selvanandan, San Francisco, CA (US)

(72) Inventors: Armin Bahramshahry, Vancouver (CA); Piranavan Selvanandan, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/528,619

(22) Filed: Aug. 1, 2019

(65) Prior Publication Data
US 2020/0026564 A1    Jan. 23, 2020

Related U.S. Application Data

(63) Continuation-in-part of application No. 15/587,170, filed on May 4, 2017, and a continuation-in-part of
(Continued)

(51) Int. Cl.
*G06F 9/50* (2006.01)
*G06F 9/48* (2006.01)
(Continued)

(52) U.S. Cl.
CPC .......... *G06F 9/505* (2013.01); *G06F 9/4881* (2013.01); *G06F 9/4887* (2013.01);
(Continued)

(58) Field of Classification Search
None
See application file for complete search history.

(56) References Cited

U.S. PATENT DOCUMENTS

| 5,577,188 A | 11/1996 | Zhu |
| 5,608,872 A | 3/1997 | Schwartz et al. |

(Continued)

OTHER PUBLICATIONS

Wang et al., "A Power-Aware, Best-Effort Real-Time Task Scheduling Algorithm", 2003, IEEE Computer Society. (Year: 2003).*
(Continued)

*Primary Examiner* — Qing Yuan Wu
(74) *Attorney, Agent, or Firm* — Elliot, Ostrander & Preston, P.C.

(57) ABSTRACT

In accordance with disclosed embodiments, there are provided systems, methods, and apparatuses for implementing a stateless, deterministic scheduler and work discovery system with interruption recovery. For instance, according to one embodiment, there is disclosed a system to implement a stateless scheduler service, in which the system includes: a processor and a memory to execute instructions at the system; a compute resource discovery engine to identify one or more computing resources available to execute workload tasks; a workload discovery engine to identify a plurality of workload tasks to be scheduled for execution; a cache to store information on behalf of the compute resource discovery engine and the workload discovery engine; a scheduler to request information from the cache specifying the one or more computing resources available to execute workload tasks and the plurality of workload tasks to be scheduled for execution; and further in which the scheduler is to schedule at least a portion of the plurality of workload tasks for execution via the one or more computing resources based on the information requested. Other related embodiments are disclosed.

22 Claims, 47 Drawing Sheets

Related U.S. Application Data application No. 15/587,161, filed on May 4, 2017, now Pat. No. 10,514,951, and a continuation-in-part of application No. 15/587,188, filed on May 4, 2017, now Pat. No. 10,545,796.

(51) Int. Cl.
*H04L 12/24* (2006.01)
*G06Q 10/06* (2012.01)

(52) U.S. Cl.
CPC .......... *G06F 9/5016* (2013.01); *G06F 9/5022* (2013.01); *G06F 9/5038* (2013.01); *G06Q 10/06316* (2013.01); *H04L 41/5003* (2013.01); *H04L 41/5009* (2013.01); *H04L 41/5019* (2013.01); *H04L 41/50* (2013.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,212,562 B1* | 4/2001 | Huang ............ G06F 9/5027 370/468 |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 10,514,951 B2 | 12/2019 | Bahramshahry et al. |
| 10,545,796 B2 | 1/2020 | Bahramshahry et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0005181 A1* | 1/2006 | Fellenstein ........... G06F 9/5005 717/174 |
| 2009/0177744 A1 | 7/2009 | Marlow et al. |
| 2010/0333094 A1 | 12/2010 | Restall et al. |

OTHER PUBLICATIONS

U.S. Appl. No. 16/774,550, filed Jan. 28, 2020, Armin Bahramshahry.
Final Office Action for U.S. Appl. No. 15/587,170 dated Oct. 30, 2019, 32 pages.
Notice of Allowance for U.S. Appl. No. 15/587,188, dated Sep. 9, 2019, 7 pages.

(56) References Cited

OTHER PUBLICATIONS

Notice of Allowance for U.S. Appl. No. 16/528,617 dated Jun. 18, 2020, 9 pages.
Notice of Allowance for U.S. Appl. No. 15/587,161, dated Aug. 7, 2019, 16 pages.
Office Action for U.S. Appl. No. 15/587,161, dated Apr. 17, 2019, 19 pages.
Office Action for U.S. Appl. No. 15/587,170 dated Apr. 8, 2019, 30 pages.
Office Action for U.S. Appl. No. 15/587,170 dated Apr. 29, 2020, 32 pages.
Office Action for U.S. Appl. No. 15/587,188, dated May 13, 2019, 19 pages.

* cited by examiner

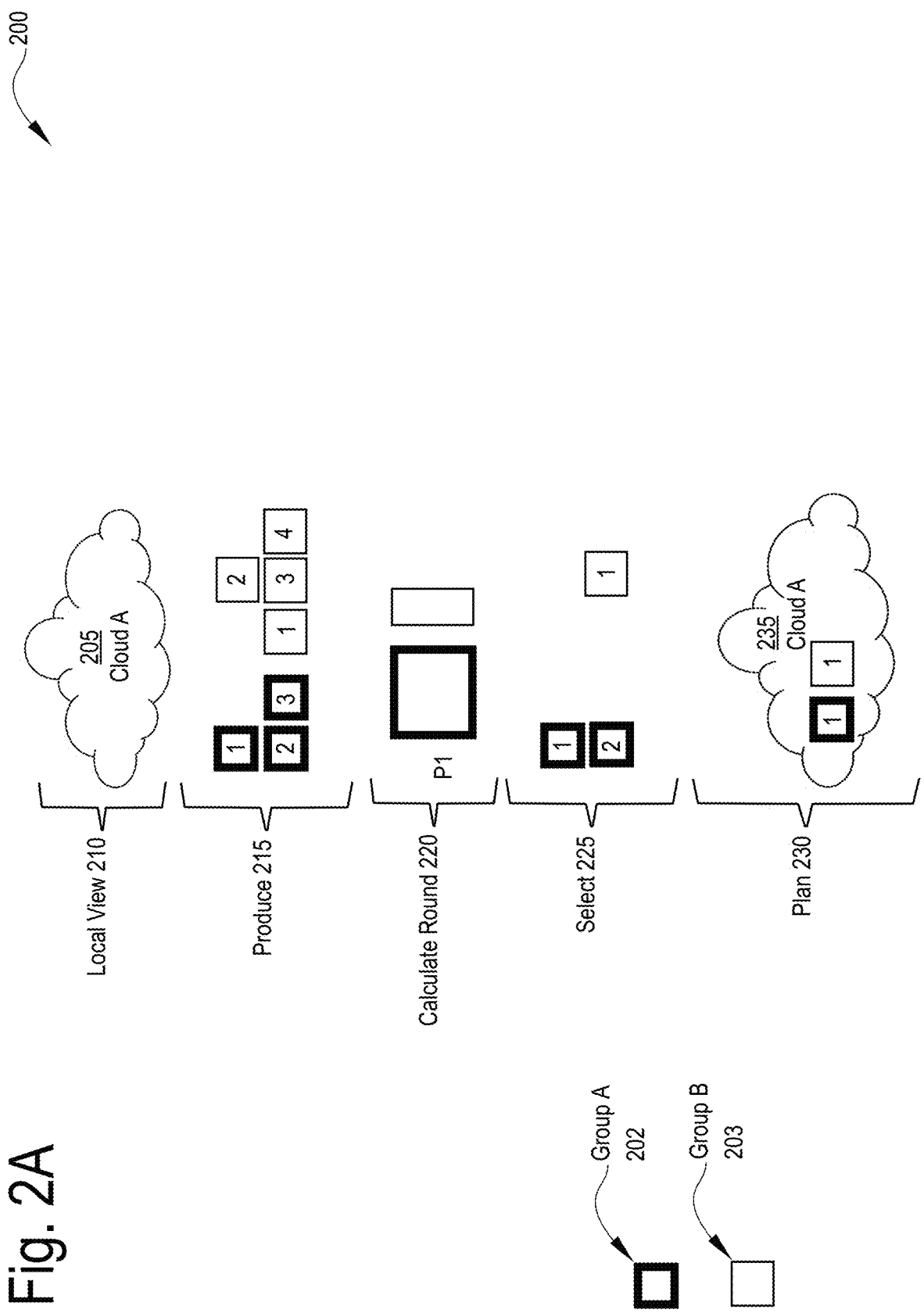

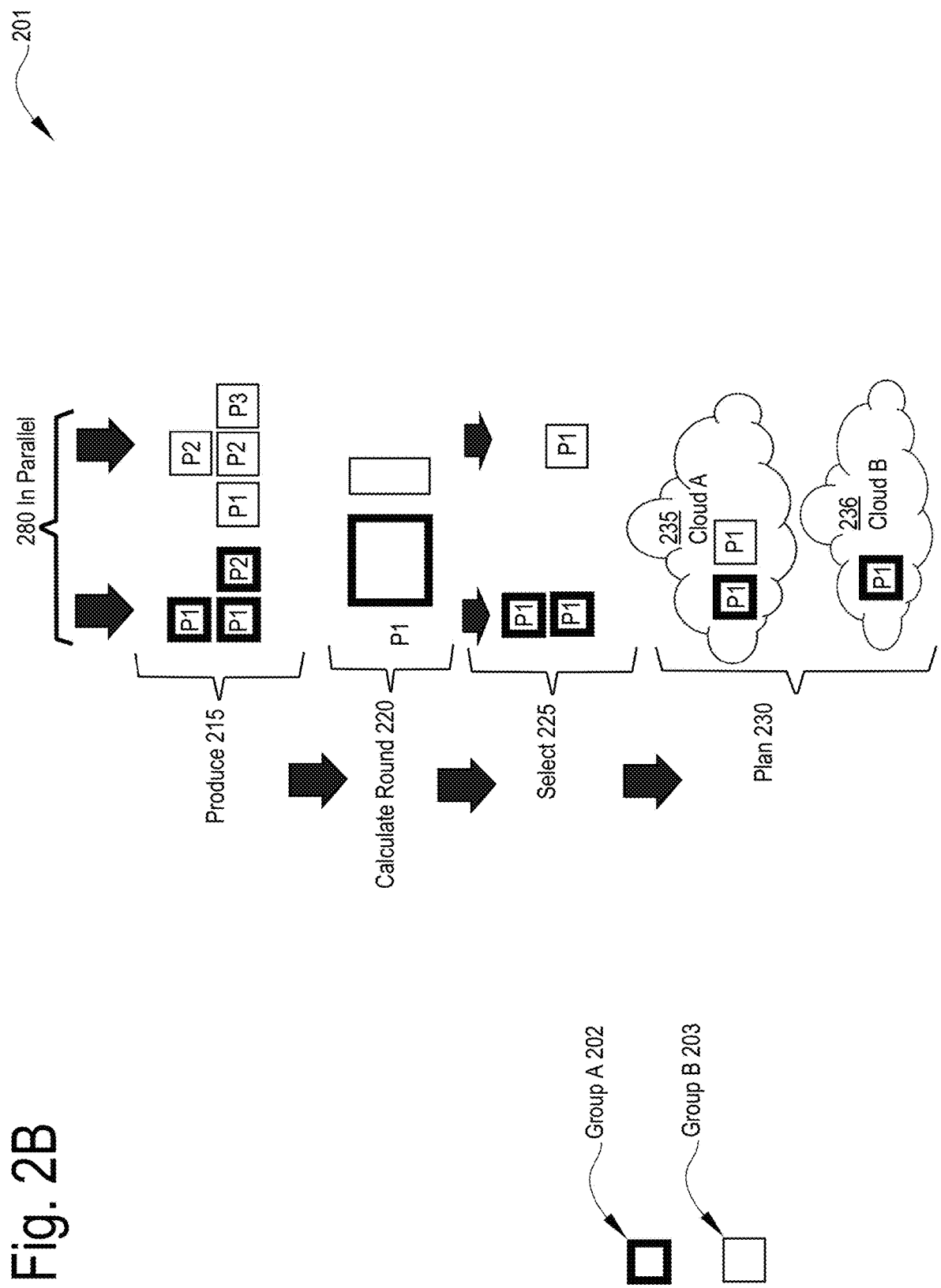

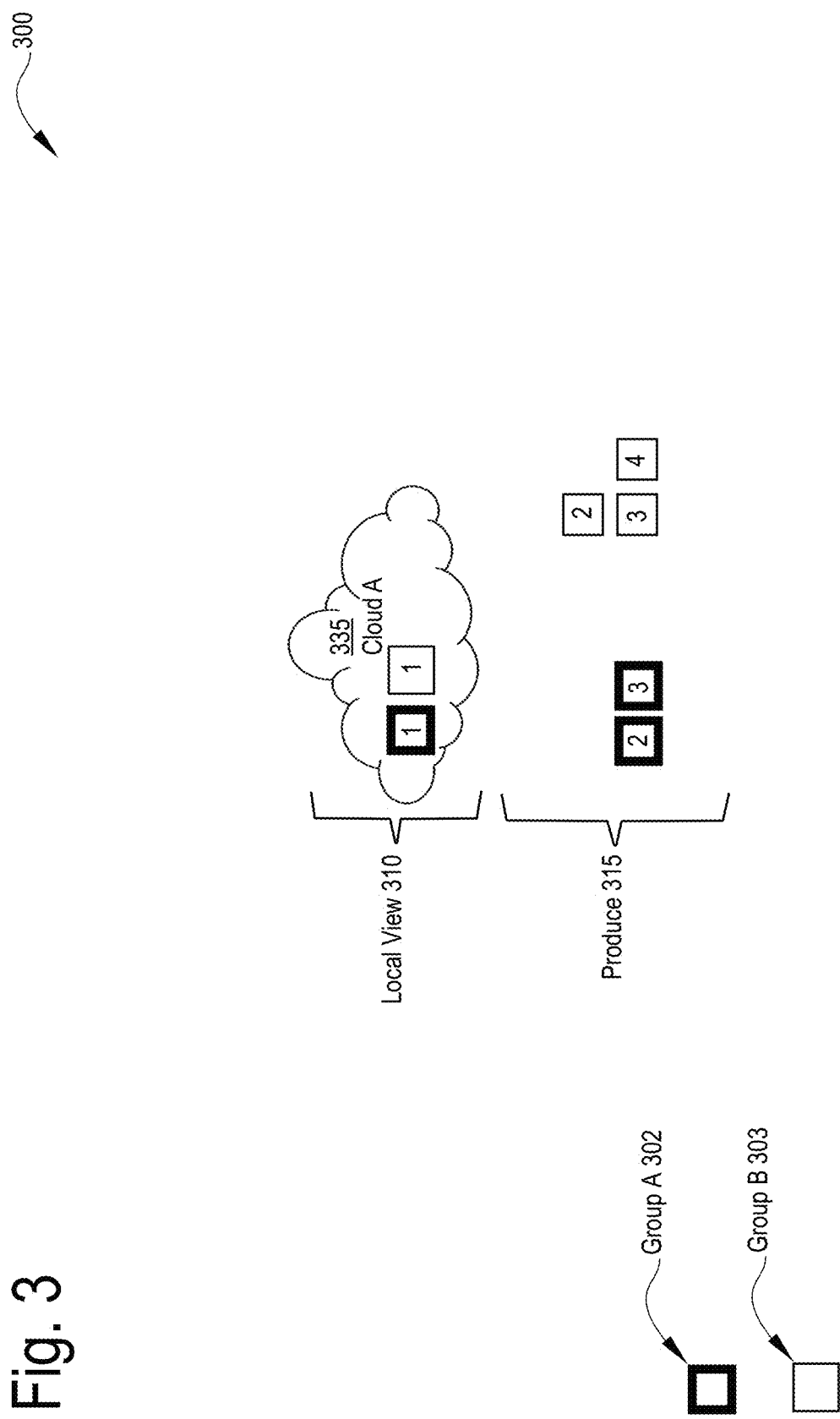

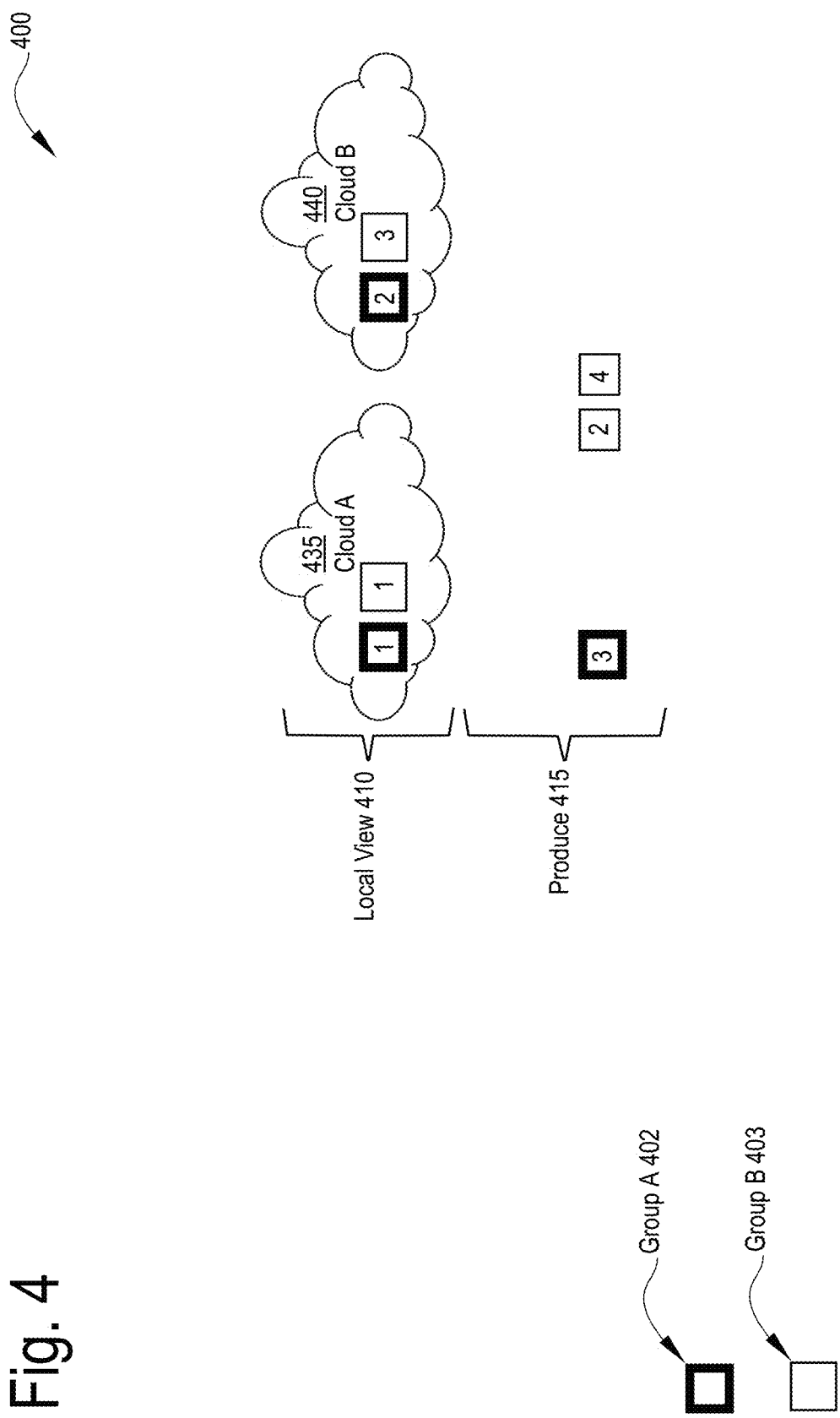

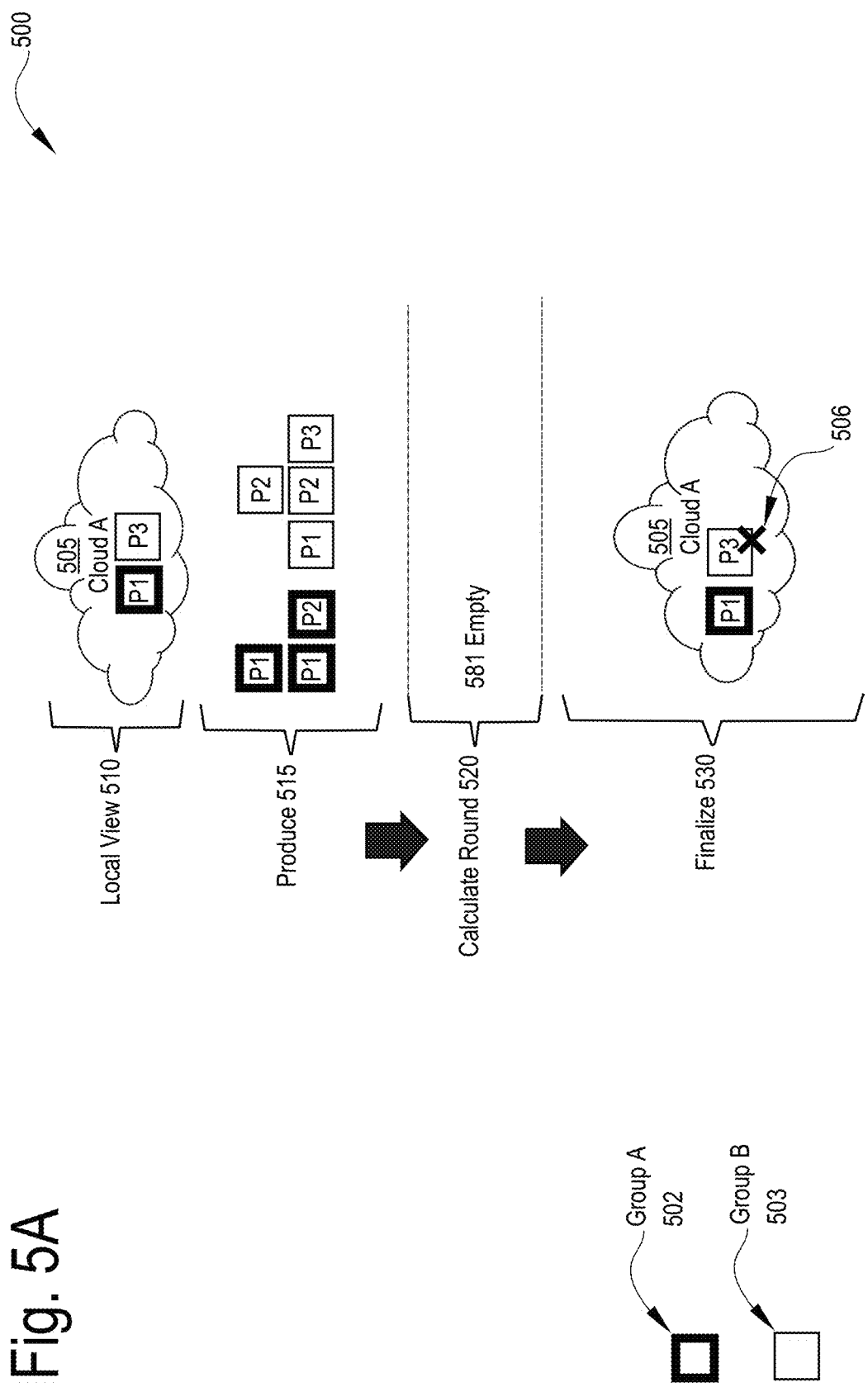

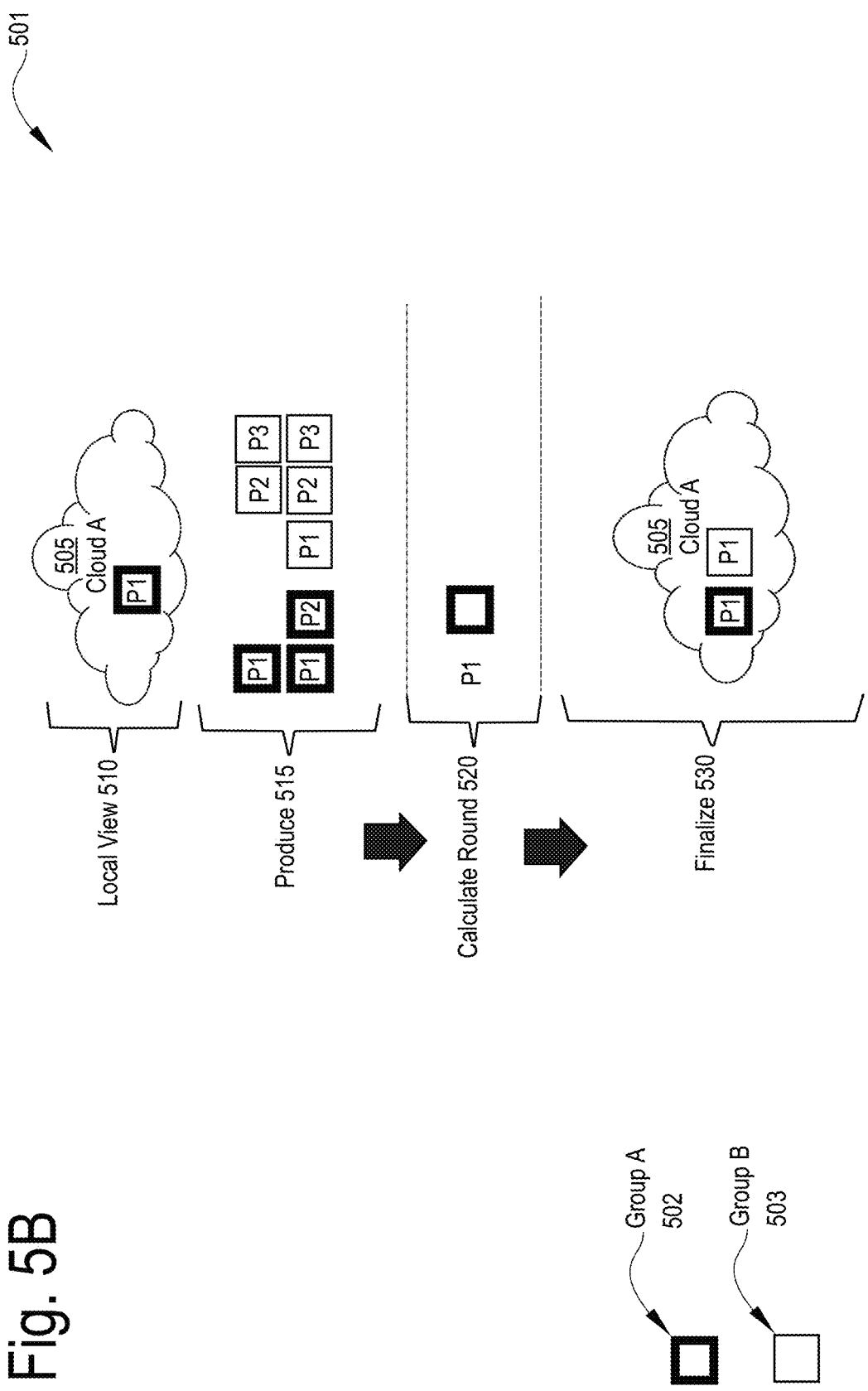

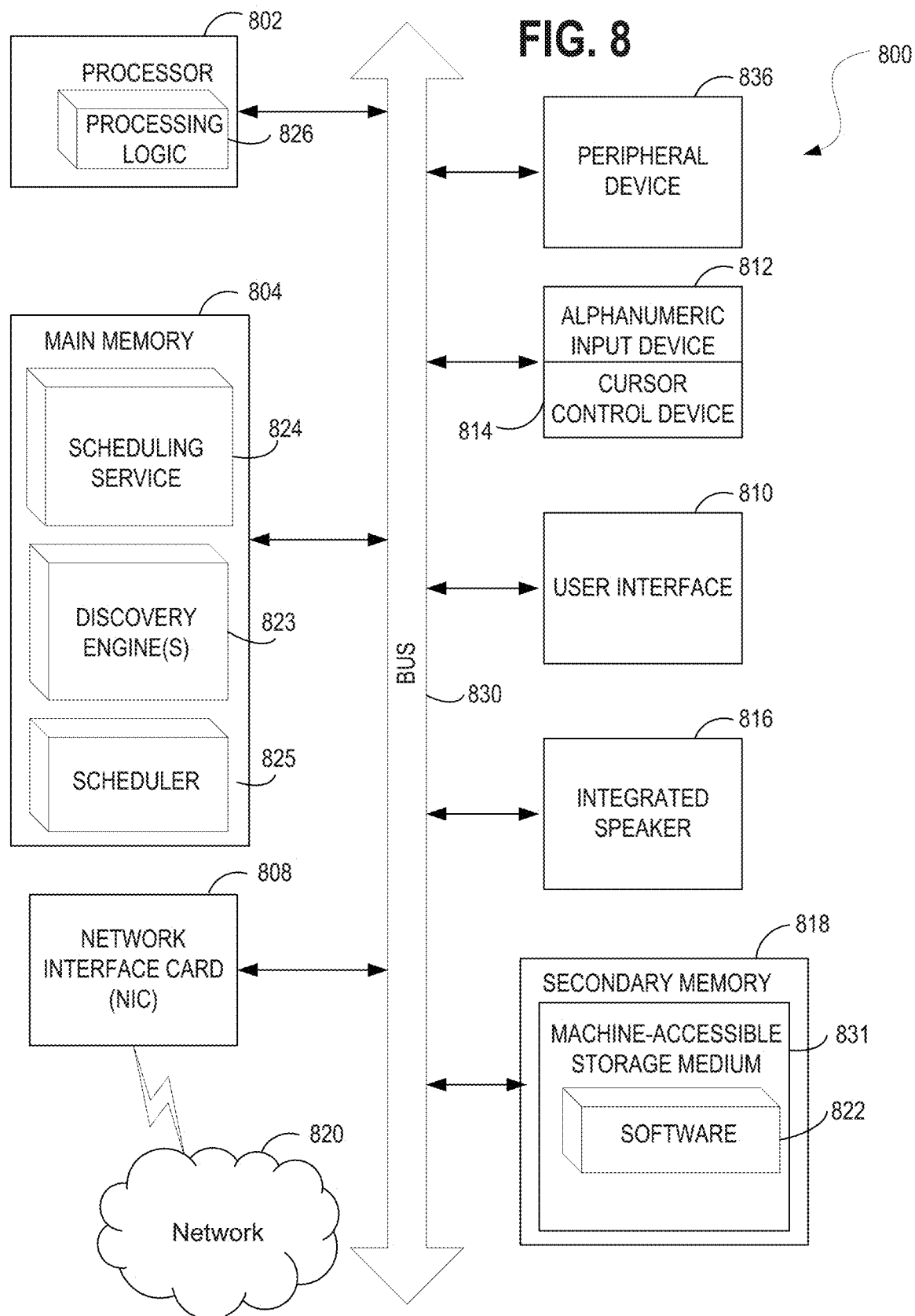

1400

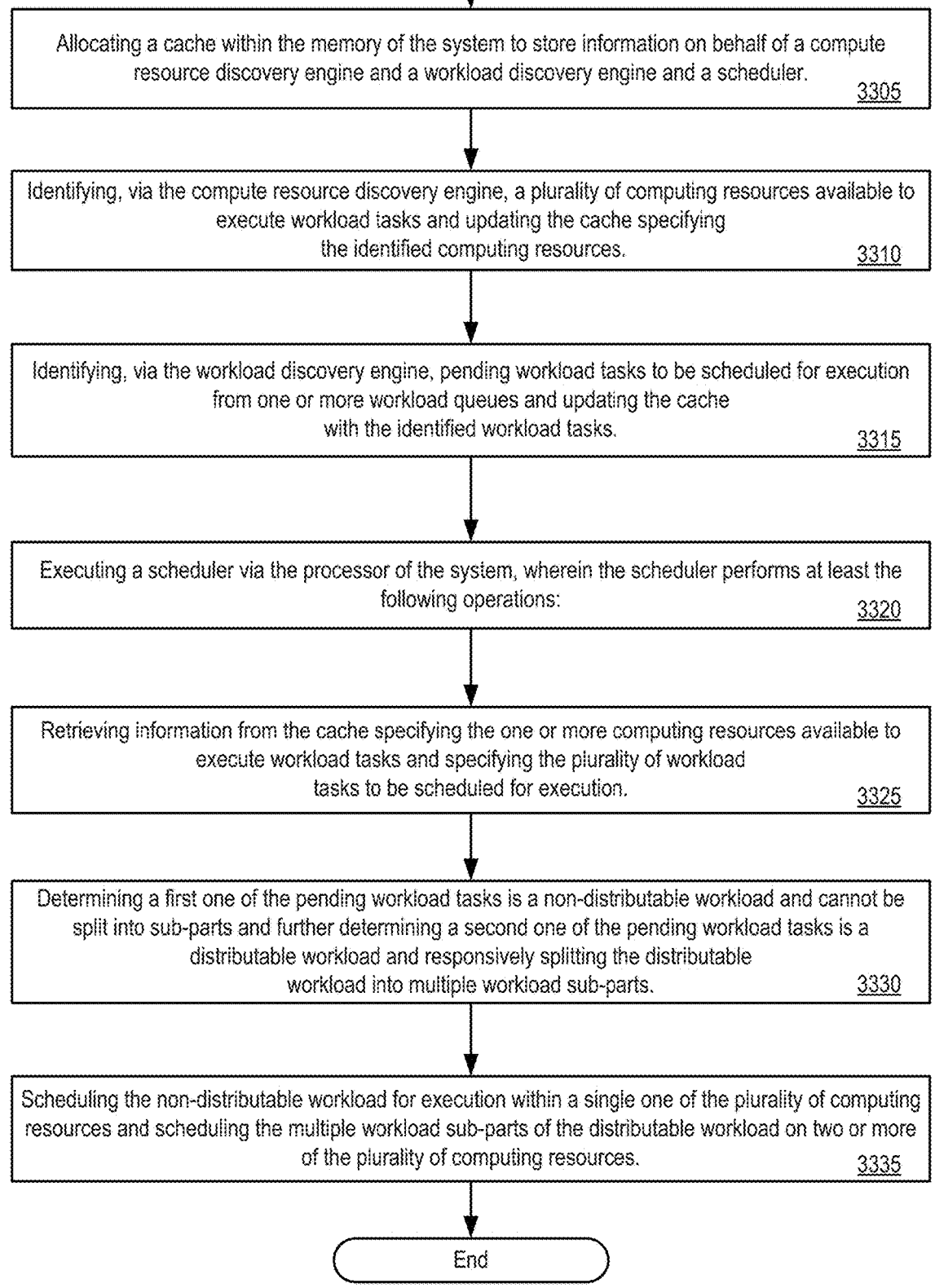

Start

Allocating a cache within the memory of the system to store information on behalf of a compute resource discovery engine and a workload discovery engine and a scheduler.
3405

Identifying, via the compute resource discovery engine, a plurality of computing resources available to execute workload tasks and updating the cache specifying the identified computing resources.
3410

Identifying, via the workload discovery engine, pending workload tasks to be scheduled for execution from one or more workload queues and updating the cache with the identified workload tasks.
3415

Executing a scheduler via the processor of the system, wherein the scheduler performs at least the following operations:
3420

Retrieving information from the cache specifying the one or more computing resources available to execute workload tasks and specifying the plurality of workload tasks to be scheduled for execution.
3425

Determining, based on the information from the cache, that a sub-set of the plurality workload tasks are serviceable by identical snapshots of a provisioned computing resource and initiating a snapshotting process to generate a snapshot of the provisioned computing resource and force delaying the sub-set of the plurality workload tasks until the snapshot is complete.
3430

Scheduling each of the sub-set of the plurality workload tasks for execution on a different computing resource utilizing replicated copies of the completed snapshot.
3435

End

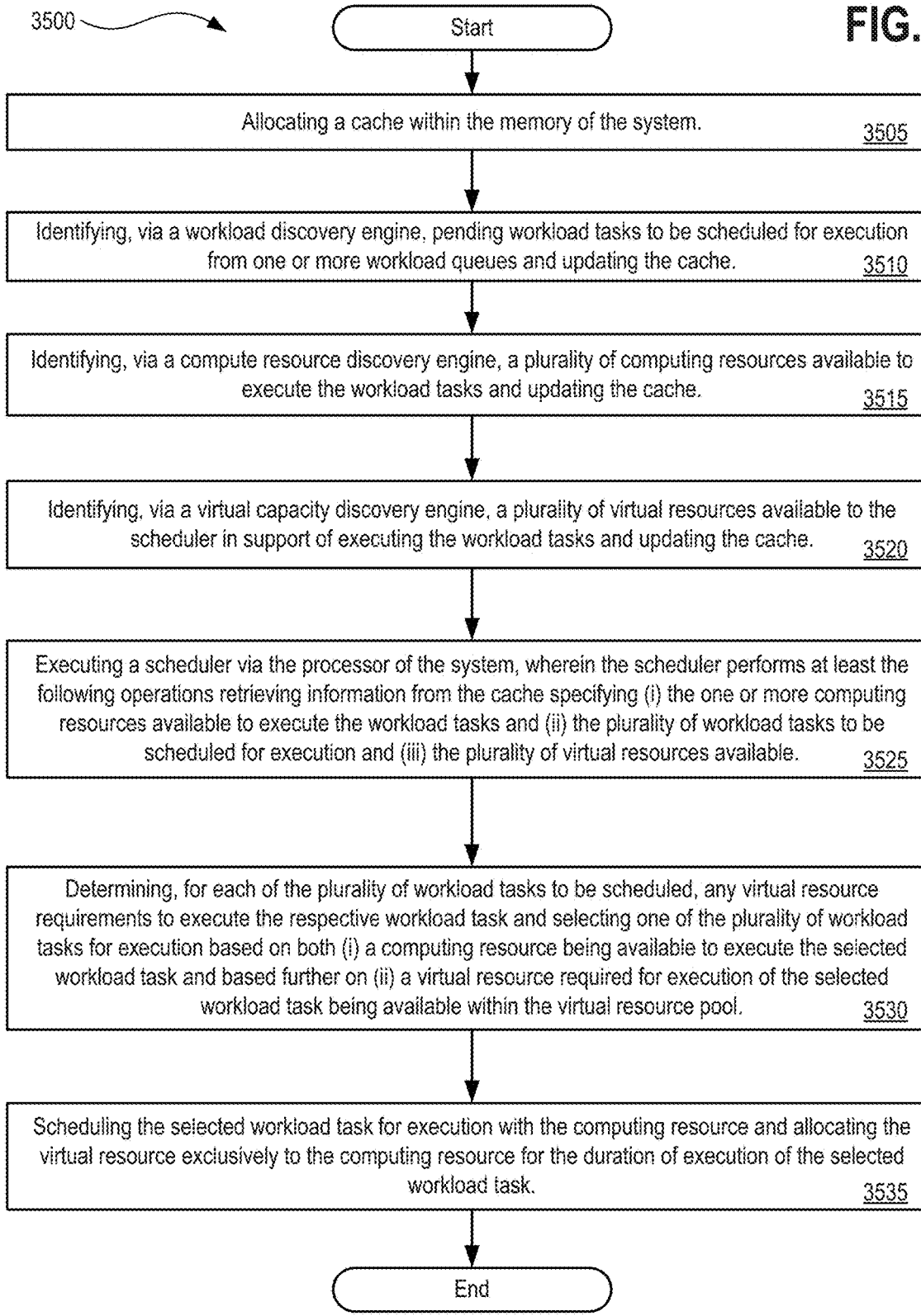

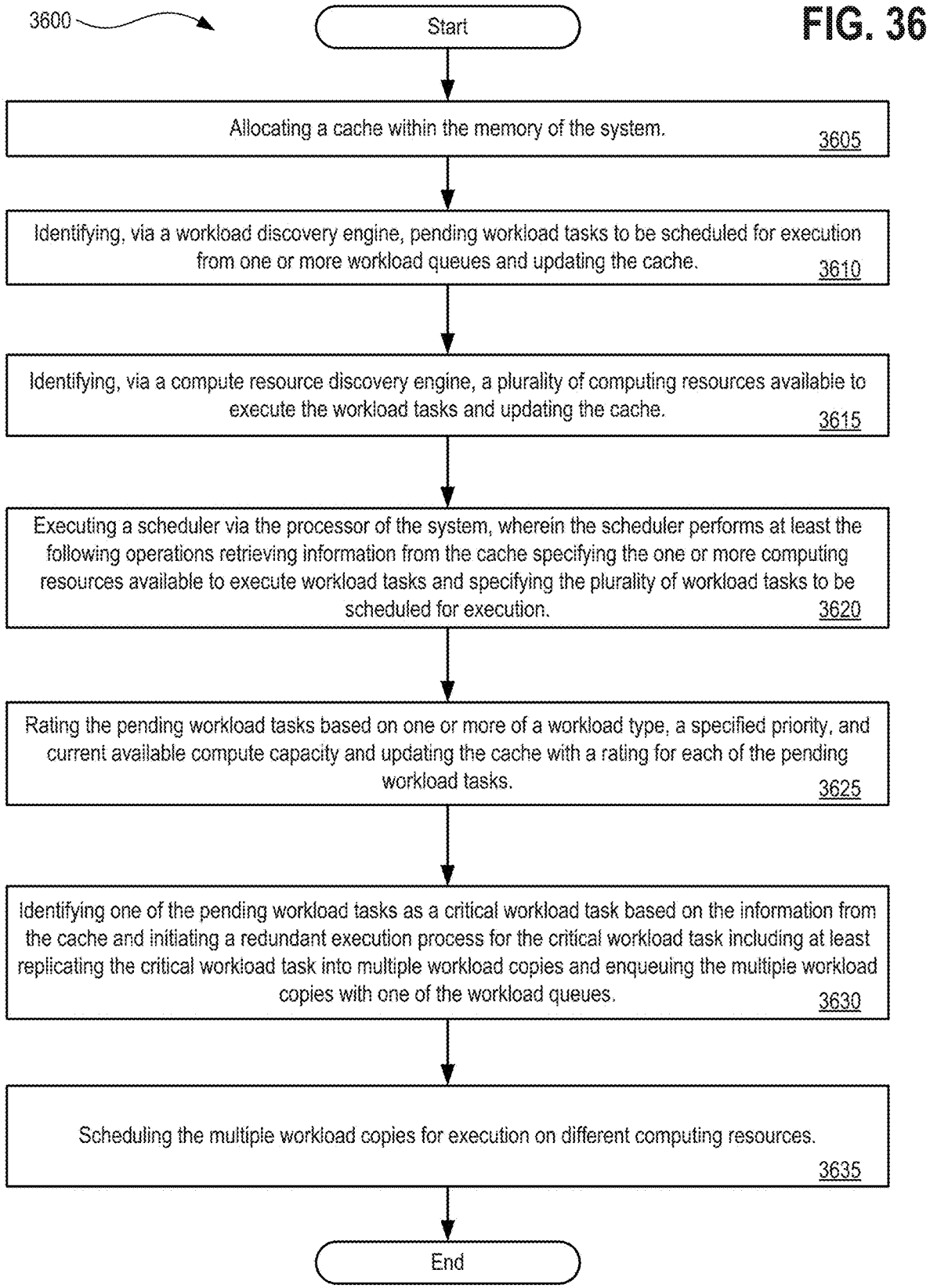

Start

↓

A method for updating Service Level Targets (SLTs) of a scheduling service, by performing the following operations:
3705

↓

Allocating a cache within the memory of the system.
3710

↓

Identifying, via a workload discovery engine, pending workload tasks to be scheduled for execution from one or more workload queues and updating the cache.
3715

↓

Identifying, via a compute resource discovery engine, a plurality of computing resources available to execute the workload tasks and updating the cache.
3720

↓

Executing an SLT updater via the processor of the system, wherein the SLT updater performs at least the following operations: (i) identifying multiple SLTs for each of the pending workload tasks based on a current time period, (ii) selecting one of the multiple SLTs to apply to each of the pending workload tasks based on which of the multiple SLTs is determined to be most restrictive, and (iii) updating the cache with information specifying the selected SLT for each pending workload task.
3725

↓

Executing a scheduler via the processor of the system, wherein the scheduler performs at least the following operations: (i) retrieving information from the cache specifying the one or more computing resources available to execute workload tasks and specifying the plurality of workload tasks to be scheduled for execution and specifying the selected SLT for each pending workload task and (ii) scheduling the pending workload tasks to execute via the one or more computing resources in compliance with the selected SLT specified for each of the pending workload tasks.
3730

↓

End

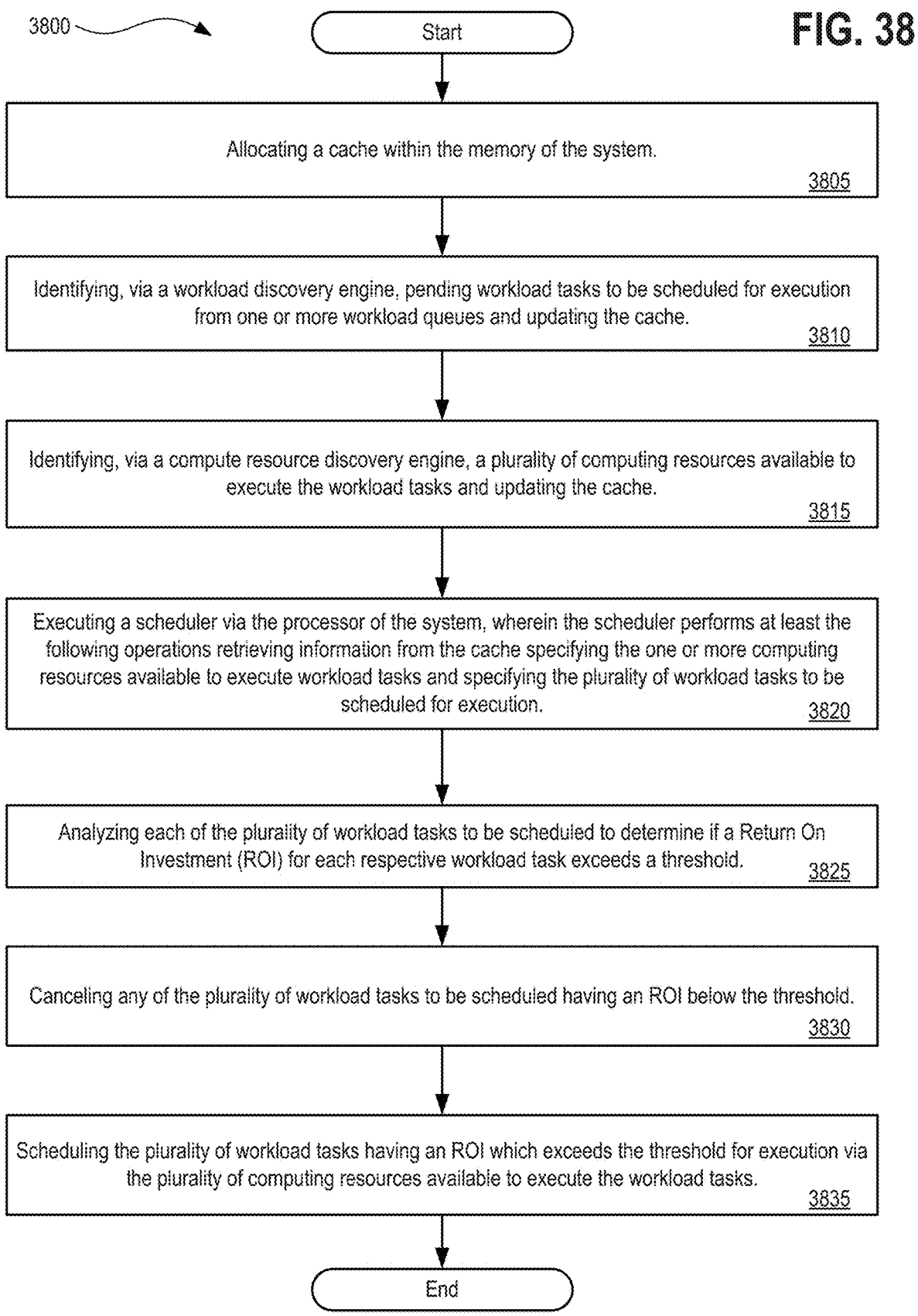

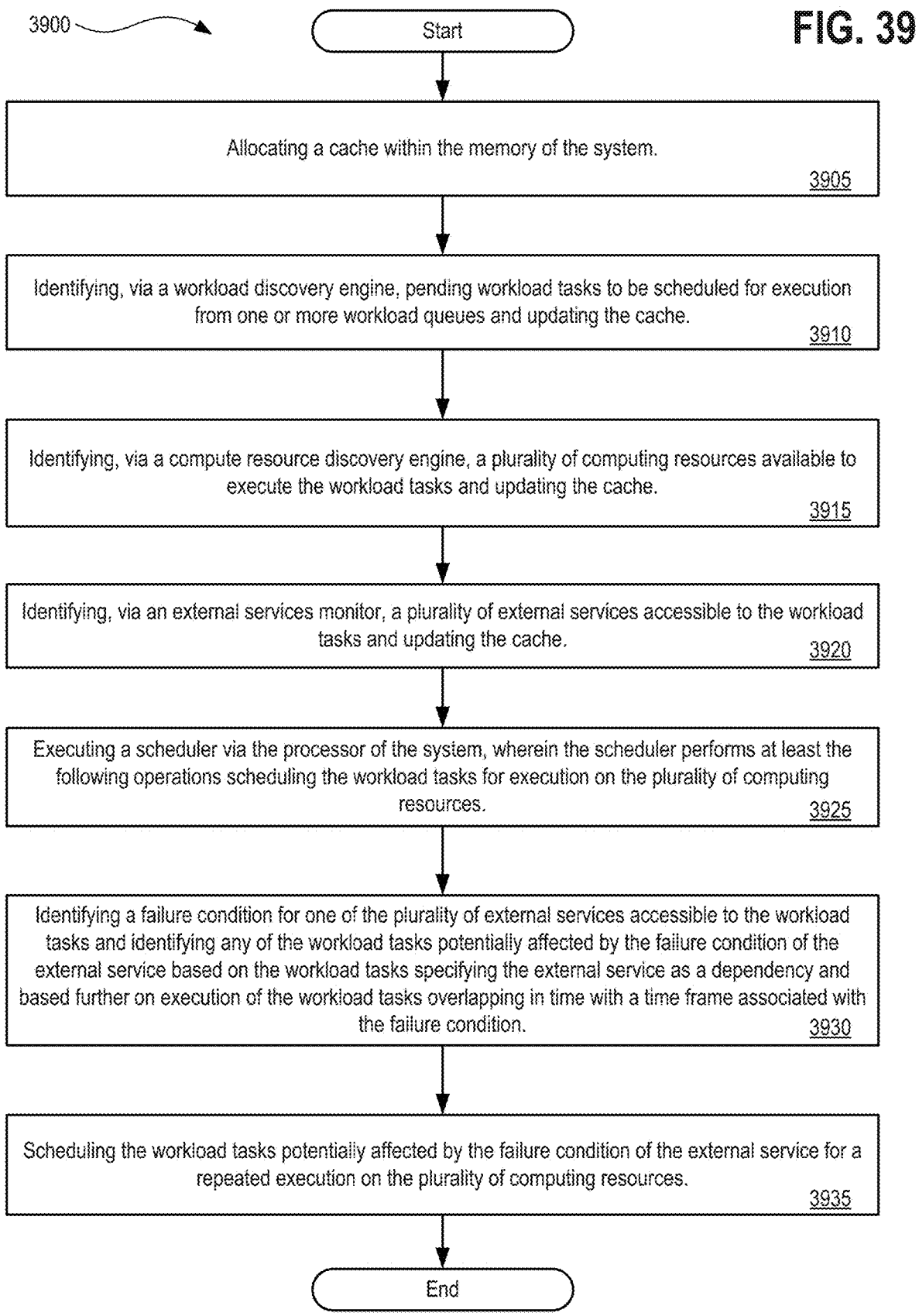

SYSTEMS, METHODS, AND APPARATUSES FOR IMPLEMENTING A SCHEDULER AND WORKLOAD MANAGER WITH DYNAMIC WORKLOAD TERMINATION BASED ON COST-BENEFIT ANALYSIS

CLAIM OF PRIORITY

This United States Continuation In Part (CIP) patent application is related to, and claims priority to, the non-provisional U.S. Utility patent application entitled "SYSTEMS, METHODS, AND APPARATUSES FOR IMPLEMENTING A STATELESS, DETERMINISTIC SCHEDULER AND WORK DISCOVERY SYSTEM WITH INTERRUPTION RECOVERY," filed May, 4, 2017, having an application Ser. No. 15/587,161 and is further is related to, and claims priority to, the non-provisional U.S. Utility patent application entitled "SYSTEMS, METHODS, AND APPARATUSES FOR IMPLEMENTING A SCALABLE SCHEDULER WITH HETEROGENEOUS RESOURCE ALLOCATION OF LARGE COMPETING WORKLOADS TYPES USING QOS," filed May, 4, 2017, having an application Ser. No. 15/587,170 and is further related to, and claims priority to, the non-provisional U.S. Utility patent application entitled "SYSTEMS, METHODS, AND APPARATUSES FOR IMPLEMENTING A SCHEDULER WITH PREEMPTIVE TERMINATION OF EXISTING WORKLOADS TO FREE RESOURCES FOR HIGH PRIORITY ITEMS," filed May, 4, 2017, having an application Ser. No. 15/587,188, the entire contents of each being incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of computing, and more particularly, to systems, methods, and apparatuses for systems, methods, and apparatuses for implementing a stateless, deterministic scheduler and work discovery system with interruption recovery supported by a processor and a memory to execute such functionality. Additional disclosed embodiments are related to systems, methods, and apparatuses for implementing a scalable scheduler with heterogeneous resource allocation of large competing workloads types using Quality of Service (QoS) requirements. Other disclosed embodiments are related to systems, methods, and apparatuses for implementing a scheduler with preemptive termination of existing workloads to free resources for high priority items supported by a processor and a memory to execute such functionality. Any such disclosed means may be implemented within the computing architecture of a hosted computing environment, such as an on-demand or cloud-computing environment, which utilizes multi-tenant database technologies, client-server technologies, traditional database technologies, or other computing architecture in support of the hosted computing environment.

BACKGROUND

The subject matter discussed in the background section is not to be assumed as prior art merely as a result of its mention in the background section. Similarly, a problem mentioned in the background section or associated with the subject matter of the background section is not assumed to have been previously recognized in the prior art. The subject matter in the background section merely represents different approaches, which in and of themselves may also correspond to claimed embodiments.

In the context of computing, scheduling is the method by which specified workloads are assigned to resources which are then responsible for completing the workloads. Such workloads may be, for example, virtual computation elements such as threads, processes, and data flows. The scheduling process applies available hardware resources such as processors, memory, hard drive space, network links, network addresses or IP (Internet Protocol) addresses, expansion cards, and so forth.

A scheduler responsible for performing the scheduling processes and generally will seek to perform a variety of functions in addition to scheduling work, such as optimizing utilizing of resources through a load balancing process which thus permits multiple users to share system resources more effectively.

Implementation of a scheduler is a technically complex task as there exist many criteria which affect operation of the scheduler and may in turn affect perceived performance of the underlying computing resources based on how the scheduler allocates resources and prioritizes competing needs.

Unfortunately, conventional schedulers fail to adequately address the needs of specified Quality of Service (QoS) targets or Service Level Targets (SLTs) such as those defining an exemplary 95th percentile expected completion time and resource usage for a given task. Moreover, it may be impossible to prove the correctness of a scheduling algorithm implemented by conventional schedulers as they generally lack sufficient extendibility and maintainability criteria.

The present state of the art may therefore benefit from the variously disclosed schedulers including the systems, methods, and apparatuses for implementing: (i) the stateless, deterministic scheduler and work discovery system with interruption recovery which is described herein; (ii) the scalable scheduler with heterogeneous resource allocation of large competing workloads types using Quality of Service (QoS) requirements which is described herein; and (iii) the scheduler with preemptive termination of existing workloads to free resources for high priority items, which is also described herein. Each of the described scheduler means are additionally operable within a cloud based computing environment in accordance with the described embodiments set forth below.

BRIEF DESCRIPTION OF THE DRAWINGS

Embodiments are illustrated by way of example, and not by way of limitation, and will be more fully understood with reference to the following detailed description when considered in connection with the figures in which:

FIG. 2A depicts an exemplary scheduling scheme as implemented by the scheduling service in accordance with described embodiments;

FIG. 2B depicts another exemplary scheduling scheme as implemented by the scheduling service in accordance with described embodiments;

FIG. 3 depicts another exemplary scheduling scheme as implemented by the scheduling service in accordance with described embodiments;

FIG. 4 depicts another exemplary scheduling scheme as implemented by the scheduling service in accordance with described embodiments;

FIG. 5A depicts another exemplary scheduling scheme as implemented by the scheduling service in accordance with described embodiments;

FIG. 5B depicts another exemplary scheduling scheme as implemented by the scheduling service in accordance with described embodiments;

FIG. 8 illustrates a diagrammatic representation of a machine in the exemplary form of a computer system, in accordance with one embodiment;

FIG. 33 depicts a flow diagram illustrating a method 3300 for implementing a scheduler and workload manager that identifies and optimizes horizontally scalable workloads supported by a processor and a memory to execute such functionality;

FIG. 34 depicts a flow diagram illustrating a method 3400 for implementing a scheduler and workload manager with snapshot and resume functionality supported by a processor and a memory to execute such functionality;

FIG. 35 depicts a flow diagram illustrating a method 3500 for implementing a scheduler and workload manager that identifies and consumes global virtual resources supported by a processor and a memory to execute such functionality;

FIG. 36 depicts a flow diagram illustrating a method 3600 for implementing a scheduler and workload manager with scheduling redundancy and site fault isolation supported by a processor and a memory to execute such functionality;

FIG. 37 depicts a flow diagram illustrating a method 3700 for implementing a scheduler and workload manager with cyclical Service Level Target (SLT) optimization supported by a processor and a memory to execute such functionality;

FIG. 38 depicts a flow diagram illustrating a method 3800 for implementing a scheduler and workload manager with dynamic workload termination based on cost-benefit analysis supported by a processor and a memory to execute such functionality; and FIG. 39 depicts a flow diagram illustrating a method 3900 for implementing a scheduler and workload manager with workload re-execution functionality for bad execution runs supported by a processor and a memory to execute such functionality.

DETAILED DESCRIPTION

Figure 1A:
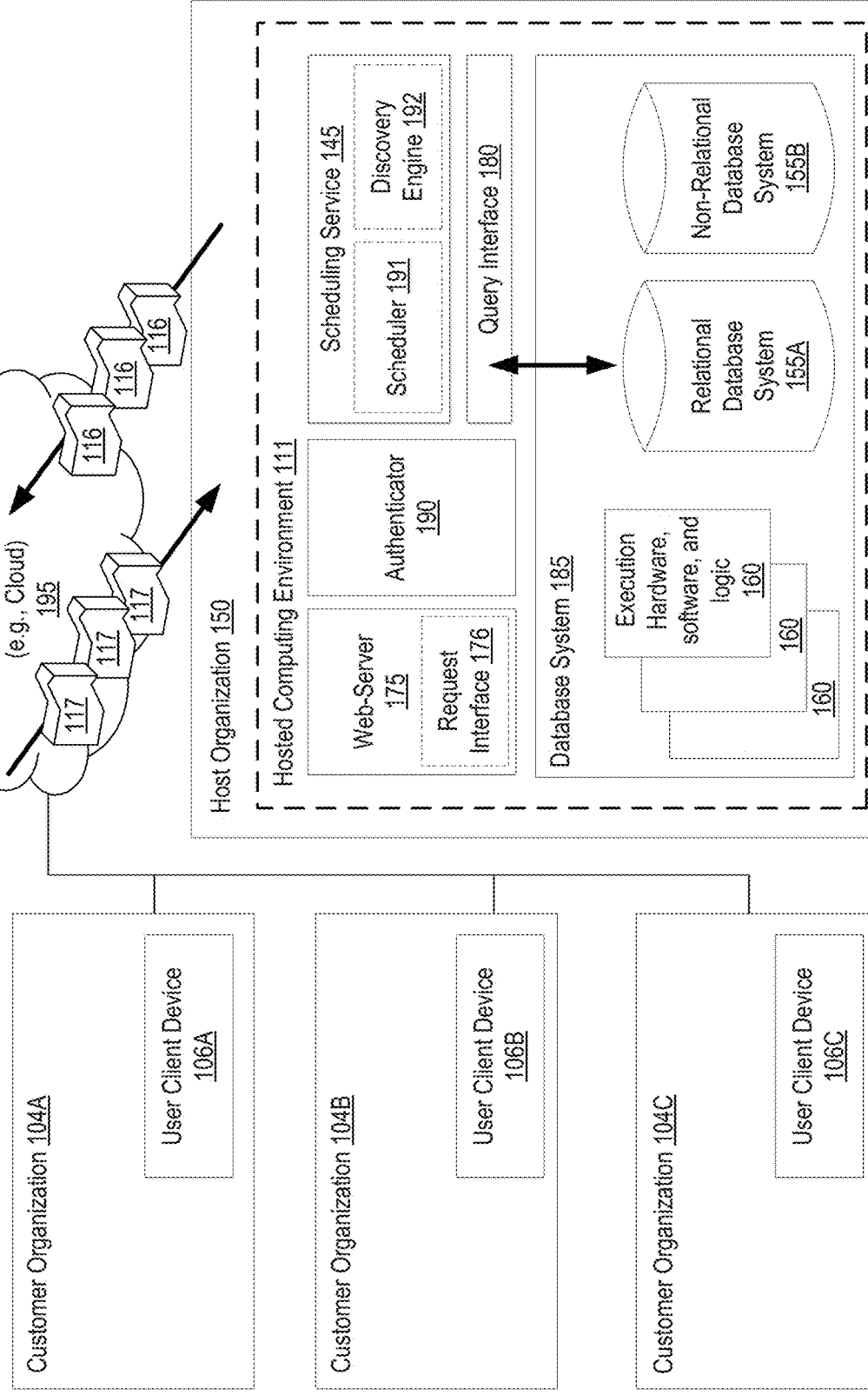
FIG. 1A depicts an exemplary architecture in accordance with described embodiments.

Described herein are systems, methods, and apparatuses for implementing a stateless, deterministic scheduler and work discovery system with interruption recovery within a cloud based computing environment.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1A depicts an exemplary architecture 100 in accordance with described embodiments. In one embodiment, a hosted computing environment 111 is communicably interfaced with a plurality of user client devices 106A-C (e.g., such as mobile devices, smart phones, tablets, PCs, etc.) through host organization 150. In one embodiment, a database system 185 includes databases 155A and 155B, for example, to store application code, object data, tables, datasets, and underlying database records with user data on behalf of customer organizations 104A-C (e.g., users of such a database system 185 or tenants of a multi-tenant database type database system or the affiliated users of such a database system). Such databases include various database system types including, for example, a relational database system 155A and a non-relational database system 155B according to certain embodiments.

In certain embodiments, a client-server computing architecture may be utilized to supplement features, functionality, or computing resources for the database system 185 or alternatively, a computing grid, or a pool of work servers, or some combination of hosted computing architectures may be utilized to carry out the computational workload and processing demanded of the host organization 150 in conjunction with the database system 185.

The database system 185 depicted in the embodiment shown includes a plurality of underlying hardware, software, and logic elements 160 that implement database functionality and a code execution environment within the host organization 150.

In accordance with one embodiment, database system 185 utilizes the underlying database system implementations 155A and 155B to service database queries and other data interactions with the database system 185 which communicate with the database system 185 via the query interface. The hardware, software, and logic elements 160 of the database system 185 are separate and distinct from a plurality of customer organizations (104A, 104B, and 104C) which utilize web services and other service offerings as provided by the host organization 150 by communicably interfacing to the host organization 150 via network 195. In such a way, host organization 150 may implement on-demand services, on-demand database services or cloud computing services to subscribing customer organizations 104A-C.

Further depicted is the host organization 150 receiving input and other requests 117 from a plurality of customer organizations 104A-C via network 195 (such as a public Internet). For example, incoming search queries, database queries, API requests, interactions with displayed graphical user interfaces and displays at the user client devices 106A-C, or other inputs may be received from the customer organizations 104A-C to be processed against the database system 185, or such queries may be constructed from the inputs and other requests 117 for execution against the databases 155 or the query interface 180, pursuant to which results 116 are then returned to an originator or requestor, such as a user of one of a user client device 106A-C at a customer organization 104A-C.

In one embodiment, each customer organization 104A-C is an entity selected from the group consisting of: a separate and distinct remote organization, an organizational group within the host organization 150, a business partner of the host organization 150, or a customer organization 104A-C that subscribes to cloud computing services provided by the host organization 150.

In one embodiment, requests 117 are received at, or submitted to, a web-server 175 within host organization 150. Host organization 150 may receive a variety of requests for processing by the host organization 150 and its database system 185. Incoming requests 117 received at web-server 175 may specify which services from the host organization 150 are to be provided, such as query requests, search request, status requests, database transactions, graphical user interface requests and interactions, processing requests to retrieve, update, or store data on behalf of one of the customer organizations 104A-C, code execution requests, and so forth. Web-server 175 may be responsible for receiving requests 117 from various customer organizations 104A-C via network 195 on behalf of the query interface 180 and for providing a web-based interface or other graphical displays to an end-user user client device 106A-C or machine originating such data requests 117.

The query interface 180 is capable of receiving and executing requested queries against the databases and storage components of the database system 185 so as to return a result set, response, or other requested data in furtherance of the methodologies described. The query interface 180 additionally provides functionality to pass queries from web-server 175 into the database system 185 for execution against the databases 155 for processing search queries, or into the other available data stores of the host organization's computing environment 111. In one embodiment, the query interface 180 implements an Application Programming Interface (API) through which queries may be executed against the databases 155 or the other data stores.

Host organization 150 may implement a request interface 176 via web-server 175 or as a stand-alone interface to receive requests packets or other requests 117 from the user client devices 106A-C. Request interface 176 further supports the return of response packets or other replies and responses 116 in an outgoing direction from host organization 150 to the user client devices 106A-C.

Authenticator 190 operates on behalf of the host organization to verify, authenticate, and otherwise credential users attempting to gain access to the host organization.

Still further depicted within the hosted computing environment 111 is the scheduling service 145 having therein both a scheduler 191 and also a discovery engine 192 capable of discovering available compute resources by which to complete workloads and further capable to discover pending workloads awaiting assignment to compute resources. As depicted here, the scheduling service 145 is hosted within host organization 150 as a cloud based service, however, the scheduling service 145 may optionally be provided as a separate scheduling platform external to the host organization 150 or provided by a different host organization.

Figure 1B:
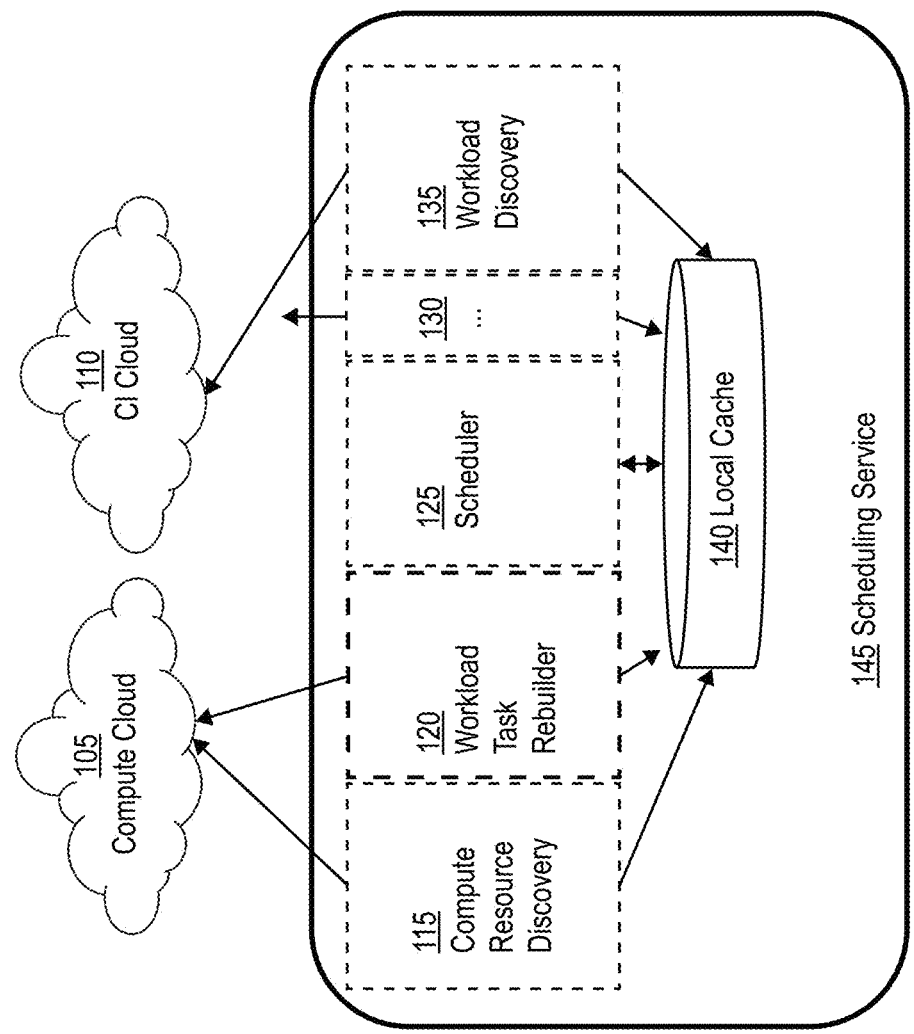
FIG. 1B depicts the scheduling service in additional detail and operating within an alternative stand-alone architecture in accordance with described embodiments.

FIG. 1B depicts the scheduling service 145 in additional detail and operating within an alternative stand-alone architecture 101 in accordance with described embodiments.

More particularly, there is depicted within the scheduling service 145 a local cache 140 which is communicably interfaced with each of a compute resource discovery 115 component, a workload task rebuilder 120 component, the scheduler 125, a workload discover 135 component, and additional scheduling functions 130. Each of the depicted components are in turn communicably interfaced with a compute cloud 105 and a Continuous Integration (CI) cloud 110 or a Continuous Integration Software (CI software) cloud. Each of the components may be interfaced with the compute cloud 105 and the CI cloud 110 from within the previously depicted host organization 150 of FIG. 1A or may alternatively be interfaced to the compute cloud 105 and the CI cloud 110 from a stand-alone scheduling service 145 architecture 101 such as that which is depicted at FIG. 1B.

By providing multiple separate and discreet services, each capable of updating the local cache 140 view of the scheduler 125, the scheduler is freed from the responsibility of collecting such information and integrating the requisite information within the local cache 140 and may therefore apply its computational resources specifically to the scheduling functions.

In such a way, the scheduler 125 is enabled to utilize the local cache 140 to make decisions on resource allocation while leveraging the various services to monitor external resources as well as utilizing the separate services including the compute resource discovery 115 component and the workload discovery 135 component to rediscover and re-import or update the status of any running tasks on the externally provided compute resource pools. For instance, resource pools or third party clouds may go online and offline or may become available to perform work or be wholly consumed and therefore unavailable to perform work. There are additional factors which may change such as pricing and preference and performance metrics, each of which may likewise be monitored and updated by the compute resource discovery 115 component of the scheduling service 145.

By updating the local cache 140 with any recently discovered tasks, the scheduler 125 will make the correct decisions based on the most up to date information available without being burdened by having to maintain such information or collect and store such information as part of the scheduling process. According to one embodiment there is a separate monitor for every available computing cloud and each monitor continuously updates the local cache 140 on behalf of the scheduler. Therefore, where there is both a compute cloud 105 and a CI cloud 110, there may be two separate and distinct monitors, one for each cloud, with each of the monitors observing their respectively associated cloud and updating the local cache 140 on behalf of the scheduler 125 with updated information and metrics as they become available to the monitors.

According to a particular embodiment, every time a new compute cloud is discovered or re-discovered, the workload discovery 135 component will then query that discovered compute cloud requesting all running tasks and completed tasks, at which point the workload discovery 135 component will then update the local cache 140 on behalf of the scheduler 125 so as to fully describe the present state of the newly discovered or rediscovered compute cloud. During any subsequent scheduling cycle, the scheduler 125 will then reference the local cache 140 and thus make scheduling and planning determinations based upon the most up to date and relevant information without having to go and collect such information.

The scheduling service 145 provides means by which to dynamically allocate compute capacity at anytime, such as allocating CPU, RAM, IP, etc., as necessary for performing a specific type of work according to need. Such compute capacity may exist within a large cloud-based and on-demand host organization, which provides computing resources to customers as a service. Certain clouds provide very large pools of heterogeneous resources capable of processing very large sets or many small sets of heterogeneous workloads.

The scheduling service 145 is further enabled to prioritize resource allocation according to need for any given type of workload with the specified QoS of the workload provided in the form of a Service Level Target (SLT). An exemplary SLT may define the 95th percentile expected completion time and resource usage for a given task, for a given user, for a given customer organization, etc.

The scheduler 125 as described herein is highly adaptable yet operates without requiring any perfect single scheduling algorithm, which may arguably be impossible to develop. Rather, by utilizing iterative processing, a simplistic scheduling policy may be utilized for initial planning, allocation, and selection, while permitting subsequent iterations to improve upon the initial or prior planning, allocation, and selection determinations based on current information.

For instance, accordance to a particular embodiment, the scheduler 125 independently determines where resources are allocated on an iterative cycle, such as minute by minute, or other iterative timing loop. Moreover, the describe scheduler 125 embraces an eventual consistency design thus permitting for a highly decoupled scheduler implementation. According to described embodiments, the scheduler 125 dynamically discovers workload and resources via its workload discovery 135 and compute resource discovery 115 components respectively. Moreover, such a scheduler 125 dynamically reacts to workload types and workload requirements and recognizes all the requirements or other criteria that must be met for any given type of workload. Because the scheduler 125 is extendable via other functions 130 there are further optimizations that may be permissibly developed by users, customers, or other developers interested in providing add-ons to the core scheduling service 145.

Such a scheduler 125 may be utilized for scheduling in general application workloads such as for a CRM application, used for scheduling workloads associated with web servers and other application infrastructure owned by the host organization, used for allocation and scheduling of virtualized resources such as those allocated to Virtual Machines (VMs), used for Software Defined Data Center bring-up or reallocation, used for Salesforce.com specific "Force" Application Models, Kubernetes, and Orchestration engines, as well as used for expanding or contracting to accommodate non-linear workloads such as seasonal and cyclical workloads.

The scheduler 125 is decoupled from the underlying workloads and compute resources by embracing an eventual consistency such that separate functional components within the scheduling service 145 are responsible for gathering the requisite data on behalf of the scheduler and making such data available by caching the needed information in the local cache 140 for fast retrieval and processing.

For instance, information provided and cached within the local cache 140 by the components of the scheduling service 145 include a list of available resources, a list of workload types and the resource requirements for those workload types, and a list of jobs for each of the workload types that need to be performed.

According to described embodiments, the scheduler takes into account the quality of service or a Service Level Target (SLT) for every workload type performed. For instance, workload tasks will require some amount of time to process regardless of what computing architecture they are executed against, however, they SLT for a given workload type may specify a priority or an expected completion time or an acceptable amount of processing time or an acceptable cost to complete the processing and so forth.

Based on the specified SLT, the scheduler will dynamically allocate capacity for different types of work as scheduled so as to perform the scheduled work in a manner consistent with the specified SLT for those workloads. Not all workload tasks are equal, however, and thus, the scheduler must accommodate the different computational burdens, the different computational and architecture requirements, and the different Quality of Service (QoS) or SLT expectations for each workload task, with every scheduled task being in contention for limited resources with all other scheduled workload tasks.

Conventional solutions utilize a status allocation model in which a prediction is made for any scheduled work or expected work in terms of how much computing resources should be reserved. Unfortunately, such a model locks up resources for defined periods of time and risks having sub-sets of computing resources sitting idle or under-utilized if the expected workload does not arrive while other computing resources are over-utilized or the overall system is indicating an over-allocated state and therefore refusing to accept new work leading to overall performance degradation.

Through a dynamic allocation process as implemented by the scheduling service it is possible to realize both more efficient computing architecture utilization while simultaneously delivering greater compliance with expected QoS and SLTs.

The scheduling service must make many decisions in quick succession and therefore, the various services are provided to support the scheduler's core function of creating, selecting, and planning the execution of tasks.

Therefore, all of the information which will be utilized by the scheduler as part of its decision process to create, select, and schedule workload tasks are kept locally within the local cache 140 so as to ensure very fast access and eliminate any latency associated with the scheduler attempting to retrieve such information from their original source.

Because the scheduler 125 pulls all requisite information from the local cache 140, it is the responsibility of the various components to retrieve and populate the local cache 140 with the relevant information as well as maintain such information on behalf of the scheduler 125, including updating the information within the local cache 140 as necessary.

By decoupling the compute resource discover 115 component and the workload task rebuilder 120 component and the workload discovery 135 component from the scheduler 125 the local cache may be maintained without burdening the scheduler or inducing latency within the scheduler.

As depicted here there are two principle resources accessible to the scheduling service. The compute cloud 105 provides computing architecture upon which workload tasks may be performed and the CI cloud 110 is where the work that needs to be performed is discovered such that it may be scheduled for execution. Consider for instance a software platform with multiple change lists and many configuration variations, all of which require testing. Such software platform variants requiring test may be hosted within the Continuous Integration (CI) cloud 110 to be discovered and ultimately scheduled for execution via the compute cloud 105.

The compute cloud 105 and CI cloud 110 do not necessary have to be associated with the scheduling service 145 or even the host organization within which the scheduling service 145 operates. For instance, the compute cloud 105 and CI cloud 110 may be controlled by a third party cloud computing service such as Google or Amazon, etc. The compute resource discovery 115 component discovers and defines the available compute clouds 105 as well as their hardware and performance characteristics and other metrics such as licenses, pricing, software builds, operating system (e.g., mac, Windows, Linux, etc.), patch levels, permissibility to execute generic virtual machines (VMs), cost or budget to utilize a particular machine, permissibility of executing a single VM and OS license with one or many CPUs, and so forth. If one of the computing clouds 105 expands its hardware offerings or changes its available capacity in some way, then the compute resource discovery 115 component which monitors the compute clouds 105 will discover such a change and update the local cache accordingly.

In such a way, the compute resource discovery 115 component constantly observes, monitors, and interacts with the available compute clouds 105 and updates the local cache as appropriate such that the scheduler may then have access to the latest and most accurate information with which to schedule workload tasks for execution without obligating the scheduler 125 itself to seeking out or requesting such information as part of the scheduling process which could induce undesirable latency problems. Rather, the compute resource discovery 115 component creates a representation of the relevant information on behalf of the scheduler 125 and stores and maintains such a representation within the local cache which is accessible to the scheduler 125.

The CI cloud 110 or continuous integration cloud 110 lists the many tests, check-ins, validations, and other work constantly on-going within the host organization on behalf of its customer organizations and on behalf of its internal software offerings. The CI cloud 110 lists such work and permits the scheduler's workload discover 135 to discover the work and represent those tasks within the local cache where they may then be picked up for selection and planning by the scheduler 125 to be executed at any one of many accessible compute clouds 105.

According to a particular embodiment, the additional scheduling functions 130 are expandable by other developers which may create a component to update the local cache 140 with their own representation of workload tasks to be scheduled for execution by the scheduler 125. Because each developer may create their own expansion to the scheduling functions 130 there is a reduced likelihood of the developers' code and tasks conflicting with one another. Rather, the information is assimilated within the local cache and then retrieved by the scheduler 125 as part of its processing. The developers may utilize the expandable scheduling functions 130 to specify their SLT requirements and other policy considerations such as pricing, licensing requirements, software requirements, and so forth for their workload tasks which will then be represented within the local cache.

According to a particular embodiment, each software variant may require a distinct image or a specific operating system configuration or a specific version of patches, etc. Such requirements are identified to the scheduler so that the testing may then be matched against a base image meeting the particular requirements as specified for testing that particular software variant. For instance, a workload task for testing a particular version may specify that for that task a specifically identified base image must be utilized to ensure correct execution of the test sequence embodied within the workload task.

Because the scheduler must handle thousands of incoming workload tasks it is undesirable to reference the database system of the host organization for every transaction as doing so requires a processing delay which undermines the performance of the scheduler. It is therefore in accordance with described embodiments that the scheduler makes all scheduling and prioritization decisions exclusively upon data and information stored within the local cache, with such information being maintained within the local cache by the other components of the scheduling service 145, such as the compute resource discovery component 115 and the workload discovery component 135.

In such a way, the components of the scheduling service other than the scheduler 125 itself operate as auxiliary services which are responsible to reach out and query various computing clouds to check whether they are accessible and available and what workload tasks they are presently executing or have completed, with such auxiliary services then updating the local cache on behalf of the scheduler 125.

Figure 1C:
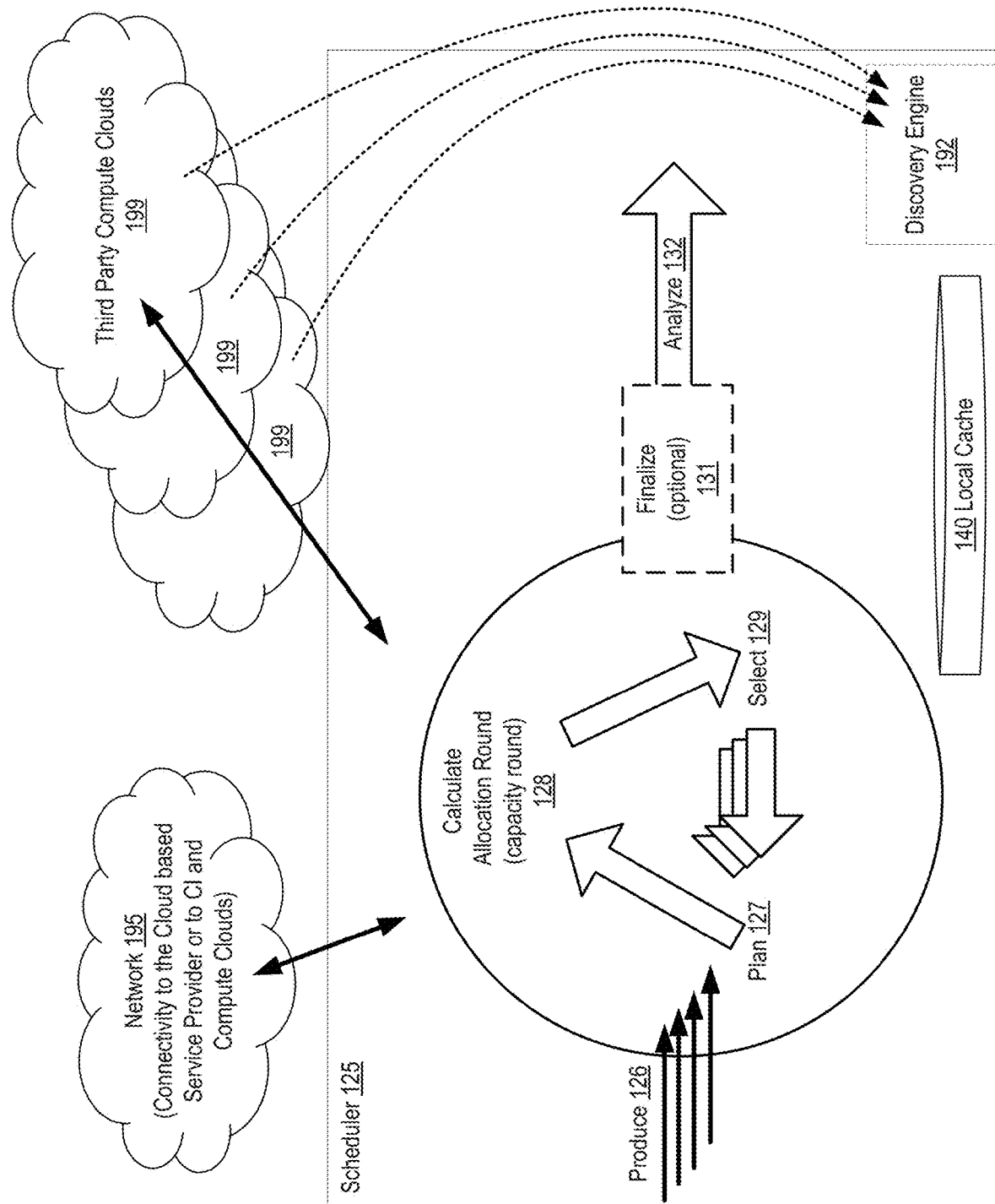
FIG. 1C depicts additional functions of the scheduler in greater detail in accordance with described embodiments.

FIG. 1C depicts additional functions of the scheduler 125 in greater detail in accordance with described embodiments.

More particularly, there is depicted the scheduler 125 being communicatively interfaced with network 195, for instance, providing connectivity to the cloud based service provider or to the Continuous Integration (CI) cloud and the compute cloud. Further depicted within the additional functions of scheduler 125 are a production or a produce 126 operation which generates work or enqueues work to be performed. Work is then planned 127 subsequent to which a calculate allocation round 128 is performed and work is selected 129, in which the plan 127, calculation allocation 128, and select 129 operations may be iteratively repeated as workloads flow into and out of the scheduler. The finalize 131 and analyze 132 operations then evaluate the selected 129 work in the context of required or expected performance metrics.

Additionally depicted is the discovery engine 192 capable of identifying accessible and on-line third-party compute clouds 199 as well as querying the third-party compute clouds for information such as currently executing workload tasks, workload task types supported, completed workload tasks, and other possible metrics, such as cost, performance, etc.

According to described embodiments, such a scheduler 125 may implement simple and deterministic policies which are easily understandable, extendable, testable, and debuggable. Such a scheduler may therefore generate sub-optimal results, yet through the iterative processing permit improvement as the scheduler cycles over and over evaluating and analyzing the work to be performed and making its allocations. Moreover, though the analysis 132 phase it is possible then to make adjustments to the output and selected 129 work as determined by the scheduler.

Within the scheduling service 145 from FIG. 1B, the scheduler 125 as depicted here works from locally cached data and to allocate the available resources using the following exemplary allocation scheme. For instance, the scheduler 125 first produces 126 all tasks possible for a given workload type along with an associated priority for each task, with the production operating in isolation from other workload types. Next, the scheduler calculates a next allocation round 128 including the round's priority and allowed resources for each workload type. Selection 129 to capacity then proceeds by first selecting tasks for each workload type from the produced set of tasks according to both the round's priority and also the workload type's resource allocation. Planning 127 then effectuates a stated plan for the given round according to all tasks that were selected for that round and according also to the available resources for that round.

For a next capacity round, the scheduler then proceeds to calculate the next capacity round by taking into account the recently planned tasks at phase 127 and then the scheduling cycle is optionally finalized 131. A subsequent analyze 132 phase then applies post-scheduling analysis to check any decisions made during the scheduler's allocation rounds to check for potential scheduling improvements for future rounds.

Notably, the production 126 phase is agnostic as to total available capacity and rather, simply generates all possible work which remains pending, regardless of whether or not capacity exists for such work. Rather the produce 126 phase prepares a comprehensive list of all pending work for a single workload type. Ideally, the scheduler would begin its calculate allocation round 128 phase on the assumption that an infinite amount of resources exist, however, in reality, the tasks are prioritized and therefore, the producer 126 additionally specifies the importance or priority for every task created according to the workload type's SLT or required QoS.

The capacity round implements a round-robin resource allocation which singularly focuses on available capacity without any consideration whatsoever of how many tasks were produced or the priority of any given task or any logical considerations as to planning or task selection. Rather, the capacity round simply considers available capacity, evaluates the requirements for each type of workload, and calculates whether or not sufficient resources exist for one more instance allocation of the tasks for that given workload type during the present round. If resources are available to allocation another instance of a pending task, then the round-robin capacity round process simply allocates that instance. The scheduler 125 then iterates through as many rounds as required to either exhaust all available resources or exhaust all produced tasks.

According to a particular embodiment, there is a starvation check implemented by the scheduler 125. In the context of computing, starvation is a problem with concurrent computing processes where one process is perpetually denied necessary resources to complete its work. Therefore, according to one embodiment, starvation is avoided by configuring the capacity round to begin allocating at very low percentage of the total available resources and then gradually increasing the allocated percentage subsequent rounds. Each round is also assigned a specified priority and thus, early rounds begin with high priority tasks and gradually decrease the priority to permit allocation of lower priority tasks via the scheduler 125.

Selection 129 of tasks is similar to the production 126 of tasks as there is no consideration of available capacity or any consideration given to other possible workload types. However, unlike the production 126 phase which creates the tasks the selection 129 phase is solely responsible for selecting from the list of previously created tasks.

Upon reaching the selection 129 phase, it is known precisely which tasks are to be executed for the given workload type and which compute resources are specifically required to perform those tasks as well as the prioritization for the current round. Based on this information, a most appropriate task that will fit within the specified resources is selected.

At the planning 127 phase, the scheduler knows precisely which tasks for which workload types are selected for execution and then proceeds to allocate the resources from the available pool of resources accordingly. Considering the heterogeneous nature of resources and workloads, the planner 127 may be utilized to allocate resource for the most efficient utilization or for best performance (e.g., the fastest execution). Other considerations may likewise be employed, such as the lowest cost resources or the most preferred among two or more resources from competing clouds.

When utilized, the optional finalize 131 operation evaluates all of the produced 126, selected 129, and planned 127 tasks, as well as the available resources and applies final optimizations to the resulting selection and allocation. For instance, the finalize 131 operation may be utilized to help guide future production, selection, and planning of resource allocation in the form of aging, bookkeeping, or other optimizations such as starvation avoidance or more effective utilization of resources to meet SLTs and QoS requirements.

It is therefore in accordance with such embodiments that the scheduling service 145 implements a framework having concrete and individualized operations, each of which themselves have well defined input/output. Together, the components of the scheduling service 145 are enabled to schedule even very complicated resource and work requirement combinations. Further still, because each phase of operation is individualized and lacking in complexity due to the clearly defined division of responsibility for each of the various operations, it is possible to implement deterministic policies for each of the operations which will integrate and interoperate through the scheduling service.

While such an adaptive scheduler may appear nondeterministic the output itself is deterministic and through a set of small and well defined policies to construct such a scheduler 125, it is thus possible to both maintain and also extend the scheduler to support new features, requirements, types of workloads, or any other type of customization required or desired by consumers.

For instance, such policies may be specific to the workload types and produced tasks being processed while having no function for other non-specified workload types to which such policies do not apply. For instance, there may be a scheduler having resources on multiple compute service providers or multiple distinct clouds. Such scheduler may therefore be made to recognize, through such policies, a continuous integration (CI) software implementation such as that depicted at FIG. 1B. Because the scheduler utilizes separate services by communicating with a variety of available computing pools, including cloud-based resources provided by third-party and external service providers, the compute resource discovery component (e.g., element 115 of FIG. 1B) may discover the presence of such resources and write such information to the local cache from which the scheduler may then read from local cache during the scheduling process and allocate workload to the third party cloud or to the services provided by an external service provider. Because the discovery mechanism writes the information to local cache the scheduler may continue to operate in a fast and efficient manner without having to stop the scheduling operations to reach out and discover or inquire as to potentially available resources and workload task support from the third party or external service providers. Even where the scheduler is to allocate to compute resources provided within the host organization for a scheduling service also operating within the same host organization, the local cache and compute resource discovery means serve to keep the scheduling service operating in a fast and efficient manner.

As shown here, the initial produce 126 operation is responsible for producing a list of all possible jobs for a given workload type during any particular cycle, without any regard whatsoever to the available capacity to perform such work. Rather, the produce 126 function builds a list of jobs that have not yet been planned for execution and indeed are not yet executing, and thus require scheduling. Such jobs will be listed by the produce 126 operation regardless of their priority as well as it is the responsibility of the produce operation 126 to produce or create a fully exhaustive list, whereas subsequent functions of the scheduler 125 will then seek to make the most appropriate selection and planning determinations.

There is also the potential for jobs that were previously produced, selected, and planned for execution, and possibly even jobs that began execution, to be identified by the produce 126 operation where such jobs are no longer executing and are not identified as completed. This may occur where such jobs are scheduled for execution and terminated prematurely, evicted from execution by a particular computing cloud, or where a third party compute cloud or a local compute cloud goes off-line for scheduled or unscheduled downtime, thus resulting in the previously executing job having an unknown state where it is no longer currently executing and where it also is not marked as completed. Consequently, the workload discovery engine 192 would update the local cache with that particular workload task as requiring scheduling and the produce 126 would consequently create or list a workload task corresponding to the previously scheduled but never completed job.

According to a particular embodiment, there are hundreds of supported workload types capable of being produced, selected, and planned for execution based on their respective priorities, SLT expectations, execution requirements, and current capacity. According to one embodiment, the scheduler will iterate through every possible supported workload type seeking to identify any workloads for each respective type as a group and then produce a list of workloads corresponding to the particular type being evaluated, subsequent to which the scheduler will advance to the next supported workload type and again, via the produce operation, produce a list of all workloads for that particular type, and so on, until every possible supported workload type has been considered. In other embodiments, multiple threads may iterate through every possible supported workload type, albeit, on a per-type by per-type basis, notwithstanding multiple threads executing concurrently.

The defined output of the produce operation 126 is a list of workloads of one specific supported workload type, which require scheduling, selection, and planning for execution. Each listed workload task may additionally be associated with supporting information by the produce operation 126, such as current priority for that task, time since submission or a submission time, expected execution time, SLT expectations, cost constraints or cost budgets for execution of that workload task, preferred third-party compute cloud(s) 199 or local compute cloud preferences, execution requirements such as base image, virtual image, memory, CPU, vCPU(s), software version, and so forth.

Because the various decision points are broken out as individual operations, including the produce 126 phase, the calculate allocation (e.g., capacity) round 128 phase, the select 129 phase, the plan 127 phase, and the optional finalize 131 and analyze 132 phases, each individual operation is highly specialized, extremely fast and efficient, and capable of operating in accordance with simple and straight forward policies.

After the produce phase, the scheduler 125 then proceeds to calculate an allocation route based on the service level targets and capacity that is known to be available at that time (e.g., as represented in the local cache 140 data as maintained by the discovery engine 192). The defined output therefore from the calculate allocation round 128 operation is a determined capacity available for the known list of all possible workload tasks for a given workload type as created by the produce operation 126.

The scheduler 125 then proceeds with the select 129 operation in which the scheduler identifies which of those workload tasks will be picked up for planning against the available capacity. Consider for instance that there are multiple third-party compute clouds 199 presently accessible, some of which are small and have highly restricted capacity whereas others are much larger and may therefore accommodate greater allocations. Additionally, each of the various third-party compute clouds 199 or even local compute clouds or computing pods within a host organization executing the scheduling processing may have different characteristics, such as cost, hardware, software version, etc. The scheduler's 125 select 129 operation identifies which of the available tasks will be picked up for execution given the capabilities to perform the work associated with those tasks in further consideration of the priority and SLTs associated with the identified workload tasks previously produced.

The scheduler's 125 planning 127 operation then proceeds to specifically delineate which task will be performed by which compute cloud from the list of selected workload tasks. For instance, a first priority 1 workload task may be sent to a first third party cloud 199 with other priority 2 tasks being sent to different third-party compute clouds 199 and yet additional tasks having a lower priority being planned for execution by a local computing pod or a local computing cloud of a host organization within which the scheduler 125 operates. Such planning takes into account the policies which may be defined for the workload tasks specifically for the planning 127 phase of the scheduler's 125 processing.

According to certain embodiments, the scheduler 125 then repeats or iteratively applies these calculation 128, selection 129, and planning 127 operations until either the list of produced workload tasks is fully exhausted or the available capacity is fully exhausted. Thus, the scheduler 125 may repeat the processing until all tasks have been planned to satisfaction or all available capacity has been fully exhausted. It is therefore possible that not all tasks will be selected and planned for execution, thus causing them to age in terms of time since submission as well as possibly increase in priority for subsequent scheduling rounds to the extent necessary for the scheduler to ensure that such pending and non-planned workload tasks ultimately are set for execution in accordance with QoS and SLTs associated with the tasks as well as to prevent a starvation condition.

In accordance with another embodiment, some portion of available capacity is left unplanned for produced tasks so as to leave allocation space for possible last minute or late incoming high priority tasks. For instance, the scheduler 125 may iterate through its process operations (e.g., calculating allocation, selecting, planning, etc.) many times, even hundreds of times, so as to plan for execution the tasks for which capacity is available and during this time if high priority tasks arrive, the scheduler 125 may reach the finalize 131 stage at which point it is analyzed whether any high priority tasks remain or have been updated within the local cache 140, and if so, the scheduler may then proceed to allocate those high priority tasks into the portion of available capacity previously left unplanned. In alternative embodiments, the scheduler 125 may additionally or alternatively evict previously planned tasks or even early terminate previously planned and now presently executing tasks so as to schedule high priority late arrival tasks for execution.

According to particular embodiments, the finalize 131 and/or analyze 132 operations are performed separate from and subsequent to the operations performed by the scheduler 125, for instance, being performed by a host organization within which the scheduler 125 operates. In such instances, the separate and distinct finalize 131 and/or analyze 132 operations may override the planning decisions made by the scheduler so as to accommodate or improve upon the execution plan. For instance, such an override may be to replace lower priority tasks with pending higher priority tasks due to such tasks arriving late or not being present within the original produced 126 list of workload tasks, or so as to correct an erroneous or inefficient selection and planning policy instituted by the scheduler 125. In such a way, the scheduler 125 may iteratively process and create a plan of execution with simple policies and decision points, yet remain optimize-able by subsequent finalize 131 and/or analyze 132 operations, regardless of which such functionality resides.

According to a particular embodiment, a simulator is used to estimate changes to computing infrastructure at a local or remote computing pod or third party datacenter accessible via a computing cloud by writing simulated data into the local cache representing additional hardware and computing infrastructure availability via one of the computing resources as well as simulated workload tasks queued for execution. According to such an embodiment, the scheduler may then be utilized to process the simulated data written to the local cache by processing the simulated data written to local cache by iterating through the produce, calculate, select, and plan operations to yield a scheduling plan based on SLTs for the simulated workload tasks and the simulated data representing the additional computing hardware. Such a utility may be utilized to evaluate "what if" scenarios. For instance, to evaluate whether additional computing hardware will sufficiently meet anticipated demand or sufficiently meet actual historical demand. Because the scheduler simply pulls data from the local cache, it is agnostic to the fact that the data in local cache is being provided by a simulator rather than being actual production data.

Figure 1D:
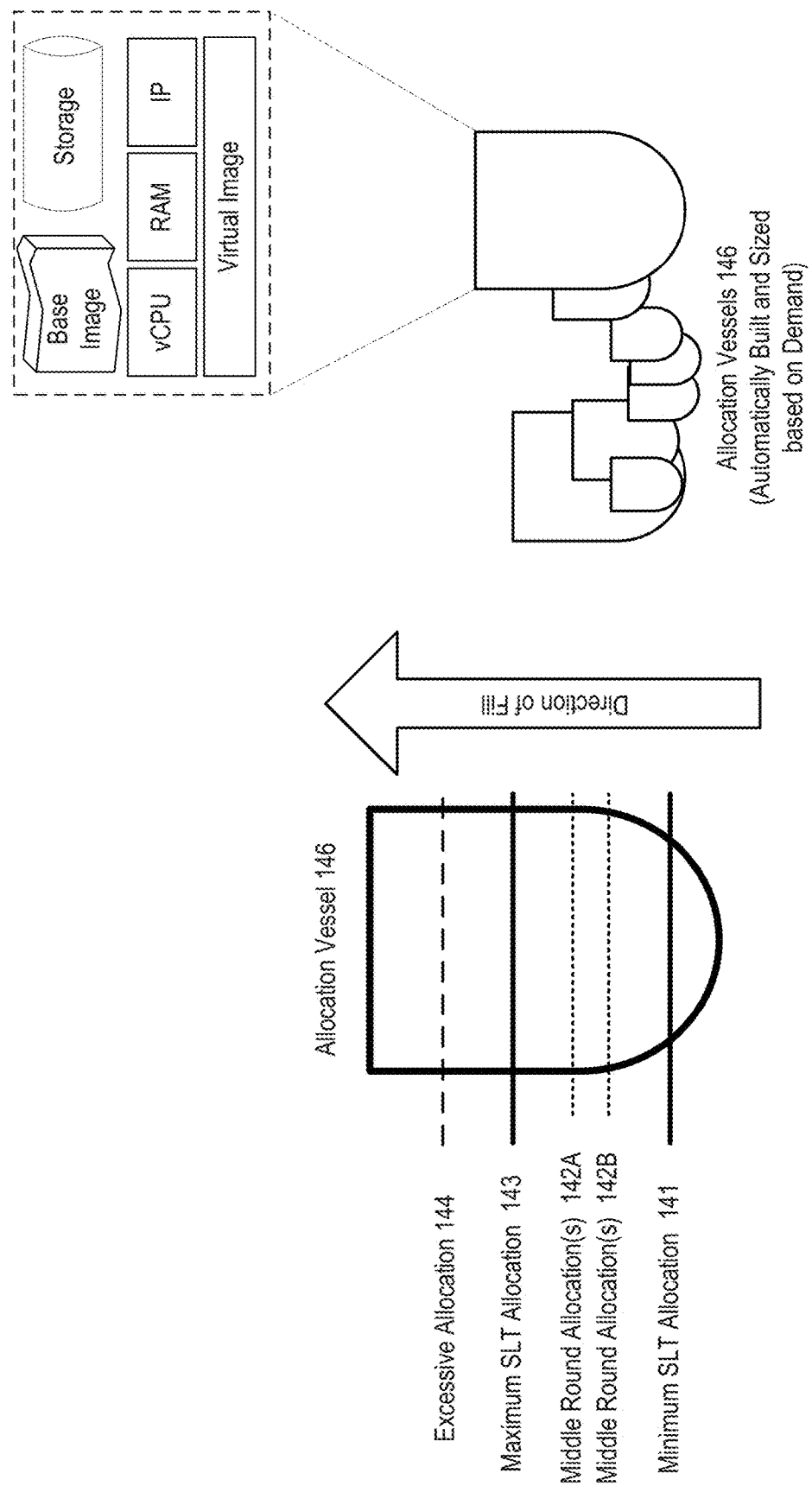
FIG. 1D depicts an exemplary allocation vessel having varying levels of fill in accordance with described embodiments.

FIG. 1D depicts an exemplary allocation vessel 146 having varying levels of fill in accordance with described embodiments.

For instance, as is depicted to the left of the allocation vessel 146, there is a minimum SLT allocation 141, followed by any number of middle round allocations 142A-142B, and then a maximum SLT allocation 143. As is additionally depicted, as the allocation vessel is filled with workload by the scheduler, it is possible to overfill the allocation vessel 146 as is depicted by the excessive allocation 144 level nearest to the top.

Additionally depicted here within the allocation vessels 146 are greater details of each allocation vessel which includes any number of computing resources capable of performing work including, for instance, a base image, storage, CPU allocation or a virtual CPU (vCPU) allocation, RAM, IP or other network address space, and a virtual image. Such allocation vessels 146 are automatically built (e.g., for the base image, etc.) and are sized based on demand by assigning more or less computing resources to any given allocation vessel 146.

Consider for instance each of many compute clouds or computing pods having a allocation vessel 146 representing a set amount of execution capacity for that particular compute cloud or computing pod. Such an allocation vessel 146 may be thought of as a glass of water which begins empty or nearly empty and is then gradually filled with water, where the glass represents the total capacity for a computing cloud and the water represents workload tasks being executed or planned for execution by each respective computing cloud.

Certain glasses or allocation vessels 146 may be full or nearly full (e.g., at or above their maximum SLT allocation 143) and therefore, no additional tasks are allocated whereas other allocation vessels 146 represent compute clouds which have not yet reached their maximum SLT allocation 143, and are therefore "thirsty" for water or capable of receiving additional workload task allocation for execution.

For each compute cloud as represented here by an allocation vessel 146 there may be a minimum and maximum SLT for each workload type. Therefore, the scheduler will seek to provide to every allocation vessel 146 at least a minimum SLT allocation 141 while "pouring" or "filling" the additional available capacity through middle round allocations 142A-142B during iterative processing of the scheduler without surpassing the maximum SLT allocation 143 for any given allocation vessel 146. However, as noted above, some headroom or buffer may be reserved for high priority workload tasks, into which either the scheduler's selection and planning operations or subsequent finalize and/or analyze operations may allocate workload tasks into one or more of the allocation vessels 146 in excess of the maximum SLT allocation 143 threshold, thus resulting in an excessive allocation 144. In certain instances, the excessive allocation 144 may be permitted to remain until the computing cloud completes planned work and thus recedes back below the maximum SLT allocation 143 threshold or alternatively the scheduler or subsequent finalize and/or analyze operations may evict or early terminate some portion of tasks executing within a given allocation vessel 146 to immediately bring that compute cloud back below the maximum SLT allocation 143 threshold so as to affirmatively and immediately eliminate the excessive allocation 144 condition.

According to at least one embodiment, the reserved portion of available compute capacity is set as a percentage of total compute capacity (e.g., such as 10% or 15%) within which the scheduler does not plan selected workload tasks for execution, yet may subsequently during a finalize and/or analyze phase plan tasks for execution, thus consuming the previously reserved portion and consuming the last remaining 10% or 15% of reserved compute capacity. In such a way, the compute clouds may be utilized at maximum efficiency while also permitting late arrival and high priority scheduling for workload tasks which are not selected and planned during normal iterative processing by the scheduler yet meet policy requirements for immediate or special handling during a finalize and/or analyze phase.

FIG. 2A depicts an exemplary scheduling scheme 200 as implemented by the scheduling service in accordance with described embodiments.

According to an exemplary embodiment, the scheduler (e.g., scheduler 125 from FIGS. 1A-1C) is responsible for allocating two distinct types of workloads, such as group A 202 workloads identifying the boxes having the thick black border and group B 203 workloads identifying the boxes having the thin black border.

In the simplest example, there is depicted at the local view 210 compute resources provided by cloud A 205, such as computing architecture available within the host organization hosting the scheduling service or a particular cloud-based service platform provided by a third party and accessible to the scheduling service, regardless of whether the scheduling service operates within a host organization or as a stand-alone scheduling service.

Notably, there are no tasks presently running within cloud A 205.

During the produce 215 operation, the scheduler creates create three group A 202 tasks of a first workload type in which there is one priority 1 task, one priority 2 task, and one priority 3 task. During the same produce 215 operation, the scheduler additionally creates four group B 203 tasks of a second type, in which there is one priority 1 task, one priority 2 task, one priority 3 task, and one priority 4 task.

All of the tasks are created by the scheduler with consideration of the pending workload presently enqueued and awaiting start of work as well as all tasks that are actually in progress at that time.

Because the information is stored within and served up by a local cache the access to such information is extremely fast, thus permitting the scheduler to cycle through the process multiple times per minute.

Continuing with the above example, transitioning to the calculate round 220 operation having a P1 status (priority 1 status), the scheduler calculates the first allocation round and determines that the group A 202 tasks require a much larger allocation, thus permitting multiple large tasks of equal size while allocating a much smaller collection of resources to the group B 203 tasks. As depicted, the large box with the thick black border at operation 220 indicates a larger resource allocation whereas the smaller box with the thin black border at operation 220 indicates a smaller allocation of resources. Therefore, during the first calculate round 220 the scheduler gives group A 202 a larger resource allocation, allowing for almost four workload tasks of equal size, whereas the group B 203 tasks receive a smaller allocation.

Moving to the select 225 operation, because there are priority 1 tasks in both groups, the select operation 225 selects the one priority 1 task from group A 202 and selects the one priority 1 task from group B 203. The select operation 225 additionally selects the one priority 2 task from group A. The remaining tasks from groups A and B 202-203 are not selected.

At the planning 230 operation there are only sufficient resources within cloud A 235 for two tasks and consequently, there is one group B 203 task planned for work via the available cloud A 235 and there is one group A 202 task to be planned for work via the same cloud A 235. The selected group A 202 priority 2 task is not planned for execution at this time via cloud A 235.

The cloud A 235 provides available resources to perform work, but it is not necessarily owned or controlled by the host organization operating the scheduler 125 and in the case of a stand-alone scheduler architecture, the clouds by definition must be third-party cloud-based resources capable of performing work on demand. Exemplary clouds capable of performing such work include private clouds such as Open-Stack and VMWare as well as public clouds such as AWS and Azure.

FIG. 2B depicts another exemplary scheduling scheme 201 as implemented by the scheduling service in accordance with described embodiments.

As depicted here, both workload types from group A 202 and also group B 203 are allocated by the scheduler in parallel 280.

During the produce 215 operation, the scheduler creates create three group A 202 tasks of a first workload type in which there are two priority 1 tasks and one priority 2 task. During the same produce 215 operation, the scheduler additionally creates four group B 203 tasks of a second type, in which there is one priority 1 task, two priority 2 tasks, and one priority 3 task. As before, the tasks are created by the scheduler with consideration of enqueued and waiting workload as well as tasks that are actually in progress.

Transitioning to the calculate round 220 operation having a P1 status (priority 1 status), the scheduler calculates the first allocation round and determines that the group A 202 tasks require a larger allocation, thus permitting approximately four large tasks of equal size while allocating a much smaller collection of resources to the group B 203 tasks.

Moving to the select 225 operation, because there are priority 1 tasks in both groups, the select operation 225 selects the two priority 1 tasks of group A 202 and selects the one priority 1 task of group B 203.

At the planning 230 operation there are only sufficient resources within cloud A 235 for two tasks and consequently, there is one group B 203 task planned for work via the available cloud A 235 and there is one group A 202 task planned for work via the same cloud A 235.

Additional resources are required to plan the remaining priority 1 task from group A 202 and consequently, the last remaining priority 1 task from group A 202 is planned for execution via a separate computing resource pool provided by cloud B 236, thus completing the plan 230 phase. The remaining tasks from groups A and B 202-203 were not selected and are not planned for execution via either cloud A 235 or cloud B 236 at this time.

Subsequent to the P1 priority status first calculation round 220 operation, the scheduler will repeat processing until either all available resources are exhausted or until all produced tasks are exhausted.

Therefore, in a subsequent calculation round (not shown) the scheduler will reduce the priority to 2 given that all priority 1 tasks are already planned. Because all priority 1 tasks have been planned there only remains sufficient processing resources for two additional tasks. Therefore, each of group A 202 and group B 203 include one priority 2 task selected and planned for execution. The selected tasks are allocated to cloud B 236 as it is the only cloud with remaining compute resources available.

After this second P2 calculate round, all of the group A 202 workload tasks have been selected and planned in a prior round whereas group B 203 has tasks remaining which have yet to be selected and planned, with group B 203 specifically having one priority 2 task remaining and one priority 3 task remaining.

During the next calculate round it is determined by the scheduler that no compute resources remain and thus the scheduler ends the cycle, despite the fact that some workload tasks from group B 203 remain yet to be selected or planned for execution.

According to one embodiment, the scheduler next runs the optional finalize operation and recognizes that group B 203 has outstanding tasks that are not yet planned for execution. Because group B 203 is a lower priority workload type according to this example, the finalize operation takes no further action and does not age any workloads given that compute resources were allocated to group B 203 during the scheduling process, albeit not sufficient resources to process all of group B 203 tasks pending.

Because there are many different reasons to create tasks, there will be multiple producer policies for creating tasks via the produce 215 operation, such as the creation of tasks to build artifacts whereas another type of workload may create a task for executing tests, and each will likely have a different priority. Similarly, the remaining operations of the scheduler including the selection 225 and planning 230 phases will likewise benefit from having simple and well-defined operations which, when taken together, operate as a sophisticated scheduler service.

Specifically depicted here are multiple computing resources or multiple pools of computing resources, such as the cloud A 235 and cloud B 236, into which the scheduler may produce, calculate capacity, select, and plan execution of workload tasks concurrently in parallel 280. It is very likely that there are many varying types of computing resources accessible to the scheduler for assigning workload tasks to be performed, be they local or remote computing pods within a local or a remote host organization or public and private third-party computing clouds accessible to the scheduler.

Moreover, there may be a very wide variation amongst the various computing clouds 235 or computing resources accessible to the scheduler, such as the quantity of RAM, CPUs, vCPUs, pricing, software versions, base images, operating systems, patch levels, peripherals, licenses, and so forth. Moreover, the differences amongst the computing resources affect the amount of time that any given workload task may take to complete based on the above characteristics of such computing resources.

The scheduler therefore may take such information into account when calculating capacity and allocating selected workload tasks into the available calculated capacity by modeling the expected performance of allocated tasks at the variously available computing clouds 235 and 236, so as to generate an expected plan of execution for the workload tasks. In such a way, the scheduler may then allocate workload tasks in accordance with QoS or SLT provisions specifying, for instance, permissible timing for completion of a task. Other policy, QoS, or SLT considerations which may be evaluated by the scheduler include seasonal or periodic demand such as work that is high priority during the day or during working hours but low priority when executed on a weekend or vise versa.

The scheduler may iteratively perform the producing, calculating, selecting, and planning operations so as to gradually fill the available capacity of the various computing clouds to a maximum permissible capacity.

According to a particular embodiment, as the scheduler gradually files the variously available computing clouds to capacity, the scheduler estimates time to completion for the workload tasks planned for execution based on a histogram providing a distribution of workload tasks assigned to the various computing resources. The scheduler may select a workload task for execution and assign the selected task to a particular computing resource based on which of the available resources will complete the assigned workload task within an SLT required time limit based on the histogram. In such a scheme, the scheduler may not necessary assign a selected workload task to a fastest or best performing computing resource, but rather, select one of the computing resources which is fast enough, based on QoS or SLT requirements.

In such a way, the scheduler models a forward looking view when creating a plan 230 to determine whether everything scheduled will complete within an acceptable time period. Where selected workload tasks cannot meet the requirements based on available capacity at the computing resources the scheduler may need to evict previously scheduled workloads, terminate currently executing workloads, or re-enqueue the workload task with a higher priority such that it is scheduled with greater preference during a subsequent scheduling cycle.

Certain tasks may initially be queued with a very low priority and therefore reside within a list produced 215 for a long period of time without ever being selected. For instance, if a workload task must execute every 12 hours, then during the first hour, the workload task may have such a low priority that it is never selected and planned for execution by the scheduler. However, the identical task will increase in urgency over time due to aging as the target completion time nears closer. If the workload takes 30 minutes to complete on a typical computing resource then by the sixth hour the same task may have a medium priority and by the 11th hour the same task may be increased to a critical priority, thus causing the same scheduler to evaluate the same task differently. A workload discovery engine may therefore monitor such workload tasks queued for execution and update a local cache with the presence of such a workload task as well as the priority and aging of such work in accordance with QoS or SLT requirements.

Because the scheduler executes in an iterative fashion, the schedulers produce 215, calculate 220, select 225, and plan 230 operations will continuously re-assess queued workload tasks which have not yet been scheduled for execution or have not completed execution and thus, as the priority or age or SLT/QoS requirements associated with such a task change over time as represented by the local cache, the scheduler will respond to these changes when it pulls information for a next scheduling iteration from the local cache, regardless of what may have occurred in the past for any given workload task. Even where workload tasks are re-enqueued due to having failed, been terminated, evicted, or simply timed-out, the scheduler will simply treat the re-enqueued workload tasks based on their currently available information as represented by the local cache. A workload discovery engine may therefore recover from a failed or terminated workload task by updating the local cache to indicate the workload task requires execution as well as possibly indicating a heightened priority or a greater age for the task.

Should the entire scheduling service terminate and be re-instantiated, the workload discovery engine will update the local cache with all pending workload tasks yet to be scheduled, all presently executing workload tasks from known and currently accessible computing resources, and all completed tasks previously assigned to a computing resource. In such a way, it is not necessary for the scheduling service to persistently maintain state information as such state information may be dynamically re-built ad-hoc as needed, including associated priority information, aging information, and so forth. Such information may be discovered by the workload discovery engine from, for example, a continuous integration cloud listing work to be completed or from other work queues or sources accessible to the workload discovery engine.

FIG. 3 depicts another exemplary scheduling scheme 300 as implemented by the scheduling service in accordance with described embodiments.

Following from the tasks depicted at FIGS. 2A and 2B, there are now depicted at FIG. 3 one priority 1 task from each of group A 302 and group B 303 presently executing via cloud A 335 as shown within the local view 310.

In a subsequent scheduling round, because cloud A 335 already includes the priority 1 tasks from groups A and B 302-303 the scheduler will produce a different set of tasks at produce operation 315, thus resulting in group A 302 having only two workload tasks, one priority 2 task and one priority 3 task and group B 303 having three workload tasks, one priority 2 task, one priority 3 task, and one priority 4 task.

As described above, certain tasks may not be selected or scheduled once the available compute resources are fully exhausted, even where there remains tasks to be scheduled.

However, consider that a new compute cloud is discovered by the workload discover component or alternatively, a previously known but unavailable compute cloud becomes available after freeing up resources or after finishing scheduled maintenance or after unexpectedly being unavailable or inaccessible.

Because the compute resource discovery component and the workload discovery component monitors the availability and completed or executing tasks at the variously available compute clouds the local cache will be updated by such monitoring services and the scheduler can then make new and more up to date determinations as to what tasks are to be selected and planned for execution.

Even if the local cache has been flushed or overwritten, the monitoring services will update and maintain the local cache with the new information reflecting that a second compute cloud has now come back on-line or is for whatever reason, available again despite being previously unavailable.

The following figure depicts the scheduler accounting for such a change via its iterative processing.

FIG. 4 depicts another exemplary scheduling scheme 400 as implemented by the scheduling service in accordance with described embodiments.

As depicted via local view 410, there is now a new compute cloud accessible and available to the scheduling service. Specifically, there remains cloud A 435 which was previously available, however, there is now additionally depicted cloud B 440 which was previously unavailable or inaccessible. For instance, cloud B 440 may be re-discovered by the monitoring components such as the compute resource discovery component at element 115 from FIG. 1B after a maintenance window or other period where the services are unavailable.

As shown here, there is a priority 2 task from group A 402 and a priority 3 task from group B 403 presently executing within cloud B 440 which are updated to the local cache after re-discovery of the cloud B 440 and after the workload discovery operation which queries for any running and completed tasks.

Here the produce 415 operation immediately recognizes that the priority 2 task from group A 402 and the priority 3 task from group B 403 are executing within the cloud B 440 and therefore, the produce operation 415 generates only a single remaining priority 3 task from group A 402 and the priority 2 and priority 4 tasks from group B 403 which remain yet to be selected and planned for execution.

In such a way, even unscheduled or unexpected downtime does not disrupt the scheduler which simply accommodates the new information by the eventual consistency design and thus permitting for a highly decoupled scheduler implementation from the various computing clouds.

Whereas FIG. 3 depicts the allocation of workload tasks into only a single cloud FIG. 4 depicts the allocation of workload tasks into multiple compute clouds, specifically cloud A 435 and cloud B 440. Based on the capacity of each cloud certain amount of workload is computed and then pending workload tasks produced and selected by the scheduler are planned for execution via the computed capacity of each cloud. During each heartbeat or iteration of the scheduler's compute, selection, and planning phases, additional workload tasks are planned for execution within the available capacity of the respective compute clouds 435 and 440 until all tasks produced have been exhausted or until all calculated capacity of the respective compute clouds is consumed.

However, according to the described embodiments, the scheduler adapts to any scheduled or unscheduled downtime exhibited by any compute cloud. For instance, consider that at FIG. 3 there were two compute clouds into which capacity was calculated and workload tasks were executing or being planned for execution, yet the second compute cloud B 440 as depicted here became unavailable or became out of contact with the scheduler. In such a situation, the scheduler will continue to compute, select, and plan for execution workload tasks within the cloud A which remains available (e.g., cloud A 335 at FIG. 3) and those tasks which were executing at cloud B but not completed will therefore re-appear on the produce list created by the scheduler and therefore be subject to selection and planning by the scheduler within the remaining available computing cloud (e.g., cloud A 335 at FIG. 3).

When the second computing cloud again becomes available as is depicted by cloud B 440 at FIG. 4, the executing workload tasks 2 and 3 within the second computing cloud B 440 do not need to be re-selected or re-planned for execution, but rather, a workload discovery engine of the scheduler will discover that cloud B 440 is again available, updating the local cache with the availability of such a compute cloud, and the workload discovery engine will additionally identify those tasks completed by cloud B 440 as well as those tasks executing within cloud B 440. In the event that tasks on a produce list are not also shown executing within cloud B 440 which becomes available again after a scheduled or unscheduled period of inaccessibility, the executing tasks at cloud B 440 will simply be stripped from the produce list of the scheduler (e.g., by the workload discovery engine updating the local cache based on query response(s) from the compute cloud B 440) such that those executing and not yet completed tasks are no longer subject to the selection and planning operations by the scheduler.

Similarly, entire scheduler mechanism is likewise resilient to planned or unplanned outages which causes a partial or total loss of status of pending or completed workload tasks or a partial or total loss of communication with any of the local or third-party compute clouds. Because the information utilized by the scheduler is entirely based on data stored within the local cache which is maintained by the auxiliary services of the scheduler such as the compute resource discovery mechanism (e.g., element 115 of FIG. 1) and the workload discovery mechanism (e.g., element 135 of FIG. 1), it is therefore possible for the scheduler to encounter a total loss of state data or a total expected or unexpected shutdown and yet recover seamlessly as the discovery engines supporting the scheduler will independently identify any possible compute clouds capable of performing work (e.g., via the compute resource discovery engine), independently identify work to be performed (e.g., via a continuous integration cloud), independently identify executing and completed work (e.g., via the workload discovery engine), each of which update the local cache, from which the scheduler will then have all requisite data to continue producing workload tasks requiring execution, selecting those tasks, and planning those tasks for execution, regardless of any prior shutdown or loss of state data.

For example, even where the scheduler loses connectivity with both cloud A 435 and cloud B 440, once the scheduler resumes connectivity with the compute clouds, the discovery engines will update the local cache with the relevant data and the scheduler may then proceed forward as if connectivity had never been lost. Specifically, the scheduler need not re-schedule the tasks presently executing by the compute clouds as such work will be re-discovered as either having completed or remaining executing and therefore such workload tasks will be stripped or pruned from any production list of workload tasks yet to be planned.

Where such tasks are re-discovered as either having been completed or remaining executing, the tasks are effectively dropped from the scheduler due to their removal from the produce operation which provides as input to the scheduler all pending workload tasks for a given workload type yet to be scheduled.

FIG. 5A depicts another exemplary scheduling scheme 500 as implemented by the scheduling service in accordance with described embodiments.

In accordance with certain embodiments, there is an optional finalize 530 operation which is performed after the completion of all rounds of allocation to capacity for available resources. Such a finalize 530 operation provides analysis of the set of tasks produced, selected, and planned.

As shown here, there is a priority 1 task from group A 502 and a priority 3 task from group B 503 presently executing within cloud 505 as may be observed within the local view 510.

According to such an embodiment, the produce 515 operation of a subsequent round of scheduling (e.g., after the round that selected and planned the now executing tasks at cloud A 505) creates three tasks from group A 502 including two priority 1 tasks and a single priority 2 task. For group B 503 the produce 515 operation creates four tasks including a single priority 1 task, two priority 2 tasks, and a single priority 3 task.

The depicted cloud A 505 has room only for two tasks, and is presently executing two tasks, a priority 1 and a priority 3 task.

At the calculate round 520 the scheduler recognizes that there is no remaining capacity available via cloud A 505 to be allocated to any task and therefore, despite having produced three group A 502 tasks and four group B 503 tasks, many of which are of higher priority than the presently executing priority 3 task, the calculate round 520 causes the scheduler to complete empty 581 without selecting or planning any further tasks for execution due to having already exhausted all available compute resources.

However, at the optional finalize 530 operation, the scheduler recognizes that a high priority 1 task remains within each of groups A and B 503-504 which has yet to be selected and planned for execution whereas a much lower priority 3 task from group B 503 is currently executing.

Consequently, the scheduler via the finalize 530 processing operation will affirmatively move to evict the lower priority 3 task from group B 503 from executing at cloud A 505, thus causing an early termination 506 and non-completion of the lower priority 3 task from group B 503.

Because the scheduler operates with discrete and segregated functions it is possible to re-evaluate previously scheduled jobs, even those previously selected and planned for execution.

At some point, no matter how good any scheduler or scheduling algorithm may be, there will be mistakes which need correcting, such as a higher priority job being left unscheduled while lower priority work is selected and planned for execution.

So as to fully utilize available computational resources to their fullest and in the most efficient manner possible, the scheduler provides the further capability of post-selection and post-planning review in a process referred to herein as "finalizing" or "analyzing." During such finalize and/or analyze operations the scheduler will re-evaluate prior decision making implemented by other functional components, such as the preceding selection and planning phases.

Consider for instance work that is planned for execution on a remote third party computing cloud while resources remain free and available internal to the host organization. Because the internally available resources represent a fixed capital cost, they are essentially free or nearly free to utilize (e.g., ignoring the marginal increase in electricity costs). It may therefore be preferable to kill or terminate planned work, even currently executing work, which is running on a third party computing cloud in favor of scheduling and performing such work on the locally available computing resources within the host organization's computing infrastructure.

It is therefore in accordance with described embodiments that planned workloads presently executing on a third party cloud may be terminated prematurely, before they finish, and re-scheduled for execution within available capacity of the host organization.

In other embodiments, the finalize operation may re-evaluate scheduled work and identify a lower priority job executing within a computing cloud that may be evicted from its allocated computing capacity space at a local or remote computing cloud on the basis that, for example, the work is of a lower priority than pending higher priority work and further on the basis that the work may be canceled and re-scheduled at a later time and still finish within an expected SLT target time frame.

According to such an embodiment, the scheduler will optimistically plan the higher priority workload for execution within computing capacity presently allocated and being utilized by a currently executing workload and then immediately terminate and evict the currently running workload and initiate execution of the higher priority workload in its place.

Such a situation may occur because during the produce stage there are two higher priority jobs which must be selected and planned for execution as depicted here, along with the lower priority P2 and P3 jobs. However, because the lower priority P3 was already executing within the computing cloud A 505, only one of the two high priority P1 jobs is selected and planned for execution, thus leaving the other high priority P1 job behind and yet to be scheduled.

If there is insufficient capacity remaining to schedule, plan, and execute the last remaining high priority job then the job will be passed over and remain queued as depicted by calculate round 520 for which the remaining available capacity is empty 581.

Regardless, during the analyze stage, functionality recognizes that there remains another high priority P1 job yet to be selected and planned while the lower priority P3 job remains executing. Consequently, the analyze stage functionality will pre-maturely terminate the lower priority P3 job, thus evicting the lower priority P3 job from its allocated computational space within compute cloud A 505, and thus freeing compute capacity into which the higher priority P1 job may then be planned for execution.

With room now available or one more high priority P1 job to execute within the compute cloud A 505, the scheduler's analyze stage will select and plan the P1 job and initialize execution of the P1 job within the compute cloud A 505 within the space previously utilized by the evicted P3 job.

Because the lower priority P3 job was killed without successful completion, the P3 job will be returned to the produce queue where a subsequent iteration of the scheduler will produce a list of pending workload jobs to be scheduled, within which the terminated P3 job will be ready for selection and planning operations.

According to certain embodiments, the scheduler's analyze stage replaces or swaps the higher priority P1 job with the lower priority P3 job evicted from the compute cloud A 505. In alternative embodiments, the lower priority P3 job is re-queued within local cache and the higher priority P1 job remains queued within local cache and a subsequent iteration of the scheduling service then produces all workload jobs of a given type to be scheduled for execution thus identifying both the re-queued lower priority P3 job and also the higher priority P1 job. With the complete list of all workloads of a given type having been produced, the produced list of jobs is then provided as input to the scheduler in the manner described above, from which the calculate, select, and plan operations proceed as discussed above (refer to the calculate 128, select 129, and plan 127 operations at FIG. 1C) within which the higher priority P1 job will be selected and planned for execution within the space freed up via the eviction of the lower priority P3 job.

The terminated job will be one for which the system's scheduling service has a high degree of confidence that despite being terminated, may be re-scheduled at a later time and still finish within a time frame set by the SLT for the terminated job. In such a way, it is possible that the same job may be scheduled, terminated, re-queued, re-scheduled, and terminated again, multiple times, before eventually moving up the queue in terms of priority or urgency such that it is eventually scheduled and executed through to completion without further interruption. Moreover, each time a job is terminated prematurely its remaining window of time within which it may successfully execute to completion in compliance with its SLT timeframe is reduced, and therefore, such terminated jobs will organically become increasingly urgent and increase in priority until such time that the job may be scheduled and execute to completion.

The following figure demonstrates the new allocation of the higher priority P1 task subsequent to the analyze stage functionality having freed up resources within the cloud A 505 due to the early termination 506 of the group B 503 priority 3 task.

FIG. 5B depicts another exemplary scheduling scheme 501 as implemented by the scheduling service in accordance with described embodiments.

As depicted here by local view 510, the cloud A 505 now has only a single priority 1 task from group A 502 presently executing as a consequence of the early termination 506 of the group B 503 priority 3 task as depicted at FIG. 5A.

The produce 515 operation generates three group A tasks as before but now generates five group B tasks, including the recently terminated 506 group B task 503 priority 3 task evicted by the scheduler during the finalize 530 operation.

The calculate round 520 now recognizes that compute resources are available via cloud A 505 which has a single resource space remaining and consequently selects and plans for execution the priority 1 task of group A 502 resulting in the priority 1 task of group A taking the place of the previously executing lower priority 3 task from group B.

In such a way, the finalize 530 operation institutes a policy that checks for more important high priority tasks which were produced but not planned and then seeks to reclaim lower priority tasks presently executing and thus consuming compute resource space. During a next scheduling round, the higher priority tasks are then planned as result of capacity opening up. Considering the scheduler is likely running at high utilization levels of its resources, there are likely to be lower priority tasks that may have already started before the scheduler has an opportunity to select and plan the higher priority task.

By calculating required capacity in the optional finalize 530 operation and then identifying all tasks which have been started opportunistically, the scheduler may determine it is favorable to evict or terminate such tasks early based on their remaining time, priority, workload type, and/or SLTs, so as to make room for and schedule higher priority tasks which will then preempt the lower priority tasks within the available compute resources, such as those provided by cloud A 505 as depicted here.

The scheduler will make its determination as to which tasks may be removed based on whether or not the evicted tasks may be started later and still meet their applicable SLT, essentially resulting in no Quality of Service loss due to the preemption.

Figure 6:
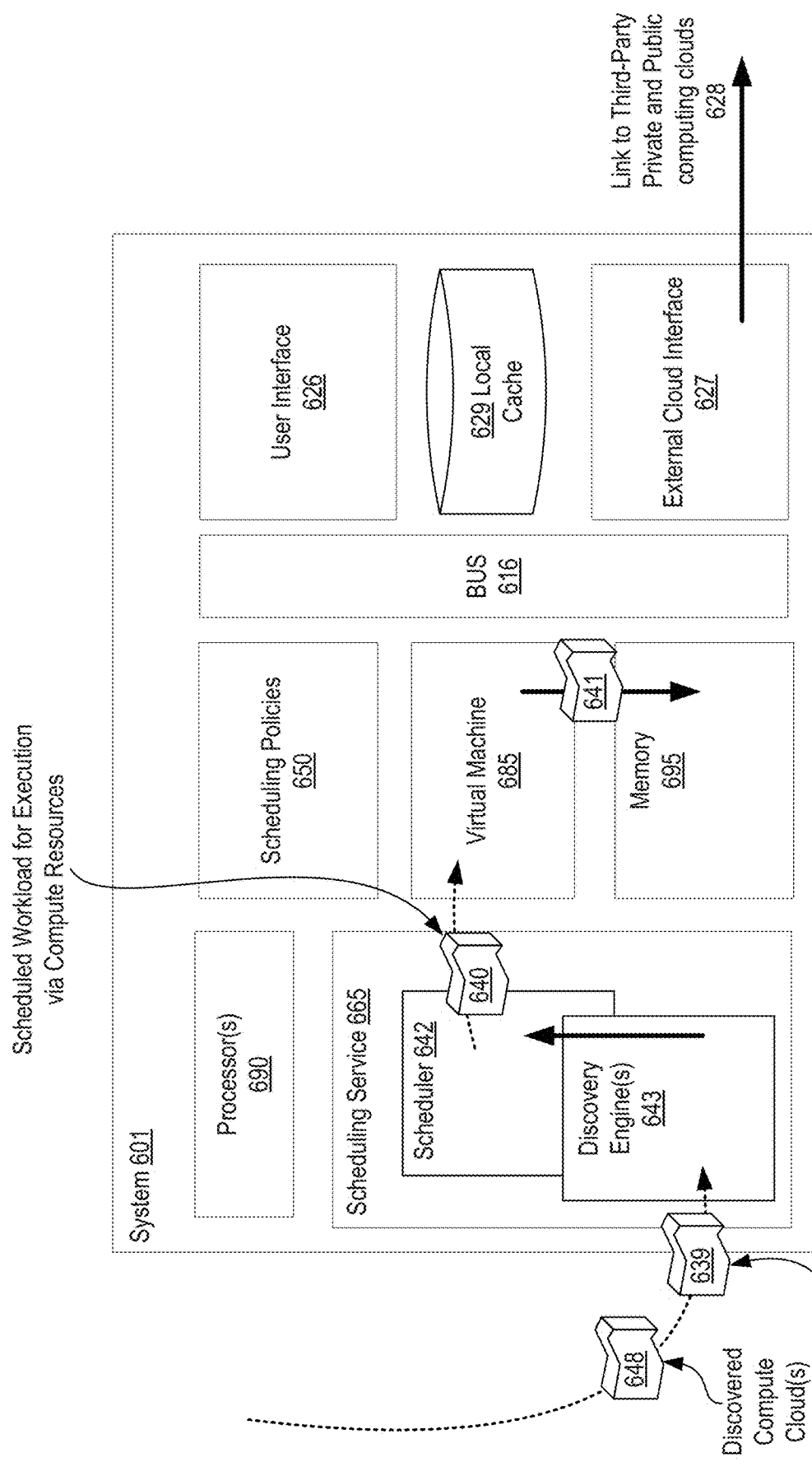
FIG. 6 shows a diagrammatic representation of a system within which embodiments may operate, be installed, integrated, or configured, in accordance with described embodiments.

FIG. 6 shows a diagrammatic representation of a system 601 within which embodiments may operate, be installed, integrated, or configured.

According to the depicted embodiment, the system 601, which may operate within a host organization, includes the processor 690 and the memory 695 to execute instructions at the system 601. According to such an embodiment, the system 601 further includes: a scheduling service 665 which includes discovery engine(s) 643 to receive query responses for workloads executing at compute clouds specifying completed and executing work as well as discovery of the compute clouds 648 themselves which are capable of performing work on behalf of the scheduling service. Further included within scheduling service 665 is scheduler 642 which selects and plans workloads tasks 640 for execution via available compute resources pursuant to the scheduling policies 650. For instance, as depicted here there is a virtual machine 685 having mapped computing resources such as vCPU, RAM, a base image, a virtual image, IP space and network links, etc. The virtual machine 685 executes the workload tasks 641 in conjunction with memory 695.

According to another embodiment of the system 601, a user interface 626 operates at a user client device remote from the system and communicatively interfaces with the system via a public Internet and the external cloud interface 627 provides a communications link to third party private and public computing clouds 628 on behalf of the scheduling service 665.

Such a system may reside within a host organization which operates as a cloud-based service provider to the user client device; in which the cloud-based service receives inputs from the client device at the user interface 626 to configure use of the scheduling service 665 and identify workload tasks to be performed on behalf of the user device or on behalf of a customer organization, developer, business customer, or another user.

In accordance with one embodiment of the system 601, the system implements a scheduling service 665, in which the system includes: a processor 690 and a memory 695 to execute instructions at the system 601; a compute resource discovery engine 643 to identify one or more computing resources such as a private or public computing cloud 628, in which the computing resources are available to execute workload tasks 640; a workload discovery engine 643 to identify a plurality of workload tasks 640 to be scheduled for execution responsive to queries 639 by the workload discovery engine; a local cache 629 to store information on behalf of the compute resource discovery engine 643 and the workload discovery engine 643; a scheduler 642 to request information from the local cache 629 specifying the one or more computing resources available 628 to execute workload tasks and the plurality of workload tasks 640 to be scheduled for execution; and further in which the scheduler is to schedule at least a portion of the plurality of workload tasks 640 for execution via the one or more computing resources 628 based on the information requested Bus 616 interfaces the various components of the system 601 amongst each other, with any other peripheral(s) of the system 601, and with external components such as external network elements, other machines, client devices, cloud computing services, etc. Communications may further include communicating with external devices via a network interface over a LAN, WAN, or the public Internet.

According to another embodiment of the system 601, the scheduler is to further perform at least the following operations: producing a list of the workload tasks to be executed based on the information requested from the local cache; computing available capacity to execute workload tasks at each of the one or more computing resources based on the information requested from the local cache; selecting the portion of the plurality of workload tasks for execution via the one or more computing resources based on the information requested; and planning execution of the selected workload tasks by scheduling the selected portion of the plurality of workload tasks with the one or more computing resources based on the computed available capacity to execute workload tasks at each of the one or more computing resources.

According to another embodiment of the system 601, the scheduler is to further perform additional operations, including: initiating execution of the selected workload tasks at the one or more computing resources pursuant to the planned execution; and removing any selected and planned workload tasks from the list of the workload tasks to be executed.

According to another embodiment of the system 601, the scheduler is to further initiate execution of the selected workload tasks at the one or more computing resources pursuant to the planned execution; and in which the workload discovery engine is to further: (i) determine the selected and planned workload tasks are executing at the one or more computing resources, and (ii) update the local cache to indicate the selected and planned workload tasks are executing at the one or more computing resources; and in which producing the list of the workload tasks to be executed based on the information requested from the local cache includes producing an updated list of the workload tasks during a subsequent processing cycle of the scheduler based on the updated information in the local cache including the indication that the selected and planned workload tasks are executing at the one or more computing resources; and in which the updated list does not include the selected and planned workload tasks indicated by the local cache as executing at the one or more computing resources.

According to another embodiment of the system 601, the scheduler is to further perform additional operations, including: discovering, via the workload discovery engine, that a workload task selected and scheduled for execution via any one of the computing resources has failed, terminated prematurely, failed to complete successfully within a threshold period of time, failed to complete successfully within a time specified by a Service Level Target (SLT) for the workload task, or is no longer executing at any of the one or more computing resources available to execute workload tasks or marked as complete by the computing resources to which it was assigned for execution; updating the local cache to indicate the workload task is to be re-scheduled for execution; and aging or increasing a priority designation within the local cache for the workload task to be re-scheduled for execution.

According to another embodiment of the system 601, the scheduler is to iteratively repeat the producing, computing, selecting, and planning operations until either (i) all of the plurality of workload tasks identified for execution via the one or more computing resources have been planned for execution or (ii) all of the computed available capacity to execute the workload tasks at each of the one or more computing resources has been exhausted.

According to another embodiment of the system 601, the local cache includes an asynchronous local cache; in which the compute resource discovery engine and the workload discovery engine each update the information within the asynchronous local cache independent of the scheduler; and in which the scheduler requests information from the asynchronous local cache independent of the compute resource discovery engine and the workload discovery engine.

According to another embodiment of the system 601, the compute resource discovery engine is to further: query any discovered computing resource to determine any workload tasks presently executing by each respective discovered computing resource which was assigned to the discovered computing resource by the scheduler; query any discovered computing resource available to execute workload tasks to determine any completed workload tasks which were assigned to the discovered computing resource by the scheduler; and update the local cache with results received responsive to the queries.

According to another embodiment of the system 601, the compute resource discovery engine is to re-discover a previously known computing resource having one or more workload tasks assigned for execution by the scheduler; and in which the re-discovered previously known computing resource was removed from the local cache by the compute resource discovery engine due to planned or unplanned inaccessibility to the scheduler.

According to another embodiment of the system 601, the compute resource discovery engine is to further: update the local cache to list the re-discovered previously known computing resource as one of the computing resources available to execute workload tasks; query the re-discovered previously known computing resource to determine any workload tasks presently executing which were assigned to the discovered computing resource by the scheduler; query the re-discovered previously known computing resource to determine any completed workload tasks which were assigned to the discovered computing resource by the scheduler; and update the local cache with results received responsive to the queries.

According to another embodiment of the system 601, the stateless scheduler service does not persistently maintain state of the one or more computing resources identified as available to execute workload tasks between instances of execution of the scheduling service and in which the stateless scheduler service does not persistently maintain state of the plurality of workload tasks to be scheduled for execution or scheduled for execution between instances of execution of the scheduling service; in which the stateless scheduler service upon instantiation of a new execution instance re-builds current state information by: (i) re-discovering, via the compute resource discovery engine, all computing resources available to execute workload tasks; (ii) re-discovering, via the workload discovery engine, all workload tasks to be scheduled for execution; (iii) re-discovering, via the workload discovery engine, all workload tasks currently executing via any of the computing resources which were assigned to the computing resources by the stateless scheduling service; (iv) re-discovering, via the workload discovery engine, any completed workload tasks finished executing via any of the computing resources which were assigned to the computing resources by the stateless scheduling service; and (v) updating the local cache with the state of the re-discovered computing resources and the state of the workload tasks to be scheduled for execution or currently executing or completed executing via the computing resources.

According to another embodiment of the system 601, the scheduler is to further produce a list of all workload tasks to be executed based on the information requested from the local cache; in which the produced list of all workload task identifies a priority for each of the workload tasks to be executed.

According to another embodiment of the system 601, the scheduler is to further receive as input a list of all workload tasks to be executed based on the information stored within the local cache; and in which the scheduler is to further select a portion of workload tasks for execution via the one or more computing resources based one or more of: a priority associated with each of the workload tasks as specified via the list; a Quality of Service (QoS) designation for each of the workload tasks as specified via the list; and a Service Level Target (SLT) associated with each of the workload tasks as specified via the list.

According to another embodiment of the system 601, the scheduler supports a plurality of distinct workload types; and in which the workload discovery engine to identify the plurality of workload tasks to be scheduled for execution includes the workload discovery engine to identify a first group of workload tasks of a first type during a first scheduling cycle of the scheduling service and to further identify a second group of workload tasks of a second type during a second scheduling cycle of the scheduling service; and in which the workload discovery engine is to iteratively cycle through all of the plurality of distinct workload types supported by the scheduler on per-workload task type basis.

According to another embodiment of the system 601, the compute resource discovery engine is to autonomously discover any one of: one or more third-party compute clouds accessible to the scheduler; one or more private on-demand compute clouds accessible to the scheduler; one or more public on-demand compute clouds accessible to the scheduler; one or more computing pods within a local host organization within which the scheduling service operates when the one or more computing pods are accessible to the scheduler; one or more remote computing pods within a remote host organization separate from the local host organization within which the scheduling service operates when the one or more remote computing pods are accessible to the scheduling service through the remote host organization; an OpenStack computing cloud accessible to the scheduler; a VMWare computing cloud accessible to the scheduler; an Amazon Web Services (AWS) public computing cloud accessible to the scheduler; a Microsoft Azure public computing cloud accessible to the scheduler; an AWS Direct Connect privately leased computing space accessible to the scheduler; and an Azure ExpressRoute privately leased computing space accessible to the scheduler.

According to another embodiment, the system 601 further includes: an external cloud interface to communicatively link the system with one or more third-party private and/or public computing clouds via a public Internet.

According to another embodiment, the system 601 further includes: a multi-tenant database system having customer data stored therein for a plurality of distinct customer organizations; in which each customer organization is an entity selected from the group consisting of: a separate and distinct remote organization, an organizational group within the host organization, a business partner of the host organization, or a customer organization that subscribes to cloud computing services provided by the host organization; in which the system operates at a host organization as a cloud-based service provider to the plurality of distinct customer organizations; and in which the cloud-based service provider receives inputs from the plurality of distinct customer organizations to schedule workload tasks for execution the plurality of computing resources.

Figure 7A:
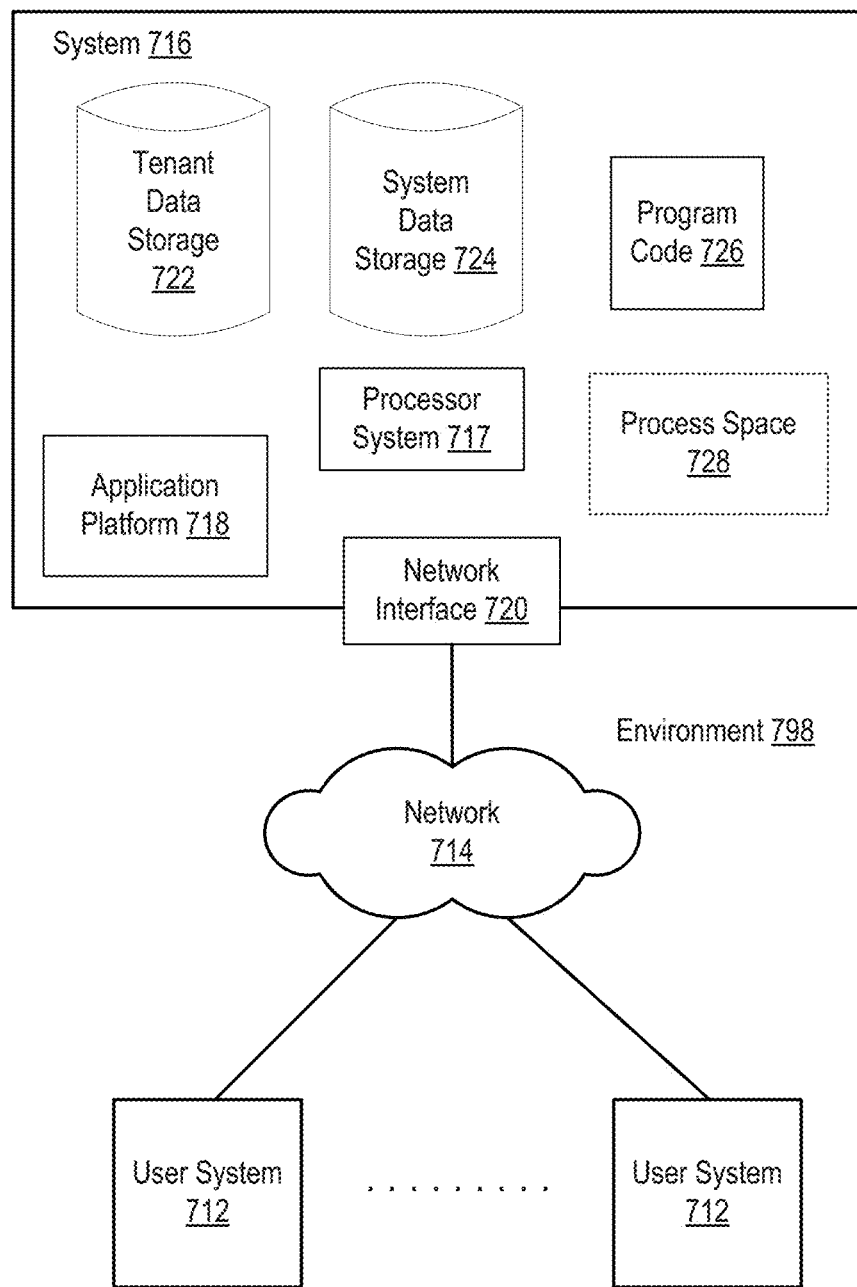
FIG. 7A illustrates a block diagram of an environment in which an on-demand database service may operate in accordance with the described embodiments.

FIG. 7A illustrates a block diagram of an environment 798 in which an on-demand database service may operate in accordance with the described embodiments. Environment 798 may include user systems 712, network 714, system 716, processor system 717, application platform 718, network interface 720, tenant data storage 722, system data storage 724, program code 726, and process space 728. In other embodiments, environment 798 may not have all of the components listed and/or may have other elements instead of, or in addition to, those listed above.

Environment 798 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7A (and in more detail in FIG. 7B) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" is used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7A, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7A, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7A include conventional, well-known elements that are explained only briefly here. For example, each user system 712 may include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units.

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7B:
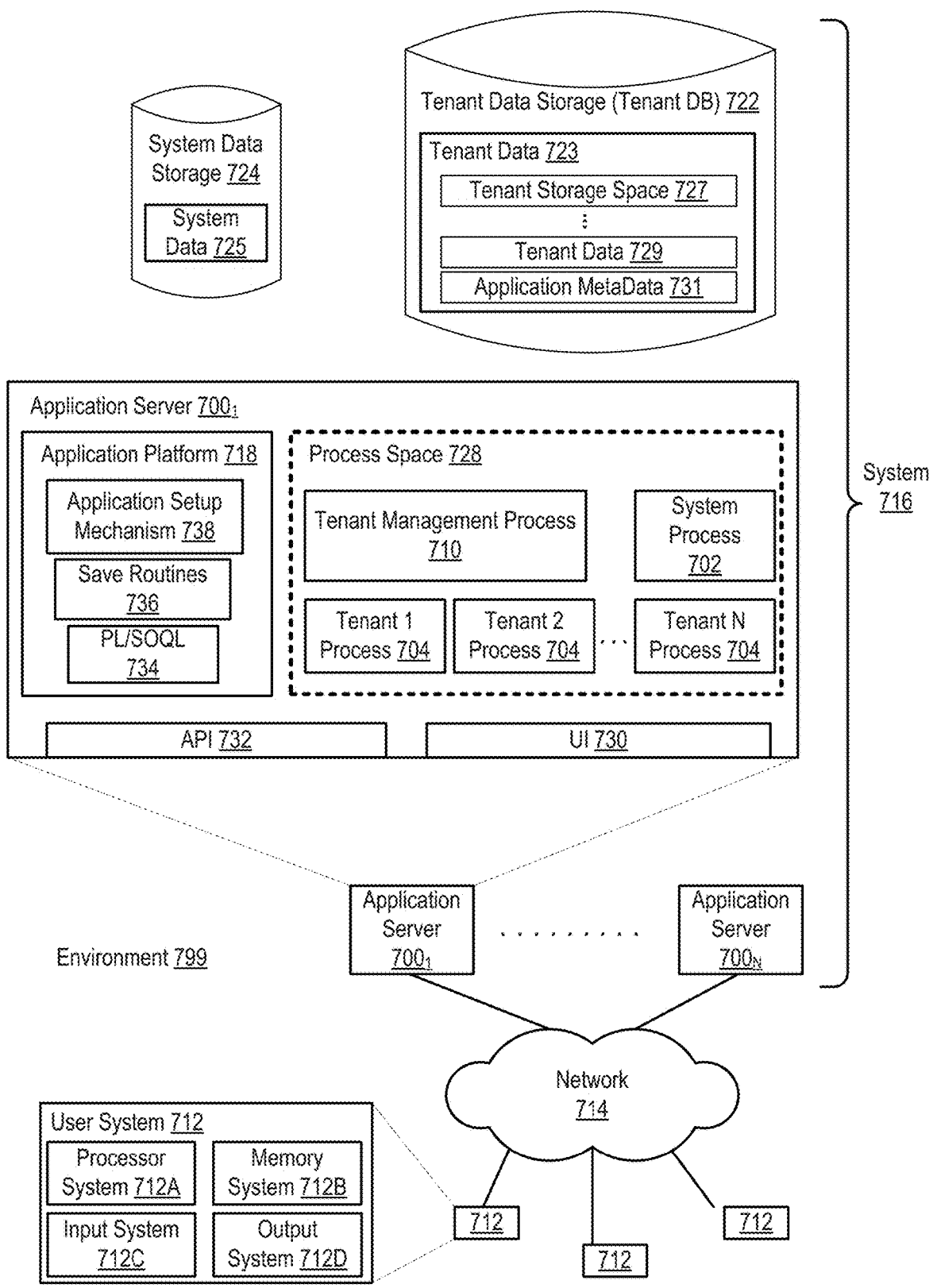
FIG. 7B illustrates another block diagram of an embodiment of elements of FIG. 7A and various possible interconnections between such elements in accordance with the described embodiments.

FIG. 7B illustrates another block diagram of an embodiment of elements of FIG. 7A and various possible interconnections between such elements in accordance with the described embodiments. FIG. 7B also illustrates environment 799. However, in FIG. 7B, the elements of system 716 and various interconnections in an embodiment are illustrated in further detail. More particularly, FIG. 7B shows that user system 712 may include a processor system 712A, memory system 712B, input system 712C, and output system 712D. FIG. 7B shows network 714 and system 716. FIG. 7B also shows that system 716 may include tenant data storage 722, having therein tenant data 723, which includes, for example, tenant storage space 727, tenant data 729, and application metadata 731. System data storage 724 is depicted as having therein system data 725. Further depicted within the expanded detail of application servers $700_{1-N}$ are User Interface (UI) 730, Application Program Interface (API) 732, application platform 718 includes PL/SOQL 734, save routines 736, application setup mechanism 738, process space 728 includes system process space 702, tenant 1-N process spaces 704, and tenant management process space 710. In other embodiments, environment 799 may not have the same elements as those listed above and/or may have other elements instead of, or in addition to, those listed above.

User system 712, network 714, system 716, tenant data storage 722, and system data storage 724 were discussed above in FIG. 7A. As shown by FIG. 7B, system 716 may include a network interface 720 (of FIG. 7A) implemented as a set of HTTP application servers 700, an application platform 718, tenant data storage 722, and system data storage 724. Also shown is system process space 702, including individual tenant process spaces 704 and a tenant management process space 710. Each application server 700 may be configured to tenant data storage 722 and the tenant data 723 therein, and system data storage 724 and the system data 725 therein to serve requests of user systems 712. The tenant data 723 might be divided into individual tenant storage areas (e.g., tenant storage space 727), which can be either a physical arrangement and/or a logical arrangement of data. Within each tenant storage space 727, tenant data 729, and application metadata 731 might be similarly allocated for each user. For example, a copy of a user's most recently used (MRU) items might be stored to tenant data 729. Similarly, a copy of MRU items for an entire organization that is a tenant might be stored to tenant storage space 727. A UI 730 provides a user interface and an API 732 provides an application programmer interface into system 716 resident processes to users and/or developers at user systems 712. The tenant data and the system data may be stored in various databases, such as one or more Oracle™ databases.

Application platform 718 includes an application setup mechanism 738 that supports application developers' creation and management of applications, which may be saved as metadata into tenant data storage 722 by save routines 736 for execution by subscribers as one or more tenant process spaces 704 managed by tenant management process space 710 for example. Invocations to such applications may be coded using PL/SOQL 734 that provides a programming language style interface extension to API 732. Invocations to applications may be detected by one or more system processes, which manages retrieving application metadata 731 for the subscriber making the invocation and executing the metadata as an application in a virtual machine.

Each application server 700 may be communicably coupled to database systems, e.g., having access to system data 725 and tenant data 723, via a different network connection. For example, one application server $700_1$ might be coupled via the network 714 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 712 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user may hit three different application servers 700, and three requests from different users may hit the same application server 700. In this manner, system 716 is multi-tenant, in which system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 700 to request and update system-level and tenant-level data from system 716 that may require sending one or more queries to tenant data storage 722 and/or system data storage 724. System 716 (e.g., an application server 700 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 8 illustrates a diagrammatic representation of a machine 800 in the exemplary form of a computer system, in accordance with one embodiment, within which a set of instructions, for causing the machine/computer system 800 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 818 (e.g., a persistent storage device including hard disk drives and a persistent database and/or a multi-tenant database implementation), which communicate with each other via a bus 830. Main memory 804 includes a scheduling service 824 and discovery engines 823 and a scheduler 825 by which discover, identify, create, select, and plan workloads to be executed at available compute clouds or other computing architecture which provides on-demand services in accordance with described embodiments. Main memory 804 and its sub-elements are operable in conjunction with processing logic 826 and processor 802 to perform the methodologies discussed herein.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and functionality which is discussed herein.

The computer system 800 may further include a network interface card 808. The computer system 800 also may include a user interface 810 (such as a video display unit, a liquid crystal display, etc.), an alphanumeric input device 812 (e.g., a keyboard), a cursor control device 814 (e.g., a mouse), and a signal generation device 816 (e.g., an integrated speaker). The computer system 800 may further include peripheral device 836 (e.g., wireless or wired communication devices, memory devices, storage devices, audio processing devices, video processing devices, etc.).

The secondary memory 818 may include a non-transitory machine-readable storage medium or a non-transitory computer readable storage medium or a non-transitory machine-accessible storage medium 831 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-readable storage media. The software 822 may further be transmitted or received over a network 820 via the network interface card 808.

Figure 9:
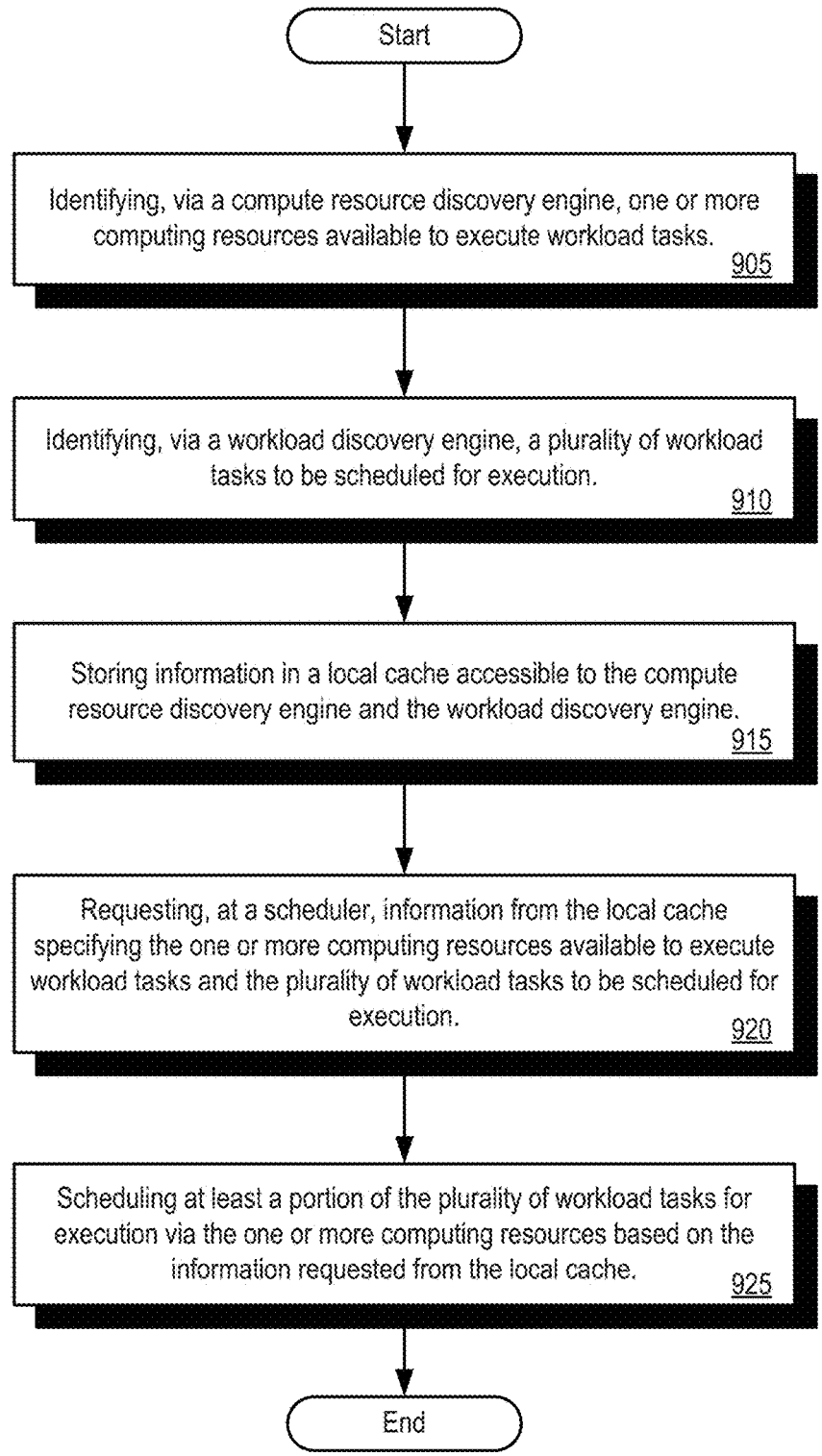
FIG. 9 depicts a flow diagram illustrating a method for implementing a stateless, deterministic scheduler and work discovery system with interruption recovery, in accordance with described embodiments.

FIG. 9 depicts a flow diagram illustrating a method 900 for implementing a stateless, deterministic scheduler and work discovery system with interruption recovery supported by a processor and a memory to execute such functionality. Method 900 may be performed by processing logic that may include hardware (e.g., circuitry, dedicated logic, programmable logic, microcode, etc.), software (e.g., instructions run on a processing device) to perform various operations such as identifying, storing, requesting, producing, creating, selecting, planning, scheduling, assigning, loading, executing, operating, receiving, generating, maintaining, returning, presenting, interfacing, communicating, transmitting, querying, processing, providing, determining, triggering, displaying, updating, sending, etc., in pursuance of the systems and methods as described herein. For example, the hosted computing environment 111, the scheduling service 145, and its scheduler 191 and discovery engine(s) 192 as depicted at FIG. 1, and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 900 depicted at FIG. 9, at block 905, processing logic identifies, via a compute resource discovery engine, one or more computing resources available to execute workload tasks.

At block 910, processing logic identifies, via a workload discovery engine, a plurality of workload tasks to be scheduled for execution.

At block 915, processing logic stores information in a local cache accessible to the compute resource discovery engine and the workload discovery engine.

At block 920, processing logic requests, at a scheduler, information from the local cache specifying the one or more computing resources available to execute workload tasks and the plurality of workload tasks to be scheduled for execution.

At block 925, processing logic schedules at least a portion of the plurality of workload tasks for execution via the one or more computing resources based on the information requested from the local cache.

In accordance with another embodiment of method 900, scheduling the workload tasks for execution via the one or more computing resources based on the information requested includes: producing a list of the workload tasks to be executed based on the information requested from the local cache; computing available capacity to execute workload tasks at each of the one or more computing resources based on the information requested from the local cache; selecting the portion of the plurality of workload tasks for execution via the one or more computing resources based on the information requested; and planning execution of the selected workload tasks by scheduling the selected portion of the plurality of workload tasks with the one or more computing resources based on the computed available capacity to execute workload tasks at each of the one or more computing resources.

In accordance with another embodiment of method 900, the scheduling further includes: initiating execution of the selected workload tasks at the one or more computing resources pursuant to the planned execution; and removing any selected and planned workload tasks from the list of the workload tasks to be executed.

In accordance with another embodiment of method 900, the scheduling further includes: initiating execution of the selected workload tasks at the one or more computing resources pursuant to the planned execution; and in which the workload discovery engine further performs operations including (i) determining the selected and planned workload tasks are executing at the one or more computing resources, and (ii) updating the local cache to indicate the selected and planned workload tasks are executing at the one or more computing resources; and in which the producing of the list of the workload tasks to be executed includes producing an updated list of the workload tasks during a subsequent processing cycle of the scheduler based on the updated information in the local cache including the indication that the selected and planned workload tasks are executing at the one or more computing resources; and in which the updated list does not include the selected and planned workload tasks indicated by the local cache as executing at the one or more computing resources.

In accordance with another embodiment of method 900, identifying the one or more computing resources available to execute workload tasks includes: re-discovering, via the compute resource discovery engine, a previously known computing resource having one or more workload tasks assigned for execution by the scheduler; in which the re-discovered previously known computing resource was removed from the local cache by the compute resource discovery engine due to planned or unplanned inaccessibility to the scheduler; updating the local cache to list the re-discovered previously known computing resource as one of the computing resources available to execute workload tasks; querying, via the compute resource discovery engine, the re-discovered previously known computing resource to determine any workload tasks presently executing which were assigned to the discovered computing resource by the scheduler; querying, via the compute resource discovery engine, the re-discovered previously known computing resource to determine any completed workload tasks which were assigned to the discovered computing resource by the scheduler; and updating the local cache with results received responsive to the queries.

In accordance with a particular embodiment there is a non-transitory computer readable storage media having instructions stored thereon that, when executed by a processor of a system, the instructions cause the system to perform operations including: identifying, via a compute resource discovery engine, one or more computing resources available to execute workload tasks; identifying, via a workload discovery engine, a plurality of workload tasks to be scheduled for execution; storing information in a local cache accessible to the compute resource discovery engine and the workload discovery engine; requesting, at a scheduler, information from the local cache specifying the one or more computing resources available to execute workload tasks and the plurality of workload tasks to be scheduled for execution; and scheduling at least a portion of the plurality of workload tasks for execution via the one or more computing resources based on the information requested from the local cache.

Figure 10:
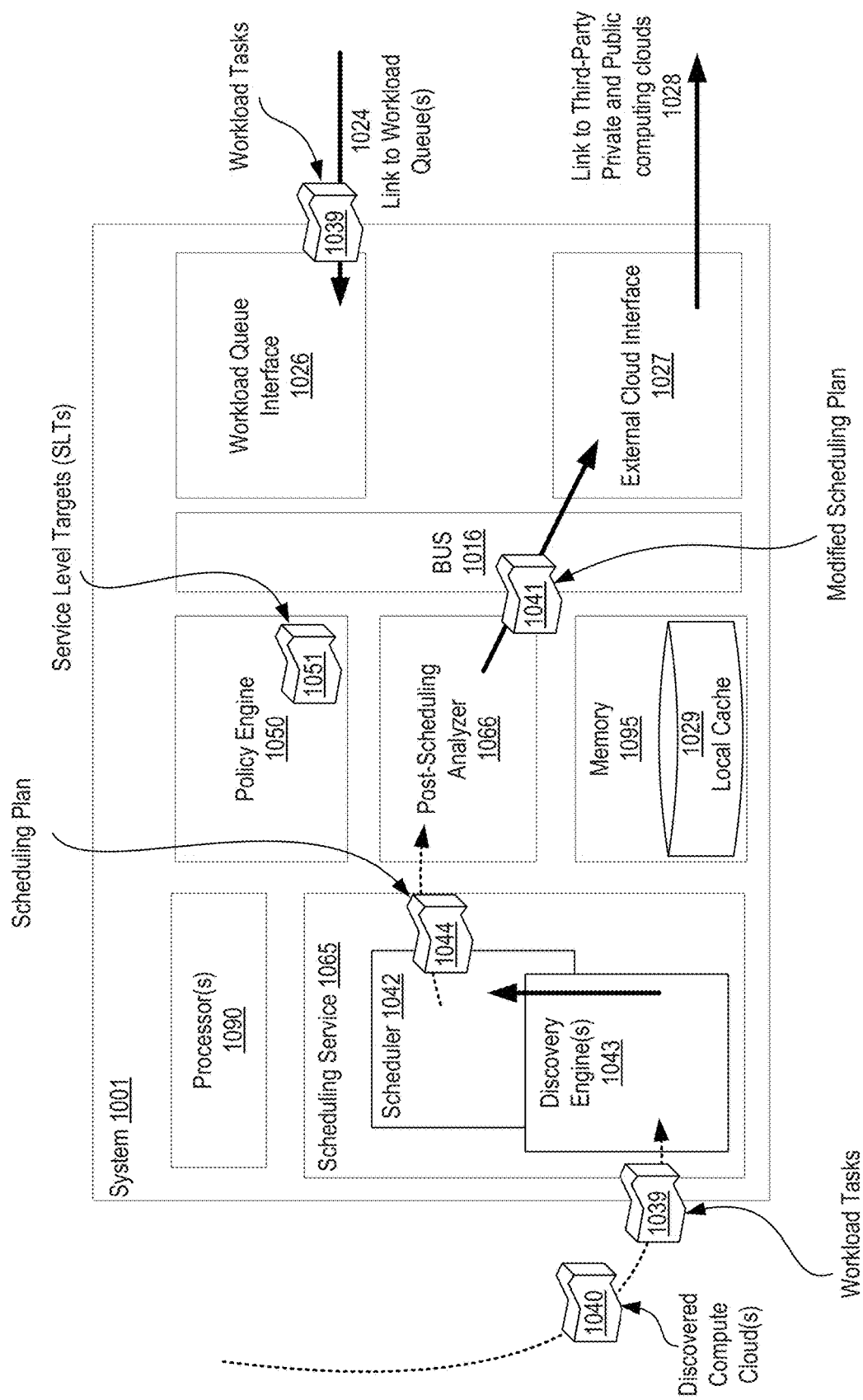
FIG. 10 shows a diagrammatic representation of a system within which embodiments may operate, be installed, integrated, or configured, in accordance with one embodiment.

FIG. 10 shows a diagrammatic representation of a system 1001 within which embodiments may operate, be installed, integrated, or configured.

According to the depicted embodiment, the system 1001, which may operate within a host organization, includes the processor 1090 and the memory 1095 to execute instructions at the system 1001. According to such an embodiment, the system 1001 is to implement a scheduling service 1065, in which the system includes: a local cache 1029 allocated within the memory 1095 of the system; a compute resource discovery engine 1043 to identify a plurality of computing resources 1028 available to execute workload tasks 1039, the computing resources residing within any one of private or public datacenters or third party computing clouds 1040 and a plurality of resource characteristics for each of the plurality of computing resources 1028 identified; in which the compute resource discovery engine 1043 is to fill the local cache 1029 with information representing each of the identified computing resources 1040 available and the plurality of resource characteristics identified for each of the plurality of computing resources 1040; a workload discovery engine 1043 to identify pending workload tasks 1039 to be scheduled for execution from one or more workload queues 1024 and to update the local cache 1029 with the identified workload tasks 1039; a policy engine 1050 to identify a Service Level Target (SLT) 1051 for each of the workload tasks identified and to update the local cache 1029 with the SLT for each workload task identified; and a scheduler 1042 to schedule each workload task for execution via one of the computing resources available based on which of the computing resources are estimated to meet the SLT 1051.

According to another embodiment of the system 1001, a user interface operates at a user client device remote from the system and communicatively interfaces with the system via a public Internet and the external cloud interface 1027 provides a communications link to third party private and public computing clouds 1028 on behalf of the scheduling service 1065.

Such a system may reside within a host organization which operates as a cloud-based service provider to the user client device; in which the cloud-based service receives inputs from the client device at the user interface to configure use of the scheduling service 1065 and identify workload tasks to be performed on behalf of the user device or on behalf of a customer organization, developer, business customer, or another user.

According to a particular embodiment workload tasks 1039 are retrieved by the system 1001 from one or more workload queues via a workload queue interface 1026 and a link to the workload queues 1024.

Bus 1016 interfaces the various components of the system 1001 amongst each other, with any other peripheral(s) of the system 1001, and with external components such as external network elements, other machines, client devices, cloud computing services, etc. Communications may further include communicating with external devices via a network interface over a LAN, WAN, or the public Internet.

According to another embodiment of the system 1001, the plurality of resource characteristics for each of the plurality of computing resources identified include one or more of CPU type, quantity of CPU cores, memory type, memory quantity, licenses, operating system type, virtual machine (VM) execution policy, pricing data, minimum workload allocation, maximum workload allocation, electrical power data, and carbon footprint data.

According to another embodiment of the system 1001, each of the plurality of computing resources available to execute workload tasks implements a local computing resource interface at the respective computing resource, remote from the system; and in which the compute resource discovery engine to identify the plurality of resource characteristics for each of the plurality of computing resources identified includes the compute resource discovery engine to query the local computing resource interface at each of the plurality of computing resources identified.

According to another embodiment of the system 1001, the workload discovery engine is to retrieve the pending workload tasks from a continuous integration cloud.

According to another embodiment of the system 1001, the workload discovery engine retrieves one or more of: software auto builds for test or validation; codelines for test or validation; customer submitted code for test or validation; software release branches for test or validation; patch validation; and release branch for test or validation against specified software variants, operating system variants, or computing hardware variants.

According to another embodiment of the system 1001, the workload discovery engine is to: fill the local cache with the identified pending workload tasks; and associate each pending workload task within the local cache with a priority marker, a QoS indicator, and/or the SLT based on the workload queue from which the task was retrieved.

According to another embodiment of the system 1001, the workload discovery engine is to further identify a plurality of associated workload task requirements for each of the pending workload tasks; and in which the scheduler is to schedule the pending workload tasks based further on the associated workload task requirements and which of the plurality of computing resources available to execute workload tasks satisfies the associated workload task requirements and is estimated to meet the Service Level Target (SLT) for workload task.

According to another embodiment of the system 1001, the policy engine is to query a database system to retrieve the SLT for the workload task based at least in part on the workload task type.

According to another embodiment of the system 1001, multiple SLTs exist for each workload task type; and in which the SLT is identified by the policy engine based further on a customer identifier or an organizational identifier or a service tier associated with each respective workload task.

According to another embodiment of the system 1001, the SLT identified for each of the workload tasks defines a Quality of Service (QoS) expectation for each workload task; in which the scheduler does not guarantee or commit to meeting the QoS expectation for any individual workload task; and in which scheduler will adjust one or more of re-try logic, priority, end-to-end execution time, preferred resource allocation range, and aging for each workload task increase a likelihood of the respective workload task meeting the defined QoS expectation.

According to another embodiment of the system 1001, the scheduler is to evaluate pricing data represented within the local cache by the plurality of resource characteristics identified for each of the plurality of computing resources; and in which the scheduler is to schedule each workload task for execution based on which one of a plurality of computing resources have a lowest financial cost and are estimated to meet an execution completion deadline for the respective workload task.

According to another embodiment of the system 1001, the scheduler is to evaluate a specified customer preference for executing workload tasks at a specified one of the plurality of computing resources as represented within the SLT for the respective workload task.

According to another embodiment of the system 1001, the scheduler is to generate a scheduling plan 1044 as output; and in which the system further includes a post-scheduling analyzer to receive the scheduling plan 1044 from the scheduler and to evaluate the scheduling plan 1044 prior to initiating the scheduling plan 1044.

According to another embodiment of the system 1001, the post-scheduling analyzer 1066 is to create a modified scheduling plan 1041 by adding at least one workload task not selected by the scheduler to the scheduling plan or by removing at least one workload task selected by the scheduler from the scheduling plan 1044; and in which the scheduling service is to initiate execution of the workload tasks at the computing resources in accordance with the modified scheduling plan 1041.

According to another embodiment of the system 1001, the post-scheduling analyzer 1066 is to check for any of the workload tasks which were not selected for execution by the scheduler having a higher priority than any of the workload tasks selected for execution; in which the post-scheduling analyzer is to remove one or more workload tasks selected for execution in the scheduling plan having a lower priority than the workload tasks which were not selected for execution and have the higher priority; and in which the post-scheduling analyzer is to add at least one of the workload tasks having the higher priority to the scheduling plan.

According to another embodiment of the system 1001, the post-scheduling analyzer is to check for any of the workload tasks which were not selected for execution by the scheduler having a higher priority than any of the workload tasks selected for execution; and in which the post-scheduling analyzer is to exceed a maximum SLT allocation for one of the computing resources by adding at least one of the workload tasks having the higher priority to the scheduling plan.

According to another embodiment of the system 1001, the post-scheduling analyzer is to check for an allocation load which exceeds a specified maximum SLT allocation for any one of the computing resources; and in which the post-scheduling analyzer is to modify where at least one each workload is scheduled for execution by specifying a different one of the computing resources to load balance execution of the workload tasks across the plurality of computing resources.

According to another embodiment, the system 1001 further includes: a simulator to estimate changes to computing infrastructure by writing simulated data into the local cache representing additional hardware and computing infrastructure availability via one of the computing resources and by further updating the local cache with simulated workload tasks queued for execution; and in which the scheduler is to retrieve the simulated data from the local cache for processing by iterating through a scheduling cycle to plan, calculate, select, and plan the simulated workload tasks for execution against the simulated data representing the additional hardware and computer structure availability.

According to another embodiment of the system 1001, the compute resource discovery engine is to autonomously discover any one of: one or more third party compute clouds accessible to the scheduler; one or more private on-demand compute clouds accessible to the scheduler; one or more public on-demand compute clouds accessible to the scheduler; one or more computing pods within a local host organization within which the scheduling service operates when the one or more computing pods are accessible to the scheduler; one or more remote computing pods within a remote host organization separate from the local host organization within which the scheduling service operates when the one or more remote computing pods are accessible to the scheduling service through the remote host organization; an OpenStack computing cloud accessible to the scheduler; a VMWare computing cloud accessible to the scheduler; an Amazon Web Services (AWS) public computing cloud accessible to the scheduler; a Microsoft Azure public computing cloud accessible to the scheduler; an AWS Direct Connect privately leased computing space accessible to the scheduler; and an Azure ExpressRoute privately leased computing space accessible to the scheduler.

According to another embodiment, the system 1001 further includes: a multi-tenant database system having customer data stored therein for a plurality of distinct customer organizations; in which each customer organization is an entity selected from the group consisting of: a separate and distinct remote organization, an organizational group within the host organization, a business partner of the host organization, or a customer organization that subscribes to cloud computing services provided by the host organization; in which the system operates at a host organization as a cloud based service provider to the plurality of distinct customer organizations; and in which the cloud based service provider receives inputs from the plurality of distinct customer organizations to schedule workload tasks for execution the plurality of computing resources.

Figure 11:
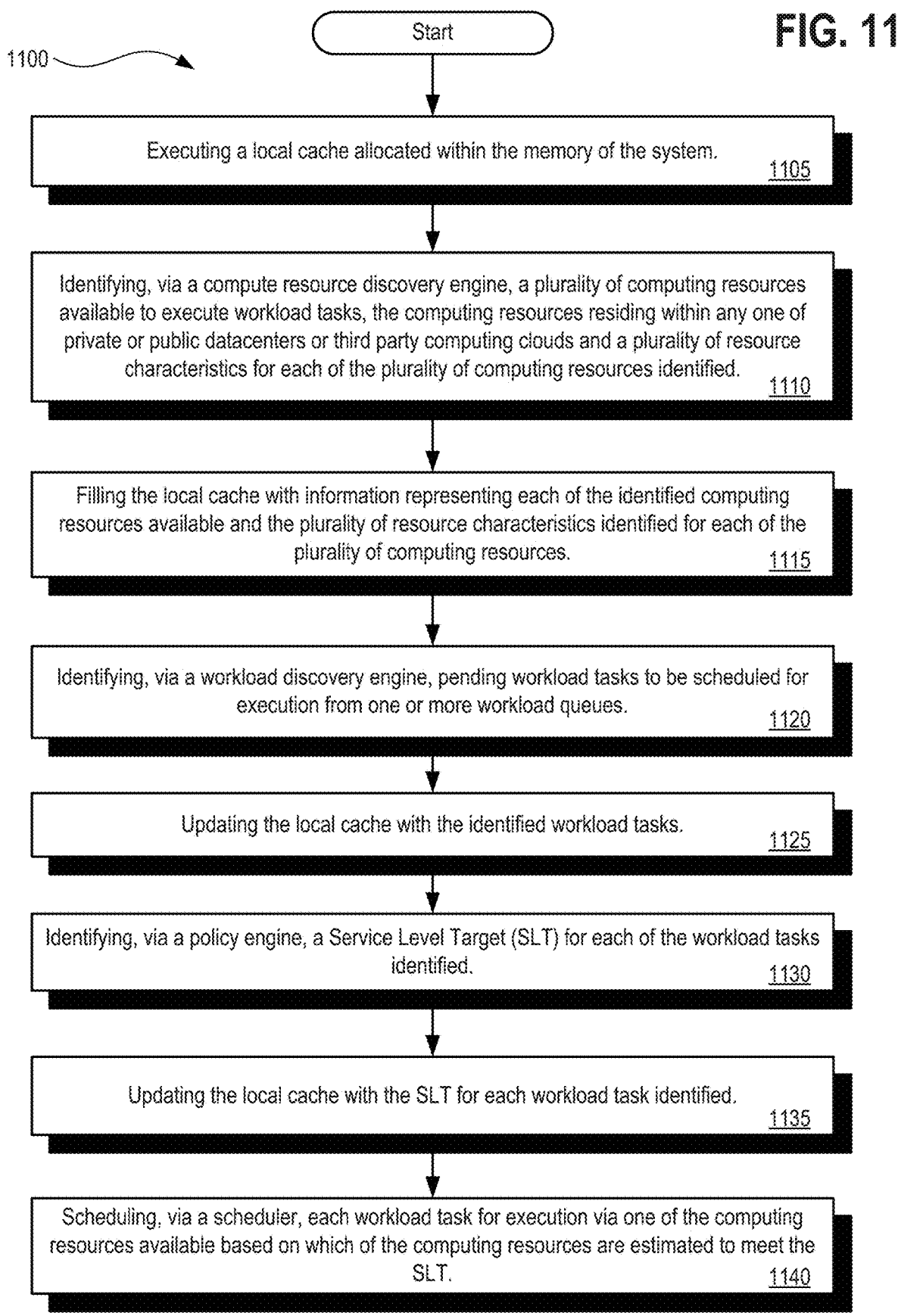
FIG. 11 depicts a flow diagram illustrating a method for implementing a scalable scheduler with heterogeneous resource allocation of large competing workloads types using Quality of Service (QoS) requirements, in accordance with described embodiments.

FIG. 11 depicts a flow diagram illustrating a method 1100 for implementing a scalable scheduler with heterogeneous resource allocation of large competing workloads types using Quality of Service (QoS) requirements supported by a processor and a memory to execute such functionality. Method 1100 may be performed by processing logic that may include hardware (e.g., circuitry, dedicated logic, programmable logic, microcode, etc.), software (e.g., instructions run on a processing device) to perform various operations such as executing, identifying, filling, updating, scheduling, producing, creating, selecting, planning, assigning, receiving, generating, maintaining, returning, presenting, interfacing, communicating, transmitting, querying, processing, providing, determining, triggering, displaying, updating, sending, etc., in pursuance of the systems and methods as described herein. For example, the hosted computing environment 111, the scheduling service 145, and its scheduler 191 and discovery engine(s) 192 as depicted at FIG. 1, and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 1100 depicted at FIG. 11, at block 1105, processing logic executes a local cache allocated within the memory of the system.

At block 1110, processing logic identifies, via a compute resource discovery engine, a plurality of computing resources available to execute workload tasks, the computing resources residing within any one of private or public datacenters or third party computing clouds and a plurality of resource characteristics for each of the plurality of computing resources identified.

At block 1115, processing logic fills the local cache with information representing each of the identified computing resources available and the plurality of resource characteristics identified for each of the plurality of computing resources.

At block 1120, processing logic identifies, via a workload discovery engine, pending workload tasks to be scheduled for execution from one or more workload queues.

At block 1125, processing logic updates the local cache with the identified workload tasks.

At block 1130, processing logic identifies, via a policy engine, a Service Level Target (SLT) for each of the workload tasks identified.

At block 1135, processing logic updates the local cache with the SLT for each workload task identified.

At block 1140, processing logic schedules, via a scheduler, each workload task for execution via one of the computing resources available based on which of the computing resources are estimated to meet the SLT.

According to another embodiment of method 1100, the workload discovery engine to identify pending workload tasks to be scheduled for execution includes the workload discovery engine retrieving the pending workload tasks from a continuous integration cloud.

According to another embodiment of method 1100, identifying the pending workload tasks to be scheduled for execution from one or more workload queues includes: filling the local cache with the identified pending workload tasks; and associating each pending workload task within the local cache with a priority marker, a QoS indicator, and/or the SLT based on the workload queue from which the task was retrieved.

According to another embodiment of method 1100, identifying the SLT for each of the workload tasks includes querying a database system to retrieve the SLT for the workload task based at least in part on the workload task type; in which multiple SLTs exist for each workload task type; and in which the SLT is identified by the policy engine based further on a customer identifier or an organizational identifier or a service tier associated with each respective workload task.

According to another embodiment of method 1100, scheduling each workload task for execution via one of the computing resources includes the scheduler to generate a scheduling plan as output; in which the method further includes: sending the scheduling plan to a post-scheduling analyzer for evaluation; creating, via the post-scheduling analyzer, a modified scheduling plan by adding at least one workload task not selected by the scheduler to the scheduling plan or by removing at least one workload task selected by the scheduler from the scheduling plan; and initiating execution of the workload tasks at the computing resources in accordance with the modified scheduling plan.

According to a particular embodiment there is a non-transitory computer readable storage media having instructions stored thereon that, when executed by a processor of a system, the instructions cause the system to perform operations including: executing a local cache allocated within the memory of the system; identifying, via a compute resource discovery engine, a plurality of computing resources available to execute workload tasks, the computing resources residing within any one of private or public datacenters or third party computing clouds and a plurality of resource characteristics for each of the plurality of computing resources identified; filling the local cache with information representing each of the identified computing resources available and the plurality of resource characteristics identified for each of the plurality of computing resources; identifying, via a workload discovery engine, pending workload tasks to be scheduled for execution from one or more workload queues; updating the local cache with the identified workload tasks; identifying, via a policy engine, a Service Level Target (SLT) for each of the workload tasks identified; updating the local cache with the SLT for each workload task identified; and scheduling, via a scheduler, each workload task for execution via one of the computing resources available based on which of the computing resources are estimated to meet the SLT.

Figure 12:
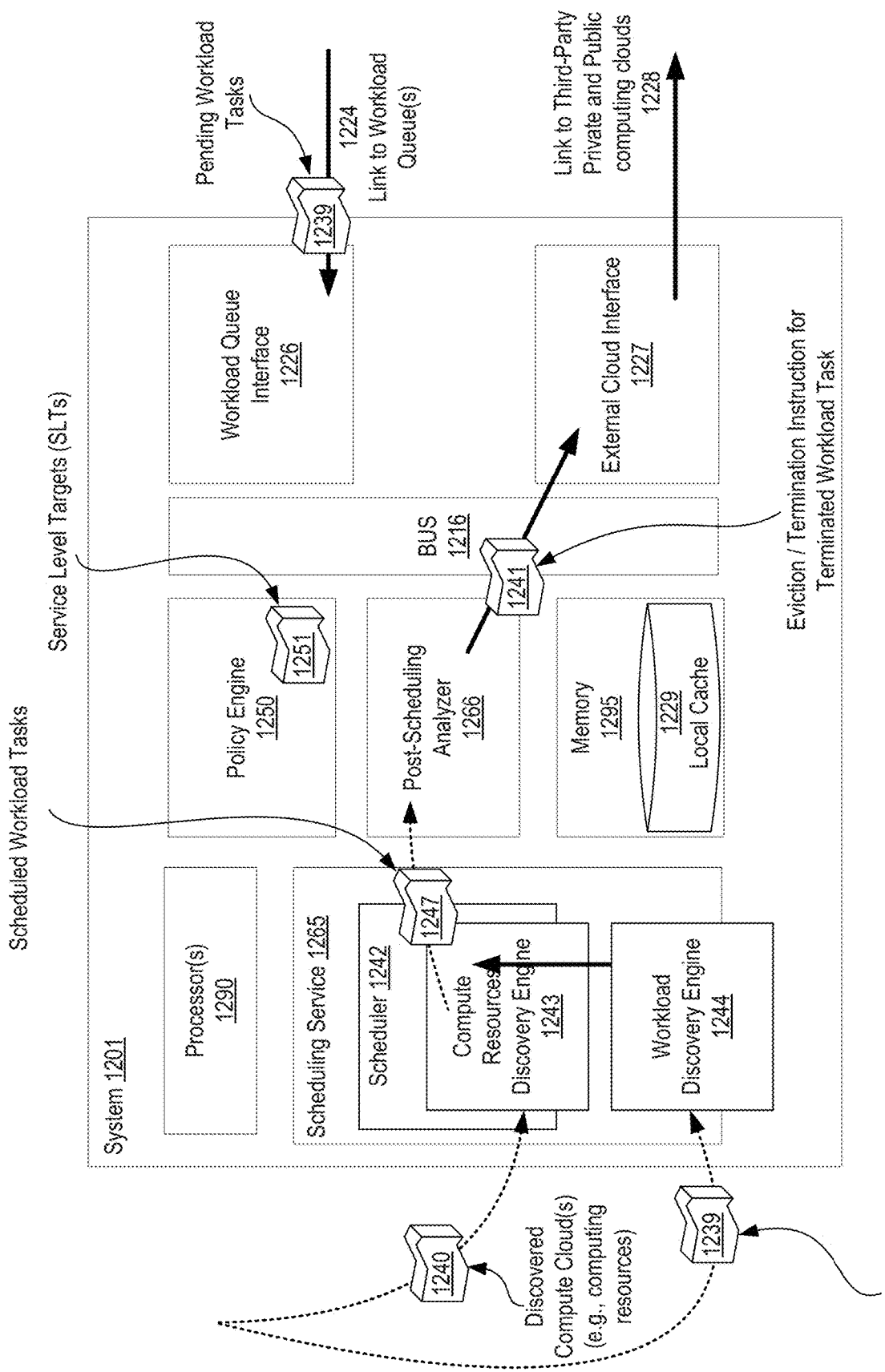
FIG. 12 shows a diagrammatic representation of a system within which embodiments may operate, be installed, integrated, or configured.

FIG. 12 shows a diagrammatic representation of a system 1201 within which embodiments may operate, be installed, integrated, or configured.

According to the depicted embodiment, the system 1201, which may operate within a host organization, includes the processor 1290 and the memory 1295 to execute instructions at the system 1201. According to such an embodiment, the system 1201 is to implement a scheduling service 1265, in which the system includes: a compute resource discovery engine 1243 to identify a plurality of computing resources 1240 currently executing scheduled workload tasks 1247; a workload discovery engine 1244 to identify one or more pending workload tasks 1239 to be scheduled for execution; in which each of the computing resources 1240 lack current available capacity to execute additional scheduled workload tasks 1247; a policy engine 1250 to define a Service Level Target (SLT) 1251 for each of the scheduled workload tasks 1247 currently executing via the plurality of computing resources 1240 and for each of the one or more pending workload tasks 1239 to be scheduled for execution; an analysis engine (e.g., the post-scheduling analyzer) 1266 to further terminate (e.g., via the eviction or termination instruction 1241) one of the scheduled workload tasks 1247 currently executing via the plurality of computing resources 1240 based on the defined SLTs 1251 for the respective workload tasks 1247; and a scheduler 1242 to schedule one of the pending workload tasks 1239 into capacity within the plurality of computing resources 1240 freed up by the terminated workload task 1241.

According to another embodiment of the system 1201, a user interface operates at a user client device remote from the system and communicatively interfaces with the system via a public Internet. According to another embodiment, the external cloud interface 1227 provides a communications link to third party private and public computing clouds 1228 on behalf of the scheduling service 1265.

Such a system may reside within a host organization which operates as a cloud-based service provider to the user client device; in which the cloud-based service receives inputs from the client device at the user interface to configure use of the scheduling service 1265 and identify workload tasks to be performed on behalf of the user device or on behalf of a customer organization, developer, business customer, or another user.

According to a particular embodiment pending workload tasks 1239 are retrieved by the system 1201 from one or more workload queues via a workload queue interface 1226 and a link to the workload queues 1224.

Bus 1216 interfaces the various components of the system 1201 amongst each other, with any other peripheral(s) of the system 1201, and with external components such as external network elements, other machines, client devices, cloud computing services, etc. Communications may further include communicating with external devices via a network interface over a LAN, WAN, or the public Internet.

According to another embodiment of the system 1201, the analysis engine 1266 is to further: identify a scheduled workload task 1247 currently executing via the plurality of computing resources 1240 having a lower priority than one of the pending workload tasks to be scheduled for execution based on the defined SLTs 1251 for the respective workload tasks; and further in which the analysis engine 1266 is to terminate the lower priority workload task.

According to another embodiment of the system 1201, the analysis engine is to further: identify a pending workload task having a higher priority than the scheduled workload task currently executing via the plurality of computing resources; in which the identified workload task having the higher priority includes a high priority task as defined by the SLTs; in which the scheduled workload task currently executing via the plurality of computing resources includes a low priority task as defined by the SLTs; and in which the scheduler is to schedule the high priority task for execution into the capacity within the plurality of computing resources freed up by the termination of the low priority task.

According to another embodiment of the system 1201, the pending workload task scheduled into the capacity within the plurality of computing resources freed up by the terminated workload task includes an urgent workload task based on inability for the pending workload task to complete execution within a time designated by its SLT; and in which the terminated workload task includes a non-urgent workload task based on the ability to re-schedule the terminated workload task at a later time and have the terminated workload task complete execution within the time designated by its SLT.

According to another embodiment, the system 1201 further includes: a local cache 1229 allocated within the memory of the system; and in which the scheduler to schedule one of the pending workload tasks into capacity within the plurality of computing resources freed up by the terminated workload task includes the scheduling service executing at least the following operations: producing a list of the workload tasks to be executed based on information requested from the local cache; computing available capacity to execute workload tasks at each of the plurality of computing resources based on the information requested from the local cache, in which the available capacity includes the capacity within the plurality of computing resources freed up by the terminated workload task; selecting a portion of the produced workload tasks for execution via the plurality of computing resources based on the information requested from the local cache, the portion of the produced workload tasks including at least one of the pending workload tasks having a higher priority than the terminated workload task as defined by the SLTs; and planning execution of the selected workload tasks; and initiating execution of the selected workload tasks at the plurality of computing resources pursuant to the planned execution including initiating execution of the one pending workload tasks having the higher priority than the terminated workload task within the capacity of the plurality of computing resources freed up by the terminated workload task.

According to another embodiment, the system 1201 further includes: a local cache allocated within the memory of the system; and in which the one or more pending workload tasks to be scheduled for execution are cached within the local cache by the workload discovery engine; in which the currently executing scheduled workload tasks are cached within the local cache by the compute resource discovery engine; and in which the policy engine is to associate the defined SLT for every pending workload tasks within the local cache and associate the defined SLT for every currently executing scheduled workload tasks within the local cache.

According to another embodiment of the system 1201, the analysis engine is to terminate a scheduled workload task currently executing having a lower priority as defined by the associated SLT within the local cache in comparison to a pending workload task having a higher priority as defined by the associated SLT within the local cache.

According to another embodiment of the system 1201, the scheduler iteratively performs operations to (i) produce a list of the workload tasks to be executed, (ii) computing available capacity to execute workload tasks on the produced list, (iii) select workload tasks from the produced list for execution based on available capacity within the plurality of computing resources, and (iv) plan execution of the selected workload tasks; in which the a first iteration of the scheduler produced, computed, selected, and planned the terminated workload task; in which the analysis engine operates during a post-scheduling operation to terminate the scheduled workload task; and in which a second or subsequent iteration of the scheduler produces, computes, selects, and plans execution of the pending workload tasks into the capacity within the plurality of computing resources freed up by the terminated workload task scheduled by the first iteration of the scheduler.

According to another embodiment, the system 1201 further includes: a local cache allocated within the memory of the system; and in which the workload discovery engine is to identify a pending high priority workload tasks to be scheduled from the local cache; and in which a post-scheduling operation analyzes pending workloads within the local cache to identify a high priority workload task to be scheduled into capacity within the plurality of computing resources freed up by the terminated workload task.

According to another embodiment of the system 1201, the analysis engine is to evict the terminated workload task from the capacity of one of the plurality of computing resources used for executing scheduled tasks and further includes the scheduler to schedule a selected pending workload task into the capacity freed up from the evicted and terminated workload task.

According to another embodiment of the system 1201, the analysis engine is to further terminate multiple scheduled workload tasks currently executing via the plurality of computing resources based on the defined SLTs for the respective workload tasks to free up sufficient capacity for a single pending workload tasks requiring a larger capacity than each of the multiple scheduled workload tasks terminated from execution at the plurality of computing resources; and in which the scheduler is to schedule the single pending workload tasks requiring the larger capacity into the capacity freed up from terminating the multiple scheduled workload tasks.

According to another embodiment of the system 1201, the system further includes an asynchronous local cache; in which the compute resource discovery engine and the workload discovery engine each update the information within the asynchronous local cache independent of the scheduler; and in which the scheduler requests information from the asynchronous local cache independent of the compute resource discovery engine and the workload discovery engine to determine which scheduled workload tasks currently executing via the plurality of computing resources is to be terminated based on the defined SLTs for the respective workload tasks and in which the scheduler further requests information from the asynchronous local cache independent of the compute resource discovery engine and the workload discovery engine to determine which pending workload task is to be scheduled into the capacity within the plurality of computing resources freed up by the terminated workload task.

According to another embodiment of the system 1201, the scheduler is to receive as input a list of all workload tasks to be executed based on information stored within a local cache; and in which the scheduler is to further select one pending workload task to be scheduled into the capacity within the plurality of computing resources freed up by the terminated workload task based one or more of: a priority associated with each of the workload tasks as specified via the list; a Quality of Service (QoS) designation for each of the workload tasks as specified via the list; and the SLT associated with each of the workload tasks as specified via the list.

According to another embodiment of the system 1201, the compute resource discovery engine to identify one or more computing resources available to execute workload tasks includes: the compute resource discovery engine to autonomously discover any one of: one or more third-party compute clouds accessible to the scheduler; one or more private on-demand compute clouds accessible to the scheduler; one or more public on-demand compute clouds accessible to the scheduler; one or more computing pods within a local host organization within which the scheduling service operates when the one or more computing pods are accessible to the scheduler; one or more remote computing pods within a remote host organization separate from the local host organization within which the scheduling service operates when the one or more remote computing pods are accessible to the scheduling service through the remote host organization; an OpenStack computing cloud accessible to the scheduler; a VMWare computing cloud accessible to the scheduler; an Amazon Web Services (AWS) public computing cloud accessible to the scheduler; a Microsoft Azure public computing cloud accessible to the scheduler; an AWS Direct Connect privately leased computing space accessible to the scheduler; and an Azure ExpressRoute privately leased computing space accessible to the scheduler.

According to another embodiment, the system 1201 further includes: an external cloud interface to communicatively link the system with one or more third-party private and/or public computing clouds via a public Internet.

According to another embodiment of the system 1201, the system includes a multi-tenant database system having customer data stored therein for a plurality of distinct customer organizations; in which each customer organization is an entity selected from the group consisting of: a separate and distinct remote organization, an organizational group within the host organization, a business partner of the host organization, or a customer organization that subscribes to cloud computing services provided by the host organization; in which the system operates at a host organization as a cloud-based service provider to the plurality of distinct customer organizations; and in which the cloud-based service provider receives inputs from the plurality of distinct customer organizations to schedule workload tasks for execution the plurality of computing resources.

Figure 13:
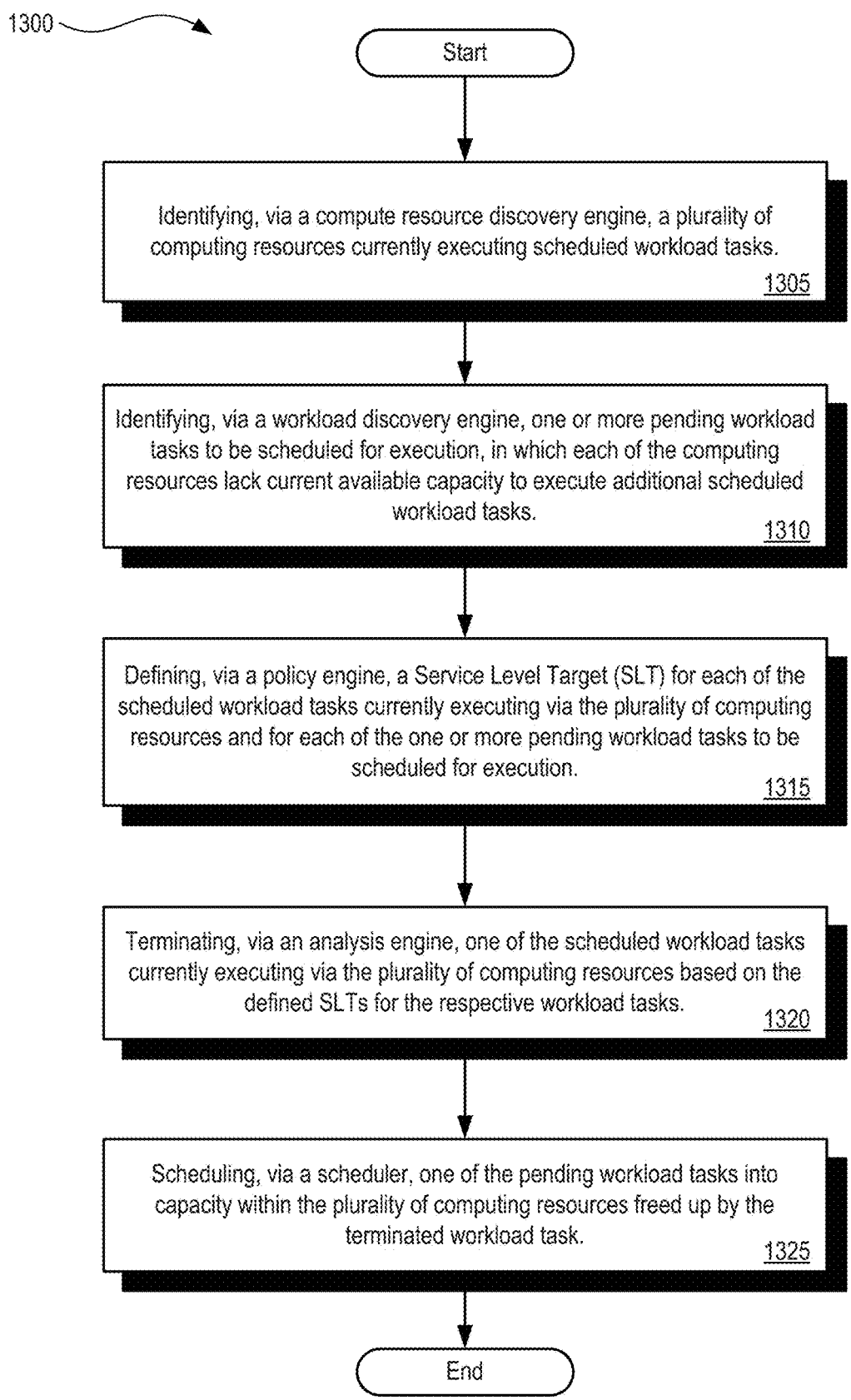
FIG. 13 depicts a flow diagram illustrating a method 1300 for implementing a scheduler with preemptive termination of existing workloads to free resources for high priority items supported by a processor and a memory to execute such embodiments.

FIG. 13 depicts a flow diagram illustrating a method 1300 for implementing a scheduler with preemptive termination of existing workloads to free resources for high priority items supported by a processor and a memory to execute such functionality. Method 1300 may be performed by processing logic that may include hardware (e.g., circuitry, dedicated logic, programmable logic, microcode, etc.), software (e.g., instructions run on a processing device) to perform various operations such as executing, identifying, defining, terminating, evicting, scheduling, producing, creating, selecting, planning, assigning, receiving, generating, maintaining, returning, presenting, interfacing, communicating, transmitting, querying, processing, providing, determining, triggering, displaying, updating, sending, etc., in pursuance of the systems and methods as described herein. For example, the hosted computing environment 131, the scheduling service 145, and its scheduler 125 and discovery engine(s) 192 as depicted at FIG. 1, and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 1300 depicted at FIG. 13, at block 1305, processing logic identifies, via a compute resource discovery engine, a plurality of computing resources currently executing scheduled workload tasks.

At block 1310, processing logic identifies, via a workload discovery engine, one or more pending workload tasks to be scheduled for execution, in which each of the computing resources lack current available capacity to execute additional scheduled workload tasks.

At block 1315, processing logic defines, via a policy engine, a Service Level Target (SLT) for each of the scheduled workload tasks currently executing via the plurality of computing resources and for each of the one or more pending workload tasks to be scheduled for execution.

At block 1320, processing logic terminates, via an analysis engine, one of the scheduled workload tasks currently executing via the plurality of computing resources based on the defined SLTs for the respective workload tasks.

At block 1325, processing logic schedules, via a scheduler, one of the pending workload tasks into capacity within the plurality of computing resources freed up by the terminated workload task.

According to another embodiment, the method 1300 further includes: identifying a scheduled workload task currently executing via the plurality of computing resources having a lower priority than one of the pending workload tasks to be scheduled for execution based on the defined SLTs for the respective workload tasks; and terminating one of the scheduled workload tasks currently executing via the plurality of computing resources includes the analysis engine to terminate the lower priority workload task.

According to another embodiment, the method 1300 further includes: identifying a pending workload task having a higher priority than the scheduled workload task currently executing via the plurality of computing resources; in which the identified workload task having the higher priority includes a high priority task as defined by the SLTs; in which the scheduled workload task currently executing via the plurality of computing resources includes a low priority task as defined by the SLTs; and in which scheduling one of the pending workload tasks into capacity within the plurality of computing resources freed up by the terminated workload task includes scheduling one of the pending workload tasks into capacity within the plurality of computing resources freed up by the terminated workload task includes the scheduler to schedule the high priority task for execution into the capacity within the plurality of computing resources freed up by the termination of the low priority task.

According to another embodiment of method 1300, the pending workload task scheduled into the capacity within the plurality of computing resources freed up by the terminated workload task includes an urgent workload task based on inability for the pending workload task to complete execution within a time designated by its SLT; and in which the terminated workload task includes a non-urgent workload task based on the ability to re-schedule the terminated workload task at a later time and have the terminated workload task complete execution within the time designated by its SLT.

According to another embodiment, the method 1300 further includes: executing a local cache within the memory of the system; and in which scheduling one of the pending workload tasks into capacity within the plurality of computing resources freed up by the terminated workload task further includes: producing a list of the workload tasks to be executed based on information requested from the local cache; computing available capacity to execute workload tasks at each of the plurality of computing resources based on the information requested from the local cache, in which the available capacity includes the capacity within the plurality of computing resources freed up by the terminated workload task; selecting a portion of the produced workload tasks for execution via the plurality of computing resources based on the information requested from the local cache, the portion of the produced workload tasks including at least one of the pending workload tasks having a higher priority than the terminated workload task as defined by the SLTs; and planning execution of the selected workload tasks; and initiating execution of the selected workload tasks at the plurality of computing resources pursuant to the planned execution including initiating execution of the one pending workload tasks having the higher priority than the terminated workload task within the capacity of the plurality of computing resources freed up by the terminated workload task.

According to another embodiment there is a non-transitory computer readable storage media having instructions stored thereon that, when executed by a processor of a system, the instructions cause the system to perform operations including: identifying, via a compute resource discovery engine, a plurality of computing resources currently executing scheduled workload tasks; identifying, via a workload discovery engine, one or more pending workload tasks to be scheduled for execution; in which each of the computing resources lack current available capacity to execute additional scheduled workload tasks; defining, via a policy engine, a Service Level Target (SLT) for each of the scheduled workload tasks currently executing via the plurality of computing resources and for each of the one or more pending workload tasks to be scheduled for execution; terminating, via an analysis engine, one of the scheduled workload tasks currently executing via the plurality of computing resources based on the defined SLTs for the respective workload tasks; and scheduling, via a scheduler, one of the pending workload tasks into capacity within the plurality of computing resources freed up by the terminated workload task.

Figure 14:
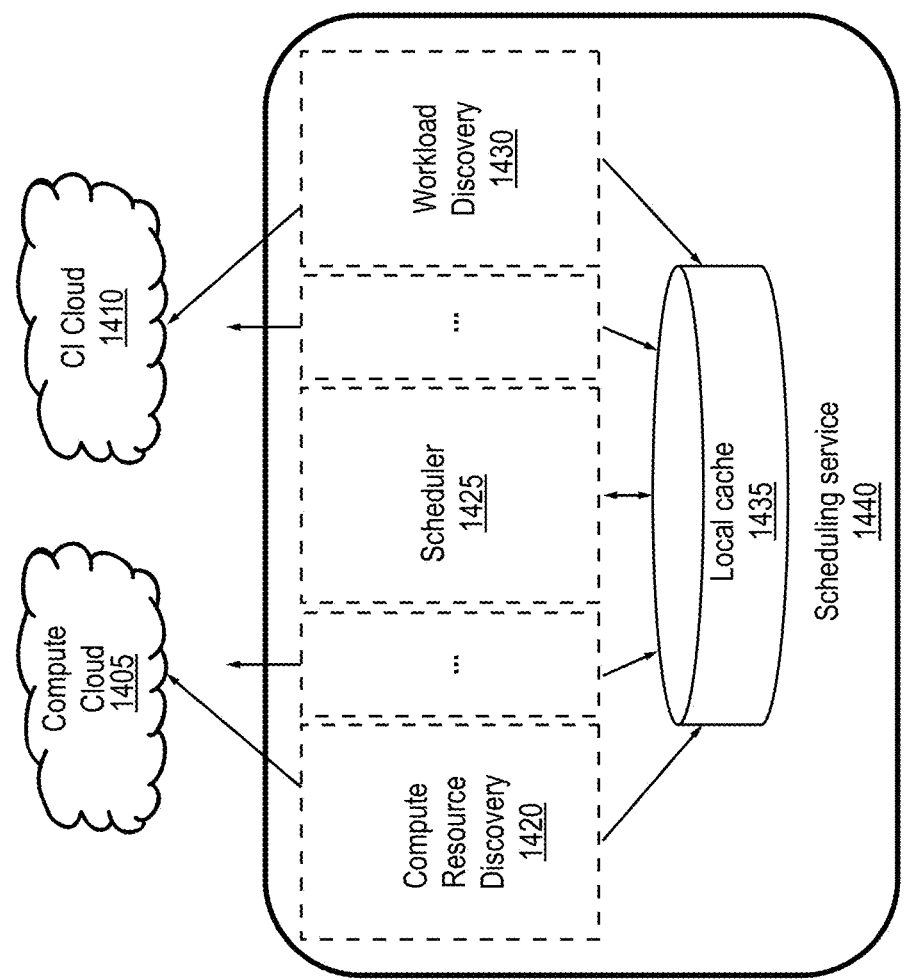
FIG. 14 illustrates a block diagram 1400 showing the various possible interconnections between a scheduling service and a compute cloud and a CI cloud, in accordance with the described embodiments.

FIG. 14 illustrates a block diagram 1400 showing the various possible interconnections between a scheduling service and a compute cloud and a CI cloud, in accordance with the described embodiments.

In particular, there is depicted here, a scheduling service 1440 which implements a local cache 1435 which communicates with various sub-components, including a compute resource discovery 1420 module, a scheduler 1425 module, and a workload discovery 1430 module.

The local cache 1435 may be implemented and operate as an asynchronous local cache, meaning, according to a particular embodiment, that data modified by any of the compute resource discovery 1420 engine or the workload discovery 1430 engine or other components of the scheduling service 1440 are not synchronously represented (e.g., not instantly or automatically ready for read operations) within the cache 1435 for other operations, such as a read operation by the scheduler 1425. This permits operations to be conducted in parallel, without any operation having to wait for the operation or the concurrent and parallel operations to complete, as is the case with a synchronous cache. Conversely, according to such an embodiment, the scheduler 1435 will re-fresh or unload and reload the asynchronous cache when necessary, for instance, during its produce round, to update and refresh all available information from the other components while preventing the scheduler from triggering any kind of a lock or deadlock condition or even a delay, which would then inhibit the independently operating compute resource discovery 1420 engine or the workload discovery 1430 engine from completing any task. For example, if the scheduler 1435 triggers a lock due to a read from the cache while the compute resource discovery 1420 engine or the workload discovery 1430 engine are attempting a write, there may be a deadlock condition or simply a delay or latency condition for the discovery engines seeking to write data into the cache.

While use of the asynchronous local cache may result in the scheduler 1435 having slightly outdated information in some instances, the asynchronous local cache also permits the other components to operate wholly independently from the scheduler without risk of any delay attributable to the actions of the scheduler 1435. Moreover, the scheduler iteratively cycles through its various rounds as described above and has recovery mechanisms and optimization phases to pick up workloads potentially missed or skipped in a prior iteration or even a prior step, and therefore, the risk of missing a particular data point momentarily due to the use of an asynchronous local cache is negated.

According to one embodiment, the asynchronous local cache utilizes a transaction commit for writes to the cache, permitting the scheduler 1435 to continue issuing transactions, such as reads and updates against the local cache without waiting for the other independently operating components, such as the compute resource discovery 1420 engine or the workload discovery 1430 engine to finish any given operation, thus permitting the independently operating components to operate in parallel without coordination with the scheduler 1435, thus unburdening the scheduler 1435 from such overhead tasks.

Database transaction to complete. However, your application cannot ensure when the transactions are completed on the Oracle database.

Moreover, each of the scheduler and the compute resource discovery 1420 engine or the workload discovery 1430 engine may update the asynchronous local cache, even when a lock is not available, meaning that the cache would be unavailable to accept transactions if operating in synchronous mode. Once the asynchronous local cache is available again and thus returns to normal operation (e.g., a record lock is available), updates committed on the cache tables are automatically propagated and made available to any other entity seeking to access, read, or otherwise update them.

According to described embodiments, parallel computation of sub-parts of a given workload, requires splitting a workload among a set of processing units called workers. The determination of how to split such a workload and to where the sub-parts are to be distributed is performed by the scheduler 1435, thus resulting in workload chunks that are then distributed to the various VMs or workers.

As shown here at FIG. 14, there is further depicted as being in communication with the scheduling service 1440, multiple remotely located clouds, including the compute cloud 1405 and the Continuous Integration (CI) cloud 1410 as depicted here.

Such a scheduling service 1440 enables the described systems to implement a scheduler and workload manager that identifies and optimizes horizontally scalable workloads in an efficient manner.

Such a scheduling service 1440 can therefore determine whether or not workloads may be split up or "distributed" and may further determine, the extent to which such workloads may be split up so as to meet a defined goal. The scheduling service 1440 may further be utilized to determine what criteria such workloads may be split, thus identifying an appropriate plan to split or distribute a given workload as though it was multiple smaller workloads. Such an approach provides greater efficiency to optimize the use of available computing architecture or increase parallelism by which to complete a given workload sooner, or to realize other benefits, such as increasing modularity of a given workload through distribution of such a workload (e.g., based on the workload being horizontally scalable and based on identified criteria), thus increasing flexibility for the scheduler 1425 of the scheduling service 1440 architecture to schedule the workload in question as well as other workloads pending or executing at the system which also require scheduling and application of a finite amount of compute resource available via the host organization's hosted computing environment.

Notably, different types of workloads which are determined to be distributable (e.g., they can be split up) may be distributable in different ways or may require different approaches to split them, or require the available of different resources to split or to distribute them.

Moreover, it is also the case that certain workloads simply cannot be distributed or split in any way, or such workloads may need to be executed in a different location, on a different cloud platform entirely, or possibly even require execution on a very specific piece of computing architecture with specially defined computing specifications (e.g., processor type, processor speed, processor quantity, processor threads, memory type, memory speed, memory quantity, operating system revision, operating system type, or connected and available peripherals, etc.).

Consider for example, the scheduling service 1440 receiving a workload that simply cannot be distributed. For example, the given workload may be tied to a single execution thread, require a single execution thread due to the nature of the workload, or be programmed in such a way or utilizing a programming language that, even if executed on a multi-threaded processor system, will nevertheless utilize only a single thread. Such a workload therefore either cannot be distributed or should not be distributed, as doing so will yield no benefit.

For example, the work of compiling source-code sometimes falls into this category, in which the software compiler must utilize a single thread and therefore, cannot be distributed.

Conversely, the scheduling service 1440 may receive code that arrives at the scheduler and requires testing. For example, a particular code example may be subjected to 115,000 different unique tests, and thus, the code could, in theory, be executed 115,000 different times, on 115,000 different instances, operating on 115,000 different virtual machines, so as to execute the received code for testing against each of the different 115,000 defined tests, and then in turn yielding 115,000 different test results. Stated differently, there may be a theoretical 1:1 breakdown or split permissible between the 115,000 different unique tests and the minimum sized executable sub-component of the workload on any given VM, in this extreme example, it would be possible (though ill-advised) to execute each and every one of the 115,000 different unique tests on a different VM. However, doing so will incur a prohibitive overhead cost.

In reality, there is a balance between executing a workload in an entirely non-distributed manner (e.g., not split up) versus fragmenting the workload into its smallest theoretical parts. This is because as the workload is broken up, split into pieces, and then distributed, there is an increase in overhead to manage the greater number of individualized workload sub-parts.

For example, burdening a virtual machine (VM) with 115,000 tests is likely to overwhelm a VM simply due to the sheer volume of individual tests that may be run, and thus, such an allocation of all 115,000 tests to a single VM is not beneficial. Similarly, utilizing 115,00 different VMs via which to allocate a single one of the 115,000 tests not only requires a massive number of individual VMs, but also requires a massive amount of overhead that well outweighs any potential benefits of splitting up and distributing the 115,000 exemplary tests of the workload.

What is needed therefore is a scheduler and workload manager that identifies and optimizes horizontally scalable workloads in an efficient manner, which takes the overhead penalty of distribution to multiple VMs (e.g., the overhead associated with splitting a workload into multiple parts which are distributed to different multiple execution VMs) into account when calculating the efficiency or benefit of splitting up such workloads.

Figure 15:
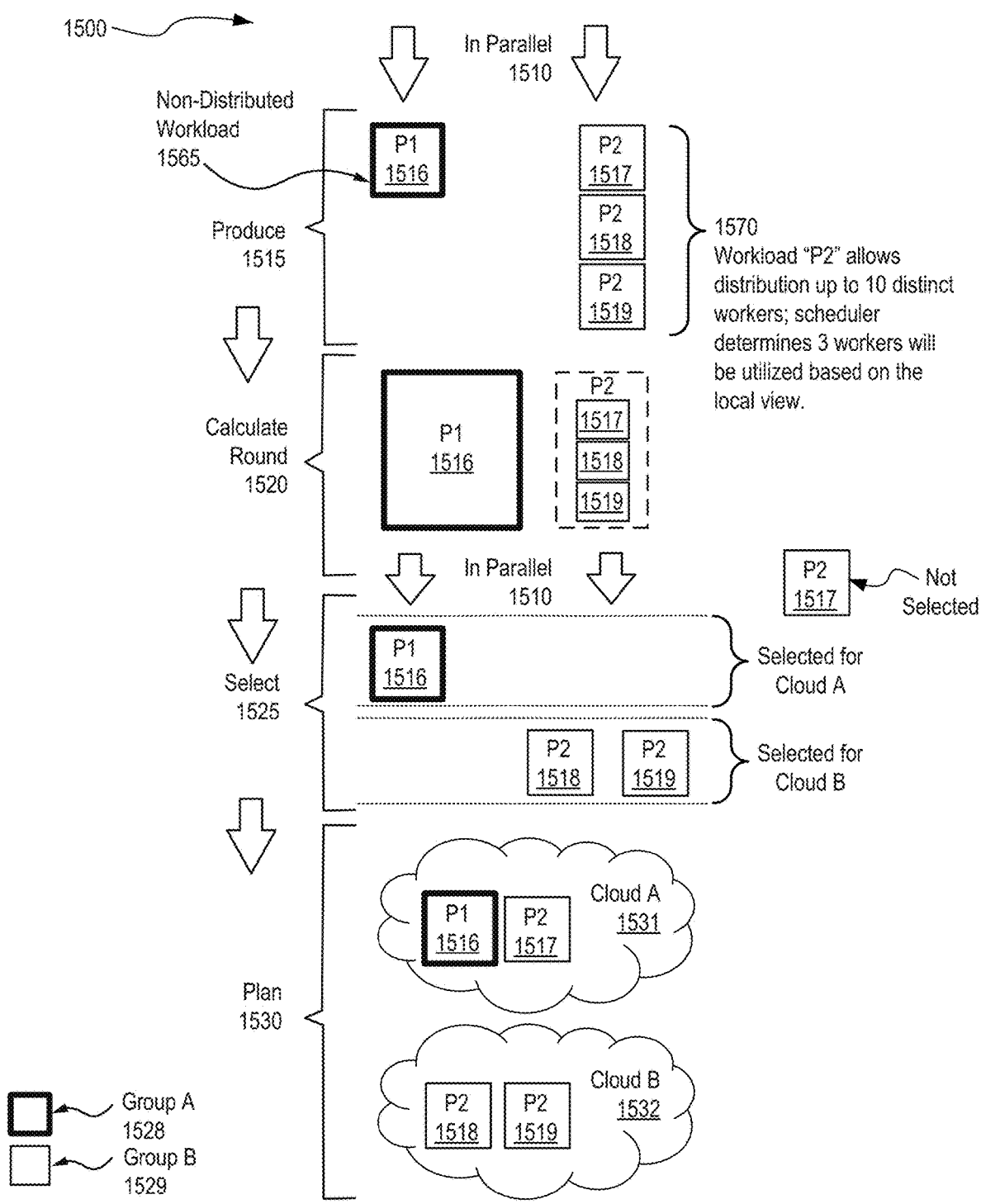
FIG. 15 depicts an exemplary scheduling scheme 1500 as implemented by the scheduling service in accordance with described embodiments.

FIG. 15 depicts an exemplary scheduling scheme 1500 as implemented by the scheduling service in accordance with described embodiments.

As shown here, there are two paths followed in parallel 1510 by the various workloads through the various phases, including the produce 1515 phase, the calculate round 1520 phase, the select 1525 phase, and the plan 1530 phase.

As can be seen here, workload P1 at element 1516 of the produce 1515 is a non-distributed workload 1565. This workload cannot be broken up, distributed, or split into smaller parts. Conversely, workload "P2" allows distribution up to 10 distinct workers. In this particularly example, the scheduler determines that 3 workers will be utilized based on information stored within the local view via the local cache (see element 1570).

Consequently, at the produce phase, there is workload P1 1516 which is non-distributable (corresponding to group A at element 1528) and workload P2 (elements 1517, 1518, and 1519) which is distributable (corresponding to group B at element 1529).

Next, at the calculate round 1520, it is determined how much computational resources are required for each of Groups A and B (1528 and 1529), thus workload resource requirements for P1 and P2 are calculated and the scheduler then performs the select 1525 phase, in which all of workload P1 (element 1516) is selected for cloud A, as it cannot be broken up and distributed. Similarly, at the select phase 1525, sub-elements of workload P2 (identified as elements 1518 and 1519) are selected for cloud B, but sub-element 1517 is not selected, despite being previously produced, as there is insufficient compute resources within cloud B for the sub-portion of workload P2 1517.

Next, the scheduler advances to the plan 1530 phase in which case all of group A, which is only workload P1 1516, is first allocated to cloud A at element 1531 as the workload P1 at element 1516 cannot be broken up into parts.

The scheduler then places workload P2 sub-elements selected at the select 1525 phase into cloud B 1532, thus populating cloud B with the two selected elements 1518 and 1519. However, based on the prior calculate phase, the scheduler determines at the plan 1530 phase that some additional allocation may be placed into cloud A at 1531, despite not previously being selected. Consequently the previously non-selected sub-element 1517 is then placed into cloud A at element 1531, thus permitting all of workload P1 (element 1516) and one sub-part of workload P2 (element 1519) to execute within cloud A 1531 and the other two sub-parts of workload P2 (elements 1518 and 1519) to execute within cloud B 1532. The mechanism by which a scheduler may pick up previously produced but non-selected sub-elements of a workload (such as sub-element 1517 of workload P2) are described previously in greater detail.

In such a way, the scheduler and workload manager dynamically identifies if incoming workloads are horizontally scalable and optimizes them adaptively.

In the process of developing a service to dynamically allocate compute capacity (any of CPU, RAM, IP addresses, etc.) via which to perform a specific type of work according to needs, it may be necessary to assign compute capacity from a large pool of heterogeneous resources to a large set of heterogeneous workloads. The goal of such a service is to prioritize resource allocation according to the need identified for each type of workload, and additionally the specified QoS of the workload provided in form of Service Level Targets (SLTs) defining, for example, a 95th percentile expected completion time and resource usage.

Implementing such scheduler becomes a very complicated task as it is hard if not impossible to prove correctness and therefore compliance with the SLT. Previously known solutions which have failed to build the correct algorithms and moreover, solutions available today further suffer from a lack of extendibility and such solutions.

Therefore, the described scheduler permits optimizing without necessitating the identification, discovery, or implementation of any single perfect scheduling algorithm as the scheduler remains adaptable to the ever changing workload demand environment and the ever-changing availability of compute resources and compute clouds having available compute resources.

Such adaptability is realized via a scheduler which determines independently where the resources should be allocated on an iteration by iteration basis, be it minute by minute, or some other time span for each iterative cycle (refer to the iterative cycle at FIG. 1C). Such a scheduler, by design, embraces the concept of eventual consistency, thus permitting a very decoupled solution. For example, even though element 1517 of workload P2 is produced and then later not selected, it is nevertheless permitted to be placed into the cloud A 1531 for execution during the final plan phase, with each operations remaining isolated and independent from one another.

Such adaptability is further realized via a scheduler which dynamically discovers work and resources and a scheduler which dynamically reacts to work type and requirements, and recognizes everything that needs to be done for the type of work that is to be performed in fulfillment of any given workload request. The scheduler is then optionally extended by many more optimizations and solutions including scheduling in application workloads, for example, via a CRM application, use of web servers and other application infrastructures, application of virtualized resources, such as Virtual Machines (VMs), use of a Software Defined Data Center for provisioning, bring-up, or re-allocation, use of the Salesforce Force Application Model, Kubernetes, and Orchestration Engines, as well as accommodating Seasonal and Cyclical Workloads.

Therefore, by extending the "producer" phase which identifies all the work that is required to be performed, including their priority, it is possible for the scheduler to dynamically recognize if the workload type is horizontally scalable. That is to say, whether that particular workload may be broken up, divided, distributed, or split among multiple workers, and if so, how such distribution may occur. For instance, the scheduler may dynamically determine based on the particular workload's SLT and available capacity that horizontally scaling the workload amongst a higher number of workers will achieve the service level target and/or optimize for time and work quality.

Thus, in the example depicted here, with the two different workloads, P1 on the left and P2 on the right, the scenario exists in which the scheduler has multiple workloads and also has access to two compute clouds for performing the work. Moreover, the scheduler is consistently updating its local view and therefore able to determine at any time, how to best plan the ultimate execution of the workloads in question. In this particular case, the non-distributable workload P1 is scheduled where it will fit, which is within cloud A and the sub-portions of workload P2 are then populated first into cloud B with the non-selected portion of P2 at element 1517 being backfilled into remaining space at cloud A.

Figure 16:
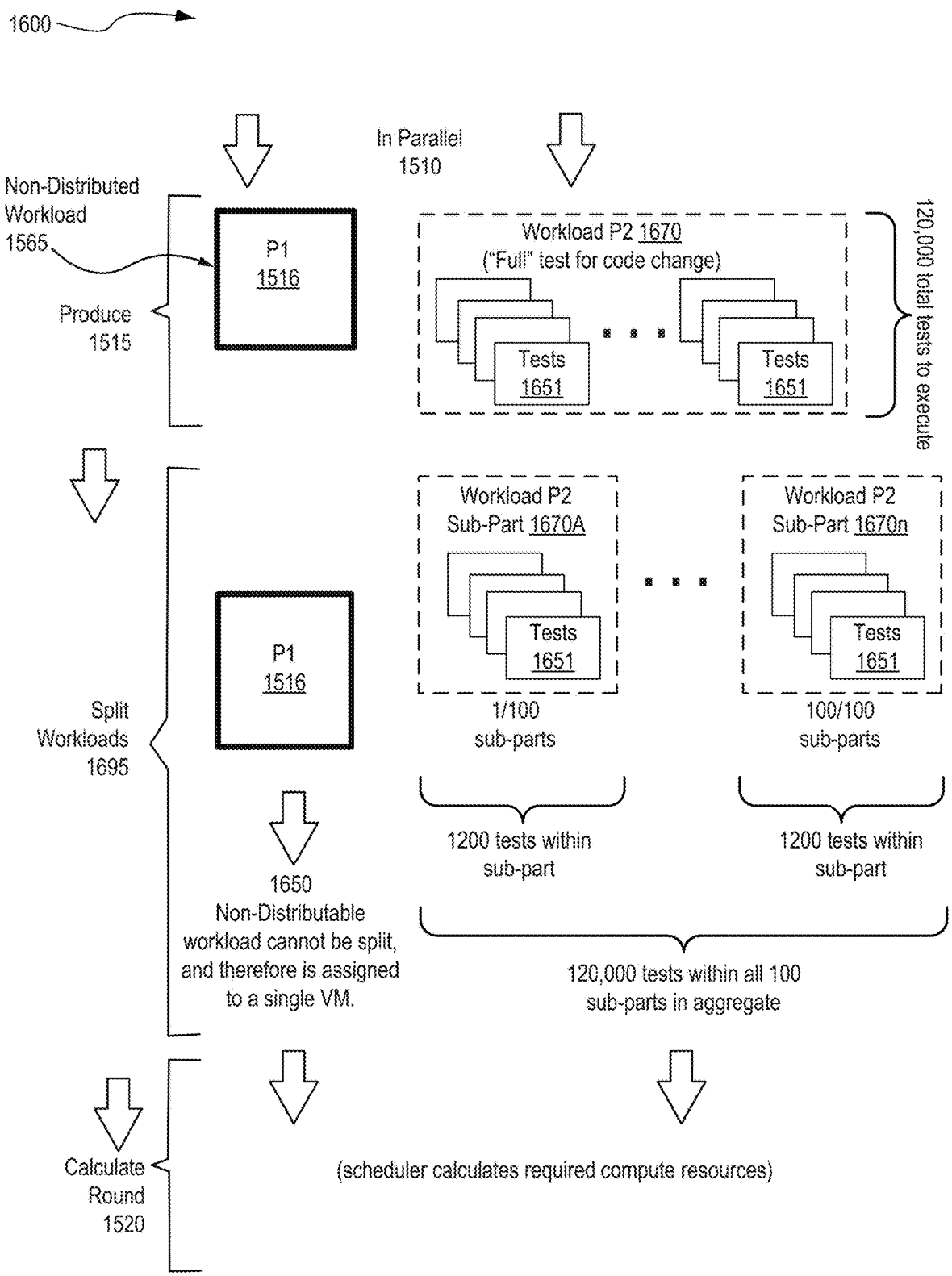
FIG. 16 depicts an exemplary scheduling scheme 1600 as implemented by the scheduling service in accordance with described embodiments.

FIG. 16 depicts an exemplary scheduling scheme 1600 as implemented by the scheduling service in accordance with described embodiments.

Referring back to the example above in which there is a workload with 115,000 different tests to be executed, such a workload may easily be broken up, split in to parts, and distributed amongst different workers due to the nature of its individualized tests. The scheduler may therefore elect to distribute the workload such that 1000 tests are run on each of 115 VMs, thus providing some balance between the overhead associated with spitting or distributing the workload and the parallelism gains realized by executing multiple sub-parts of the split workload in parallel as well as the ability to fit sub-parts of the workload into otherwise unused compute capacity.

Consider for example, customers submitting workload to the host organization for processing. For workloads that cannot be distributed, one VM or one individual unit of compute (e.g., a server, a worker, a slave worker, etc.) is therefore assigned to the non-distributable workload. For example, a G10 C++ compiler is not amenable to being split up, and thus, it must be assigned to a single unit of compute as a non-distributable workload. Such a workload may be represented by the P1 workload at element 1516 as depicted at FIG. 15.

Conversely, there may be a workload that arrives with a large amount of tests, similar to the example above. Consider a workload P2 1670 classified as "full" in which there are about 120,000 tests to be executed for a given code change. This quantity of tests is very large to execute on a single unit of compute or a single VM, and therefore, the scheduler dynamically determines first that the workload is capable of being split into parts and then further determines how to split the workload. In this particular example, it may be known that the tests are somewhat lengthy to execute, and therefore, based on the quantity of tests to be executed and the length of time each test takes, the scheduler will split the "full" workload having 120,000 individual tests into 100 sub-parts, each with 1200 individual tests, and then proceed to distribute those 100 workload sub-parts to 100 VMs or 100 compute units, which then each proceed to execute the 1200 tests and ultimately report back.

Thus, as is depicted here, workload P2 1670 has 120,000 total tests (elements 1651) to execute, but may be split into parts. Consequently, the scheduler proceeds to split workloads 1659 by first recognizing that workload P1 is a non-distributable workload that cannot be split, and therefore is assigned to a single VM as depicted by element 1650, and in parallel determines that workload 1670 may be split and thus, scheduler splits workload P2 into sub-parts 1670A through 1670n, for parts 1/100 through 100/100, each sub-part having 1200 tests and the 100 sub-parts in aggregate having all 120,000 tests.

Another distributable workload may be classified as "basic" in which there are still a large number of individual tests, such as 100,000 total tests, but each of the tests is known to execute much faster, and therefore, the scheduler first determines that the workload (with 100,000 fast running tests) may be split into parts and then the scheduler further determines, based on the quantity of tests and the length of time each test is expected to take, into how many sub-parts this particular workload is to be split. In this example, the scheduler may break the 100,000 faster running tests into 30 sub-parts and then distribute the 30 sub-parts to 30 VMs.

In such a way, the scheduler dynamically determines the ability to break workloads into separate smaller units of work and reactively allocate the sub-parts of a workload in a way that optimizes consumption of available compute resource and further to address and accommodate the workload coming into the scheduling service.

According to one embodiment, the scheduler determines during the produce phase 1515 whether or not the workload is distributable and if not, the workload is simply assigned to a single VM or a single compute unit. However, if the workload is distributable, then the scheduler may determine dynamically to split the distributable workload into 3 sub-parts or 30 sub-parts or 100 sub-parts, based on the available compute resources, applicable SLTs/QoS requirements, and other factors. The scheduler during the produce phase 1515 does not concern itself with the other phases, but rather, simply operates to produce the workloads or workload sub-parts which are to be ultimately executed.

Next the scheduler advances to the calculate round 1520 in which the scheduler determines how much compute resource to allocate to Group A and Group B, etc. Next the scheduler advances to the select phase, as described previously. Some of the sub-parts produced may be selected whereas other sub-parts may not be selected, with the scheduler iteratively processing the incoming workload until the entirety of the split workload is ultimately executed successfully.

Such a process, in practice, may be scaled up to thousands of workloads being handled simultaneously. According to one embodiment, the scheduler may determine, via the calculate round, how much compute it wishes to allocate to each given workload or to each given workload sub-part.

According to one embodiment, the scheduler analyzes the efficiency of distribution so as to balance the overhead associated with splitting and distributing a workload versus the efficiency gains associated with a distribution of workload. For example, there may be an upper bound where diminishing returns result such that further gains cannot be attained even if the workload is split or fractured further. Similarly, the same concept may be applied to account for Quality of work, or take cost or other aspects of work and service level targets into account when leveraging horizontally scalable workloads.

There is also a potentially issue with failing to split workloads into a sufficient number of sub-parts. For example, if a workload is distributable and thus split into sub-parts, but each of the split sub-parts of the workload remain too large, then it is possible that a workload sub-part will crash a VM or overwhelm a given worker to whom the workload is distributed. Thus, the scheduler needs to attain an appropriate balance between the quantity of sub-parts into which a workload is divided and the overhead associated with an increasing quantity of workload sub-parts.

The scheduler therefore considers various factors including available compute, cost of execution, overhead cost associated with splitting a workload, ability to complete a workload or workload sub-parts in compliance with a SLT or QoS requirement, etc.

In accordance with one embodiment, the scheduler has an advanced estimate or an actual value for the amount of overhead increase associated with executing each additional workload sub-part. Therefore, the scheduler is able to ensure that the increase in overhead does not overwhelm the gains associated with distributing workloads.

For example, if there is an additional 5 minutes of overhead work associated with dividing a workload and distributing the workload and providing a VM to execute the workload, and then the sub-part of the workload takes 15 minutes, then further dividing the workload may not be appropriate under certain circumstances because splitting the 15 minutes of work into, for example, 3 parts resulting in 3 sub-parts of a workload will result in a significant increase in terms of overhead, as the total overhead will increase from 5 minutes for the one 15 minute workload sub-part to 5 minutes for each of the further divided workload sub-parts, or 15 minutes total overhead for the 15 minutes of work performed for the workload sub-parts.

This example may even be taken to the extreme, in which a 5 minute workload sub-part could theoretically be divided further, say into 5 more sub-parts, each of which taking 1 minute to complete, but doing so will induce another 5 minutes of overhead for each 1 minute workload sub-part execution, thus resulting in a ratio of overhead to workload which exceeds 1:1. For example, in this extreme example, there would be 5 minutes of overhead for 1 minute of workload sub-part execution.

Nevertheless, because the various factors are considered by the scheduler, it is also possible for the scheduler to identify a critically urgent workload task that must be completed as soon as possible and at all costs, and thus, the scheduler may accept an unfavorable efficiency ratio so as to expedite execution and completion of the critically urgent task as much as possible.

Therefore, according to one embodiment, the scheduler seeks to optimize the ratio where the amount of workload execution is maximized and the amount of overhead associated with distributing workloads is minimized.

However, as noted above, this is a changing value and there are certain workloads that are so critical that they are executed as quickly as possible, regardless of costs, while other workloads may be identified that lack sufficient Return On Investment (ROI) and thus, the workload is canceled entirely, and there may be other workloads that are executed based on available compute capacity or the cost of compute capacity, etc., each of which may be defined by a policy engine (e.g., refer to the SLTs 1051 and policy engine 1050 at FIG. 10).

According to one embodiment where non-distributable workloads are discovered, for instance, workload generating an artifact from a code submission and must therefore be executed on a single desktop, or a single VM, the workload is producing executable code from a complier and thus, it simply is not possible with certain compliers to run half of the workload in one place and another half of the workload in another place. However, depending on available compute resource, it may be feasible to combine some workload sub-parts from a first workload with a non-distributable second workload, with the sub-parts and the non-distributable workload being allocated to a particular compute cloud for execution or to a particular VM, etc.

Conversely, with workloads associated with code change submissions, the workloads are highly distributable and are also time-sensitive because it is important to get the code developers feedback as soon as possible so as to facilitate a fact code test, validation, and release cycle.

For example, the developers of a code base may develop 100,000 tests, and the workload may take several days to complete. However, by splitting the workload into sub-parts and distributing the sub-parts amongst a large number of VMs, the compete suite of tests may be completed in just 2-3 hours, thus providing developers feedback within a timely manner. With another test suite, the tests run much more quickly and therefore, the workload sub-parts may be divided into a smaller quantity and then distributed to a fewer number of VMs. Here the efficiency ratio is calculated, but is modified in terms of what is acceptable based on the need to return the workload results back to the developers. Stated differently, the threshold acceptable efficiency ratio may be altered based on other factors other than an optimal efficiency ration. For instance, if processing the workload takes multiple days without distributing then the results may be worthless, and so the efficiency ratio may be permitted to degrade until the point that an SLT or QoS objective is met, such as returning test results to the developers within a stated 2-3 hour time frame. Other time frames may be applicable for different types of workloads.

Figure 17:
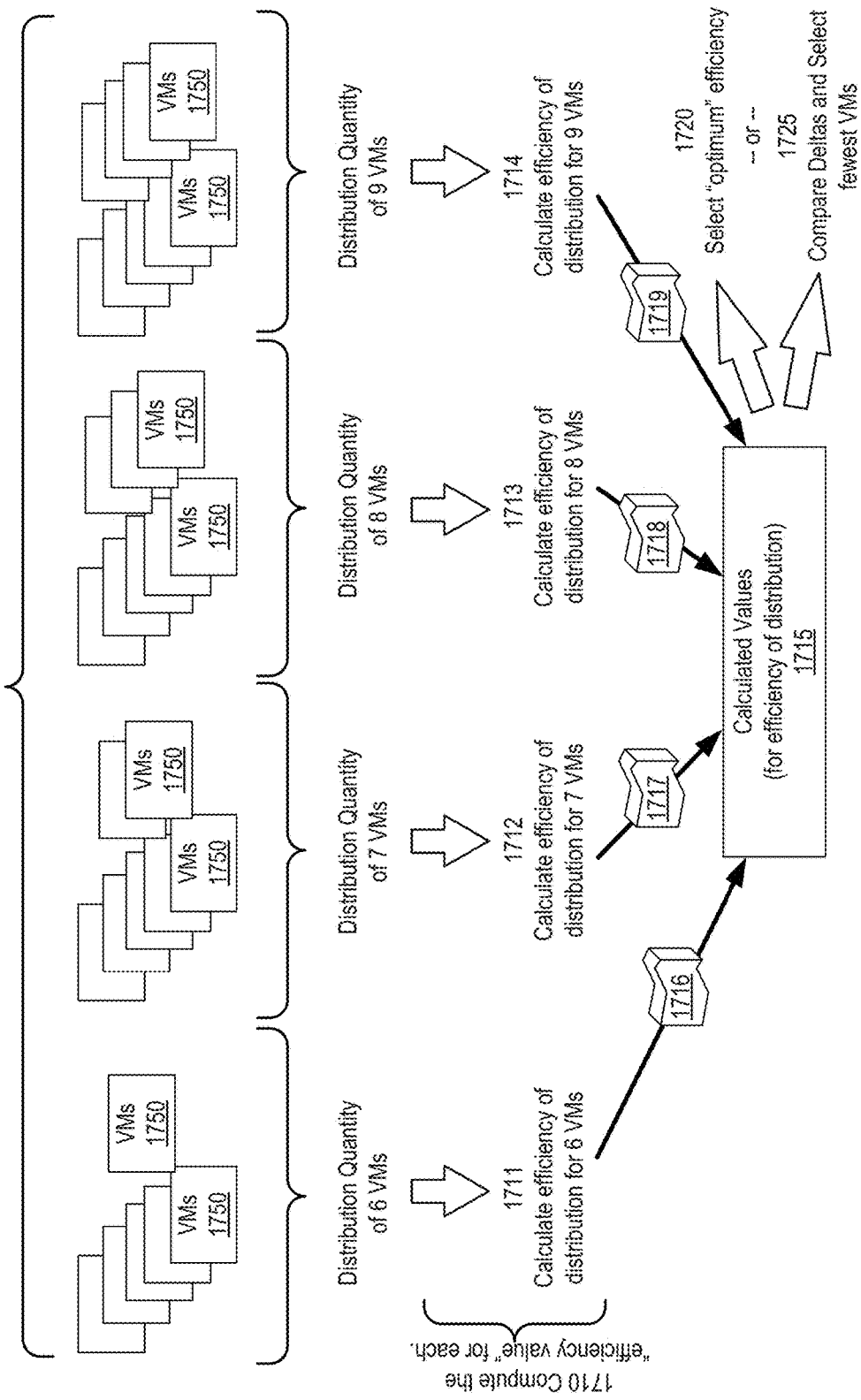
FIG. 17 depicts an exemplary scheduling scheme 1700 which includes calculating an efficiency of distribution, as implemented by the scheduling service in accordance with described embodiments.

FIG. 17 depicts an exemplary scheduling scheme 1700 which includes calculating an efficiency of distribution, as implemented by the scheduling service in accordance with described embodiments.

According to one embodiment, an efficiency of distribution value is calculated and compared to an efficiency threshold to determine whether or not a given workload distribution is sufficiently optimized or at least above a specified efficiency threshold.

According to such an embodiment, the produce 1515 phase selects a range of distribution which is permissible and then calculates an efficiency of distribution value (e.g., or an "efficiency value") for every possible distribution within the range. For example, if the produce phase identifies a distributable workload and determines that it may be broken up or split into anywhere from 30 to 50 workload sub-parts, then during the produce phase, the scheduling service will calculate an efficiency of distribution value for each possible number of workload sub-parts in the range, which in this example would be to calculate an efficiency of distribution value for 30 workload sub-parts, 31 workload sub-parts, 32 workload sub-parts, . . . n workload sub-parts through to 50 workload sub-parts.

For example, there is depicted here at element 1705, an operation to determine the permissible range of distribution, which according to the figure, is 6 to 9 VMs 1750.

Next, there is depicted several groups of VMs, including a distribution quantity of 6 VMs on the left, a distribution quantity of 7 VMs second from the left, a distribution quantity of 8 VMs third from the left, and finally a distribution quantity of 9 VMs on the right.

Further processing then performs an operation 1710 to calculate the efficiency value for each of the distribution quantities of VMs, specifically, operation 1711 calculates the efficiency of distribution for 6 VMs as shown on the left outputting efficiency value 1716, operation 1712 calculates the efficiency of distribution for 7 VMs as shown second from the left outputting efficiency value 1717, operation 1713 calculates the efficiency of distribution for 8 VMs as shown third from the left outputting efficiency value 1718, and operation 1714 calculates the efficiency of distribution for 9 VMs as shown on the far right outputting efficiency value 1719.

The resulting calculated values 1715 for the efficiency of distribution are then analyzed, permitting the scheduling service to either select the "optimum" efficiency value (operation 1720) and thus the corresponding distribution quantity within the range of distribution or alternatively permitting the scheduling service to compare deltas between each of the respective distribution quantities and then select the distribution which results in the fewest VMs (operation 1725), depending on the criteria and priorities for the workload.

According to certain embodiments, the range of distribution (e.g., how many sub-parts a distributable workload may be fragmented into) is configurable by a user or administrator while in other embodiments, the scheduler determines its own range of distribution permissible based on other criteria, such as available compute resources, expected or known overhead associated with each additional workload sub-part, etc.

Once the efficiency of distribution value is calculated for the entire range of distribution, those possible distribution values within the range of distribution having an efficiency of distribution value which falls below the efficiency threshold are simply eliminated, according to one embodiment, and a possible distribution value having a calculated efficiency of distribution value which exceeds the efficiency threshold is selected. In a different embodiment, once the efficiency of distribution value is calculated for the entire range of distribution, a single one of the possible distribution values for the distribution range which corresponds to a highest calculated efficiency of distribution value is selected. In yet another embodiment, the scheduler service identifies the lowest passing efficiency for which the delta to the next increment (next distribution value in the range or which an efficiency value is calculated) has a distribution efficiency in excess of a minimum efficiency improvement. Thus, even if multiple calculated efficiency of distribution values exceed the threshold, the producer may require that in order to step to a next distribution quantity within the permissible range of distribution, a delta for the efficiency of distribution value between two adjacent distribution quantities must exceed a second threshold, which may be referred to as the delta threshold.

For example, say the produce phase identifies a range of 10 to 15 VMs as the permissible distribution range. An efficiency of distribution value is calculated for each quantity of distribution, that is, an efficiency of distribution value is calculated for 10 VMs, 11 VMs, 12 VMs, 13 VMs, 14 VMs, and 15 VMs. Next, even if both distribution quantities 11 VMs and 12 VMs in the distribution range have an efficiency of distribution value which exceeds the distribution threshold, the produce phase may nevertheless seek to determine if it is appropriate to increase the distribution from 10 VMs to 11 VMs. Thus, a second threshold, the delta threshold, is further considered by determining if the delta between the efficiency of distribution value for 10 VMs and 11 VMs exceeds a configurable threshold, such as 2% improvement in efficiency for progressing from 10 to 11 VMs. If so, then 11 VMs is selected in favor of 10 VMs where the objective is to distribute to a greater quantity of VMs, and then the same comparison is made again with 12 VMs and so forth through the end of the series of permissible range of distribution values until the range is exhausted or until the delta threshold is not met for a given comparison.

In an alternative embodiment, the comparison is made in reverse with the objective of identifying the most efficient distribution with the lowest distribution value, that is to say, the produce phase seeks to reduce the total number of VMs utilized. Therefore, if the permissible range is from 10 VMs to 20 VMs for the range of distribution, then once the efficiency of distribution value is calculated for each quantity of VMs within the entire range of distribution, then a comparison is made, for example, between 20 VMs and 19 VMs, in which it is determined whether or not the delta for the calculated efficiency of distribution value between 19 VMs and 20 VMs exceeds the delta threshold, and if so, 19 VMs is chosen in favor of 20 VMs, and then a further comparison is made with 18 VMs, until the entire range is exhausted (e.g., all quantities are eliminated in favor of choosing 10 VMs, which is the lowest permissible distribution quantity for the range of distribution according to this example) or until the delta threshold is not attained for a given comparison of two adjacent distribution values.

From a high level, if on average there should be 2% efficiency gain for each fewer VMs utilized for a workload sub-part, then moving from 20 VMs to 10 VMs should represent an approximate 20% gain in efficiency of execution, albeit with the recognition that the workload will take longer to complete its execution. Therefore, where optimal efficiency is sought, the above algorithm permits the scheduling service, during the produce phase, to locate the most optimal efficiency of distribution value from a collection or a range of possible distribution quantities, such as a range from 20 VMs down to 10 VMs. In other embodiments where optimal efficiency is not the overriding criteria, then different algorithms may be utilized instead. For example, as noted previously, sometimes a fastest workload completion is prioritized or a lowest cost workload completion may be prioritized, and so forth.

In such a way, the algorithm gives up distribution which results in a longer total compute time, but in exchange for increased efficiency.

According to the described embodiments, the efficiency of distribution value is calculated by taking the total overhead attributable to all distributions divided by the useful work. For example, assume 30 there is minutes of overhead set up time per VM, and thus, 10× VMs results in 10 VMs times 30 minutes (e.g., 10×30) or 300 minutes of overhead. This is then compared to the amount of useful work, which should not change, regardless of how many VMs are utilized. Thus, while the useful work is constant for a given workload, the amount of overhead varies based on the distribution quantity (e.g., based on the quantity of VMs to which the workload sub-parts will be distributed). While the workload useful work remains constant, it is necessary to perform a setup for every additional VMs utilized, and therefore, as the quantity of VMs utilized increases, the amount of overhead work increases as a ratio of overhead work (on the numerator) to useful work (on the denominator).

Thus, for a workload with 60 minutes of useful work, there is 90 minutes required to distributed to a single VM, with 30 minutes of overhead and 60 minutes of useful work, resulting in a ratio of 30:60 or a 1:2 ratio for overhead versus useful work, that is to say, twice as much useful work is being conducted for the 30 minutes of overhead work. If the same workload is then distributed to two VM nodes, then the ratio would be 60 minutes of overhead work (30 minutes on each of two VMs) divided by the same 60 minutes of useful work, resulting in a ratio of 60:60 or a 1:1 ratio of overhead to useful work, meaning that the same amount of overhead is being performed as there is useful work being performed, where as previously the overhead was only half of the useful work performed. Taken a step further, if three VMs are utilized, then the distribution quantity of 3 is multiplied by the amount of overhead or set up work per VM, which is 30 minutes in this example multiplied by 3 VMs for a total of 90 minutes of overhead over the same amount of useful work of 60 minutes (20 minutes on each of the 3 VMs), resulting in a ratio of 90:60 or 3:2, meaning there is more overhead work being performed than there is useful work, although the useful work would complete faster, since it would take only 20 minutes per VM, plus the 30 minutes of overhead time, meaning that 60 minutes of useful work for the workload could be completed in 50 minutes total (30 minutes plus 20 minutes at each of 3 VMs), but at a cost of an additional 60 minutes of overhead work (30 minutes for each of the two additional VMs, since the first VM will incur 30 minutes of overhead no matter the total distribution quantity ultimately selected).

In a perfectly distributed workload, it is simple to select the optimal efficiency. However, in reality, there is an uneven distribution because while a workload may be distributable and thus is amenable to splitting into parts, the workload sub-parts are uneven and thus form an uneven distribution to the VMs which perform the workload sub-parts. For example, splitting a 60 minute workload into sub-parts may result in a 20 minute workload sub-part and a 40 minute workload subpart. It is for this reason that the step-down approach of comparing the efficiency deltas between multiple different distribution quantities (e.g., comparing 10 VMs down to 9 VMs and validating that the efficiency gain is more than 5%) is helpful because it is highly likely that the distribution of the workloads is uneven, and thus, calculating the efficiency of distribution value for each distribution quantity in a range and then checking the efficiency improvement surpasses a delta threshold helps to systematically find an appropriate distribution quantity for any given workload, even when the workload is not evenly distributable.

Further still, without the ability to determine whether or not workloads are distributable and how to optimize their distribution, it was necessary to perform all workloads as single units on a single VM, but as noted above, some workloads could be so massive that they would either never finish or they would not finish within a timeframe for which the workload output had value. Referring back to the example of the developers, executing the workload on a single VM could take weeks of processing, and thus, even if the workload were to finish successfully, it would be of no value to the developers so much later in time. However, by dynamically identifying that a workload was distributable and then determining an appropriate distribution for the workload, it is possible to get those same developers feedback from the completion of their weeks long "useful work" execution for their workload by distributing the weeks long execution workload into sub-parts and executing those sub-parts in parallel. While concurrent and parallel execution is not new, the ability to dynamically identify whether a single workload is distributable (e.g., may be split) and then break such a workload into parts and dynamically select the distribution quantity (e.g., the number of VMs) for executing the workload sub-parts is a capability simply not available to the marketplace at the present time.

Figure 18:
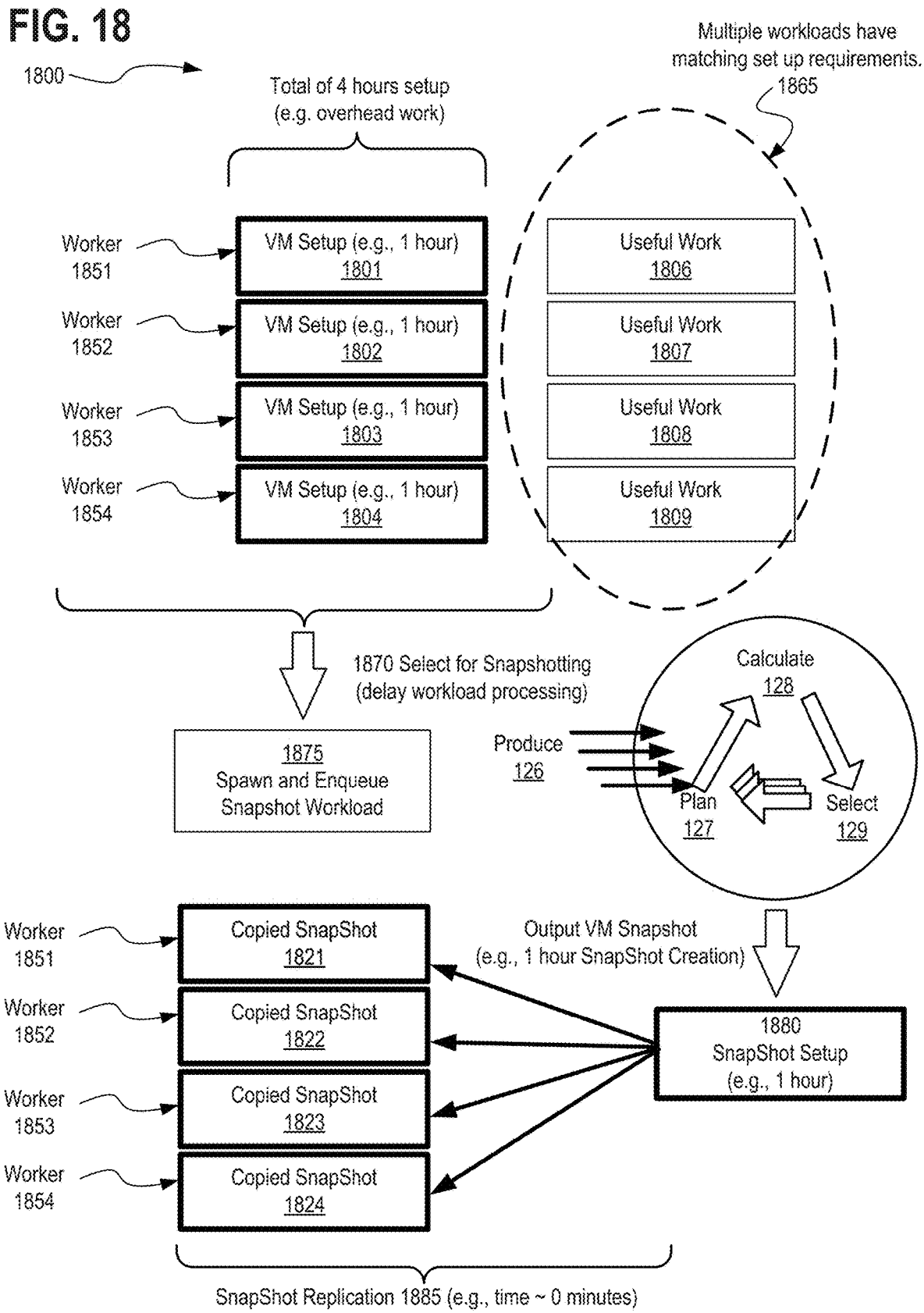
FIG. 18 depicts an exemplary snapshotting scheme 1800 for implementing a scheduler and workload manager with snapshot and resume functionality, in accordance with described embodiments.

FIG. 18 depicts an exemplary snapshotting scheme 1800 for implementing a scheduler and workload manager with snapshot and resume functionality, in accordance with described embodiments.

For example, as depicted here there are four workers 1851, 1852, 1853, and 1854 which need to be set up to execute useful work, shown here as useful work 1806, 1807, 1808, and 1809. In total, the setup constitutes 4 hours of overhead work which must be processed by the computing architecture of the host organization without realizing any benefit other than the ability to process useful work once the set up is complete. For example, where there is a requirement to provision four worker VMs, each taking an hour so as to concurrently handle the processing of four workloads (e.g., useful work 1806 to 1809), the computing architecture of the host organization will incur the overhead burden of 4 hours of setup or overhead work.

Notably, however, it is indicated here that there are multiple workloads having matching setup requirements at block 1865. Therefore, it is in accordance with certain embodiments that a collection of workloads (e.g., useful work 1806 to 1809) are selected for snapshotting 1870, which delays the workload processing.

As depicted here at block 1875, processing spawns and enqueues a snapshot workload with the scheduling service which is then processed via the produce 126, calculate 128, select 129, plan 127, and ultimately workload execution phases along with other workloads handled by the scheduling service, resulting in the output of the VM snapshot, which takes a corresponding 1 hour creation time, which is the same as the VM setup time for any one of the VM setups 1801 to 1804.

Once the Snapshot setup 1880 is output and available, for use, a snapshot replication 1885 phase is performed, for which the processing time is negligible, as snapshot replication 1885 merely involves I/O cycles to copy or duplicate the snapshot setup 1880 output previously, with the snapshot replication phase 1885 resulting in workers 1851 to 1854 now utilizing each a copied snapshot 1821, 1822, 1823, and 1824, respectively, rather than having to build and setup the VM as overhead work. According to such an embodiment, both replication and utilization of a copied snapshot 1821, 1822, 1823, and 1824 by ay of the workers 1851 to 1854 is negligible in terms of processing time (e.g., nearly 0 minutes versus the exemplary 60 minutes set up time).

Once the workers 1851 to 1854 are provisioned with the copied snapshots 1821, 1822, 1823, and 1824, processing of the useful work 1806, 1807, 1808, and 1809 may commence.

Consider the example depicted here with the four workers, each taking an hour of set up, and thus, 4 hours total. Once provisioned, the four workers are ready to perform the useful work, which is also, by example, a total of four hours, with each workload being 1 hour.

In the event that different workloads arrive at the scheduling service, it may be that the scheduling service during the produce phase recognizes that each of the different workloads are capable of being processed by a single configuration, either because the workloads have the same requirements or have sufficiently similar requirements that the scheduling service may utilize a specified configuration which meets the requirements of all of the workloads.

In another example, it may be that a workload arrives at the scheduling service and is determined to be distributable. Therefore, the scheduling service may split up or fragment the workload into workload sub-parts, resulting in multiple sub-parts, each of which have the identical resource requirements since they are derived from the same workload. Therefore, the scheduling service may elect to hold the workloads (regardless of them being different workloads or workload sub-parts) to produce a snapshot, and then utilize the snapshot for each of the workers or VMs rather than provisioning each worker or VM individually.

According to such embodiments, a snapshot describes the capability to preserve the state of a virtual machine, thus permitting any VM utilizing the snapshot to immediately return to the same state repeatedly or to allow different VMs to utilize the snapshot without having to provision the VM. For example, provisioning a VM may require the installation of an operating system and the installation of drivers and configuration and installation of applications or binary executables. However, once this work is performed a first time, a snapshot permits the same VM or other VM to utilize the snapshot to return to or arrive upon the identical machine state, without having to go through the provisioning process. Therefore, rather than undergoing a lengthy provisioning process, a VM may simply be configured to load or utilize an available snapshot, which then merely requires "booting" the operating system on the VM having been configured to utilize that snapshot, a process which may take only seconds rather than the provisioning process which can take many minutes or possibly even hours.

According to one embodiment, a VM is therefore provisioned with the necessary configuration and resources and then the state of the virtual machine is saved as a VM snapshot. In certain embodiments, a VM may be snapshotted in a powered-off state or in a powered-on state, thus potentially saving the time of the boot sequence, depending on the needs of the workload to be processed by the VM.

According to certain embodiments, a VM snapshot captures the entire state of the virtual machine at the time the snapshot is taken, including, for example: (i) the state of all the virtual machine's disks, (ii) the contents of the virtual machine's memory, (iii) the virtual machine settings and configuration, etc., thus permitting the same VM or any other VM to quickly revert to the snapshot to the state the VM was in at the time the snapshot was generated.

While the application of additional VMs to a given amount of workload is helpful to increase the parallelism of the workload, and thus complete the workload in a shorter period of time, every additional unit of compute, such as every additional worker or every additional VM results in a greater amount of overhead associated with completing the same amount of useful work. Therefore, additional VMs results in a less efficient processing of a given workload, although likely in a shorter period of time.

Thus, as depicted here with the example of four workers, there is a total set up time or overhead time of 4 hours, and the greater number of VMs utilized, the worse the problem becomes.

It is therefore desirable to increase the efficiency of processing the workload through the implementation of a scheduler and workload manager having snapshot and resume functionality.

According to another embodiment, after provisioning the computing resource, for example, installing an OS and building a configuration on server, worker, or compute device, an image, container, VM snapshot, or an immutable image is captured of the provisioned computing resource.

According to a particular embodiment, a docker image file type format is captured of the provisioned computing resource. A docker image is a file, having therein multiple layers, which is then used to execute code in a Docker container.

Docker is a tool designed to make it easier to create, deploy, and run applications by using containers. Containers allow a developer to package up an application with all of the parts it needs, such as libraries and other dependencies, and ship it all out as one package. By doing so, thanks to the container, the developer is assured that the application will run on any other Linux machine regardless of any customized settings that machine might have that could differ from the machine used for writing and testing the code since all of the libraries and dependencies are self-contained.

Unlike a Virtual Machine, rather than creating a whole virtual operating system, Docker allows applications to use the same Linux kernel as the system that they're running on and only requires applications be shipped with things not already running on the host computer. This gives a significant performance boost and reduces the size of the application.

Docker is an open source OS-level virtualization software platform primarily designed for Linux and Windows. Docker uses resource isolation features of the OS kernel, such as cgroups in Linux, to run multiple independent containers on the same OS. A container that moves from one Docker environment to another with the same OS will work without changes, because the image includes all of the dependencies needed to execute the code.

A container differs from a virtual machine (VM), which encapsulates an entire OS with the executable code atop an abstraction layer from the physical hardware resources.

A Docker image is made up of multiple layers. A user composes each Docker image to include system libraries, tools, and other files and dependencies for the executable code. Image developers can reuse static image layers for different projects. Reuse saves time, because a user does not have to create everything in an image.

Most Docker images start with a base image, although a user can build one entirely from scratch, if desired. Each image has one readable/writable top layer over static layers. Layers are added to the base image to tailor the code to run in a container.

When a new container is created from an image, a writable layer is also created. This layer is called the container layer, and it hosts all changes made to the running container. This layer can store newly written files, modifications to existing files and newly deleted files. The writable layer allows customization of the container. Changes made to the writable layer are saved on that layer. Multiple containers can share the same underlying base image and have their own data state thanks to the writable layer.

Figure 19:
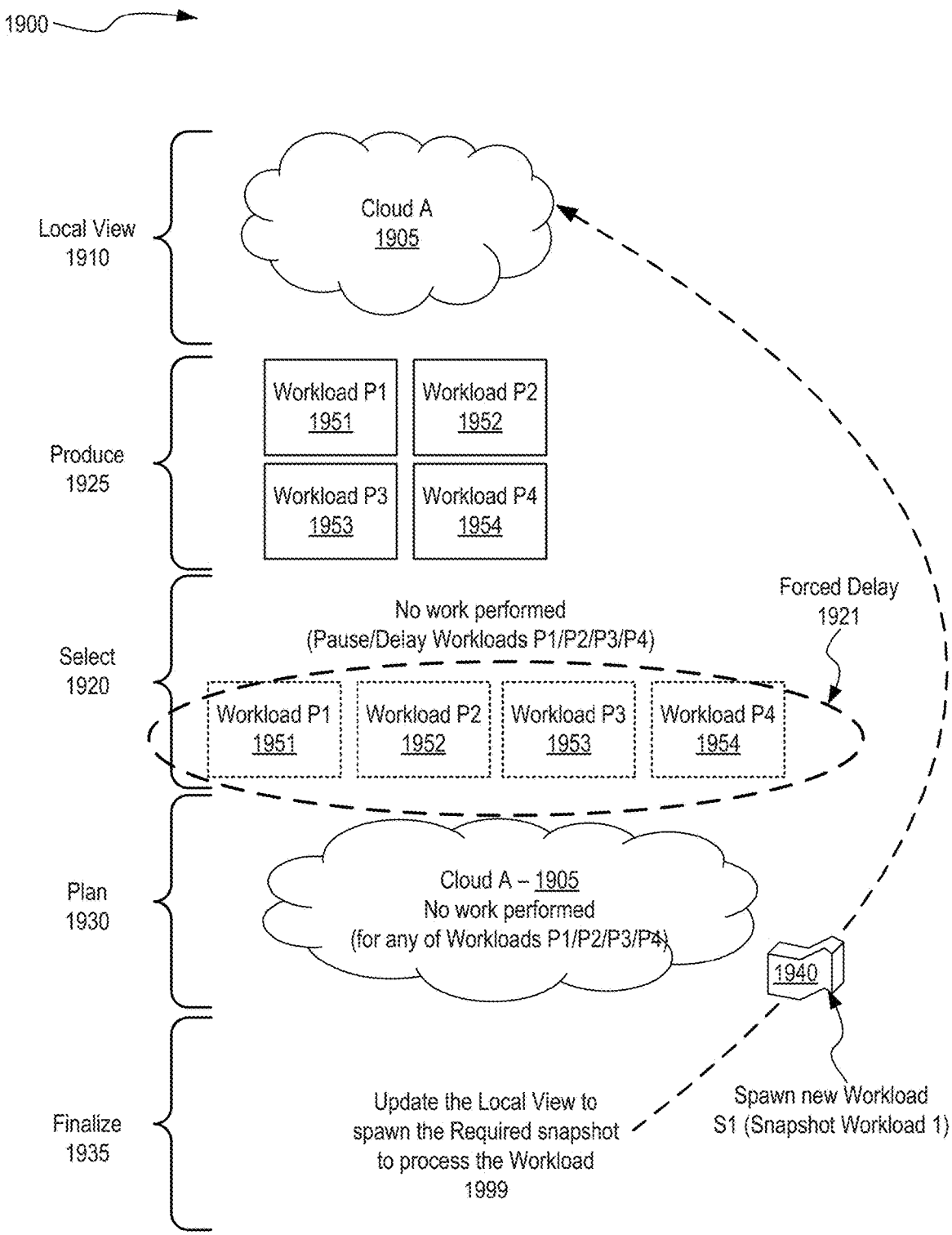
FIG. 19 depicts another exemplary snapshotting scheme 1900, in accordance with described embodiments.

FIG. 19 depicts another exemplary snapshotting scheme 1900, in accordance with described embodiments.

As shown here, there is a local view 1910, a produce phase 1925, a select phase 1920, a plan phase 1930, and a finalize phase 1935. At the local view 1910 cloud A 1905 is available to process workloads. At the produce phase 1925, there are workloads P1, P2, P3, and P4 represented by elements 1951, 1952, 1953, and 1954 respectively. During the produce phase, it is recognized that each of the workloads P1-P4 (elements 1951 to 1954) may be processed either by creating workers via an overhead and setup process or alternatively, by utilizing a same or similar snapshot. However, no such snapshot is available at this phase of processing.

Accordingly, at the select phase 1920, there is no work performed due to a forced delay 1921 which causes a pause or delay of workloads P1-P4 (elements 1951 to 1954). At the plan phase 1930, because the workloads P1-P4 (elements 1951 to 1954) were not selected, there is again no work performed. Consequently, the finalize phase 1935 does not reflect the processing of workloads P1-P4 (elements 1951 to 1954) as such workloads were force delayed 1921, but rather, the finalize phase updates the local view to spawn the required snapshot to process the workloads P1-P4 (elements 1951 to 1954) as is depicted by element 1999, thus causing the finalize phase 1935 to spawn the new workload S1 (snapshot workload 1) 1940 which is enqueued into the local view as workload requiring processing.

Through this process, the required snapshot will thus be generated as output, which in turn permits the workloads P1-P4 (elements 1951 to 1954) to be processed utilizing the snapshot which, for example, may take 1 hour to produce while the workloads P1-P4 (elements 1951 to 1954) are delayed versus each of the workloads P1-P4 having to spend 1 hour on overhead set up for their own workers. Such a strategy will therefore result in a reduction of total overhead time from 4 hours to 1 hour.

Figure 20:
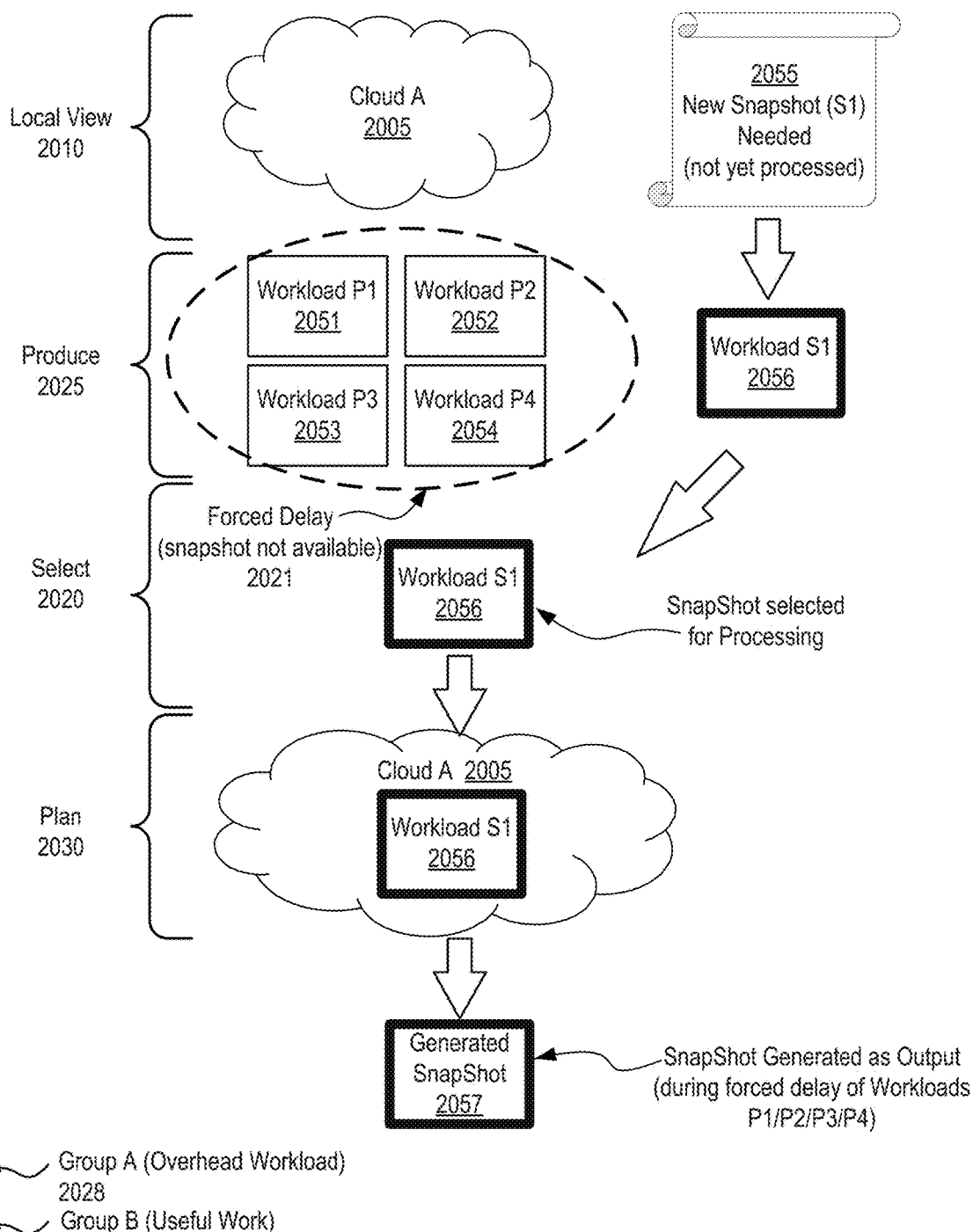
FIG. 20 depicts another exemplary snapshotting scheme 2000, in accordance with described embodiments.

FIG. 20 depicts another exemplary snapshotting scheme 2000, in accordance with described embodiments.

As is shown here, there is again the local view 2010, a produce phase 2025, a select phase 2020, and a plan phase 2030. At the local view 2010 cloud A 2005 is available to process workloads. Notably, there is a new snapshot S1 workload 2055 which needs to be processed.

At the produce phase 2025, there are workloads P1, P2, P3, and P4 represented by elements 2051, 2052, 2053, and 2054 respectively. During the produce phase, it is again recognized that each of the workloads P1-P4 (elements 2051 to 2054) may be processed by utilizing a same or similar snapshot, however, no such snapshot is available. However, workload S1 2056 corresponding to the needed snapshot is enqueued at the local view and ready for processing. Therefore, the produce phase identifies the workload S1 2056 as ready for processing and advancing to the select phase 2020, the snapshot workload S1 2056 is selected for processing while the workloads P1-P4 (elements 2051 to 2054) again remain under a forced delay 2021 due to the unavailability of the completed snapshot.

Next, as the plan phase 2030, the workload S1 2056 is allocated to cloud A 2005 for processing resulting in the generated snapshot 2057 as output while the workloads P1-P4 (elements 2051 to 2054) remain under forced delay. As depicted here, group A 2028 represents overhead workload which includes the snapshot workload S1 2056, while group B 2029 represents useful work, albeit none is being processed at this time in this particular example.

Figure 21:
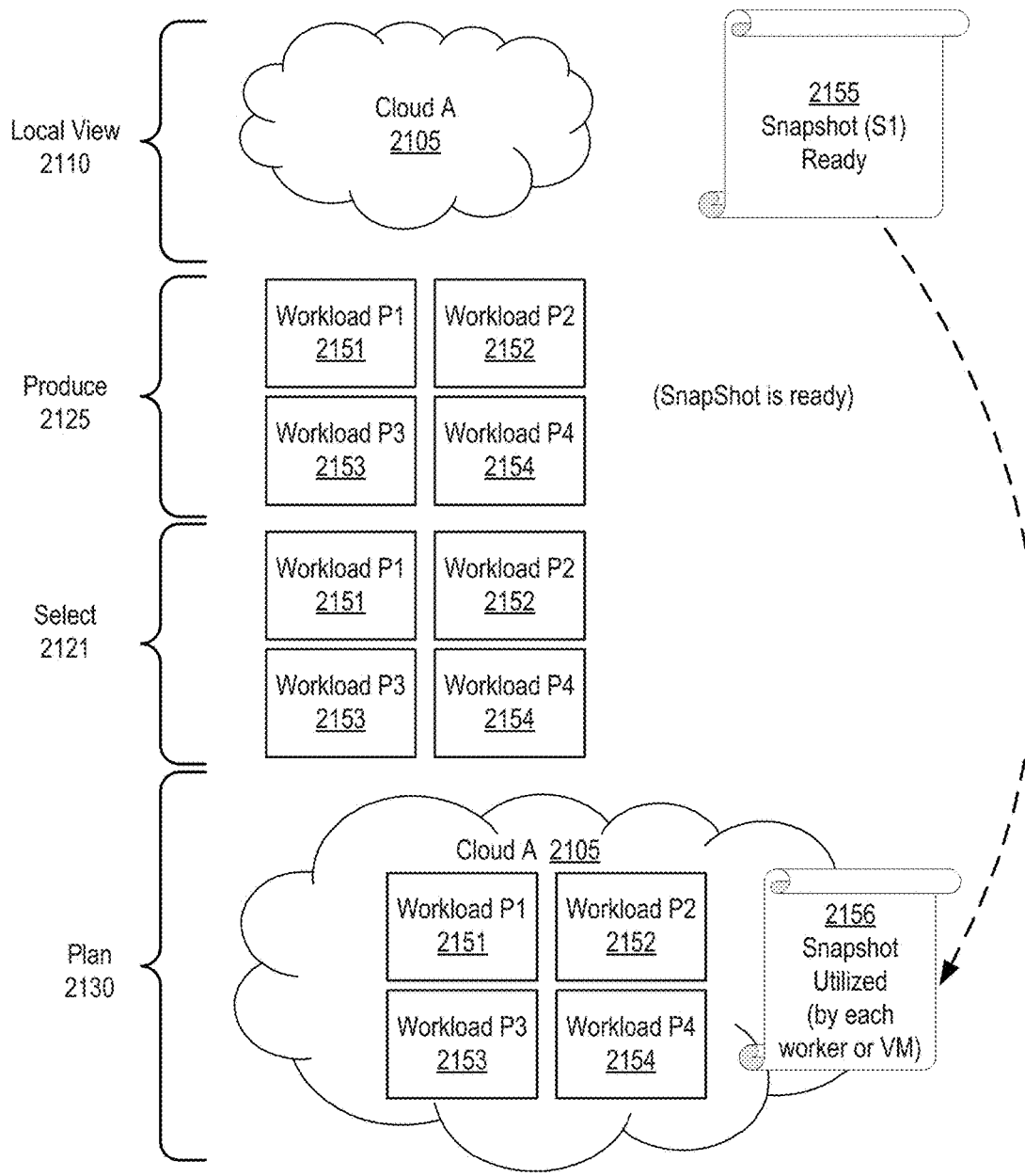
FIG. 21 depicts another exemplary snapshotting scheme 2100, in accordance with described embodiments.

FIG. 21 depicts another exemplary snapshotting scheme 2100, in accordance with described embodiments.

As depicted here, there is again the local view 2110, a produce phase 2125, a select phase 2121, and a plan phase 2130. At the local view 2110 cloud A 2105 is available to process workloads. Notably, snapshot S1 2155 is now ready as a result of prior processing.

At the produce phase 2125, there are workloads P1, P2, P3, and P4 represented by elements 2151, 2152, 2153, and 2154 respectively. During the produce phase, it is again recognized that each of the workloads P1-P4 (elements 2151 to 2154) may be processed by utilizing a same or similar snapshot, and unlike in prior iterations of the scheduling cycle, the snapshot S1 2156 is now recognized as being ready and available for use in processing workloads P1-P4 (elements 2151 to 2154).

Therefore, the select phase selects workloads P1-P4 (elements 2151 to 2154) for processing and the plan phase 2130 next allocates the workloads P1-P4 (elements 2151 to 2154) for processing utilizing cloud A 2105 utilizing the snapshot, depicted here as snapshot 2156 being utilized by each worker or VM which processes one of the workloads P1-P4 (elements 2151 to 2154). Notably, the workloads themselves are different, but have the same underlying base requirements or may be satisfied by a snapshot of the same configuration, and therefore, the system generates and produces the snapshot 2155 once and then replicates the snapshot permitting the replicated or copied snapshot to be utilized by each of the workers or VMs processing any of workloads P1-P4 (elements 2151 to 2154). While four distinct workloads are depicted here, any number may be accommodated by such a process, although use of the processing for a single workload would realize no efficiency gains.

Figure 22:
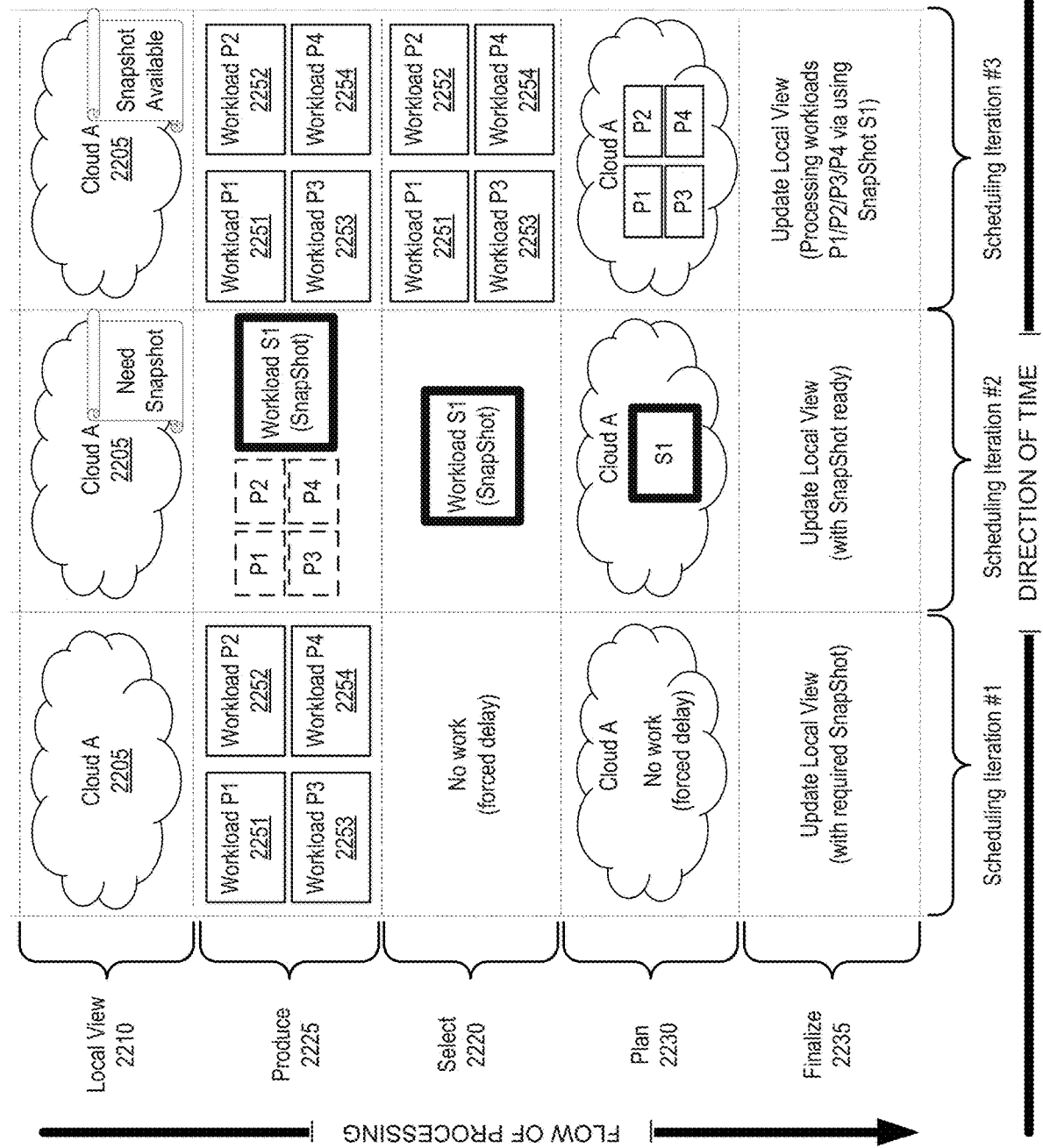
FIG. 22 depicts another exemplary snapshotting scheme 2200, in accordance with described embodiments.

FIG. 22 depicts another exemplary snapshotting scheme 2200, in accordance with described embodiments.

As depicted here, there is again the local view 2210, a produce phase 2225, a select phase 2222, a plan phase 2230, and a finalize phase 2235, and in which local view 2210 includes cloud A 2205 as being available to process workloads.

On the vertical axis there is the flow of processing advancing from top to bottom and on the horizontal axis there is the direction of time advancing from left to right. Notably, there are now depicted three scheduling heartbeats or three scheduling iterations for the scheduling service, each iteration (1, 2, and 3) progressing from top to bottom through the local view, the produce phase, the select phase, the plan phase, and the finalize phase, before repeating at a next iteration.

Thus, it is now shown here that in the first iteration, cloud A 2205 is available to process workloads and the produce phase of the first iteration identifies workloads P1, P2, P3, and P4 represented by elements 2251, 2252, 2253, and 2254. As before, the produce phase recognizes that workloads P1-P4 may be processed by utilizing the same snapshot, once generated. Because no such snapshot is available at this phase of processing, the select phase institutes a forced delay and performs no useful work with regard to workloads P1-P4. This forced delay carries through to the plan phase in which no useful work from the workloads P1-P4 is allocated to cloud A (or any other cloud) and the local view is then updated with the requirement that a SnapShot in fulfillment of workloads P1-P4 needs to be produced, thus concluding iteration 1 in the left column.

Advancing to iteration 2 at the middle column, the local view recognizes that a snapshot is needed and the produce phase 2225 maintains a forced delay on workloads P1-P4, yet produces workload S1 as the snapshot to be processed based on the information written into the local view during a prior iteration. Consequently, the select phase identifies and selects workload S1 (snapshot) for processing, and the plan phase plans processing of workload S1 (snapshot) by allocated S1 into cloud A for processing and updating the local view indicating that the snapshot is now ready, once generated and completed.

Advancing to iteration 3 at the right most column, the local view now reflects that the snapshot (S1) is available and thus, at the produce phase, workloads P1-P4 are now produced as ready for processing (without any forced delay) given that the requirements for processing are ready (in this case the availability of the snapshot S1 is a resource requirement added by the scheduling service) and at the select phase then selects workloads P1-P4 for processing thus permitting the plan phase to allocate workloads P1-P4 into cloud A for processing. Subsequently, the local view is updated to indicate the current or completed processing of workloads P1-P4 utilizing snapshot S1.

Processing then concludes as usual since all workers or VMs needed to process workloads P1-P4 are able to apply, load, provision, or utilize the snapshot generated as output from prior processing by replicating the snapshot into a local instance for each respective VM.

Thus, according to described embodiments, the scheduling service during the produce phase first recognizes a pattern of workloads that are sufficiently similar that they may be processed by a single snapshot configuration. Stated differently, the scheduling service during the produce phase identifies multiple workloads that may be processed and completed utilizing a single snapshot after recognizing that the workloads may be completed with the single VM, with the scheduling service undertaking such action in an effort to save on overhead.

Next, the scheduling service force delays (e.g., stops, pauses, holds back, halts, etc.) the recognized workloads for which the snapshot will be utilized, thus preventing any further overhead work to be expended to provision workers or VMs for processing each of the recognized workloads.

With the recognized workloads paused or delayed, the scheduling service then configures and generates the snapshot which is specifically configured to process the recognized workloads. Unlike conventional solutions which may create several generic snapshots or several "base" or "foundation" snapshots, upon which additional configuration may later be applied, the scheduling service creates a customized snapshot specifically meeting the resource and configuration requirements for the recognized workloads which are to utilize the generated snapshot. For example, a VM snapshot may be prepared to test one specific code submission and is therefore used only for the workload associated with testing that specific code submission.

According to one embodiment, the VM is set up to a specific point in support of the recognized workloads and then snapshotted. Each VM allocated to process the recognized workloads then load the snapshotted VM to restore the VM state and then perform final configuration unique to each of the recognized workloads to be processed.

Once the snapshot is generated and outputted from the processing, the VMs which are to process the recognized workloads are then configured to utilize the generated snapshot for processing the respective workloads, rather than undergoing a provisioning process to set up and configure the VM for processing the recognized workloads. In such a way, the scheduling service dynamically trades off snapshotting and some delay of processing the workloads associated with the snapshotting process with the computational overhead savings associated with creating only a single snapshot which is then replicated rather than setting up and provisioning multiple individual worker VMs.

According to described embodiments, the produce 2225 phase performs its normal operations and is wholly agnostic of the snapshotting process and even unaware that the scheduling service performs any snapshotting. For example, as shown here, the produce phase simply recognizes that it needs to perform four units of work, corresponding to workloads P1-P4.

Therefore, according to such embodiments, during the select and plan phase, the scheduling service will analyze pending workloads across the entire scheduling service utilizing the data stored within the local view and recognize that some collection or group of workloads may be processed utilizing an identical snapshot.

Therefore, during the select and plan phases, the scheduling service force delays the recognized workloads and spawns the creation of the snapshot by generating a new overhead workload which will be updated at the local view, thus permitting the scheduling service during its next iteration to pick up the overhead workload for processing, so as to create the snapshot to be utilized for processing the pending workloads P1-P4.

According to such embodiments, the local view (e.g., the asynchronous local cache) is updated with a requirement that the recognized workloads P1-P4 now require as a resource, the availability of the snapshot workload S1 which is just being enqueued, thus, the workloads P1-P4 will not continue until that snapshot is completed and made available for use by the VMs which are to process the workloads P1-P4.

Because the scheduler implements the design practice of eventual consistency, the scheduler will iteratively review the information stored in the local view (local cache) and produce and schedule those workloads that are ready and which meet the various criteria, such as resource availability, cost, time to completion as per an SLT or QoS, etc. Thus, even though the workloads P1-P4 are force delayed by creating the requirement that a snapshot which does not yet exist be available as a resource, the workloads P1-P4 will nonetheless be picked up for selection and planning through subsequent iterative heartbeats of the scheduling service as information written to the local view changes.

Eventual consistency is a consistency model utilized by distributed computing architectures to achieve high availability that informally guarantees that, if no new updates are made to a given data item, eventually all accesses to that item will return the last updated value. Also referred to as optimistic replication, eventual consistency provides a weak guarantee of consistency, but one which is sufficient for the scheduling service. Eventually-consistent services are sometimes classified as providing BASE (Basically Available, Soft state, Eventual consistency) semantics, in contrast to traditional ACID (Atomicity, Consistency, Isolation, Durability) guarantees, such as those which may be required by a transactional database system processing, for example, financial transactions. Eventual consistency designs provide purely a liveness guarantee (e.g., reads eventually return the same value) and does not make safety guarantees, and thus, an eventually consistent system may return different values before convergence.

Thus, according to one embodiment, the scheduling service is constantly updating the local cache with the latest information available to the scheduling service, with the first iteration updating the local view specifying that the workloads P1-P4 each require availability of the snapshot S1. During the second iteration, the produce phase again reads the local view and recognizes that workloads P1-P4 require availability of the snapshot S1, and therefore, during the select and plan phases, the scheduling service will not attempt to process workloads P1-P4 because the snapshot S1 is not available but it will select, plan, and process the generation of snapshot S1 via processing of the workload S1 because the workload is ready for processing and has no other requirements. The workload S1 may additionally be prioritized on the basis that workloads P1-P4 specify the workload S1 as a dependency or the scheduling service may increase the priority of the workload S1 utilizing a dynamically generated SLT or QoS requirement.

During any subsequent iterations of the scheduling service, the produce and select phases will look at workloads P1-P4 and will not attempt to plan and process them so long as the workload S1 is still processing as the scheduling service knows from the local view that the workload S1 has a status of processing.

Eventually, the workload S1 will complete processing and thus the local view will be updated with a status of complete and the snapshot will appear as an available resource, which corresponds exactly to the snapshot resource which is required by workloads P1-P4. Therefore, during any subsequent produce and select phases, the scheduling service will recognize that all requirements have been met for workloads P1-P4 (e.g., the snapshot S1 is available) and thus, the workloads P1-P4 will be selected for processing, planned by allocating the workloads P1-P4 to specific VMs to for processing with the specification that such VMs utilize the previously generated snapshot, and then processed as usual.

In such a way, the scheduling service realizes 3 hours of overhead savings, since 1 hour was spent to create the snapshot, but 4 hours were negated to setup and provision the four individual worker VMs.

Because there are many types of workloads that would benefit from utilizing a same snapshot, the produce phase is configured to coordinate amongst pending workloads, such that if the producer has a choice to pick a workload which requires VM set up versus picking a workload which is recognized to match other workloads that may be processed utilizing a same snapshot, then the produce phase should bias toward the workloads for which the same snapshot may be utilized so as to yield greater overhead savings. In a related way, the producer may also be configured to store and buffer a set of previously created snapshots and then again, when the producer has a choice to pick a workload which requires VM set up or a workload for which a previously available and previously generated snapshot remains available to the scheduling service, then the producer should bias toward that workload which may utilize the previously generated snapshot to save on overhead.

In a related embodiment, use of a same snapshot may be applied to a distributable workload, thus permitting the scheduling service to fragment or split a workload into workload sub-parts and then select a higher distribution quantity (e.g., distribute the workload sub-parts to a greater number of VMs) which are then configured to utilize the snapshot, thus resulting in increased efficiency of distribution values (e.g., refer to FIG. 17) due to a greatly reduced overhead time consumption for each additional VM added to the distribution quantity through use of the snapshotting procedure.

Figure 23:
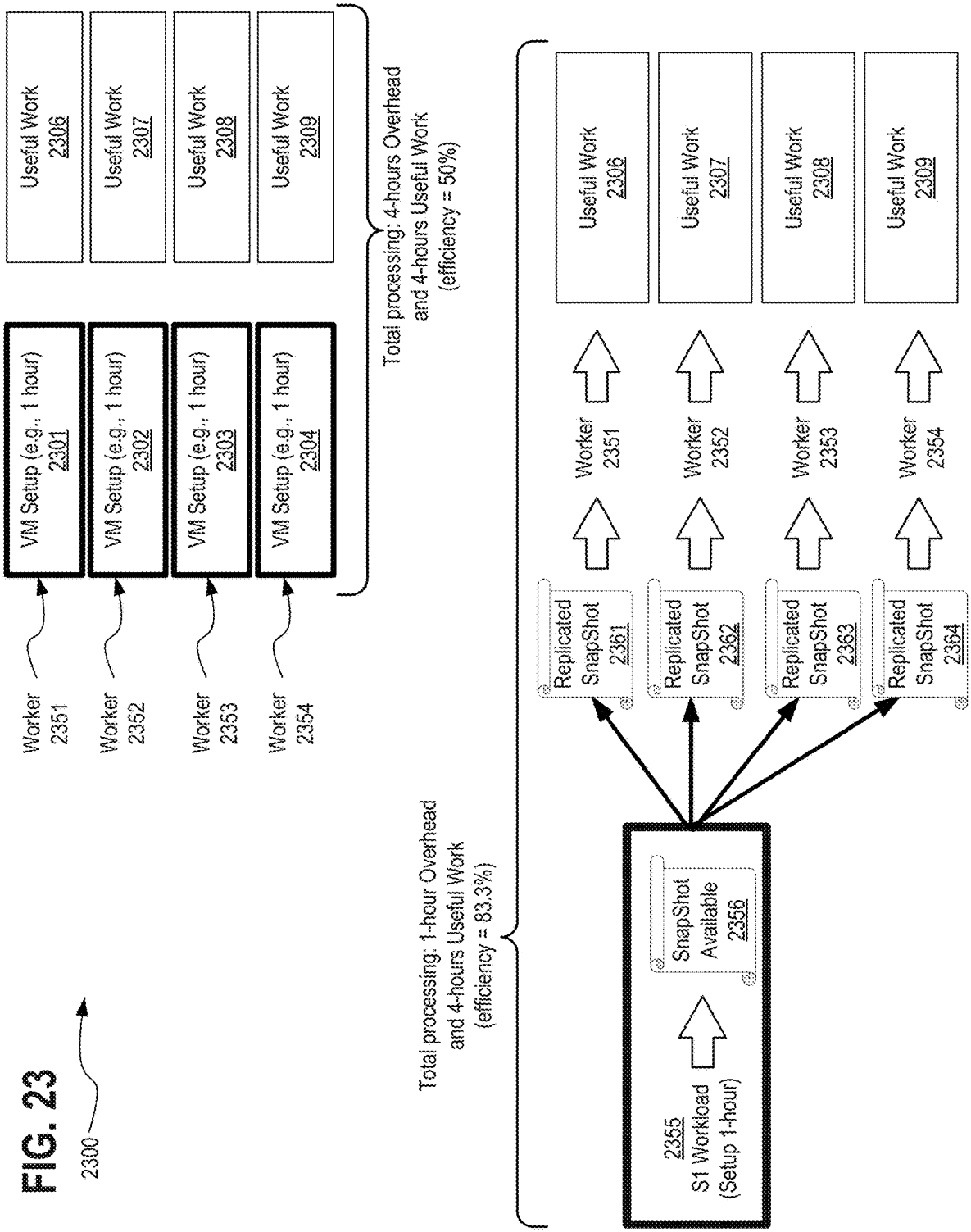
FIG. 23 depicts another exemplary snapshotting scheme 2300, in accordance with described embodiments.

FIG. 23 depicts another exemplary snapshotting scheme 2300, in accordance with described embodiments.

As shown here, there is the prior example of the workers 2351, 2352, 2353, and 2354 each having to spend overhead time and computational resource to provision and set up each of the four VMs shown at the top (elements 2301, 2302, 2303, 2304) before useful work may be performed by each of the respective VMs, as depicted at elements 2306, 2307, 2308, and 2309, resulting in a total processing time of 4-hours overhead and 4-hours useful work, or 8 hours total. With 4 hours useful work divided by the total 8 hours spent, the efficiency of performing these workloads is 50% or a 1:1 ratio of overhead to useful work. Conversely, as is not depicted at the lower half, by spending 1-hour of setup time to produce the S1 workload 2355, resulting in the available snapshot 2356, a negligible amount of time may be spent on snapshot replication to produce replicated snapshots 2361, 2362, 2363, and 2364, which are then utilized by the respective workers 2351, 2352, 2353, and 2354 to perform the useful work 2306, 2307, 2308, and 2309, resulting in a total processing time of 1-hour of overhead and four hours of useful work or 5 hours total. With 4 hours of useful work divided by the total of 5 hours spent, the efficiency of performing these workloads is 83.3% or a 1:4 ratio of overhead to useful work performed.

Figure 24:
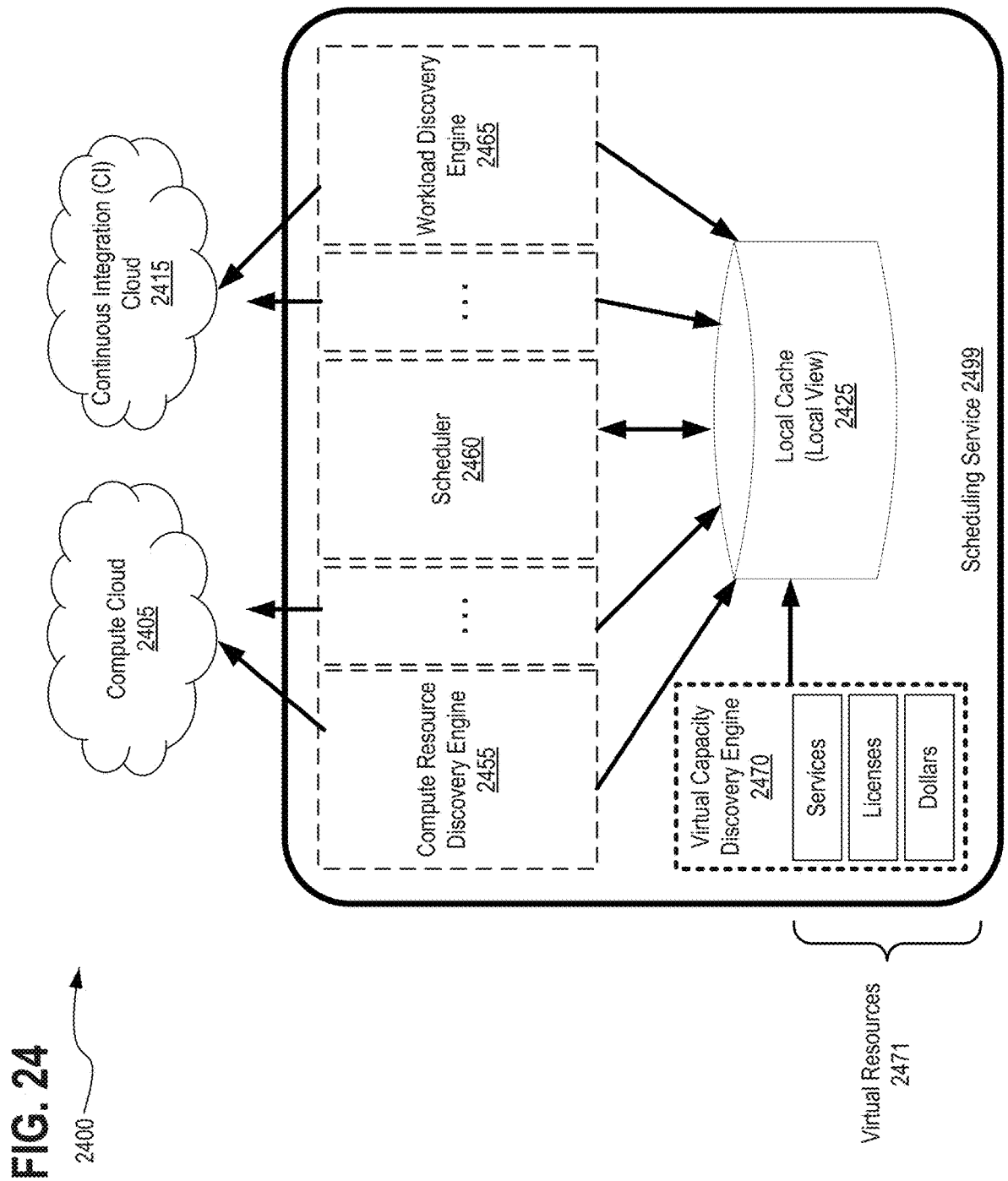
FIG. 24 depicts another exemplary scheduling service 2499 computing architecture 2400 having a virtual capacity discovery engine 2470, in accordance with described embodiments.

FIG. 24 depicts another exemplary scheduling service 2499 computing architecture 2400 having a virtual capacity discovery engine 2470, in accordance with described embodiments.

As may be observed here, the scheduling service 2499 is communicably interfaced with each of a compute cloud 2405 and also a continuous integration (CI) cloud 2415, via which to perform workloads (e.g., useful work submitted by users and subscribers).

Further depicted within the scheduling service 2499 are multiple engines, including the compute resource discovery engine, a scheduler 2460, and a workload discovery engine 2465, each of which operate pursuant to instructions of an implementing system. For example, a system having a processor and a memory therein may execute instructions to cause the scheduling service to execute the functions and instructions of the compute resource discovery engine, a scheduler 2460, and a workload discovery engine 2465 to carry out functions as set forth herein.

Further depicted is now a virtual capacity discovery engine 2470, which includes various "soft" resources or "non-physical" resources or "virtual" resources, including, for example, additional services which are limited in terms of available quantity, licenses which are limited in terms of available quantity, and dollars or currency which are limited in terms of available quantity.

Similar to physical resources, such a memory (RAM) or processors, or processor cores, or storage space on a hard disk drive (HDD) or solid state drive (SSD), the virtual resources are very much real and represent actual constraints on the ability of the scheduling service 2499 to schedule workloads to be performed. However, unlike physical resources, the virtual resources 2471 are intangible insomuch that they cannot be physically touched. Regardless, the scheduling service may be required to allocate, for example, an Operating System (OS) license to a VM performing a workload for at least the duration that the operating system is in use by that VM and in so doing, the allocation of the license decrements by one the quantity of available licenses. Similarly, of a client specifies a processing budget of $100.00 USD, then the scheduling service 2499 needs to allocate workloads in accordance with the limited virtual resource of the $100.00 USD, and thus, if allocation of a workload to a given compute cloud 2405 requires $150.00 USD in spend to complete the workload, then the scheduling service 2499 must coordinate and recognize that there are insufficient virtual resources available to the scheduler 2460 at that particular time.

Each of the compute resource discovery engine, the scheduler 2460, the workload discovery engine 2465, and the virtual capacity discovery engine 2470 are not only connected with a system's processor and memory to control and perform execution of their respective functions, but additionally are communicably interfaced (e.g., via an Input/Output (IO) system bus) with the local cache 2225 which provides a "local view" to the scheduler.

As shown here, the scheduler 2460 retrieves information from the local cache 2225 and also writes information to the local cache to update the local view. In this particular embodiment, the other engines (e.g., the compute resource discovery engine, the workload discovery engine 2465, and the virtual capacity discovery engine 2470) operate wholly independently of the scheduler 2460 and are agnostic to the operations performed by the scheduler 2460 and merely collect information and write the information to the local cache to update the local view 2225 with such information then being consumed by the scheduler 2460 in fulfillment of its scheduling role of pending workloads.

Figure 25:
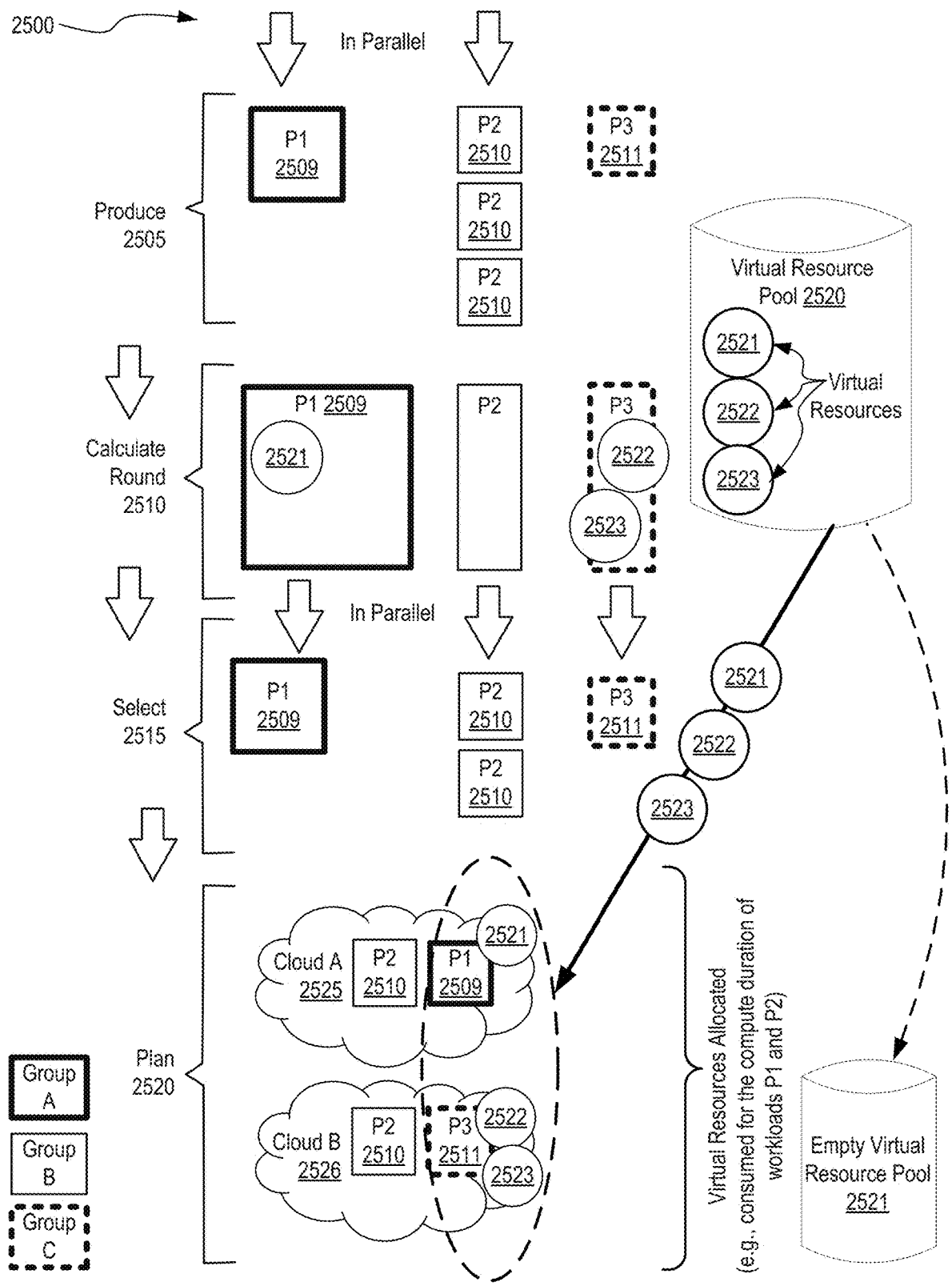
FIG. 25 depicts an exemplary virtual capacity allocation scheme 2500, in accordance with described embodiments.

FIG. 25 depicts an exemplary virtual capacity allocation scheme 2500, in accordance with described embodiments.

As can be seen here, there is again a produce phase 2505, a calculate round 2510, a select phase 2515, and a plan phase 2520. Here, the scheduling service is handling the allocation of workload groups A, B, and C to the compute clouds A and B (elements 2525 and 2526 respectively).

There is also depicted a virtual resource pool 2520 having therein several virtual resources 2521, 2522, and 2523. At the top right of the diagram the virtual resource pool 2520 is depicted as partially full, having some virtual resources 2521, 2522, and 2523 which may be applied or allocated to a VM or work server or compute cloud (e.g., cloud A or B) to process workloads. At the bottom right of the diagram, the virtual resource pool is now shown as an empty virtual resource pool 2521 because the virtual resources 2521, 2522, and 2523 have been consumed for the duration of compute of workloads P1 2509 and P2 2510. Once processing of the workloads P1 and P2 complete, the virtual resources are returned to the virtual resource pool 2520. In certain embodiments, the virtual resources may be referred to and considered "global" resources because they may be utilized anywhere within the compute architecture of the data center. Because each virtual resource is not tied to any physical machine, the resources may be allocated on a global basis to any VM or work server at any cloud to which the scheduling service has access, regardless of whether that cloud is a remote compute cloud or a local compute cloud or a locally accessible unit of compute, such as a server or VM within a server pool. In other embodiments, the virtual resource pool 2520 may be referred to as a "global" resource pool with global or virtual resources that are allocatable anywhere and not attached to any physical rack or any physical work server or work machine.

As shown here, the produce phase produces workloads P1 2509 and also the three P2 workloads 2510. There is further depicted Virtual resources, such as licenses, dollars, etc., may be thought of similar to physical resources, except that where it is not possible for physical sticks of RAM memory to fly across the data center and be re-allocated from one work server to another work server for use in processing workload (note that in our example here, RAM sticks cannot fly as of this writing), it is possible to re-allocate virtual resources such as licenses, dollars, etc., from one work server to another work server (or corresponding VM) dynamically and on-the-fly. Therefore, virtual resources may be retrieved from a virtual resource pool and allocated and used by a particular VM to process a given workload, and then returned to the virtual resource pool once the workload processing is complete, thus permitting such virtual resources to next be allocated to an entirely different work server or VM for the use in processing a different workload. For these reason, virtual resources are sometimes referred to as non-physical resources or "soft" resources which are amenable to dynamic allocation and re-use at the discretion of the scheduling service 2499.

As depicted here, there are three distinct workload types, workload P1 2509, workload P2 2510, and workload P3 2511. During the produce phase 2505, the scheduling service produces the workloads P1, P2, and P3 as being ready for processing and processing then advances to the calculate round 2510 wherein the scheduling service calculates what resources are required to process the workloads P1, P2, and P3. Above and beyond requirements associated with physical resources such minimum memory, processor cores, etc., the calculate round determines that P1 requires one license from the virtual resource pool 2520 and workload P3 requires two licenses from the virtual resource pool 2520. Workload P2 does not require any licenses to process.

The calculate round 2510 therefore calculates and determines both the compute and the virtual capacity needs of each worker or VM which is to process the given workloads P1, P2, and P3, which is discovered by the virtual capacity discovery engine 2470 and the compute resource discovery engine 2455 (refer to FIG. 24) as described above. The respective engines write the available virtual resource capacity and the available compute capacity into the local cache to update the local view which is then read by the scheduler.

During the calculate round, as shown here, virtual resource 2521 is therefore allocated as a license to workload P1 and virtual resources 2522 and 2523 are allocated to workload P3 as two additional licenses, along with any other required compute requirements.

Because the calculate round has accounted for the consumption of these virtual resources of the duration of compute by each of workloads P1 and P3, the virtual resources (e.g., the licenses) are removed from the virtual resource pool 2520, thus resulting in the empty virtual resource pool 2521 shown here, for at least the duration of compute of workloads P1 and P3.

Next, the select round, now having the workloads P1, P2, and P3, produced and ready and having all required resources (virtual or otherwise) calculated and allocated, sends the workloads to the compute clouds for processing. As shown here, workload P1 is sent to cloud A 2525 with part of workload P2 and with a license 2521 providing the needed virtual resource to cloud A so that cloud A may process workload P1. Similarly, workload P3 is sent to cloud B 2526 with the remaining part of workload P2 and with licenses 2522 and 2523, providing the needed virtual resources to cloud B so that cloud B may process workload P3 which requires two licenses for the duration of its compute.

Once processing of each of the workloads completes, the physical compute resources associated with clouds A and B are no longer being utilized, and thus, the compute resource discover engine 2455 updates the local view and the virtual resources (e.g., licenses 2521, 2522, and 2533) are no longer required by the compute clouds A and B, and thus, the virtual resources are returned to the virtual resource pool 2520 and the virtual capacity discovery engine 2470 updates the local view.

Once the virtual resources are available again (as updated within the local view) the scheduler in following scheduling heartbeats may therefore re-allocate those same virtual resources to new or different workloads. While the workloads P1 and P3 are processing, however, the scheduler recognizes that there are no available virtual resources within the virtual resource pool 2520, and therefore, the allocated and presently consumed virtual resources act as a limiting factor for other workloads needing to be scheduled (e.g., the other workloads must wait for the return of the virtual resources to the virtual resource pool 2520).

According to such embodiments, the virtual resources may be utilized globally across any datacenter associated with the host organization or applied to any cloud to which the host organization has access or specific to a particular data center or a particular compute cloud or a collection of racks with work servers. Regardless, the virtual resources are managed as a whole as an aggregated resource.

According to one embodiment, the virtual resource pool 2520 is utilized to enforce a restriction on the quantity of virtual resources. For example, the virtual resource pool 2520 may be configured with 3× licenses as is depicted here with virtual resources 2521, 2522, and 2533, and thus, by requiring that any workload needing such a license wait until a license is available within the virtual resource pool 2520, the scheduling service is limited in a controlled manner and not permitted to exceed the quantity of available licenses, as the scheduler will wait to schedule new work requiring such a license until one or more of the licenses are returned to the virtual resource pool 2520. In such a way, the virtual resource pool 2520 may operate as governor for limited resources to ensure that workloads do not exceed concurrent consumption of a particular resource, such as a license.

According to another embodiment, the scheduler utilizes the virtual resource pool 2520 to enforce a contractual agreement for the quantity of concurrent licenses utilized. For example, consider that three licenses are available for concurrent use, however, if a fourth license is utilized concurrently, then a vendor will permit the use to exceed the contractual agreement, but will then trigger an invoice or penalty for the excessive usage. By associating the licenses with the contractual limitations, such as 3× in this example, the schedule can throttle concurrent use of the licenses to ensure that at any point in time, the actual use does not exceed the permitted (by contract) use, and thus prevent excessive use fees, penalties, or fines, etc.

According to one embodiment, the virtual capacity discovery engine 2470 (refer to FIG. 24) operates to discover and identify the presence of virtual resources, such as licenses, on behalf of the scheduler. In such embodiments, the scheduler itself has no mechanism by which to determine what virtual resources exist from external vendors or from internal groups, and is limited to simply retrieving information about available virtual resources from the local view. Therefore, it is the virtual capacity discovery engine 2470 which identifies what virtual resources exist, such as how many licenses, what kind of license, etc., and writes the information about the virtual resources into the local view (via the local cache) such that the information may then be retrieved by the scheduler.

According to certain embodiments, the virtual capacity discovery engine 2470 utilizes an API or plug-ins which continuously monitor availability of virtual resources from vendors, service providers, or other parties specifying the availability of such virtual resources and in turn continuously updates the local view with the information about availability of such virtual resources which then permits the scheduler to allocate available virtual resources based on the information written into the local view.

For example, if a browser license is required to test a code submission affecting a particular web browser, then the virtual capacity discovery engine 2470 may utilize an API or plug-in to continuously monitor available of the browser license from a third party vendor which provides or sells such licenses. For example, the third party vendor may list the availability of the browser licenses via their website or provide such information via a queryable API, in much the same way a bank customer may check their bank account balance. The virtual capacity discovery engine 2470 will then write the latest information into the local view, or validate the information in the local view is current and up to date. The virtual capacity discovery engine 2470 and scheduler operate wholly independently of one another, however, because the virtual capacity discovery engine 2470 writes its information into the local view, the scheduler may, at any time, retrieve the current state of the browser licenses from the local view (e.g., 3× total concurrent license usages are permissible) and then allocate them appropriately, as described above.

In such a way, the virtual capacity discovery engine 2470 informs the scheduler (through the local view) what types and quantities of virtual capacity the scheduler has access to via the local view. For example, one plug-in attached to the scheduling service would operate as the source of truth of all browser licenses from a particular vendor and another plug-in extending the scheduling service would operate as the source of truth of all OS licenses from a particular vendor. If an application is being tested, a third plug-in extending the scheduling service would operate as the source of truth of all application licenses from the vendor of the application being tested.

Once the information is written into the local cache, the scheduler is then enabled to understand what licenses are available and in what quantities. Therefore, if a particular workload specifies the requirement for 2 browser licenses, such as is the case with workload P3 2511, then the scheduler can retrieve the information about such license from the local view, and allocate the licenses for processing the workload P3, causing those licenses to be removed from the virtual resource pool 2520 for the duration of compute processing of workload P3 2511.

Figure 26:
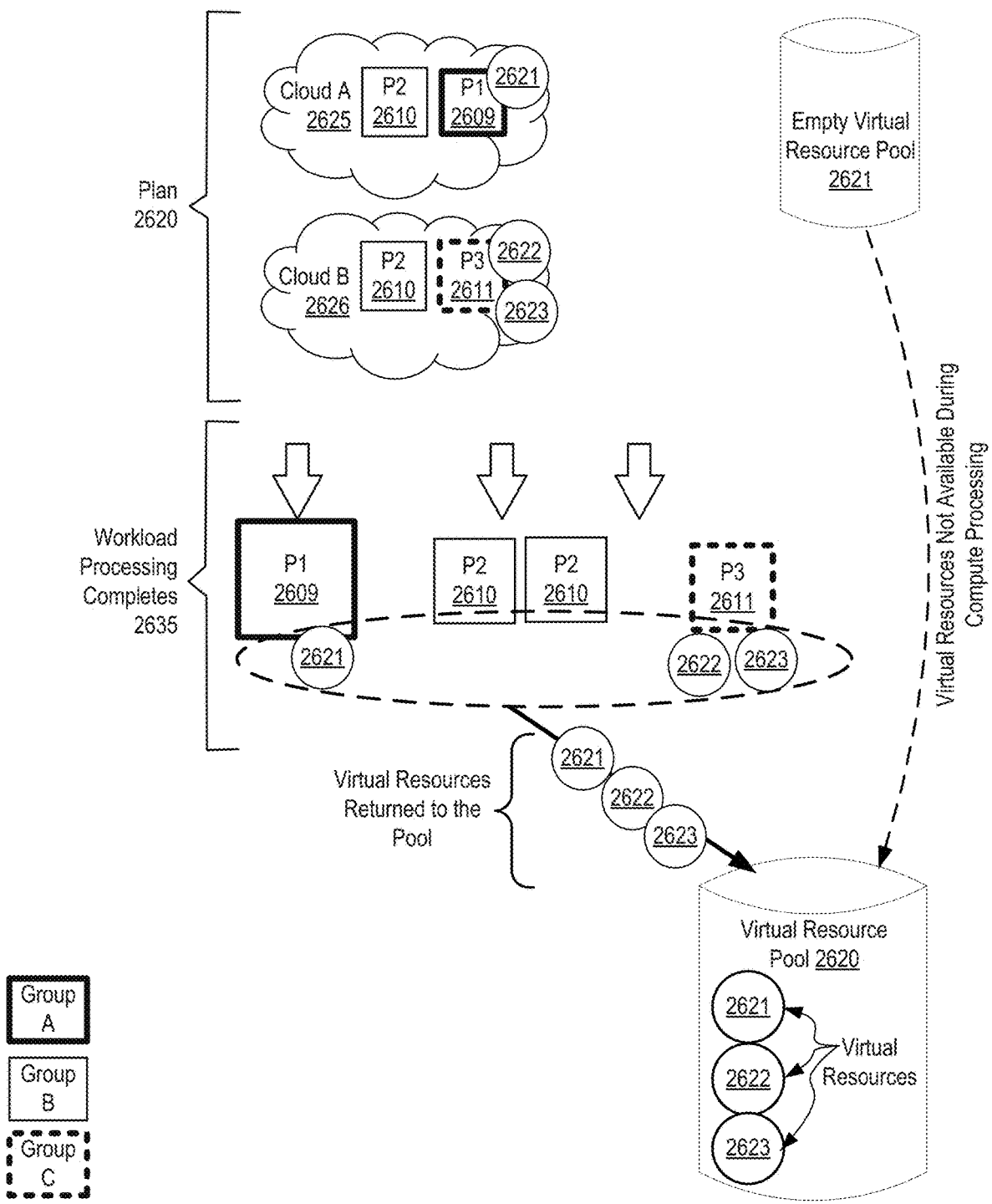
FIG. 26 depicts another exemplary virtual capacity allocation scheme 2600, in accordance with described embodiments.

FIG. 26 depicts another exemplary virtual capacity allocation scheme 2600, in accordance with described embodiments.

As is depicted here, the plan phase 2620 has allocated workloads P1 2609, P2 2610, and P3 2611 to clouds A and B (2625 and 2626) and has consumed the virtual resources 2621, 22622, and 2633 for the duration of the compute processing. Consequently, the empty virtual resource pool 2621 is depicted. Further depicted is step 2635 where workload processing completes, and virtual resources 2621, 22622, and 2633 are thus returned to the resource pool, thus resulting in the virtual resource pool 2620 now indicating via the local view that virtual resources 2621, 22622, and 2633 are available to the scheduler for consumption by other workloads on a future iteration or a future scheduling heartbeat.

According to certain embodiments, different vendors and different sources of virtual resources will have different types of licenses, however, sometimes the same types of licenses are available from multiple sources. For example, there may be two development teams which have each purchased OS licenses, with the first team having purchased 5× licenses and the second development team having purchased 10× licenses. The scheduler can therefore manage these 15× total licenses in aggregate since they are the same type of license, despite being from different sources. By aggregating the licenses in such a way, the scheduler can help both teams operate more efficiently as a whole by managing the total available licenses in aggregate. For instance, the team having purchased 5× licenses may have a peak workload and may benefit from 10× concurrent OS licenses and the scheduler can therefore allocate 10× of the 15× total licenses to the first team or concurrent use and allocate only the remaining 5× of the 15× total licenses to the second team. Once each team's respective workloads complete processing, the licenses utilized by the respective first and second teams are returned to the virtual resource pool 2520 by updating the local view, thus permitting a different allocation on future scheduling iterations.

Consider another embodiment in which the workload performs browser testing to validate the functionality of a code submission for a web browser. According to such an embodiment, the workload is distributed to 2× distinct VMs to perform the workload in a timely fashion, and each VM requires its own browser license. Thus, 2× browser licenses are required to perform the web browser functionality test. The browser licenses are available from a 3rd party vendor to perform such testing and pursuant to the licensing agreement with the 3rd party vendor, at any given time, the host organization and the scheduling service may permissibly execute 50 of concurrent sessions, each requiring a single license. Therefore, the scheduling service defines that workload to perform the browser testing may execute at any time and each time the workload is spawned, the associated workload requires two browser licenses concurrently. Therefore, when the scheduling service produces a single unit of workload of the type that performs the browser testing, the scheduler's calculation phase will determine, based on metadata for the workload, that the two license are required and then during the select phase the scheduler checks the local view to verify that two licenses are presently available, and if so, then the workload is selected and planned and execution commences for that particular workload, during which time, those two licenses are not available to any other workload needs.

Not all virtual resources are licenses. As described above, the virtual resources provides a means by which to manage interactions with third party systems and a limited number of available licenses or to manage the contractual obligations to stay within a specified number of concurrent licenses.

However, internal processes may also be managed. For example, a development team internal to the host organization may request the creation of an internal license which is then utilized as a governor or throttle to manage internal workloads that require no outside or third party vendor's license, but nonetheless benefit from throughput management.

Consider for example an internal development team running validation tests or performance tests against a production database. The development team may wish to limit the maximum concurrent number of tests to, for example, 50 test instances at any given time. Therefore, a pseudo license or an internal license or an "artificial" license may be artificially created, and then the virtual capacity discovery engine 2470 (FIG. 24) is configured with 50× concurrent artificial licenses for that particular development team or an API or plug-in extending the scheduling service is configured to read configuration information from the development team which specifies via metadata that 50× concurrent licenses are available to the scheduling service. Then, no matter how many workloads the development team submits, the scheduling service will never be able to concurrently initiate more than 50 work units (e.g., 50 VMs to execute the development team's workloads) because as the workloads from the development team are scheduled and begin executing, the quantity of available artificial licenses will eventually fall to zero, and then all further processing of workloads which require the artificial license will be delayed until such time that more artificial licenses become available, due to previously executing workloads utilizing the same artificial licenses completing, and thus freeing up their virtual resource and returning the artificial license (virtual resource) for that completed workload to the virtual resource pool.

Use of the virtual resources in such a way permits the development team to throttle or govern the throughput of their workload as it is processed by the scheduling service, meaning that far more than 50 workloads may be submitted in bulk, without the development team having to worry that the scheduler will initiate execution of too many of the workloads simultaneously which could negatively affect performance of the production database. In such a way, the scheduler may be configured by internal development groups and teams within the host organization to control throughput and budget consumed by such groups, or for the scheduler team to configure the scheduler to control the throughput and budget (e.g., amount of computational resource consumed) on behalf of such internal development teams.

In another embodiment, virtual resources are tied to spendable dollars, and then utilized similar to the above, except that after consumption of the spendable dollars, the scheduling service does not return the spendable dollars to the virtual resource pool, but rather, eliminates them entirely as having been consumed and owed to, for example, a third party compute cloud service provider, thus controlling a total amount of permissible spend. Additional spendable dollars may then be added to the system by increasing the remaining quantity in the virtual resource pool pursuant to, for example, receipt of a purchase order (PO).

In yet another embodiment, the spendable dollars are represented by a virtual resource but instead of representing a total amount of permissible spend, the spendable dollars operate as a throttle or a buffer to control how much compute resource is purchased from a third party cloud service provider. For example, the virtual resource pool 2620 may be configured to allow a maximum of $100.00 USD at any given time, for a particular type of workload. As compute cycles are purchased from the third party cloud provider, the spendable dollars are allocated to the executing workload and thus removed from the virtual resource pool and unavailable to other workloads, thus throttling workloads requiring the some type or class of spendable dollars, in a similar manner to the way the licenses may be exhausted during the period of compute for a given workload type. As the workload finishes, those spendable dollars then return to the virtual resource pool and more workload requiring the spendable dollars may thus be initiated for execution via the third party compute cloud service provider.

For example, consider a workload that may be processed via any one of multiple clouds, such as cloud A and cloud B depicted here at FIG. 26. If cloud A is owned and operated by the host organization, then presumably, it is lower cost to execute the workload at cloud A. However, if cloud A is lacking in compute capacity, then it may be necessary to send the workload to execute at cloud B which, in this example, costs spendable dollars as the compute cloud B is operated by a third party and thus requires payment of a subscription an on-the-fly payment based on CPU consumption. The spendable dollars may therefore be utilized to limit a total amount of permissible spend for cloud B with regard to this particular workload type or limit the velocity or how fast spendable dollars are consumed by executing workload with cloud B.

In yet another embodiment, the workload discovery engine tracks the licensing requirements on a per-cloud basis or tracks licensing requirements on the basis of which datacenter will execute a given workload. For example, a same workload may have distinct license requirements based on which cloud or datacenter executes that particular workload, and therefore, it may be advantageous at times to direct workloads to different clouds based on the differing licensing requirements. Consider the example of a workload which may be executed by either the cloud A or cloud B. Cloud A is owned by the host organization and requires an OS license from a third party to execute the workload, thus consuming the OS license for the duration of compute of that workload. However, Cloud B is owned and operated by a remote third party compute cloud service that also provides the OS licenses and owns the associated Operating system. Therefore, cloud A requires no subscription fees because it is owned by the host organization but does require the OS license. Conversely, cloud B will incur subscription fees, paid to the owner and operator of cloud B, however, there is no requirement for an OS license because the OS and OS license is provided as part of the service by cloud B due to their ownership of the OS.

Consequently, the scheduling service may analyze, based on the information written into the local view and based on the knowledge of what virtual resources are available (e.g., how many OS licenses and how many spendable dollars) which of cloud A or cloud B should execute a workload based not just on compute capacity and availability of compute resources from the respective clouds A and B, but based further on, whether the OS licenses are available for use within cloud A and the cost of execution via spendable dollars within cloud B, but without having to consume one of the limited virtual resource OS licenses.

Consider another example where the workload is testing the FireFox web browser. It may be that a browser license is required to execute within cloud A, but cloud B provides the browser licenses as part of its service, and thus, Cloud B may be more advantageous for the particular workload requiring the FireFox browser license.

In yet other embodiments, there may be different types of spendable dollars. For example, the virtual resource pool may have 100 GCP cloud dollars and 100 Azure dollars and 100 AWS dollars. Because dollars are tracked globally when scheduling workloads, the scheduler may look to the virtual resource pool and determine that the 100 Azure dollars have been spent already but there are 100 GCP dollars available and 100 AWS dollars and therefore, the scheduler can dynamically move the compute for pending workloads from the Azure cloud to the GCP and AWS clouds for further workload execution.

In another embodiment, similar to licenses, sometimes workloads depend on internal services which are associated with different compute characteristics on different clouds. For example, there may be a service which executes via an AWS cloud at 100 requests per second while the same service when executing within the GCP cloud can handle 200 requests per second due to a larger compute architecture footprint. Therefore, allocation of "fake" dollars or an "artificial" license can be utilized to throttle or govern the consumption of resources from the AWS and GCP clouds to ensure that the scheduler does not overwhelm the respective clouds by sending too many workloads and triggering too many requests with either cloud beyond the respective clouds' capabilities. In such a way, the scheduler can smooth out the demand on available compute clouds and implement restrictions and controls on the use of such clouds, be they internal to the host organization or externally available, on the basis of virtual resources such as dollars and licenses or even on the basis of artificially created licenses tied to such workloads.

In yet other embodiments, the host organization subscribes to a pre-determined amount of compute resources from a third party cloud, such as 2000 reserve computes on an ongoing basis over the period of 2 years. By purchasing such reserve compute in advance from a third party cloud service, the cost of each compute unit is greatly discounted, however, if those reserve compute units are not consumed, then the cost is wasted.

Therefore, the scheduling service may associate 2000 reserve compute tokens with the third party cloud which are then represented within the virtual resource pool. Next, the scheduling service may prioritize workloads pending to be selected and planned for execution against the third party cloud so as to saturate the total available compute capacity of the third party cloud, but limited by the virtual resource, which is the 2000 reserve compute tokens. In such a way, the scheduling service can maximize the use of the third party cloud up to the amount of reserve compute without risking inadvertently over-scheduling workload with the third party cloud which would then incur a much higher subscription cost due to the workload at the third party cloud exceeding the 2000 pre-purchased reserve compute. This way, the scheduling service can optimize its consumption of pre-paid resources while minimizing excess usage fees, while permitting effectively unlimited amounts of workload that could potentially be executed via the third party cloud to be pending at the scheduling service. Without the limiting virtual resource applied, the scheduler could send massive amounts of workload to the third party cloud which would then trigger massive subscription fees for excessive compute consumption.

Figure 27:
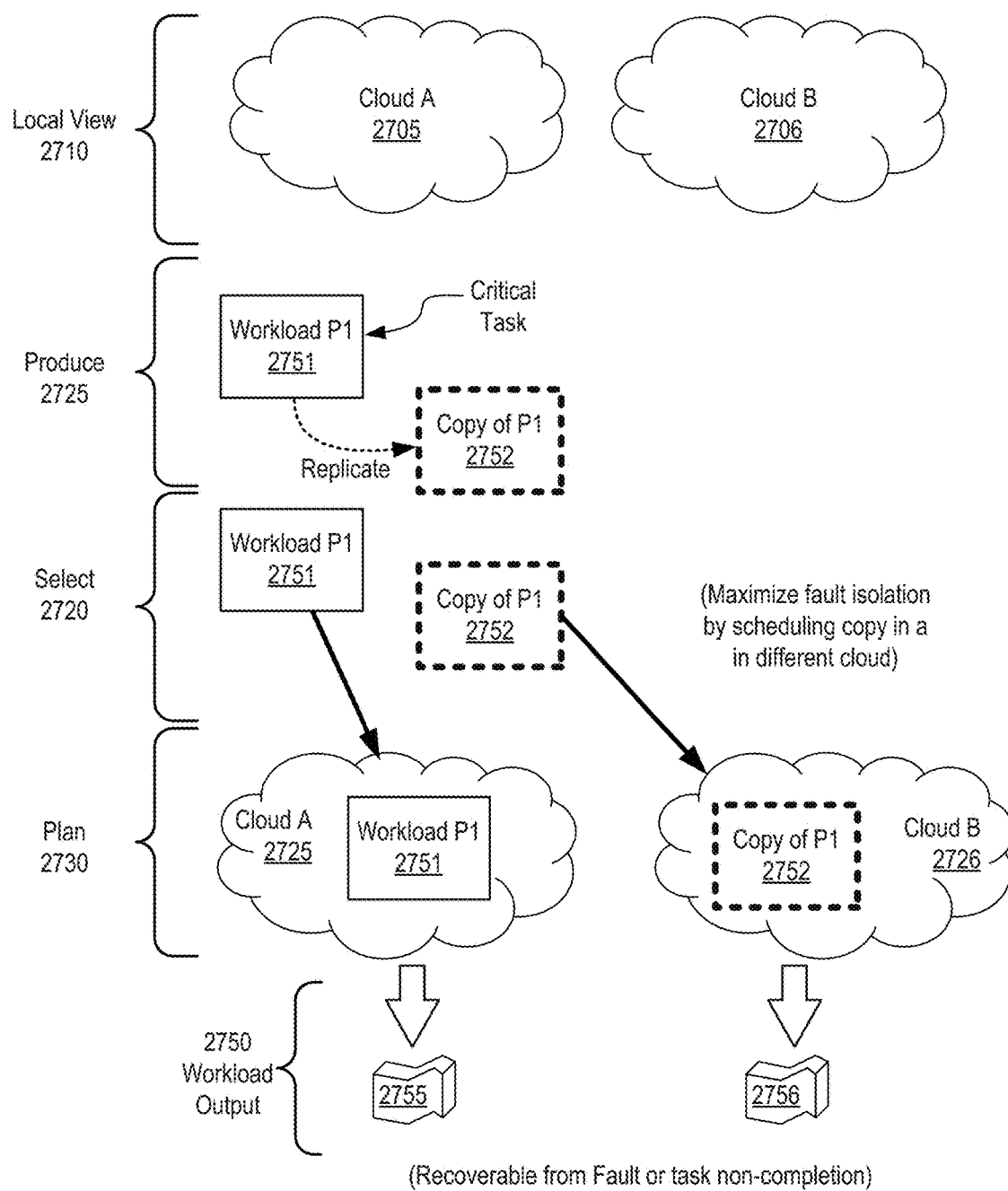
FIG. 27 depicts an exemplary fault isolation and task completion optimization scheme 2700, in accordance with described embodiments.

FIG. 27 depicts an exemplary fault isolation and task completion optimization scheme 2700, in accordance with described embodiments.

According to described embodiments, by identifying critical workloads based on various criteria the scheduling service may elect to elevate such critical workloads for redundant processing by copying or replicating a pending (critical) workload to execute via isolated clouds, thus ensuring redundant execution. In so doing, the scheduling service effectively runs at minimum double overhead for the critical workload but accepts this increased workload burden to ensure both fault tolerance and also to ensure correct and high quality execution. For example, fault tolerance is attained by isolating the original workload and the replicated copy of the critical workload to execution via distinct and isolated clouds. Therefore, even where one cloud has a critical fault, the workload should nevertheless finish as usual via the redundant cloud, be that the replicated copy finishing or the original copy finishing.

With regard to correct and high quality execution of the workload, it is possible to compare the outputs of the two workloads produced by each of the distinct and isolated clouds, in which case the workload output should be identical, assuming both workloads completed successfully.

Further still, scheduling inconsistencies may be accommodated because with a workload task marked as critical, it is highly unlikely that both an original and also a replicated copy of the workload pending with the scheduling service will be delayed.

For example, there are certain tasks that represent extremely important work that must be completed within a specified period of time or in which it is critical that the output is validated for proper, high quality, and correct completion. Therefore, by making a copy of the workload identified as a critical task, it is then possible to schedule the workload into two distinct clouds and run the workloads in parallel to create two completed work outputs, which may then be compared to validate that work was completed without tampering or unexpected execution error and additionally to ensure that the work completes on time or completes successfully on one of the clouds even in the rare event of a fault or service outage with the other cloud.

As can be seen here, the local view 2710 includes cloud A 2705 and cloud B 2706, each of which may execute workload. At the produce phase 2725, the scheduling service produces workload P1 2751 which is marked as a critical task, via meta data, via an associated SLT, or by the scheduling service determining that the workload is critically time sensitive based on an SLT, despite the workload having been pending for some period of time.

Regardless, the workload P1 is replicated to create a copy of workload P1 2752. This replication may be performed at the produce phase or by a prior phase which copies the workload P1 and enqueues the workload as an original workload P1 2751 and a copy of P1 2752 which is then produced based on the copy being enqueued and pending within the local view.

Regardless of how produced, the select phase 2720 will maximize fault isolation by scheduling the copy of workload P1 into a different cloud, thus, as shown here, the select phase 2720 selects workload P1 based on capacity within the cloud A 2725 and also selects the copy of workload P1 2752 based on capacity within the cloud B 2726.

The plan phase 2730 then plans the workload P1 and the replicated copy of workload P1 for execution via cloud A and cloud B respectively, ensuring that execution of the two workloads are planned for execution at different clouds to maximize fault isolation.

Ultimately, execution completes at the workload output 2750 phase and workload output 2755 and workload output 2756 is produced resulting in two distinct copies of output from what was originally a single workload. The workload output 2755 and workload output 2756 can then be compared to validate successful completion. In the event one of the execution fails to complete or does not complete in time, then the workload output 2755 from the successfully completing cloud may be utilized, with an indication of a cloud fault or failure.

As needed, the model may be extended to include any dynamic number of redundancies chosen by the scheduler or configured by a submitter of the workload P1 based on information stored within the local view, including SLT requirements, QoS applicable to such workload types, available compute times and capacity, etc.

In such a way, it is possible to identify important and/or fragile workloads that needs to be completed in a timely manner and then cause the scheduling service to schedule multiple copies of that identified critical workload on multiple clouds to increase the chances of successful completion and thus, to meet the deadline for that particular workload.

Determining or identifying a workload as a critical task may be based on any of the above mentioned scheduling properties and criteria, taking into account workload priorities, service level target, compute needs, available compute and so forth.

Certain workloads are always critical, where as other workloads become critical over time based on their time spent pending within the workload queues and thus reducing their total time by which to complete execution in compliance with a Service Level Target (SLT).

When the workload discovery engine discovers workload it may identify different classes of workloads. For example, some workloads may be low priority, others medium priority, others high priority, and yet others may be classified as critical priority.

Certain workloads are initially enqueued with a classification of critical, indicating that the workload is of critical importance and must be completed as urgently and as quickly as the scheduling service can feasibly coordinate its successful execution and sometimes, such workloads are additionally of such criticality that the scheduler will expend large amounts of wasted overhead as insurance to give the critical workload the greatest possible chances of successful execution.

Consider for example a critical vulnerability, such as a "0 day" exploit identified in an application, operating system, cloud platform, or other code base. An organization discovering such a vulnerability, regardless of whether the organization is the host organization, its customers, or even a competitor, will seek to patch and close the vulnerability as fast as possible, regardless of the cost, as doing so mitigates future potential damage.

In such an example, it is necessary for a development team to understand the vulnerability, locate the vulnerability in the code base, patch the vulnerability, and before releasing the patch publicly or into a production environment, the patch to the code base must be tested and validated. Any change to a large code base can take potentially significant periods of time to complete. If the patch is non-distributable, then the fastest available unit of compute may be applied to the workload processing the patch. If the patch is distributable, then the workload for processing the patch may be split in to many parts, even at the cost of high overhead and a poor efficiency of distribution, to minimize the time spent on the processing of the workload as much as possible.

Where a non-distributable workload is classified as critical, it simply is not possible to leverage parallel execution to expedite the processing, and therefore, not only must the workload be processed via a single unit of compute (e.g., via a single VM, a single work server, a single machine, etc.), but there is now the additional risk that the workload fails during execution, or the unit of compute executing the workload experiences a fault during execution, or the cloud executing the workload suffers a service outage during execution.

While such a scenario may be exceedingly rare and occur, for example, in less than 1% of cases with 99% plus of all cases executing without any incident whatsoever, the risk is nevertheless non-zero. And with a workload classified as critical, a non-zero risk of failure may be deemed unacceptable.

It is therefore in such a scenario where creating and scheduling multiple copies of a critically classified workload may be prudent.

According to such embodiments, where the critical workload is scheduled for execution with in the host organization's own computing architecture, it can be said that the host organization has assumed 100% of the risk of failure, regardless of how small the likelihood of failure may be. However, by replicating the critical workload and scheduling one copy for execution within the host organization's internal compute architecture and then scheduling another identical copy for execution via a third party compute cloud, the risk has now been divided and the likelihood of both copies of the workload failing or both compute architectures concurrently failing is statistically very small. Nevertheless, depending on the criticality of the workload, the redundant execution may be extended, as needed, to more than two instances. In such embodiments, regardless of how many copies of the critical workload are scheduled for execution, none of the copies will be co-located within the same compute cloud. Thus, different copies will be sent to different datacenters, or different geographical regions, or different compute cloud service providers.

In other situations, a workload task is not initially classified as critical. Rather, such a workload may be enqueued and pending execution and is classified as a low priority or a medium priority, but the scheduling service doesn't pick up the workload for scheduling and execution due to higher priority workloads constantly consuming all available compute resources, such as during an extended period of peak demand.

In such a situation, an SLT which defines the completion criteria and contractual obligations for time to completion of the low or medium workload task will remain the same, but the remaining time available will continuously be reduced as the scheduling service fails to pick up the workload task or scheduling.

Therefore, as a deadline or a required time to complete the pending workload task approaches, in accordance with a QoS or SLA/SLT, etc., the criticality of the task may be increased by the scheduler within the local cache or alternatively, the scheduler may simply treat a low or medium priority workload task with increasing criticality as the time to complete the workload task lessens to the point where the workload task is at risk for non-compliance with the applicable SLT.

Here also, such a workload may therefore be scheduled with redundancy by the scheduling service so as to ensure timely completion in compliance with an SLT, effectively expediting an otherwise low or medium priority workload task due to the schedulers delinquency in scheduling the task for execution.

According to alternative embodiments, the scheduling service via the scheduler may determine its own classification for pending workload tasks, by rating the workload tasks to determine a priority or a classification for the workload task based on information in the local cache. For example, the scheduler may rate a pending workload task as critical based on a pre-assigned priority or based on an amount of time remaining to complete the pending workload task in compliance with an SLT or based on historical failure rates for a given type of workload, etc.

Another criteria which affects the produce phase decision making (or the producer's decision making) is the available compute capacity at any given time. For example, there are two alternative approaches which may be applied to a given workload task.

A first of the two alternative approaches is to recognize that a critical task is pending and while the producer would ordinarily replicate the critical task and schedule multiple copies for execution, the scheduling service may also recognize that there is a limited available compute capacity due to a peak demand or currently excessive demand, and therefore, the producer will elect to not replicate the critical task and execute only a single copy of the critical task as replicating the task will further exacerbate the problem of a lack of available compute capacity. Doing so would additionally be based on the SLT for the task and the criticality of the task, with different workload tasks representing different levels of risk to the host organization and to the customer organizations.

A second of the two alternative approaches reaches the opposite conclusion. For example, the scheduling service may recognize that there is currently a glut with excessive compute capacity available and presently unused, including, for example, pre-paid compute services or reserve compute purchased from a third party compute cloud service provider which is presently going unused or under-utilized. In such a scenario, the producer may take a medium priority task and replicate the medium priority workload task and schedule both for execution, with at least one of the copies of the medium priority workload task being scheduled for execution via the reserve compute with the third party compute cloud service provider, as doing so presents no additional financial cost to the host organization and expedites processing of pending workload in anticipation of potential future workload.

According to such embodiments where replicated workloads need to be scheduled in different clouds, the scheduling service will update the local cache so that the local view of the scheduler reflects where each of the replicated copies are scheduled for execution. For example, once the workload task is replicated and enqueued so as to result in two distinct pending workloads, albeit identical copies, it is up to the scheduler when to produce, select, and plan for execution each of the copies, both of which will be treaded independent of one another and in isolation. Therefore, there is a non-negligible risk that both copies could be placed within the same compute cloud, potentially even on the same unit of compute, wholly negating any benefits of the workload replication. Therefore, the scheduling service will track, via the local cache, to what compute cloud each of the replicated copies is scheduled for execution.

According to one embodiment, a resource requirement for execution or virtual resource requirement is associated with each copy of the replicated workload, linking the two workloads as known copies of one another with the requirement that they not be executed via the same compute cloud or the same computing resource. In so doing, once the first copy is scheduled for execution, the local cache is updated so that in-flight, it is known where the first copy is executing (at which compute cloud) and then when the second copy is picked up for execution by the scheduler producing and selecting the second copy, the planning phase of the scheduler will recognize the resource requirement or the virtual resource requirement associated with the second copy mandating that the second copy not be executed at the same computing resource as the first copy, and thus, the scheduler will ensure that both redundant copies are not scheduled for execution via the same computing resource or the same compute cloud.

According to yet another embodiment, workloads are replicated by the scheduler not on the basis of criticality, but on the basis of expected or historical failure rates for a specific type of workload. Therefore, the scheduler will anticipate that workload types with historically a high rate of failure will continue to have a high rate of failure, and therefore, the scheduler will create replicate copies of the same workload for multiple concurrent execution on the basis that some will fail but others will pass. Thus, the scheduler can make a decision to produce n number of copies to accommodate an expected failure rate.

For example, based on history, a particular workload type fails 80% of the time, and yet, it is nevertheless important to finish the work on time in compliance with an SLT.

Therefore, the scheduler, recognizing that, on average, it takes 5× instances of execution for this particular workload type, can replicate the workload n times, so as to increase the statistical likelihood of success. Depending on the classification or priority of the workload, the scheduler may therefore replicate and schedule, for example, 5× copies of the workload, or 10× copies of the workload, or n copies of the workload, depending on remaining permissible time to completion, expected duration of execution, expected or historical failure rates, and priority classification of the workload.

Consider for example, a workload type which is producing artifacts (e.g., an executable binary compiled from source code). Such a workload is non-distributable and thus, cannot be expedited in time based on parallel processing. If such a workload takes 2 hours to execute and is highly prioritized, and yet, has a known significant failure rate, then executing a single copy may result in a failure half way through processing, thus requiring the workload to be re-scheduled and re-executed and now requiring at minimum 3 hours to complete due to the hour lost on the first attempted execution.

Consider if this artifact is a patch or bug fix for a customer and is therefore highly time-sensitive. The scheduler may therefore replicate and enqueue and schedule multiple copies to account for the known failure rate and to maximize the statistical likelihood of success for timely completion.

According to such embodiments, once a single one of the multiple replicated copies completes successfully, the scheduler may kill, de-queue, or terminate and pending copies of the replicated task and any currently executing but unfinished copies of the replicated tasks, as such copies are no longer required.

While it may seem unlikely for an identical task to fail during one execution and yet pass successfully with another otherwise identical execution, the problem of failure is a known problem with massive cloud computing architectures which operate at scale due to the sheer volume of individual work servers which effective multiplies a small risk of failure for any individual machine by the tens of thousands of individual machines executing within the compute cloud's underlying hardware.

Consider a simplified example where a typical work server with a hard drive, power supply, memory, and processor may be expected to statistically suffer a hardware failure of the processor once in 10,000 hours, a hardware failure of the hard drive once in 10,000 hours, a hardware failure of the memory once in 10,000 hours, and a hardware failure of the power supply once in 10,000 hours (note that these figures are illustrative and not as per any particular specification). Such a typical work server should therefore suffer a hardware failure every 2,500 hours, on average or once every 104 days of non-stop operation. Again, running a task on such a server is therefore highly unlikely to fail. Now, multiple the chance of failure by 10,000 concurrently executing work servers in a datacenter or within a compute cloud's underlying server architecture. The rate of failure at that datacenter will now be, on average as per the above failure rates, one failure (of a memory, CPU, hard drive or power supply) on one of the typical work-servers, somewhere within the datacenter's compute architecture every 0.25 hours, or once failure every 15 minutes. Such rates of failure when operating at massive scales are not out of the question. In this example now, it is very easy to see that a workload which takes two hours to execute has the potential to encounter a fault or a failed execution. There are many other reasons why a workload may fail, but the above example helps to illustrate the known risk.

Other exemplary risks include dependencies on services, where a given service upon which the workload depends experiences an outage or an interruption, which will then in turn cause a failed execution. It is further possible that other workloads executing within the same datacenter trigger a spike or a peak demand, resulting in an oversubscription problem at a given compute cloud, thus resulting in the workload execution taking too long, and thus having its execution fail. In another example, a workload which executes tests may have specific performance characteristics and thus require CPU consumption under a threshold, or execution time under a threshold, or memory consumption under a threshold, or network consumption under a threshold, and in such instances, workloads executing within the same compute cloud could, during oversubscription or periods of peak demand, negatively affect the tests, thus triggering the test to fail.

In yet another embodiment, a workload may be scheduled to execute on a different compute footprint by the scheduler for the sake of mitigating failure risk. For example, the scheduler may seek to minimize risk for a critical task by not only sending copies to different compute clouds, but also by requiring different compute footprints. Such examples include the scheduler sending one copy to a compute footprint optimized for CPU bandwidth and another copy optimized for GPU bandwidth or scheduling a copy with a compute footprint optimized for I/O or scheduling a copy with a compute footprint optimized for memory, or scheduling a copy with a compute footprint which utilizes AMD CPU architecture or scheduling a copy with a compute footprint which utilizes Intel CPU architecture or scheduling a copy with a compute footprint which utilizes a larger VM or a smaller VM or scheduling a copy with a compute footprint which utilizes different operating systems, or scheduling a copy with a compute footprint utilizing 8 core CPUs or 4 core CPUs, etc.

In yet another example, the scheduler may seek to mitigate risk by scheduling multiple copies of a distributable workload using different quantities of distribution. For example, a first copy of the distributable workload may be split into 10 workload sub-parts for execution while a second copy of the distributable workload may be split into 20 workload sub-parts for execution. Then if one fails, the risk is not only minimized, but additionally, the failure cause may be analyzed later to determine why the execution failed, for example, with 10 sub-parts but passed with 20 sub-parts.

In such a way, not only is the critical workload replicated and thus benefiting from redundancy but additionally mitigates risk of failed execution via the different compute footprints.

Figure 28:
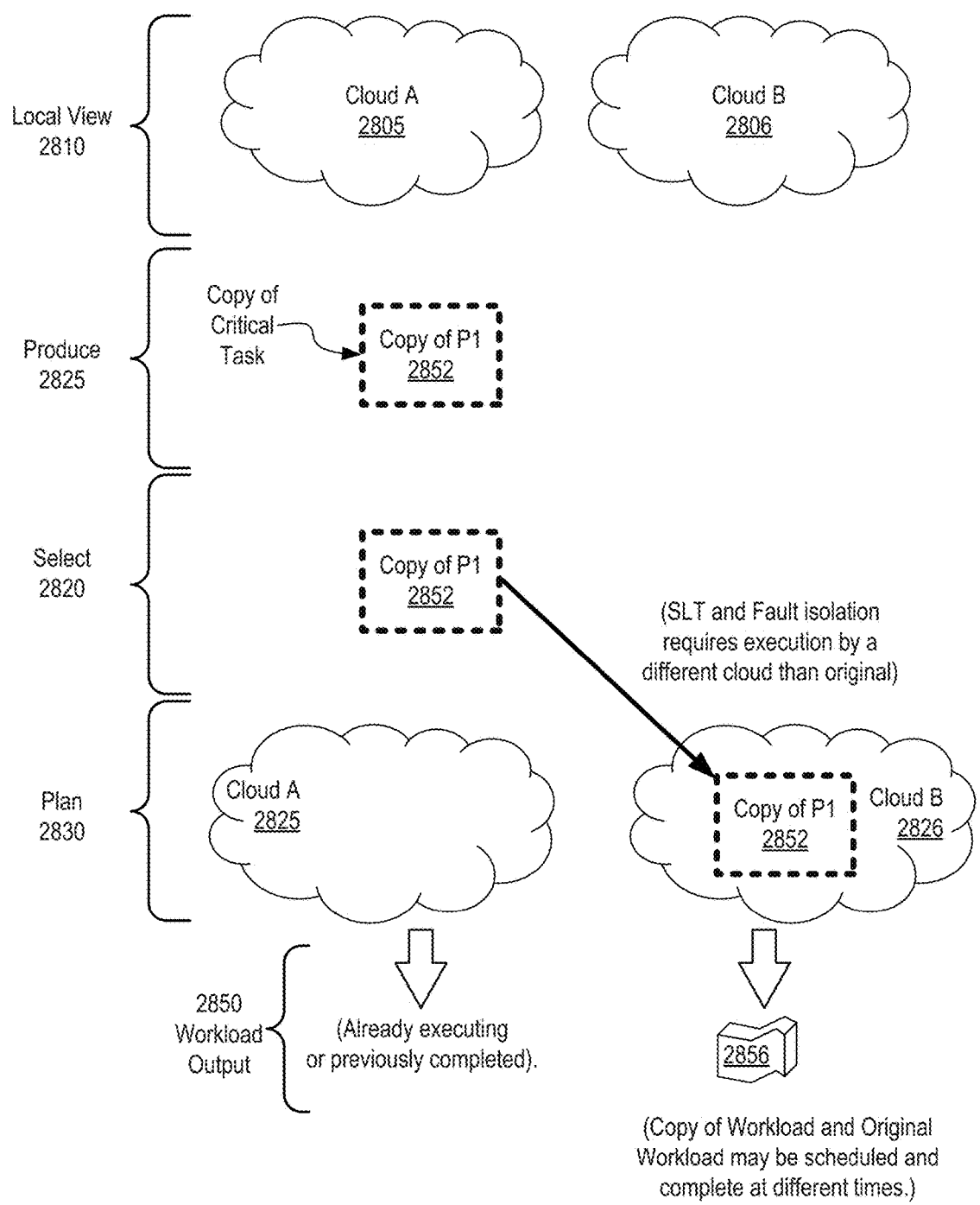
FIG. 28 depicts another exemplary fault isolation and task completion optimization scheme 2800, in accordance with described embodiments.

FIG. 28 depicts another exemplary fault isolation and task completion optimization scheme 2800, in accordance with described embodiments.

According to certain embodiments, it is possible that an original workload and the copy of the workload P1 2852 may not be scheduled at the same time. In such scenarios, the producer will continue producing the copy of the workload P1 2852 for execution, assuming it is not yet too late for the copy of the workload P1 2852 to be completed as per an SLT or QoS, thus permitting the eventual scheduling of the copy of the workload P1 2852 on the alternative cloud.

Thus, as is depicted here, the local view 2810 includes both cloud A and cloud B (2805 and 2806), however, at the produce phase 2825, only the copy of P1 2852 is produced based on information in the local view. This is possible because either the original copy has been planned and is executing or because the original copy has finished execution already. Regardless, at the select phase 2820 the copy of P1 is selected and then planned 2830 by allocating the copy of P1 for execution via cloud B 2828 based on SLT and fault isolation requirements which mandates execution by a different cloud than any cloud used to execute the original copy of workload P1.

Therefore, at the workload output 2850 phase, there is no output from cloud A 2825 for this particular scheduling iteration because the original copy of the workload is either executing currently or has already completed execution. Regardless, the copy of P1 2852 completes execution and output 2856 is produced. In such a way, both the original workload P1 and the copy of the workload P1 may be scheduled and execute at different times, thus maximizing redundancy and fault tolerance.

In alternative embodiments, upon completion of a successful execution of the original workload P1 or upon successful completion of the replicated copy of workload P1, it is permissible to cancel the unfinished workload by either removing it from the local view so that it will never be produced and scheduled in the event execution has not yet begun or by terminating execution of the unfinished workload or the unfinished copy of the workload, so as to save compute resources. Other times, both copies may executed to completion so that they may be compared and validated, with the decision to cancel being potentially different based on the workload in question.

According to one embodiment, fault isolation is attained by scheduling execution of the original workload P1 and the copy of workload P1 in two distinct clouds. In other embodiments, fault isolation is attained by scheduling execution in two different regions, for example, in two different data centers in different geographical locations but within the same cloud computing service.

Figure 29:
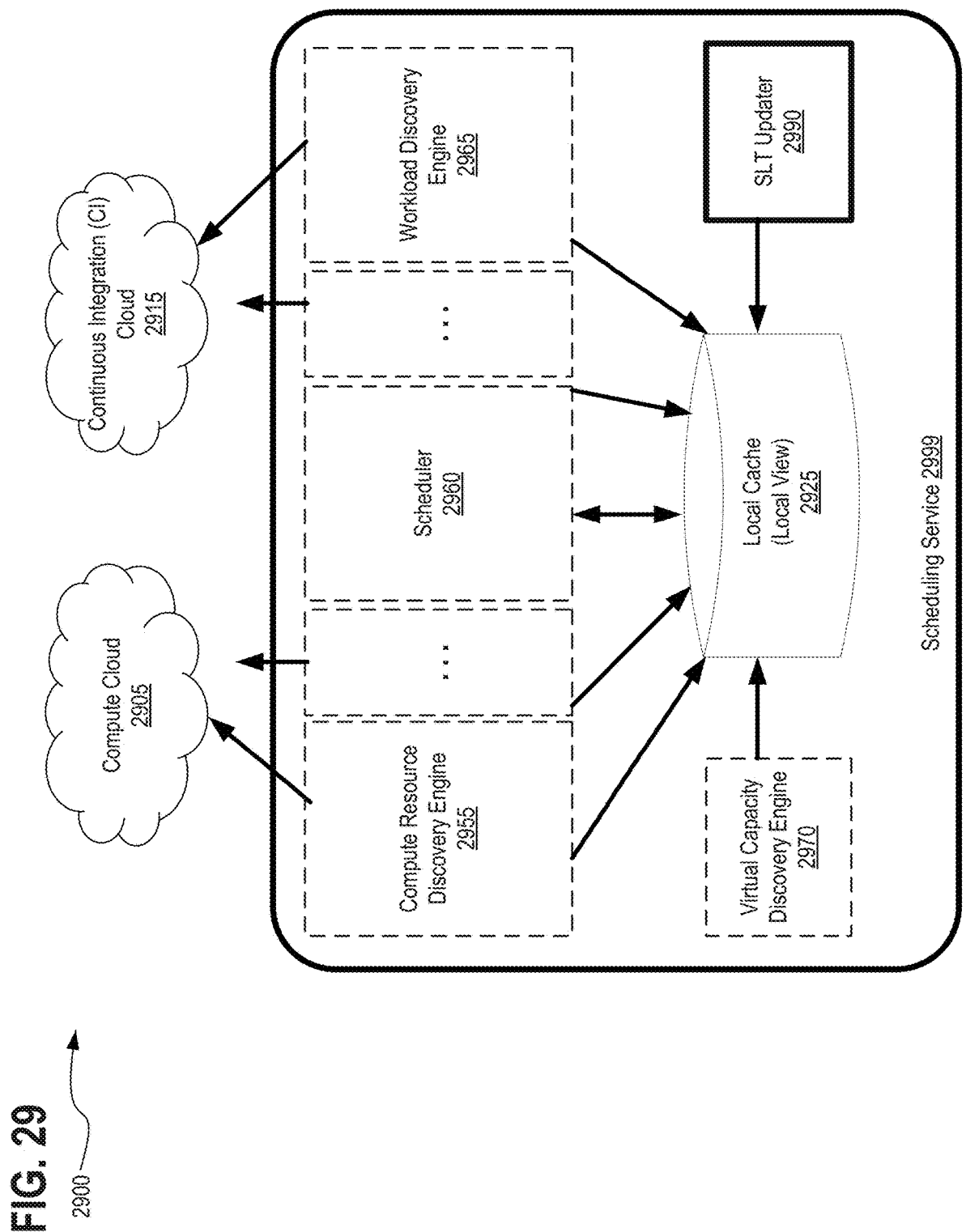
FIG. 29 depicts another exemplary scheduling service 2999 computing architecture 2900 having an SLT updater 2990, in accordance with described embodiments.

FIG. 29 depicts another exemplary scheduling service 2999 computing architecture 2900 having an SLT updater 2990, in accordance with described embodiments.

As may be observed here, the scheduling service 2999 is communicably interfaced with each of a compute cloud 2905 and also a continuous integration (CI) cloud 2915, via which to perform workloads (e.g., useful work submitted by users and subscribers).

Further depicted within the scheduling service 2999 are multiple engines, including the compute resource discovery engine, a scheduler 2960, a virtual capacity discovery engine 2970, and a workload discovery engine 2965, each of which operate pursuant to instructions of an implementing system. For example, a system having a processor and a memory therein may execute instructions to cause the scheduling service to execute the functions and instructions of the compute resource discovery engine, the scheduler 2960, the virtual capacity discovery engine 2970, and the workload discovery engine 2965 to carry out functions as set forth herein.

Further depicted is now an SLT updater 2609, via which to update and carryout periodic modifications to an applicable SLT. As described above, SLTs may be attached to and associated with pending workload tasks. According to certain embodiments, various workloads may additionally have different SLT targets depending on a defined periodic cycle, such as the day of the week, the day of the month, the month of the year, the hour of the day, hour of the week, fiscal year end date, fiscal quarter end date, or even the even year.

Each of the compute resource discovery engine, the scheduler 2960, the workload discovery engine 2965, the virtual capacity discovery engine 2970, and the virtual capacity discovery engine 2970 are not only connected with a system's processor and memory to control and perform execution of their respective functions, but additionally are communicably interfaced (e.g., via an Input/Output (TO) system bus) with the local cache 2225 which provides a "local view" to the scheduler.

As shown here, the scheduler 2960 retrieves information from the local cache 2225 and also writes information to the local cache to update the local view. In this particular embodiment, the other engines (e.g., the compute resource discovery engine, the workload discovery engine 2965, the virtual capacity discovery engine 2970, and the SLT updater 2990) operate wholly independently of the scheduler 2960 and are agnostic to the operations performed by the scheduler 2960 and merely collect information and write the information to the local cache to update the local view 2225 with such information then being consumed by the scheduler 2960 in fulfillment of its scheduling role of pending workloads.

According to such embodiments, the scheduler will periodically update its local view with the active SLT for all the workloads, and schedule accordingly.

For example, a workload that is used on Wednesdays to make a business decision needs to be scheduled. Pending workload tasks arriving at the scheduling service for this workload type arrive throughout the week, and their execution should continue, however, they are designated as higher priority and more time-sensitive Wednesdays, based on business considerations of the user or customer scheduling the workload. For example, the workload may produce reports which are referenced in a weekly Wednesday meeting.

The scheduler therefore may utilize the SLT updater 2990 to iteratively review and refresh all known and defined SLTs for known workload types, and determine whether any of the known SLTs are active or applicable for the current time period.

According to certain embodiments, there is only one SLT for any given workload or any given workload type. However, in alternative embodiments, a user, administrator, or customer organization may permissibly schedule multiple different active SLTs for the same workload or multiple different active SLTs for any given workload type. Moreover, in accordance with such embodiments, the scheduling service will self-determine which SLT is active and which to apply. In certain embodiments, multiple overlapping active SLTs may apply to a specific workload or a given workload type, and again, the scheduling service will determine which of the multiple active SLTs to apply at the time of scheduling.

As shown here, the SLT updater 2990 extends the scheduling service and is utilized to update the local cache with the active SLT for each workload or the active SLT for each given workload type based on the current time period. Similarly, if there are multiple active and overlapping SLTs, then the SLT updater 2990 will determine which SLT is active and update the local cache for the pending workload tasks and/or workload types accordingly.

For example, if an SLT is defined as applicable on "weekends" and the current day is Saturday then the SLT updater makes the weekend SLT active for the workload or workload type with which it is associated. Similarly, a time period for end of quarter, or end of fiscal year, or end of calendar year may be defined, and when that time period is the current time period, then any SLT defined as being active for that time period (e.g., an SLT defined as active at EOY or end of year) will be updated in the local cache by the SLT updater.

In such a way, the scheduler component need not determine which of many SLTs is active or the correct SLT at any given time, but rather, simply retrieves the SLT objectives from the local cache for each pending workload task or for each particular workload type. The SLT updater 2990 therefore takes on the burden of determining which SLT is active and is to be applied and also is responsible for updating the local cache.

Where multiple overlapping SLTs are active and applicable during a current time period (for example, it can be both a weekend and also end of quarter or it can be a weekend, and end of quarter and also end of year), then the SLT updater will select the most restrictive SLT in accordance with certain embodiments.

For example, for an SLT that specifies a quantity of distribution, the most restrictive SLT will be selected on the basis of which active SLT specifies the greater distribution, and thus, utilizes more parallel compute and incurs a greater overhead burden, but finishes faster due to the higher distribution. Therefore, the SLT updater will identify the active SLT on such grounds from amongst multiple active SLTs and update the local cache accordingly.

In yet another embodiment, the SLT updater will select the active SLT which specifies the shortest permissible time to completion, and thus, as before, will consume greater concurrent compute capacity, with the SLT updater identifying the active SLT on such grounds from amongst multiple active SLTs and updating the local cache accordingly. For example, an SLT which defines a time to completion in one hour is much more restrictive than an SLT which defines a time to completion within one week.

Where multiple factors are present for multiple active SLTs, the SLT updater will apply pre-defined weights to the various factors (e.g., time to completion may be weighted higher than a defined quantity of distribution) and then the weights are calculated and analyzed in aggregate to determine which one of multiple active SLTs are to be utilized for the current time period. Time to completion may be considered the highest weighted factor as it is the most limiting on the scheduling service given that a shorter time to completion limits the flexibility of the scheduler itself.

In another embodiment, and SLT which defines a priority may be stack ranked against other active SLTs that define a priority or weighted and considered as part of an aggregate score. For example, an active SLT with a priority of high will be given a higher score for weighting purposes than a priority of low for another active SLT or if the multiple SLTs are stack ranked, then the SLT with a high priority would rank over the SLT with a low priority.

In other embodiments, the SLT will analyze how much concurrent compute resource would be utilized under current conditions for each active SLT, and then select the active SLT which incurs the greatest concurrent compute resource on the basis that such an SLT is the most restrictive. For example, if one SLT will result in the use of one CPU core per hour and another SLT will result in the use of 20 CPU core per hour, in order to meet the SLT objectives, then the SLT which will require use of 20 CPU core per hour will be selected as it will be the most restrictive and induce the highest demand on the scheduling service.

Once the active SLT is identified or chosen from amongst multiple active SLTs, the SLT updater updates the local cache specifying the SLT objectives for each pending workload task or for each workload type for which the SLT applies.

For instance, according to such embodiments, there may be 1000 different types of workloads supported by the scheduling service and an SLT is defined for code-submission workloads which corresponds to a large number of the different types of workloads. It may be that code-submissions are reviewed every week on Wednesdays by the developers, and thus, each day of the week, the SLT defined for code submission is low priority and non-urgent, and is made active. However, another SLT is defined for the code submissions but is only active on Wednesdays, and defines a high priority execution and a 4-hour time to completion, so that any code submission workloads are complete and ready for review in the same day meeting at where go/no-go decisions are made for the code submission. There may even be an SLT for Wednesdays from 12 pm to 3 pm to mark such workloads as critical so as to force completion of late submitted code submission workloads which are needed by the Wednesday afternoon 4*pm* code review meeting.

With such an example, both SLTs may permissibly be active without error or conflict by the scheduling service. The SLT updater will simply analyze the available SLTs active for a given time period, which during the week on every day not Wednesday, there is only one active and on Wednesdays when both the low priority SLT and the high priority SLT are active, the SLT updater will select the more restrictive SLT and then update the local cache specifying the higher priority and more restrictive time to completion requirements for the applicable workload types corresponding to the code-submissions. On Wednesday afternoons after 12 pm, the more restrictive critical priority SLT would then apply.

According to certain embodiments, the active SLT may define start dates or end dates or both and the SLT updater will automatically apply the SLT and update the local cache and also remove the SLT objectives from the local cache (or replace them) based on the start and end dates respectively.

According to yet another embodiment, the active SLT is tracked for any new work arriving at the scheduling service and being queued by the workload queues and the SLT which was applicable to the workload when it is enqueued will be honored and will remain applicable for that workload, even if the workload is still pending when a different SLT becomes active. However, the opposite approach may also be utilized, in which case a pending workload will retain its SLT that was active at the time the workload was enqueued with the scheduling service, however, if a more restrictive SLT becomes active, then the more restrictive SLT will be updated to apply to newly enqueued workloads and also to currently pending and not yet executed workloads. With such an embodiment, if an SLT becomes less restrictive for the active current time period, then the scheduler will honor the more restrictive SLT which was active at the time the pending workload was enqueued with the scheduling service.

Figure 30A:
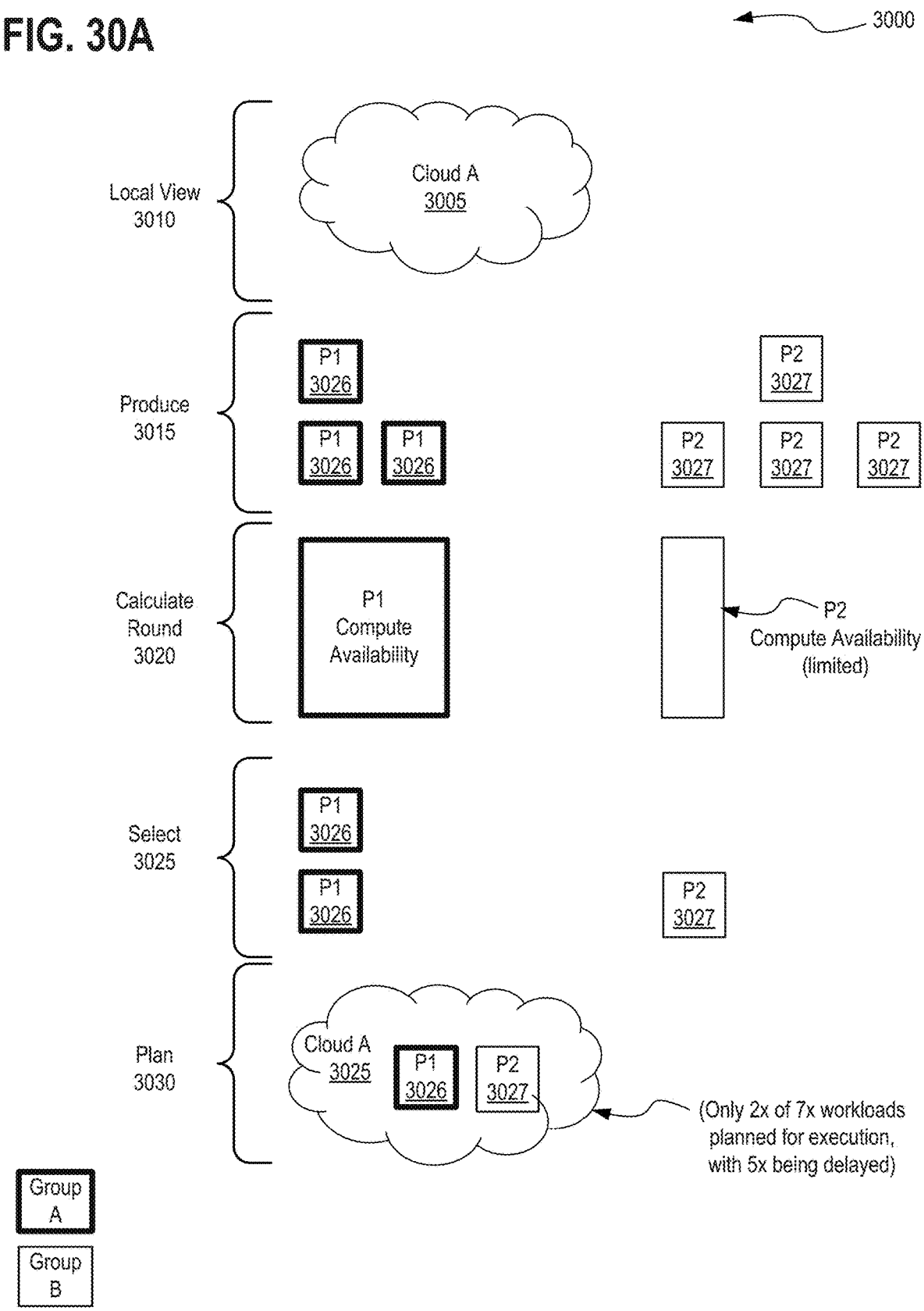
FIG. 30A and FIG. 30B depict an exemplary scheduler and workload manager process 3000 and 3001 with dynamic workload termination, in accordance with described embodiments.
Figure 30B:
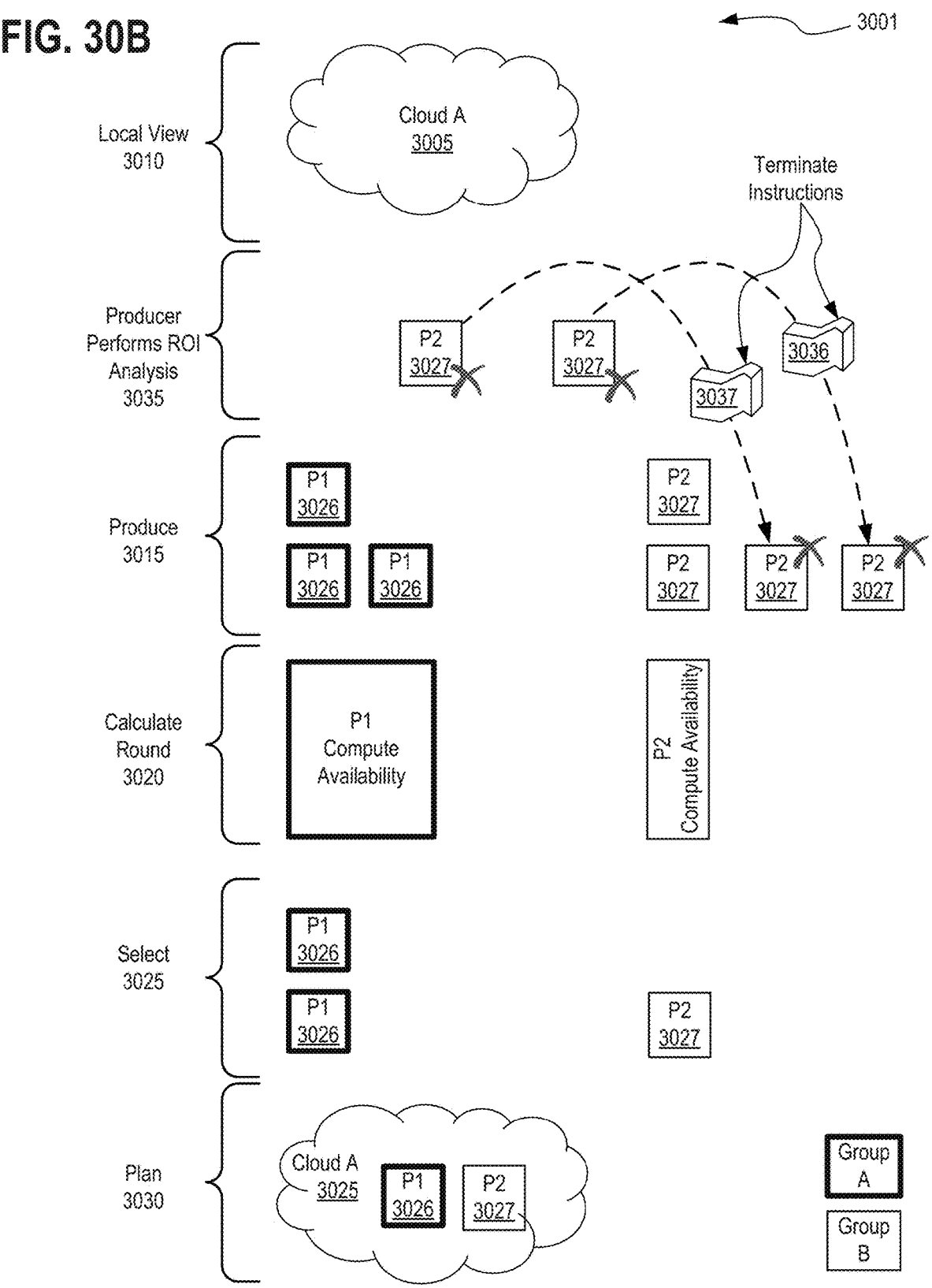

FIG. 30A and FIG. 30B depict an exemplary scheduler and workload manager process 3000 and 3001 with dynamic workload termination, in accordance with described embodiments.

According to such embodiments, the scheduler's produce phase may decline to perform certain workloads when a cost/benefit analysis or ROI indicates that pending workload is not of sufficient criticality or that the benefit of perform the work does not justify the cost of performing the work.

Saving compute resources by abandoning the workloads which fail to attain a minimum workload ROI threshold, or workloads which are now worthless, despite having been previously scheduled.

Consider for example, that a development teem needs to get feedback on a code submission. Within a week, the feedback is good for the developers, but if the workload is low priority and consequently is delayed for a month, then when the workload is finally at a point where it will be scheduled for execution, the feedback is worthless to the developers, even if the workload does complete. Further still, it is possible that a workload experiences a catastrophic test failure due to a bad code modification which causes the workload, while executing, to take much longer to execute than normal due to the test failures. Such a job may be terminated prematurely based again on the ROI analysis. For example, perhaps the workload proceeds through 10% of the tests, but because there are so many failures associated with the workload, it simply is no longer worthwhile to continuing the processing of the workload, and thus, the scheduling service will deem the ROI insufficient and terminate the already executing workload.

Consider the example as depicted here. There is a compute cloud A 3005 at the local view 3010 (although there may be more clouds). At the produce phase 3015, there are group A and group B workloads, specifically 3× workloads for P1 3026 having been produced by the scheduler and then four more workloads for P2 3027. At the calculate round 3020, compute availability is determined for each of P1 and P2 based on current available compute capacity within the connected compute clouds and other criteria, notably with P2 having somewhat limited compute availability despite high demand with four pending P2 workloads.

At the select phase two P1 3026 workloads and one P2 workload 3027 is selected for execution but at the plan phase 3030 only one workload P1 and one workload P2 is actually planned and scheduled for execution, leaving 5× of the pending workload tasks unscheduled and thus remaining in the queue until a next heartbeat iteration of the scheduler and inducing delay for those 5× unscheduled workloads.

FIG. 30B therefore further depicts an ROI analysis 3035 phase, as performed via the producer, to determine Return On Investment (ROI) for the delayed and unscheduled workloads. As shown here, ROI for two of the P2 workloads 3027 is unfavorable and does not meet a minimum threshold, and thus, termination instructions 3036 and 3037 are issued, updating the local cache, so as to dequeue the two P2 workloads from the work queues and thus preventing the terminated or canceled workloads from being produced, selected, planned or scheduled on future scheduling service heartbeat iterations.

According to another embodiment, because the scheduling service during its "producer" phase decides on the work that needs to be performed, the producer and the producer phase may be extended to perform the ROI and cost/benefit analysis to decide whether or not pending workloads should still be performed, despite being delayed. The producer may additionally take the SLT take into consideration for making such decisions.

Because the scheduling service implements a decoupled scheduler with distinct phases which operates on the design principle of eventual consistency, enabling the additional ROI operation provides a non-intrusive yet powerful function when combined with all the other phases and optimizations described herein.

Consider for example, the two distinct types of workloads, P1 and P2 as shown here. During the produce phase, all the work that needs to be performed from the work queues is generated, however, unlike in prior examples above, now the producer determines that ROI is insufficient for one or more of the pending workloads, and thus, wholly bypasses or skips two of the P2 workloads and issues their termination instructions. This action may be taken based on, for example, both terminated jobs having already missed their SLT objective, and thus, represent workload too costly to perform with little value to be gained. Thus, the scheduler may therefore choose to skip these workloads preventing them from being selected or planned for scheduling and additionally causing them to be entirely dropped from the local view by updating the local cache and dequeuing them.

Consider further the situation in which the scheduling service has effectively an infinite number of workloads coming in for scheduling as a constant and never ending stream. For a particular workload, such as workload P2, the SLT defines that the job must finish within 2 hours time. During the pendency of the workload P2, there are compute shortages or there was a service outage or there was a backlog of higher priority workload and now the workload P2 is still pending 6 hours later. Clearly the workload has missed the SLT and so the ROI analysis may cause the scheduling service to simply ascertain that because the SLT objective for the workload is missed, there is no longer value of execution and therefore the workload P2 having missed the SLT is canceled or terminated in the event it is running.

Consider another example in which there are multiple compute clouds and the workload P2 is ready for execution if scheduled via any one of the different clouds, such as running within AWS and or running within GCP. However, SLT defines that the most that may permissibly be spent to perform the work is $1.00 USD, and yet, there is no availability to perform the work on GCP at that cost and the minimum spend for AWS is $2.00, even if the workload only consumes $1.00 worth of CPU core hours. Therefore, the scheduling service may perform the ROI and ascertain that it is not possible to schedule the workload in compliance with the SLT requirements, despite compute resource availability, and therefore, the workload P2 is simply canceled.

According to another example, with the infinite stream of incoming workloads, there are multiple P2 workload, as is depicted here, each being defined via SLT objectives as having a time to completion within 2 hours. However, due to failures, delays, or other issues, earlier received P2 workloads are delayed and running late, although still capable of finishing in compliance with the SLT objectives. Later received P2 workloads were successfully scheduled and have completed out of order, with the later P2 workloads completing prior to earlier received P2 workloads from the incoming stream. In such a situation, it may be that only the feedback from the latest workload is beneficial, thus rendering any feedback from the earlier and still pending P2 workloads no obsolete. The ROI analysis may therefore ascertain based on such criteria that any earlier received P2 workload which has not completed execution (still pending or currently executing) is now obsolete and worthless, and thus, the scheduling service will issue termination instructions to the earlier received P2 workloads in favor of the later received but completed P2 workloads.

In yet another example, consider a distributable workload having 1000's of tests, which are then split into workload sub-sets and distributed across 20 distinct work servers or 20 distinct compute resources. In the event that initial feedback is received from some of the 20 workload sub-sets negative, indicating an unacceptable performance or unacceptable test failure rate, then the scheduling service may cancel any still pending workload sub-sets and terminate and currently executing workload sub-sets to save on compute resources once the ROI indicates that completion of the distributable workload and its workload sub-sets no longer has value.

According to one embodiment, the decision to not schedule a produced workload may be performed by the plan phase which operates to re-evaluate the ROI of produced and selected workloads. As shown here at FIG. 30A, even though two P1 workloads have been selected of execution, the plan phase re-evaluates the ROI for each and then declines to execute one of the two selected P1 workloads 3026.

Figure 31:
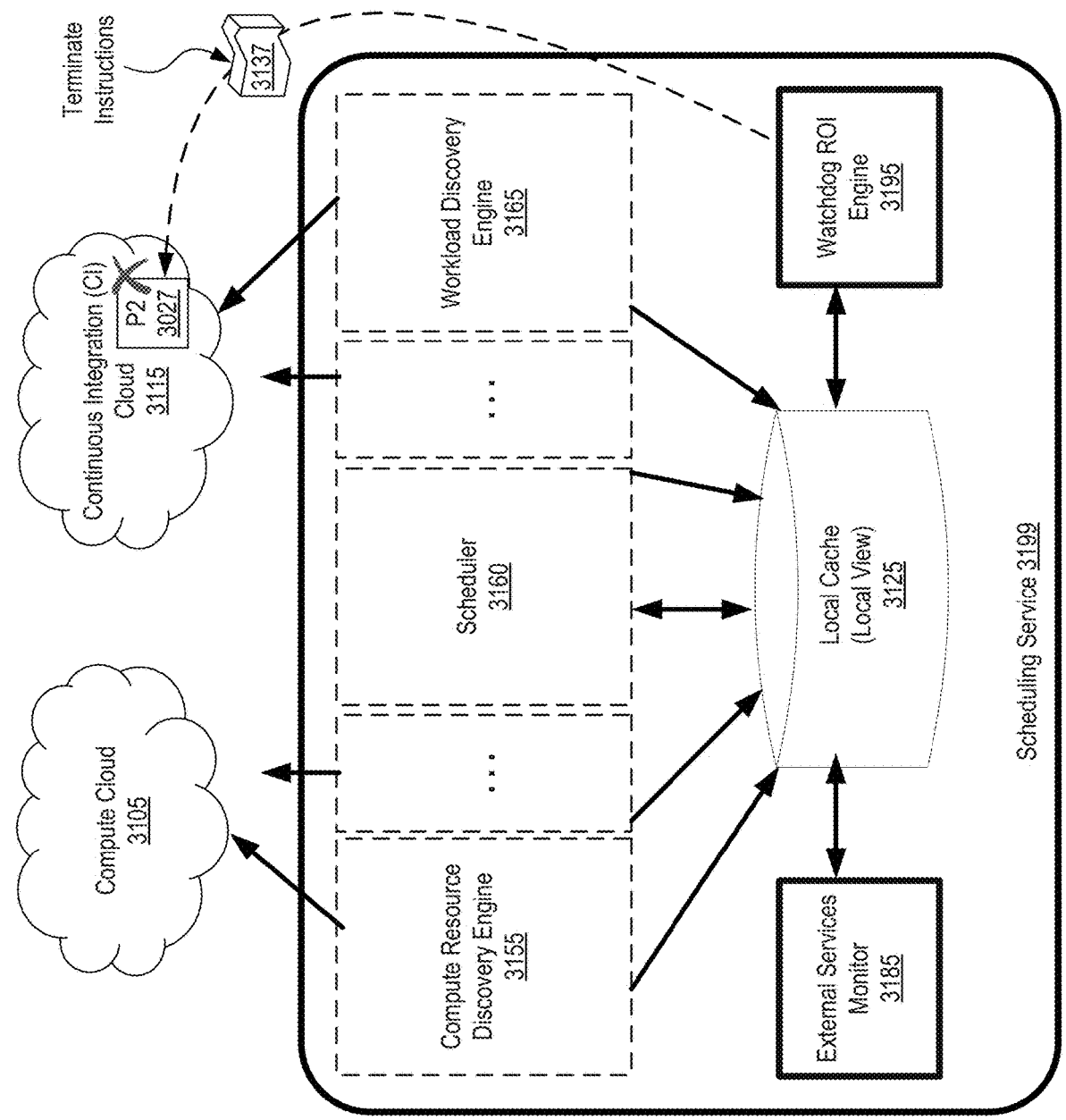
FIG. 31 depicts another exemplary scheduling service 3199 computing architecture 3100 having a watchdog ROI engine 3195, in accordance with described embodiments.

FIG. 31 depicts another exemplary scheduling service 3199 computing architecture 3100 having a watchdog ROI engine 3195, in accordance with described embodiments.

As may be observed here, the scheduling service 3199 is communicably interfaced with each of a compute cloud 3105 and also a continuous integration (CI) cloud 3115, via which to perform workloads (e.g., useful work submitted by users and subscribers).

Further depicted within the scheduling service 3199 are multiple engines, including the compute resource discovery engine, a scheduler 3160, and a workload discovery engine 3165, each of which operate pursuant to instructions of an implementing system. For example, a system having a processor and a memory therein may execute instructions to cause the scheduling service to execute the functions and instructions of the compute resource discovery engine, a scheduler 3160, and a workload discovery engine 3165 to carry out functions as set forth herein.

Further depicted is now a watchdog ROI engine 3195, which constantly evaluates all running jobs and if a running job is evaluated by the watchdog and determined to have an ROI below a threshold then the watchdog will issue the termination instructions to terminate the executing and currently running workload.

Each of the compute resource discovery engine, the scheduler 3160, the workload discovery engine 3165, and the watchdog ROI engine 3195 are not only connected with a system's processor and memory to control and perform execution of their respective functions, but additionally are communicably interfaced (e.g., via an Input/Output (TO) system bus) with the local cache 2225 which provides a "local view" to the scheduler.

Consider the example, where the workload is executing tests and searching for test failures and identify who caused those test failures. In the event that a workload completes execution and indicates that testing is already passing, then there is no longer value in executing the other tests seeking to determine if the testing will pass, given that a later received workload or a different workload has already provided the desired conclusion. Consequently, the watchdog ROI engine 3195 may be configured to review the SLT associated with the workload type executing the testing workload and then terminate all pending or canceled workloads once the successful test pass has been attained.

Consider further workload which is building artifacts. If there are multiple workloads associated with building an artifact and one of them fails, then it is no longer worthwhile to execute the other workloads since a single failure will invalidate the entire artifact, and thus, the watchdog ROI engine 3195 may be configured to terminate the still pending or currently executing workloads associated with building that artifact on the basis that ROI for those workloads is zero, as they will be unusable.

According to another embodiment, the scheduling service may be configured to not pick up work for execution on the basis of cost. For example, a workload with 1000's of tests may utilize timeouts, such as 30 seconds, but each test runs very quickly when passing. However, if a bad code submission is received or a bad change list is being processed, then many of the tests or even every test may fail, thus causing every test to wait for its timeout which is much more CPU intensive and costly in terms of time and dollars as the workload must wait for every failing test to reach its timeout. Thus, while passing tests may take a second each, and thus 1000 seconds total (approximately 16 minutes total), a workload having 1000 failing tests, each of which must wait 30 seconds, results in a total processing time of approximately 8 hours, which will incur a much larger dollar cost or compute resource consumption cost than is anticipated for such a workload. Therefore, the watchdog ROI engine 3195 which is analyzing currently executing workloads may perform its ROI analysis on the workload having the failing tests and affirmatively kill or terminate the execution to save cost and compute resource. Thus, where a catastrophic failure is identified by the watchdog ROI engine 3195, such a finding may dictate termination of the workload rather than permitting the workload to execute. By cutting the losses short for such a workload it is known already that there is a catastrophic failure and spending dollars to complete the remaining failing tests will not likely yield additional informational data points for the cost incurred, thus negating any potential ROI for the workload.

By way of clarification, the plan phase is utilized to make the decision not to schedule a new or pending, but not yet executing, workload based on ROI. Conversely, the watchdog ROI engine 3195 is utilized to determine if a presently executing workload remains valuable and can terminate an executing workload if the ROI has changed or if the workload has become worthless.

According to one embodiment, the watchdog ROI engine 3195 evaluates that an executing workload is worthless, the workload will be terminated, however, the watchdog ROI engine 3195 will also evaluate already invested cost in an executing workload and the remaining cost to complete the workload and if the workload is very low value, but not worthless, then the watchdog ROI engine 3195 will perform ROI that considers the remaining cost to obtain an additional data point. For example, if a workload is failing and has cost $0.90 USD and now has very low value, but there is a 2% chance of getting a new data point for the failure mode by completing the workload which will cost $1.00 USD total, then the watchdog ROI engine 3195 may determine that the additional $0.10 USD cost is worthwhile.

Figure 32A:
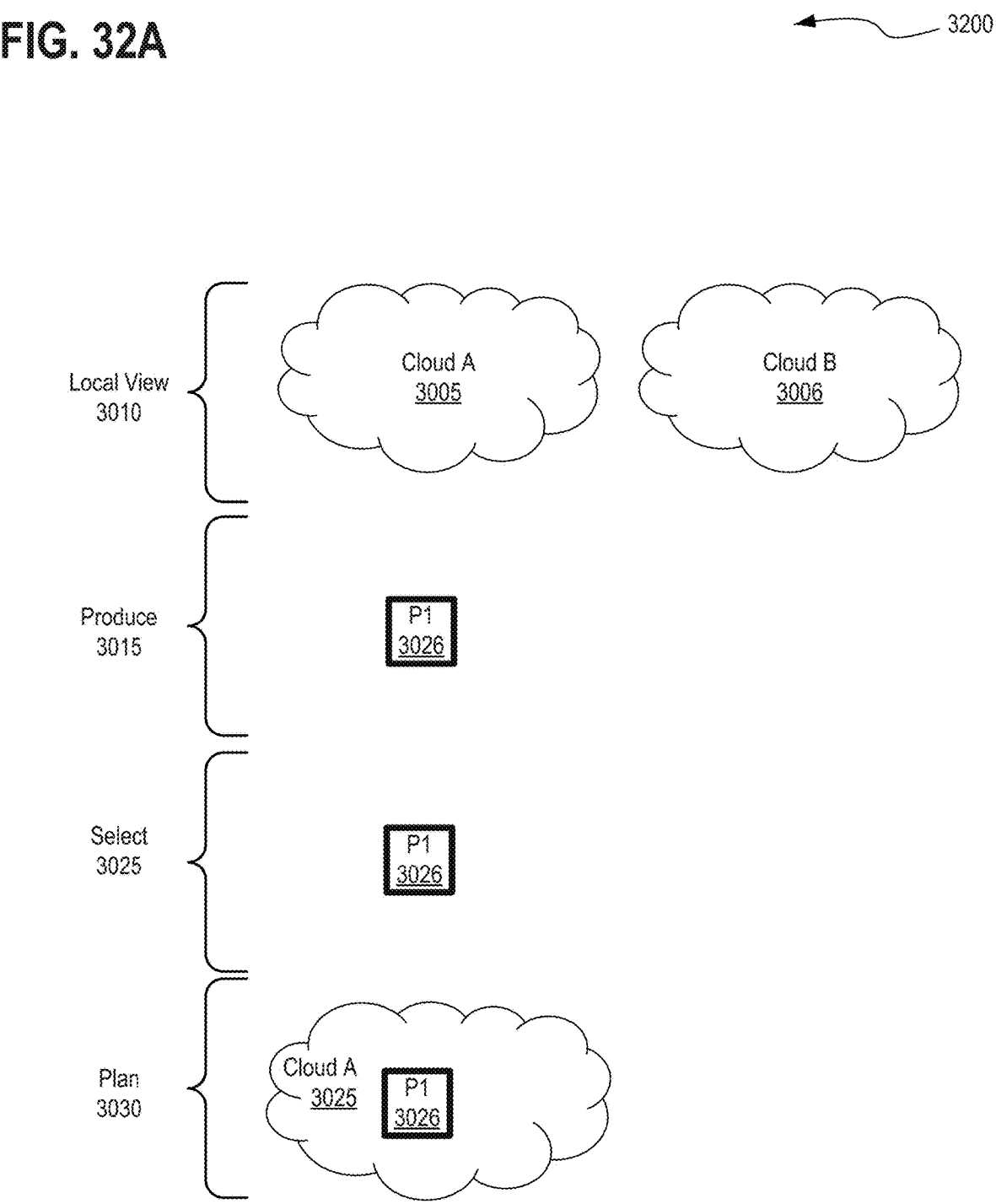
FIG. 32A and FIG. 32B depict an exemplary scheduler and workload manager process 3200 and 3201 with workload re-execution functionality for bad execution runs, in accordance with described embodiments.
Figure 32B:
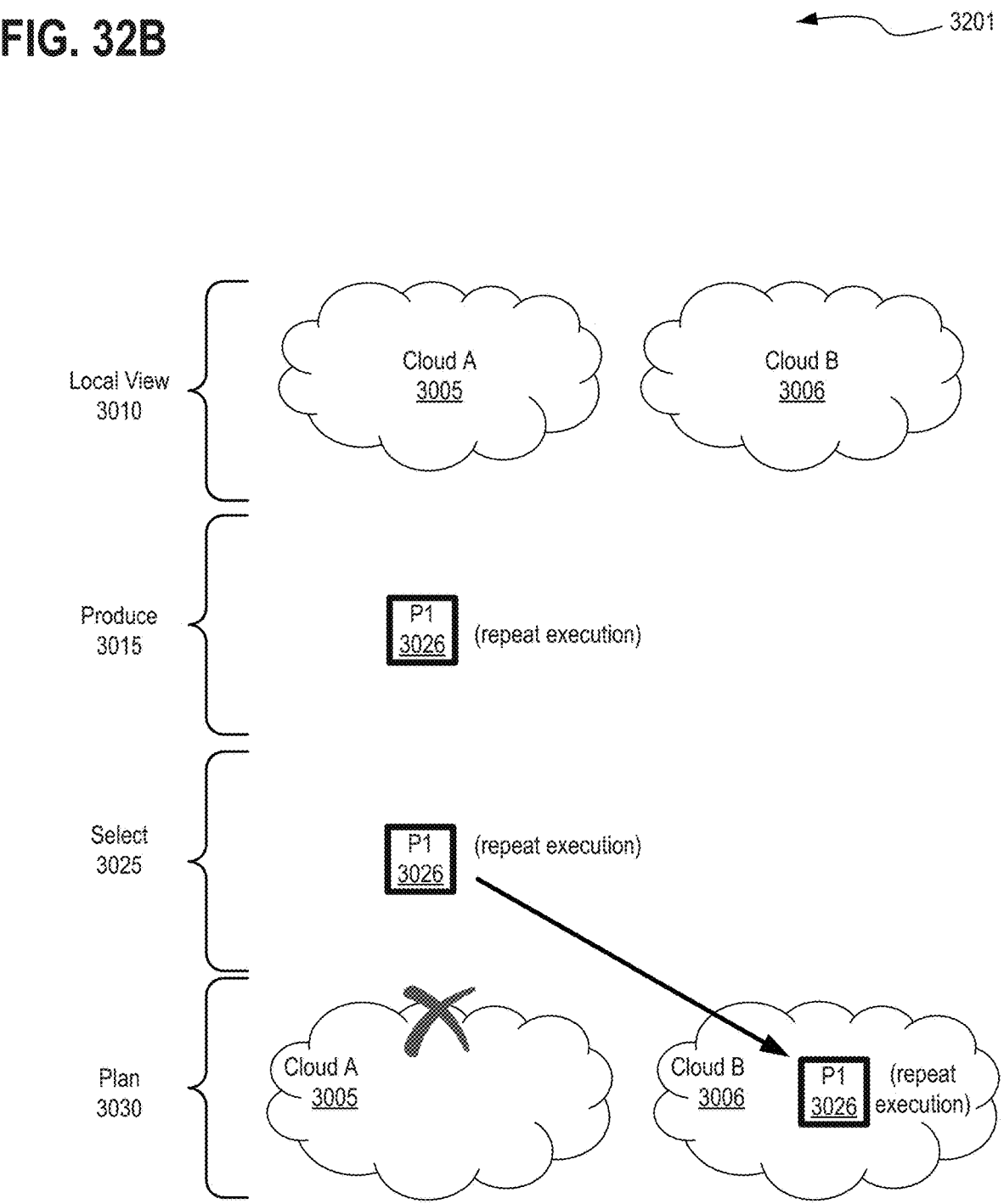

FIG. 32A and FIG. 32B depict an exemplary scheduler and workload manager process 3200 and 3201 with workload re-execution functionality for bad execution runs, in accordance with described embodiments.

The scheduler performs work on a piece of compute by processing a particular workload. Unfortunately, sometimes the workload ends up in a bad situation either during execution for a long running workload or after completion, and the additional processing and additional compute of that workload, if still running, is not helping, thus simply producing bad or sub-par results from the workload. Therefore, a monitor is utilized to detect the bad scenario and to evaluate during execution or after the output is received that the results are not of sufficient quality. The scheduling service will therefore abandon the executing workload by terminating it or abandon the results for the completed workload and re-run the workload using a different cloud and possibly a different execution environment to generate a high-quality or acceptable result for the re-executed workload.

For example, a "producer" or "produce" phase 3015 decides what work that needs to be performed and is extended, via the producer phase, to also check for quality of work that may have been performed, and when necessary, reschedule a job if the work wasn't performed to satisfaction under acceptable conditions. An unsatisfactory result typically takes into account cloud specific conditions and infrastructure related issues that may have been observed during the execution that the scheduler can take into account when requesting a rescheduling of the workload task on another infrastructure for the sake of quality improvement or verification.

Consider for example, there are depicted two clouds, cloud A 3005 and cloud B 3006 as depicted here at FIG. 32A within the local view 3010, each of which may perform the potential workload task. In the first iteration of a scheduler heartbeat, the scheduler selects 3025 workload P1 3026 for execution and plans 3030 and schedules workload P1 3026 for execution on Cloud A.

Upon completion and analysis of the workload P1 performed, a subsequent iteration of the scheduling heartbeat, the scheduler's producer phase determines that the work performed was completed with sub-par quality based on results and output of workload P1 and based further on other monitoring information provided from Cloud A.

Consequently, the producer will generate a repeat of the sub-par completed workload P1, with specified requirements to run the repeat of the workload P1 on a different cloud.

As is depicted here at FIG. 32B, the local view 3010 includes both clouds and the produce phase 3015 produces workload P1 3026 for repeat execution and the workload P1 is selected for execution. At the plan phase 3030, due to the requirement to re-run workload P1 on a different cloud, the plan phase will not consider cloud A 3006 and instead plans and schedules the workload P1's repeat execution on cloud B 3006.

According to such embodiments, the execution of workloads depends on external services in many instances and sometimes those external service experience failures or outages. When such service outages or service failures occur, the scheduling service often learns about the service outage after the fact, and after execution of the workload P1 has already started, or potentially after the workload P1 has started and completed, resulting in the execution of workload P1 generating and outputting bad, poor quality, or sub-par results.

Therefore, according to one embodiment, the scheduler is extended to look for, monitor, and discover the health of external services and when service outages are identified or when degradation of performance for such external services is identified, the scheduler will look for and identify all workloads executed utilizing those external services or workloads which are still executing utilizing those external services.

Depending on the priority level and SLT, the scheduling service will identify the workloads that were negatively affected by their dependency upon the external services that experienced a failure or an outage and the scheduling service will then re-schedule those workload for repeated execution in an attempt to generate high quality and correct execution results. If the SLT defines a workload is a low priority or defines that based on budget, quality of results does not require repeated execution on failure, then such workloads may not be repeated.

In other embodiments, where there is constrained compute capacity and availability, the scheduling service may limit which workloads may be repeated. For example, based on known workloads having executed while dependent on a service that experienced an outage, it is known that the workload will have produced "dirty" or potentially sub-par results due to the outage, and therefore, the scheduler will proactively identify and then re-run those workloads to obtain the expected high quality results.

Similarly, if there is hardware failure, such as a bad hard drive on a particular work server, then again the scheduling service can search for and identify all workloads executed or still executing utilizing that work server affected by the hardware failure and then cause those workloads to be repeated to obtain high quality results.

According to another embodiment, there is a monitor operating for each workload executing via any one of the compute resources and based on the monitoring, and based on historical data, it is known that anytime a particular log-line is observed from any one of these monitors, it is known that an outage or a failure mode has occurred and therefore the scheduler may responsively terminate that executing workload and re-schedule the workload on a new piece of hardware or in a different compute cloud, such as shifting from cloud A to cloud B, or even require that the repeated execution be scheduled on a different compute footprint entirely.

According to such embodiments, a workload that is re-scheduled for execution may be required to be executed on a different compute footprint by the scheduler for the sake of mitigating the risk of repeated bad results or repeated sub-par results. For example, the scheduler may send the repeated execution of the workload to a compute footprint optimized for CPU bandwidth and another copy optimized for GPU bandwidth or scheduling a copy with a compute footprint optimized for I/O or scheduling a copy with a compute footprint optimized for memory, or scheduling a copy with a compute footprint which utilizes AMD CPU architecture or scheduling a copy with a compute footprint which utilizes Intel CPU architecture or scheduling a copy with a compute footprint which utilizes a larger VM or a smaller VM or scheduling a copy with a compute footprint which utilizes different operating systems, or scheduling a copy with a compute footprint utilizing 8 core CPUs or 4 core CPUs, etc.

According to such embodiments, a workload that is still executing and killed will be marked in the local cache to indicate that the workload produced bad results and consequently the scheduler will pick the workload up again for a repeated execution. A workload that has finished may be analyzed and marked as having completed with bad results when the scheduling service searches for workloads affected by a service outage or fault, and thus, the scheduler will again pick that workload up for a repeated execution. According to a related embodiment, as soon as the scheduler marks a workload or workload results as unsatisfactory, the watchdog ROI engine will actively seek out any execution associated with such a workload and terminate the execution so as to save compute resource and to allow the associated workload to be picked up for repeated execution on a subsequent scheduling service heartbeat.

The scheduling service may further seek to reduce the risk of producing bad results from the repeated execution and therefore the scheduler will decide to execute the workload on a different cloud that has been more stable, even when the service outage has ended or in the instance of the external service dependency having since been restored, the scheduling service may nevertheless migrate the workload execution to the different cloud to avoid repeating the same problem. Similarly, a workload that fails due to hardware constraints, for example, exhausting memory and triggering performance problems or triggering a failure, may cause the scheduling service to react to the failure condition, such as an "out of memory" error and move the repeated execution of the workload to a larger VM with, for example, more available memory. In such embodiments, the local cache is updated to indicate the poor quality results for an executing or completed workload and where a failure condition is known (based on logs or error messages), the scheduler will reschedule the workload based further in consideration of the information in the local cache, including the failure condition if known.

For instance, a particular workload may have been repeated 6x times and failed 6x times, each time triggering an error for an "out of memory" error. The scheduler will therefore analyze this information and in certain embodiments, reschedule the workload for execution on a VM or a compute cloud which provides an increased memory capacity in comparison to where the workload previously executed.

According to another embodiment, a monitor for the scheduling service will continuously analyze all executing workloads currently in flight and analyze them for errors, failures, or poor quality results, and when found, the scheduling service will terminate the identified workload, mark it in the local cache with unsatisfactory results, and then pick up the workload again for a repeated execution on a different cloud or in a different compute environment.

For example, consider a distributed workload which has been split into 10x workload sub-parts. In almost all cases, the monitor will identify that 10x sub-parts are expected and 10x sub-parts are executing, and that all 10x parts are executing correctly. However, the monitor may discover that 10x workload sub-parts are expected and 8x workload sub-parts are executing. The scheduling service will therefore identify the missing workload-subparts and initiate execution of them on a subsequent scheduling heartbeat or if they cannot be identified or if other problems exist, then the distributable workload will be terminated and all associated workload sub-parts will be terminated and the distributed workload will be marked with unsatisfactory results and the scheduling service will then, via the produce, select, and plan phases, schedule the distributed workload for repeated execution within a different cloud or a different compute environment or a different compute footprint.

One of the expected behavior of a third party service is to throw an exception indicating that a bad call was made and this is an expected result and an acceptable result if the workload is testing a code change, because it will be assumed that the code change had a bug which resulted in that exception being thrown. Such a workload will therefore be assumed to have completed successfully. However, for executed workloads that ran to completion without discovering any issues, it is possible that later a suspicion arises that the workload in question may have completed based on bad conditions. For example, if there is an outage later discovered between the hours of Noon and 4:00 pm for an external service, during which time that particular workload executed and upon which that workload depended, despite the workload previously assumed to have completed successfully, now may be looked at with suspicion. The scheduling service may therefore mark the results as unsatisfactory and therefore on a subsequent scheduling heartbeat iteration, the scheduling service will pick up the workload again for a repeated execution via a different computing environment.

However, if the external service upon which the workload depends had an outage during a time that does not overlap with the execution of the workload, then such a workload will not be marked with unsatisfactory results and will therefore not be scheduled for a repeated execution.

According to certain embodiments, there is a monitor implemented by the scheduling service to monitor the variously available external services upon which any of the workload tasks may depend, with such a monitor reporting health problems, service outages, performance degradation of the external services outage condition and failure condition time frames and time durations for the external services, and general state and status for the external services. The monitor writes updates to the information in the local cache representing the state and health of the monitored external services so that the scheduling service may analyze the information and look for potential problems with external services which could potential cause unsatisfactory results of the executed or executing workload tasks managed by the scheduling service. For example, the external services monitor 3185 as depicted at FIG. 31 provides such a service in accordance with such embodiments. In other embodiments, there is a unique external services monitor for every one of the various external services available to and in support of execution of the workload tasks.

While the host organization and the scheduling service controls the execution of the workloads, most aspects of the workload are outside of the control of the scheduling service and therefore, the scheduling service provides such capabilities to aid in the best possible and most assured quality execution of such workload tasks. For example, the workload is constantly changing, and the external services upon which the workloads depend are outside of the control of the scheduling service and even the quality of the work that is being executed is outside of the control of the scheduling service. The system therefore helps the customers and users to catch the various problems that arise with execution of their workloads through practice of the embodiments described herein.

FIG. 33 depicts a flow diagram illustrating a method 3300 for implementing a scheduler and workload manager that identifies and optimizes horizontally scalable workloads supported by a processor and a memory to execute such functionality. Method 3300 may be performed by processing logic that may include hardware (e.g., circuitry, dedicated logic, programmable logic, microcode, etc.), software (e.g., instructions run on a processing device) to perform various operations such as executing, identifying, defining, terminating, evicting, scheduling, producing, creating, selecting, planning, assigning, receiving, generating, maintaining, returning, presenting, interfacing, communicating, transmitting, querying, processing, providing, determining, triggering, displaying, updating, sending, etc., in pursuance of the systems and methods as described herein. For example, the hosted computing environment 331, the scheduling service 145, and its scheduler 125 and discovery engine(s) 192 as depicted at FIG. 1, and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 3300 depicted at FIG. 33, at block 3305, processing logic allocates a cache within the memory of the system to store information on behalf of a compute resource discovery engine and a workload discovery engine and a scheduler.

At block 3310, processing logic identifies, via the compute resource discovery engine, a plurality of computing resources available to execute workload tasks and updating the cache specifying the identified computing resources.

At block 3315, processing logic identifies, via the workload discovery engine, pending workload tasks to be scheduled for execution from one or more workload queues and updating the cache with the identified workload tasks.

At block 3320, processing logic executes a scheduler via the processor of the system, wherein the scheduler performs at least the following operations:

At block 3325, processing logic retrieves information from the cache specifying the one or more computing resources available to execute workload tasks and specifying the plurality of workload tasks to be scheduled for execution.

At block 3330, processing logic determines a first one of the pending workload tasks is a non-distributable workload and cannot be split into sub-parts and further determining a second one of the pending workload tasks is a distributable workload and responsively splitting the distributable workload into multiple workload sub-parts.

At block 3335, processing logic schedules the non-distributable workload for execution within a single one of the plurality of computing resources and scheduling the multiple workload sub-parts of the distributable workload on two or more of the plurality of computing resources.

It is therefore in accordance with the described embodiments that, there described and claimed: 1. A method performed by a system having at least a processor and a memory therein, wherein the method comprises: allocating a cache within the memory of the system to store information on behalf of a compute resource discovery engine and a workload discovery engine and a scheduler; identifying, via the compute resource discovery engine, a plurality of computing resources available to execute workload tasks and updating the cache specifying the identified computing resources; identifying, via the workload discovery engine, pending workload tasks to be scheduled for execution from one or more workload queues and updating the cache with the identified workload tasks; and executing a scheduler via the processor of the system, wherein the scheduler performs at least the following operations: retrieving information from the cache specifying the one or more computing resources available to execute workload tasks and specifying the plurality of workload tasks to be scheduled for execution; determining a first one of the pending workload tasks is a non-distributable workload and cannot be split into sub-parts and further determining a second one of the pending workload tasks is a distributable workload and responsively splitting the distributable workload into multiple workload sub-parts; and scheduling the non-distributable workload for execution within a single one of the plurality of computing resources and scheduling the multiple workload sub-parts of the distributable workload on two or more of the plurality of computing resources. 2. The method of claim 1: wherein the non-distributable workload comprises compiling source code into an executable binary; and wherein the distributable workload comprises execution of multiple pre-defined tests against one or more of a browser, a code change submission, an application, or an operating system, wherein each of the pre-defined tests are executable independent of each other. 3. The method of claim 1, wherein splitting the distributable workload into multiple workload sub-parts comprises splitting the distributable workload based a specified QoS of the distributable workload as specified by Service Level Targets (SLTs) defining at least, a completion time and permissible resource usage. 4. The method of claim 1, wherein executing the scheduler via the processor of the system comprises executing a produce phase to: identify all workloads required to be scheduled for execution by the service; dynamically recognize if any of the workloads are horizontally scalable by dividing or splitting any of the workloads into smaller sub-parts; and determining if distributing any of the workloads will permit the workload to achieve a service level target or execute in less time or yield increased quality results. 5. The method of claim 1, wherein scheduling the multiple workload sub-parts of the distributable workload on two or more of the plurality of computing resources comprises: scheduling every one of the multiple workload sub-parts of the distributable workload on distinct Virtual Machines (VMs); and wherein each of the distinct VMs execute a respective one of the multiple workload sub-parts to completion in parallel. 6. The method of claim 1, wherein scheduling the multiple workload sub-parts of the distributable workload on two or more of the plurality of computing resources comprises: scheduling the non-distributable workload for execution on a first compute resource; backfilling excess compute resource capacity on the first compute resource by scheduling a portion of the multiple workload sub-parts for execution on the first compute resource with the non-distributable workload. scheduling a remaining portion of the multiple workload sub-parts for execution on a second compute resource. 7. The method of claim 1, wherein scheduling the multiple workload sub-parts of the distributable workload on two or more of the plurality of computing resources comprises: scheduling the multiple workload sub-parts of the distributable workload to execute in parallel via a corresponding quantity of compute resources to reduce a total execution time of the distributable workload while increasing an overhead cost of executing the distributable workload. 8. The method of claim 1, wherein splitting the distributable workload into multiple workload sub-parts, comprises: analyzing an efficiency of distribution for the distributable workload to balance increased overhead costs associated with splitting and distributing the distributable workload versus time efficiency gains associated with splitting and distributing the distributable workload for execution via multiple compute resources. 9. The method of claim 1, wherein splitting the distributable workload into multiple workload sub-parts, comprises: determining a quantity of distribution with sufficient execution parallelism of the many sub-parts the distributable workload to reduce a total time of execution of the distributable workload below a threshold in compliance with an SLT or QoS objective for the distributable workload. 10. The method of claim 1, wherein splitting the distributable workload into multiple workload sub-parts, comprises: determining a permissible range of distribution for the distributable workload; calculating an efficiency of distribution value for every possible distribution value within the permissible range of distribution; and determining a distribution quantity based on which of the calculated efficiency of distribution values is either optimal or by selecting one of the calculated efficiency of distribution values which exceeds an efficiency threshold. 11. The method of claim 10: wherein calculating the efficiency of distribution divides a total overhead attributable in aggregate to all of the multiple workload sub-parts for a given distribution value divided by useful work performed in fulfillment of the distributable workload. 12. The method of claim 1, wherein splitting the distributable workload into multiple workload sub-parts, comprises: determining a permissible range of distribution for the distributable workload; wherein the permissible range of distribution defines how many sub-parts the distributable workload may be fragmented into and is determined by: configuration by a user; configuration by an administrator; or dynamically determined by the scheduler based on one or more of (i) available compute resources, (ii) expected or known overhead associated with each additional workload sub-part, (iii) or SLT objectives for the distributable workload. 13. The method of claim 1, wherein scheduling the multiple workload sub-parts of the distributable workload on two or more of the plurality of computing resources comprises: scheduling a first portion of the multiple workload sub-parts for execution during a first scheduler heartbeat iteration and leaving a remaining portion unscheduled; scheduling the remaining portion of the multiple workload sub-parts for execution during a second or subsequent heartbeat iteration; and aggregating results associated with each of the multiple workload sub-parts after scheduling and execution completes for all of the multiple workload sub-parts of the distributable workload. 14. The method of claim 1, wherein scheduling the multiple workload sub-parts of the distributable workload on two or more of the plurality of computing resources comprises: scheduling a first portion of the multiple workload sub-parts for execution internally with a private datacenter within which the system operates; scheduling a remaining portion of the multiple workload sub-parts for execution with a third party public compute cloud; and aggregating results associated with each of the multiple workload sub-parts after scheduling and execution completes for all of the multiple workload sub-parts of the distributable workload. 15. The method of claim 1, wherein executing the scheduler via the processor of the system comprises the scheduler to perform at least the following additional operations: producing a list of the workload tasks to be executed based on the information retrieved from the cache; computing available compute capacity to execute workload tasks at each of the one or more computing resources based on the information retrieved from the cache; selecting the distributable workload and the non-distributable workload for execution via the one or more computing resources based on the information retrieved from the cache; and planning execution of the selected distributable workload and non-distributable workload by scheduling the distributable workload and at least a portion of the multiple distributable workload sub-parts with the one or more computing resources based on the computed available capacity to execute workload tasks at each of the one or more computing resources. 16. The method of claim 15, wherein the scheduler to further perform at least the following additional operations: initiating execution of the selected distributable workload and the selected portion of the multiple distributable workload sub-parts at the one or more computing resources pursuant to the planned execution; and removing from the list of the workload tasks to be executed as represented at the cache any distributable workload or workload sub-parts for which execution is initiated. 17. The method of claim 1: wherein the system operates an external cloud interface to communicatively link the system with one or more third-party private and/or public computing clouds via a public Internet; and wherein identifying the plurality of computing resources available to execute workload tasks and updating the cache specifying the identified computing resources, comprises: the compute resource discovery engine to autonomously discover any one of: one or more third-party compute clouds accessible to the scheduler; one or more private on-demand compute clouds accessible to the scheduler; one or more public on-demand compute clouds accessible to the scheduler; one or more computing pods within a local host organization within which a scheduling service of the system operates when the one or more computing pods are accessible to the scheduler; one or more remote computing pods within a remote host organization separate from the local host organization within which the scheduling service operates when the one or more remote computing pods are accessible to the scheduling service through the remote host organization; an OpenStack computing cloud accessible to the scheduler; a VMWare computing cloud accessible to the scheduler; an Amazon Web Services (AWS) public computing cloud accessible to the scheduler; a Microsoft Azure public computing cloud accessible to the scheduler; an AWS Direct Connect privately leased computing space accessible to the scheduler; and an Azure ExpressRoute privately leased computing space accessible to the scheduler. 18. The method of claim 1, wherein the system comprises a multi-tenant database system having customer data stored therein for a plurality of distinct customer organizations; wherein each customer organization is an entity selected from the group consisting of: a separate and distinct remote organization, an organizational group within the host organization, a business partner of the host organization, or a customer organization that subscribes to cloud computing services provided by the host organization; wherein the system operates at a host organization as a cloud-based service provider to the plurality of distinct customer organizations; and wherein the cloud-based service provider receives inputs from the plurality of distinct customer organizations to schedule workload tasks for execution the plurality of computing resources. 19. Non-transitory computer readable storage media having instructions stored thereupon that, when executed by a system having at least a processor and a memory therein, the instructions cause the system to perform operations including: allocating a cache within the memory of the system to store information on behalf of a compute resource discovery engine and a workload discovery engine and a scheduler; identifying, via the compute resource discovery engine, a plurality of computing resources available to execute workload tasks and updating the cache specifying the identified computing resources; identifying, via the workload discovery engine, pending workload tasks to be scheduled for execution from one or more workload queues and updating the cache with the identified workload tasks; and executing a scheduler via the processor of the system, wherein the scheduler performs at least the following operations: retrieving information from the cache specifying the one or more computing resources available to execute workload tasks and specifying the plurality of workload tasks to be scheduled for execution; determining a first one of the pending workload tasks is a non-distributable workload and cannot be split into sub-parts and further determining a second one of the pending workload tasks is a distributable workload and responsively splitting the distributable workload into multiple workload sub-parts; and scheduling the non-distributable workload for execution within a single one of the plurality of computing resources and scheduling the multiple workload sub-parts of the distributable workload on two or more of the plurality of computing resources. 20. The non-transitory computer readable storage media of claim 19, wherein splitting the distributable workload into multiple workload sub-parts comprises: splitting the distributable workload based a specified QoS of the distributable workload as specified by Service Level Targets (SLTs) defining at least, a completion time and permissible resource usage. 21. The non-transitory computer readable storage media of claim 19, wherein splitting the distributable workload into multiple workload sub-parts, comprises: determining a permissible range of distribution for the distributable workload; calculating an efficiency of distribution value for every possible distribution value within the permissible range of distribution; determining a distribution quantity based on which of the calculated efficiency of distribution values is either optimal or by selecting one of the calculated efficiency of distribution values which exceeds an efficiency threshold; and wherein calculating the efficiency of distribution divides a total overhead attributable in aggregate to all of the multiple workload sub-parts for a given distribution value divided by useful work performed in fulfillment of the distributable workload. 22. A system to implement a scheduling service, wherein the system comprises: a processor and a memory to execute instructions at the system; a cache allocated within the memory of the system to store information on behalf of a compute resource discovery engine and a workload discovery engine and a scheduler; wherein the compute resource discovery engine is to identify a plurality of computing resources available to execute workload tasks and update the cache specifying the identified computing resources; wherein the workload discovery engine is to identify pending workload tasks to be scheduled for execution from one or more workload queues and update the cache with the identified workload tasks; and wherein the scheduler is to retrieve information from the cache specifying the one or more computing resources available to execute workload tasks and specifying the plurality of workload tasks to be scheduled for execution; wherein the scheduler is further to determine a first one of the pending workload tasks is a non-distributable workload and cannot be split into sub-parts and further is to determine a second one of the pending workload tasks is a distributable workload and responsively split the distributable workload into multiple workload sub-parts; and wherein the scheduler is to schedule the non-distributable workload for execution within a single one of the plurality of computing resources and schedule the multiple workload sub-parts of the distributable workload on two or more of the plurality of computing resources. 23. The system of claim 22, wherein the scheduler to split the distributable workload into multiple workload sub-parts comprises: the scheduler splitting the distributable workload based a specified QoS of the distributable workload as specified by Service Level Targets (SLTs) defining at least, a completion time and permissible resource usage. 24. The system of claim 22, wherein the scheduler to split the distributable workload into multiple workload sub-parts, comprises the scheduler: determining a permissible range of distribution for the distributable workload; calculating an efficiency of distribution value for every possible distribution value within the permissible range of distribution; determining a distribution quantity based on which of the calculated efficiency of distribution values is either optimal or by selecting one of the calculated efficiency of distribution values which exceeds an efficiency threshold; and wherein calculating the efficiency of distribution divides a total overhead attributable in aggregate to all of the multiple workload sub-parts for a given distribution value divided by useful work performed in fulfillment of the distributable workload.

FIG. 34 depicts a flow diagram illustrating a method 3400 for implementing a scheduler and workload manager with snapshot and resume functionality supported by a processor and a memory to execute such functionality. Method 3400 may be performed by processing logic that may include hardware (e.g., circuitry, dedicated logic, programmable logic, microcode, etc.), software (e.g., instructions run on a processing device) to perform various operations such as executing, identifying, defining, terminating, evicting, scheduling, producing, creating, selecting, planning, assigning, receiving, generating, maintaining, returning, presenting, interfacing, communicating, transmitting, querying, processing, providing, determining, triggering, displaying, updating, sending, etc., in pursuance of the systems and methods as described herein. For example, the hosted computing environment 341, the scheduling service 145, and its scheduler 125 and discovery engine(s) 192 as depicted at FIG. 1, and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 3400 depicted at FIG. 34, at block 3405, processing logic allocates a cache within the memory of the system to store information on behalf of a compute resource discovery engine and a workload discovery engine and a scheduler.

At block 3410, processing logic identifies, via the compute resource discovery engine, a plurality of computing resources available to execute workload tasks and updating the cache specifying the identified computing resources.

At block 3415, processing logic identifies, via the workload discovery engine, pending workload tasks to be scheduled for execution from one or more workload queues and updating the cache with the identified workload tasks.

At block 3420, processing logic executes a scheduler via the processor of the system, wherein the scheduler performs at least the following operations:

At block 3425, processing logic retrieves information from the cache specifying the one or more computing resources available to execute workload tasks and specifying the plurality of workload tasks to be scheduled for execution.

At block 3430, processing logic determines, based on the information from the cache, that a sub-set of the plurality workload tasks are serviceable by identical snapshots of a provisioned computing resource and initiates a snapshotting process to generate a snapshot of the provisioned computing resource and force delaying the sub-set of the plurality workload tasks until the snapshot is complete.

At block 3435, processing logic schedules each of the sub-set of the plurality workload tasks for execution on a different computing resource utilizing replicated copies of the completed snapshot.

It is therefore in accordance with the described embodiments that, there described and claimed: 1. A method performed by a system having at least a processor and a memory therein, wherein the method comprises: allocating a cache within the memory of the system to store information on behalf of a compute resource discovery engine and a workload discovery engine and a scheduler; identifying, via the compute resource discovery engine, a plurality of computing resources available to execute workload tasks and updating the cache specifying the identified computing resources; identifying, via the workload discovery engine, pending workload tasks to be scheduled for execution from one or more workload queues and updating the cache with the identified workload tasks; and executing a scheduler via the processor of the system, wherein the scheduler performs at least the following operations: retrieving information from the cache specifying the one or more computing resources available to execute workload tasks and specifying the plurality of workload tasks to be scheduled for execution; determining, based on the information from the cache, that a sub-set of the plurality workload tasks are serviceable by identical snapshots of a provisioned computing resource; initiating a snapshotting process to generate a snapshot of the provisioned computing resource and force delaying the sub-set of the plurality workload tasks until the snapshot is complete; and scheduling each of the sub-set of the plurality workload tasks for execution on a different computing resource utilizing replicated copies of the completed snapshot. 2. The method of claim 1, wherein the snapshot embodies one of: an immutable binary image to restore a computing resource to an identical state of the provisioned computing resource; a container having information represented therein to restore a computing resource to an identical state of the provisioned computing resource; a Virtual Machine (VM) snapshot having a configured operating system state and configuration for the provisioned computing resource wholly represented therein; and a Docker compatible image having all libraries and dependences of the provisioned computing resource wholly represented therein. 3. The method of claim 1, further comprising: continuing scheduling and execution of pending workload tasks which are not part of the sub-set of the plurality workload tasks to be serviced utilizing the completed snapshot of the provisioned computing resource. 4. The method of claim 1, wherein determining that a sub-set of the plurality workload tasks are serviceable by identical snapshots of a provisioned computing resource comprises: determining that the sub-set of the plurality workload tasks share a common set of resource requirements. 5. The method of claim 1, wherein determining that a sub-set of the plurality workload tasks are serviceable by identical snapshots of a provisioned computing resource comprises: determining that the sub-set of the plurality workload tasks share a common set of physical compute hardware requirements and a common set of operating system requirements and a common set of configuration requirements and a common SLT objective for execution completion. 6. The method of claim 1, wherein initiating a snapshotting process to generate a snapshot of the provisioned computing resource comprises: provisioning the computing resource by: selecting a work server having compute hardware specifications which satisfy requirements of the sub-set of the plurality workload tasks; configuring the selected work server by installing an operating system which satisfies requirements of the sub-set of the plurality workload tasks; configuring the selected work server by installing and configuring any drivers or dependencies specified pursuant to requirements of the sub-set of the plurality workload tasks. 7. The method of claim 6, wherein the snapshotting process further comprises: capturing an image or snapshot of the provisioned computing resource; wherein the image or snapshot is loadable onto a second work server having same compute hardware requirements as the first work server to restore the state of the provisioned computing resource to the second work server, including the installed operating system and installed and configured drivers and dependencies without requiring re-installation of the operating system or the re-installation or re-configuration of the configured drivers and dependencies at the second work server. 8. The method of claim 6, wherein the snapshotting process further comprises: capturing an image or snapshot of the provisioned computing resource; replicating the captured image or snapshot to produce snapshot copies; and wherein the snapshot copies are loadable onto a plurality of Virtual Machines (VMs) to restore each of the VMs instantly to the state of the provisioned computing resource, including the installed operating system and installed and configured drivers and dependencies without requiring re-installation of the operating system or the re-installation or re-configuration of the configured drivers and dependencies on any of the plurality of VMs. 9. The method of claim 1, wherein initiating a snapshotting process to generate a snapshot of the provisioned computing resource comprises: spawning an overhead workload task to generate the snapshot of the provisioned computing resource; updating the cache with the spawned overhead workload task; scheduling, selecting, and planning execution of the overhead workload task to generate the snapshot of the provisioned computing resource based on the information in the cache; and updating the cache with information indicating availability of the snapshot upon completion of execution of the overhead workload task. 10. The method of claim 1, wherein force delaying the sub-set of the plurality workload tasks until the snapshot is complete, comprises: updating the cache with information specifying the snapshot is a resource requirement for execution of each workload task within the sub-set of the plurality workload tasks serviceable by the identical snapshots of a provisioned computing resource; and wherein the scheduler delays the sub-set of the plurality workload tasks until the snapshot is complete based on the information within the cache indicating unavailability of the snapshot until the snapshotting process completes and the cache is updated to indicate the snapshot is available as a resource. 11. The method of claim 1, further comprising: buffering at least one copy of the completed snapshot for the sub-set of the plurality workload tasks; and searching for and identifying new workload tasks pending with the scheduling service which are serviceable by either the snapshot created for the sub-set of the plurality workload tasks or by a previously buffered snapshot for different workload tasks; updating the cache with information specifying the snapshot or the previously buffered snapshot is a resource requirement for execution of the identified new workload tasks; and prioritizing execution of the identified new workload tasks and scheduling the identified new workload tasks for execution utilizing the snapshot or the previously buffered snapshot without initiating the snapshotting process or generating a new snapshot for the identified new workload tasks. 12. The method of claim 1, wherein executing the scheduler via the processor of the system comprises the scheduler to perform at least the following additional operations: producing a list of the workload tasks to be executed based on the information retrieved from the cache; computing available compute capacity to execute workload tasks at each of the one or more computing resources based on the information retrieved from the cache; selecting the sub-set of the plurality workload tasks for execution via the one or more computing resources based on the information retrieved from the cache upon after completion of the snapshotting process; and planning execution of the sub-set of the plurality workload tasks by scheduling the sub-set of the plurality workload tasks with the one or more computing resources based on the computed available capacity to execute workload tasks at each of the one or more computing resources and based further on availability of the snapshot as a resource for execution of the sub-set of the plurality workload tasks. 13. The method of claim 12, wherein the scheduler to further perform at least the following additional operations: initiating execution of the sub-set of the plurality workload tasks at the one or more computing resources pursuant to the planned execution; and removing from the list of the workload tasks to be executed as represented at the cache any of the sub-set of the plurality workload tasks for which execution is initiated. 14. The method of claim 1, further comprising: operating, from the system, an external cloud interface to communicatively link the system with one or more third-party private and/or public computing clouds via a public Internet. 15. The method of claim 1, wherein identifying the plurality of computing resources available to execute workload tasks and updating the cache specifying the identified computing resources, comprises: the compute resource discovery engine to autonomously discover any one of: one or more third-party compute clouds accessible to the scheduler; one or more private on-demand compute clouds accessible to the scheduler; one or more public on-demand compute clouds accessible to the scheduler; one or more computing pods within a local host organization within which a scheduling service of the system operates when the one or more computing pods are accessible to the scheduler; one or more remote computing pods within a remote host organization separate from the local host organization within which the scheduling service operates when the one or more remote computing pods are accessible to the scheduling service through the remote host organization; an OpenStack computing cloud accessible to the scheduler; a VMWare computing cloud accessible to the scheduler; an Amazon Web Services (AWS) public computing cloud accessible to the scheduler; a Microsoft Azure public computing cloud accessible to the scheduler; an AWS Direct Connect privately leased computing space accessible to the scheduler; and an Azure ExpressRoute privately leased computing space accessible to the scheduler. 16. The method of claim 1, wherein the system comprises a multi-tenant database system having customer data stored therein for a plurality of distinct customer organizations; wherein each customer organization is an entity selected from the group consisting of: a separate and distinct remote organization, an organizational group within the host organization, a business partner of the host organization, or a customer organization that subscribes to cloud computing services provided by the host organization; wherein the system operates at a host organization as a cloud-based service provider to the plurality of distinct customer organizations; and wherein the cloud-based service provider receives inputs from the plurality of distinct customer organizations to schedule workload tasks for execution the plurality of computing resources. 17. Non-transitory computer readable storage media having instructions stored thereupon that, when executed by a system having at least a processor and a memory therein, the instructions cause the system to perform operations including: allocating a cache within the memory of the system to store information on behalf of a compute resource discovery engine and a workload discovery engine and a scheduler; identifying, via the compute resource discovery engine, a plurality of computing resources available to execute workload tasks and updating the cache specifying the identified computing resources; identifying, via the workload discovery engine, pending workload tasks to be scheduled for execution from one or more workload queues and updating the cache with the identified workload tasks; and executing a scheduler via the processor of the system, wherein the scheduler performs at least the following operations: retrieving information from the cache specifying the one or more computing resources available to execute workload tasks and specifying the plurality of workload tasks to be scheduled for execution; determining, based on the information from the cache, that a sub-set of the plurality workload tasks are serviceable by identical snapshots of a provisioned computing resource; initiating a snapshotting process to generate a snapshot of the provisioned computing resource and force delaying the sub-set of the plurality workload tasks until the snapshot is complete; and scheduling each of the sub-set of the plurality workload tasks for execution on a different computing resource utilizing replicated copies of the completed snapshot. 18. The non-transitory computer readable storage media of claim 17, wherein the snapshot embodies one of: an immutable binary image to restore a computing resource to an identical state of the provisioned computing resource; a container having information represented therein to restore a computing resource to an identical state of the provisioned computing resource; a Virtual Machine (VM) snapshot having a configured operating system state and configuration for the provisioned computing resource wholly represented therein; and a Docker compatible image having all libraries and dependences of the provisioned computing resource wholly represented therein. 19. The non-transitory computer readable storage media of claim 17, wherein determining that a sub-set of the plurality workload tasks are serviceable by identical snapshots of a provisioned computing resource comprises: determining that the sub-set of the plurality workload tasks share a common set of physical compute hardware requirements and a common set of operating system requirements and a common set of configuration requirements and a common SLT objective for execution completion. 20. The non-transitory computer readable storage media of claim 17, wherein initiating a snapshotting process to generate a snapshot of the provisioned computing resource comprises: provisioning the computing resource by: selecting a work server having compute hardware specifications which satisfy requirements of the sub-set of the plurality workload tasks; configuring the selected work server by installing an operating system which satisfies requirements of the sub-set of the plurality workload tasks; configuring the selected work server by installing and configuring any drivers or dependencies specified pursuant to requirements of the sub-set of the plurality workload tasks; wherein the snapshotting process further comprises: capturing an image or snapshot of the provisioned computing resource; wherein the image or snapshot is loadable onto a second work server having same compute hardware requirements as the first work server to restore the state of the provisioned computing resource to the second work server, including the installed operating system and installed and configured drivers and dependencies without requiring re-installation of the operating system or the re-installation or re-configuration of the configured drivers and dependencies at the second work server. 21. A system to implement a scheduling service, wherein the system comprises: a processor and a memory to execute instructions at the system; a cache allocated within the memory of the system to store information on behalf of a compute resource discovery engine and a workload discovery engine and a scheduler; wherein the compute resource discovery engine is to identify a plurality of computing resources available to execute workload tasks and update the cache specifying the identified computing resources; wherein the workload discovery engine is to identify pending workload tasks to be scheduled for execution from one or more workload queues and update the cache with the identified workload tasks; and wherein the scheduler is to retrieve information from the cache specifying the one or more computing resources available to execute workload tasks and specifying the plurality of workload tasks to be scheduled for execution; wherein the scheduler is further to determine, based on the information from the cache, that a sub-set of the plurality workload tasks are serviceable by identical snapshots of a provisioned computing resource; wherein the scheduler is further to initiate a snapshotting process to generate a snapshot of the provisioned computing resource and force delaying the sub-set of the plurality workload tasks until the snapshot is complete; and wherein the scheduler is to schedule each of the sub-set of the plurality workload tasks for execution on a different computing resource utilizing replicated copies of the completed snapshot. 22. The system of claim 21, wherein the snapshot embodies one of: an immutable binary image to restore a computing resource to an identical state of the provisioned computing resource; a container having information represented therein to restore a computing resource to an identical state of the provisioned computing resource; a Virtual Machine (VM) snapshot having a configured operating system state and configuration for the provisioned computing resource wholly represented therein; and a Docker compatible image having all libraries and dependences of the provisioned computing resource wholly represented therein. 23. The system of claim 21, wherein determining that a sub-set of the plurality workload tasks are serviceable by identical snapshots of a provisioned computing resource comprises: determining that the sub-set of the plurality workload tasks share a common set of physical compute hardware requirements and a common set of operating system requirements and a common set of configuration requirements and a common SLT objective for execution completion.

FIG. 35 depicts a flow diagram illustrating a method 3500 for implementing a scheduler and workload manager that identifies and consumes global virtual resources supported by a processor and a memory to execute such functionality. Method 3500 may be performed by processing logic that may include hardware (e.g., circuitry, dedicated logic, programmable logic, microcode, etc.), software (e.g., instructions run on a processing device) to perform various operations such as executing, identifying, defining, terminating, evicting, scheduling, producing, creating, selecting, planning, assigning, receiving, generating, maintaining, returning, presenting, interfacing, communicating, transmitting, querying, processing, providing, determining, triggering, displaying, updating, sending, etc., in pursuance of the systems and methods as described herein. For example, the hosted computing environment 351, the scheduling service 145, and its scheduler 125 and discovery engine(s) 192 as depicted at FIG. 1, and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 3500 depicted at FIG. 35, at block 3505, processing logic allocates a cache within the memory of the system.

At block 3510, processing logic identifies, via a workload discovery engine, pending workload tasks to be scheduled for execution from one or more workload queues and updating the cache.

At block 3515, processing logic identifies, via a compute resource discovery engine, a plurality of computing resources available to execute the workload tasks and updating the cache.

At block 3520, processing logic identifies, via a virtual capacity discovery engine, a plurality of virtual resources available to the scheduler in support of executing the workload tasks and updating the cache.

At block 3525, processing logic executes a scheduler via the processor of the system, wherein the scheduler performs at least the following operations: retrieving information from the cache specifying (i) the one or more computing resources available to execute the workload tasks and (ii) the plurality of workload tasks to be scheduled for execution and (iii) the plurality of virtual resources available.

At block 3530, processing logic determines, for each of the plurality of workload tasks to be scheduled, any virtual resource requirements to execute the respective workload task and selects one of the plurality of workload tasks for execution based on both (i) a computing resource being available to execute the selected workload task and based further on (ii) a virtual resource required for execution of the selected workload task being available within the virtual resource pool.

At block 3535, processing logic schedules the selected workload task for execution with the computing resource and allocating the virtual resource exclusively to the computing resource for the duration of execution of the selected workload task.

It is therefore in accordance with the described embodiments that, there described and claimed: 1. A method performed by a system having at least a processor and a memory therein, wherein the method comprises: allocating a cache within the memory of the system; identifying, via a workload discovery engine, pending workload tasks to be scheduled for execution from one or more workload queues and updating the cache; identifying, via a compute resource discovery engine, a plurality of computing resources available to execute the workload tasks and updating the cache; identifying, via a virtual capacity discovery engine, a plurality of virtual resources available to the scheduler in support of executing the workload tasks and updating the cache; executing a scheduler via the processor of the system, wherein the scheduler performs at least the following operations: retrieving information from the cache specifying (i) the one or more computing resources available to execute the workload tasks and (ii) the plurality of workload tasks to be scheduled for execution and (iii) the plurality of virtual resources available; determining, for each of the plurality of workload tasks to be scheduled, any virtual resource requirements to execute the respective workload task; selecting one of the plurality of workload tasks for execution based on both (i) a computing resource being available to execute the selected workload task and based further on (ii) a virtual resource required for execution of the selected workload task being available within the virtual resource pool; and scheduling the selected workload task for execution with the computing resource and allocating the virtual resource exclusively to the computing resource for the duration of execution of the selected workload task. 2. The method of claim 1, wherein identifying the plurality of virtual resources available to the scheduler in support of executing workload tasks further comprises: representing the plurality of virtual resources within a virtual resource pool. 3. The method of claim 2, wherein the virtual resources within the virtual resource pool constitute global virtual resources allocatable to any of the plurality of computing resources at any connected private or public datacenter or any public or private compute cloud to which the scheduler assigns the selected workload task for execution. 4. The method of claim 2, wherein scheduling the selected workload task for execution with the computing resource, further comprises: removing the virtual resource allocated exclusively to the computing resource from the virtual resource pool to prevent any other pending workload tasks requiring the same virtual resource from being scheduled for execution while the virtual resource is removed from the virtual resource pool. 5. The method of claim 4, further comprising: returning the virtual resource to the virtual resource pool upon completion of execution of the selected workload task; and wherein the virtual resource returned to the virtual resource pool becomes available to the scheduler in support of executing any other pending workload tasks requiring the same virtual resource. 6. The method of claim 1, wherein identifying the plurality of virtual resources available to the scheduler in support of executing workload tasks further comprises: identifying a plurality of distinct virtual resource types; determining, for each of the plurality of distinct virtual resource types, a quantity of the distinct virtual resource type; and wherein the method further comprises populating a virtual resource pool with the determined quantity of virtual resources for each distinct virtual resource type. 7. The method of claim 1: wherein the virtual resource is a license from a third party vendor; wherein identifying the plurality of virtual resources available to the scheduler in support of executing workload tasks further comprises: the virtual capacity discovery engine communicating with the vendor via an API or Plug-In to retrieve from the third party vendor a current status for the license and a quantity of permissible concurrent execution licenses currently available, the virtual capacity discovery engine populating a virtual resource pool with the quantity of permissible concurrent execution licenses currently available; and wherein scheduling the selected workload task for execution comprises: the scheduler determining how many of the virtual resources are required to execute the selected workload task, and the scheduler removing the determined quantity of the virtual resources required in support of execution of the selected workload task from the virtual resource pool, the removal decrementing the available licenses in the virtual resource pool. 8. The method of claim 1, wherein the virtual resource comprises one of: a browser license from a third party vendor; an operating system license from a third party vendor; an application license from a third party vendor; a token representing spendable dollars; and an artificial license created internally to a host organization within which the system operates, wherein the artificial license is created and granted to an internal development team of the host organization to control computational resource consumption by the internal development team. 9. The method of claim 1, wherein executing the scheduler via the processor of the system comprises the scheduler to perform at least the following additional operations: producing a list of the workload tasks to be executed based on the information retrieved from the cache; calculating available compute capacity to execute workload tasks at each of the one or more computing resources based on the information retrieved from the cache; calculating available virtual resource capacity to in support of execution of the workload tasks based on the information retrieved from the cache; selecting the workload task for execution via the one or more computing resources based on the information retrieved from the cache; and planning execution of the selected workload task by scheduling the selected workload task with the one or more computing resources based on the calculated available capacity to execute workload tasks at each of the one or more computing resources and based further on the calculated virtual resource capacity in support of execution of the workload tasks. 10. The method of claim 9, wherein the scheduler to further perform at least the following additional operations: initiating execution of the selected workload task at the one or more computing resources pursuant to the planned execution; and removing from the list of the workload tasks to be executed as represented at the cache any of the pending workload tasks for which execution is initiated. 11. The method of claim 1, wherein executing the scheduler via the processor of the system comprises the scheduler to perform at least the following additional operations: planning execution of the selected workload task by exclusively allocating the virtual resource to the computing resource and removing the virtual resource from a virtual resource pool; updating the information in the cache indicating the virtual resource has been removed from the virtual resource pool; and wherein the scheduler continuously determines in-flight what virtual resources remain within the virtual resource pool during execution of any executing workload task having consumed any virtual resource from the virtual resource pool based on the information in the cache. 12. The method of claim 1, wherein allocating the cache within the memory of the system comprises: allocating the cache to store the information on behalf of the compute resource discovery engine and the workload discovery engine and the virtual capacity discovery engine and the scheduler; and wherein the scheduler interacts with the cache to update the information and to retrieve the information independent of any operation performed by any of the compute resource discovery engine and the workload discovery engine and the virtual capacity discovery engine. 13. The method of claim 12: wherein the compute resource discovery engine updates the information in the cache with the plurality of computing resources available to execute workload tasks; wherein the virtual capacity discovery engine updates the information in the cache with the plurality of virtual resources identified as being available to the scheduler in support of executing workload tasks; and wherein the workload discovery engine updates the information in the cache with the pending workload tasks identified. 14. The method of claim 1, further comprising: operating, from the system, an external cloud interface to communicatively link the system with one or more third-party private and/or public computing clouds via a public Internet. 15. The method of claim 1, wherein identifying the plurality of computing resources available to execute workload tasks and updating the cache specifying the identified computing resources, comprises: the compute resource discovery engine to autonomously discover any one of: one or more third-party compute clouds accessible to the scheduler; one or more private on-demand compute clouds accessible to the scheduler; one or more public on-demand compute clouds accessible to the scheduler; one or more computing pods within a local host organization within which a scheduling service of the system operates when the one or more computing pods are accessible to the scheduler; one or more remote computing pods within a remote host organization separate from the local host organization within which the scheduling service operates when the one or more remote computing pods are accessible to the scheduling service through the remote host organization; an OpenStack computing cloud accessible to the scheduler; a VMWare computing cloud accessible to the scheduler; an Amazon Web Services (AWS) public computing cloud accessible to the scheduler; a Microsoft Azure public computing cloud accessible to the scheduler; an AWS Direct Connect privately leased computing space accessible to the scheduler; and an Azure ExpressRoute privately leased computing space accessible to the scheduler. 16. The method of claim 1, wherein the system comprises a multi-tenant database system having customer data stored therein for a plurality of distinct customer organizations; wherein each customer organization is an entity selected from the group consisting of: a separate and distinct remote organization, an organizational group within the host organization, a business partner of the host organization, or a customer organization that subscribes to cloud computing services provided by the host organization; wherein the system operates at a host organization as a cloud-based service provider to the plurality of distinct customer organizations; and wherein the cloud-based service provider receives inputs from the plurality of distinct customer organizations to schedule workload tasks for execution the plurality of computing resources. 17. Non-transitory computer readable storage media having instructions stored thereupon that, when executed by a system having at least a processor and a memory therein, the instructions cause the system to perform operations including: allocating a cache within the memory of the system; identifying, via a workload discovery engine, pending workload tasks to be scheduled for execution from one or more workload queues and updating the cache; identifying, via a compute resource discovery engine, a plurality of computing resources available to execute the workload tasks and updating the cache; identifying, via a virtual capacity discovery engine, a plurality of virtual resources available to the scheduler in support of executing the workload tasks and updating the cache; executing a scheduler via the processor of the system, wherein the scheduler performs at least the following operations: retrieving information from the cache specifying (i) the one or more computing resources available to execute the workload tasks and (ii) the plurality of workload tasks to be scheduled for execution and (iii) the plurality of virtual resources available; determining, for each of the plurality of workload tasks to be scheduled, any virtual resource requirements to execute the respective workload task; selecting one of the plurality of workload tasks for execution based on both (i) a computing resource being available to execute the selected workload task and based further on (ii) a virtual resource required for execution of the selected workload task being available within the virtual resource pool; and scheduling the selected workload task for execution with the computing resource and allocating the virtual resource exclusively to the computing resource for the duration of execution of the selected workload task. 18. The non-transitory computer readable storage media of claim 17, wherein identifying the plurality of virtual resources available to the scheduler in support of executing workload tasks further comprises: representing the plurality of virtual resources within a virtual resource pool; wherein scheduling the selected workload task for execution with the computing resource, further comprises removing the virtual resource allocated exclusively to the computing resource from the virtual resource pool to prevent any other pending workload tasks requiring the same virtual resource from being scheduled for execution while the virtual resource is removed from the virtual resource pool; wherein the method further comprises returning the virtual resource to the virtual resource pool upon completion of execution of the selected workload task; and wherein the virtual resource returned to the virtual resource pool becomes available to the scheduler in support of executing any other pending workload tasks requiring the same virtual resource. 19. The non-transitory computer readable storage media of claim 17, wherein the instructions, when executed by the processor, cause the scheduler to perform at least the following additional operations: producing a list of the workload tasks to be executed based on the information retrieved from the cache; calculating available compute capacity to execute workload tasks at each of the one or more computing resources based on the information retrieved from the cache; calculating available virtual resource capacity to in support of execution of the workload tasks based on the information retrieved from the cache; selecting the workload task for execution via the one or more computing resources based on the information retrieved from the cache; and planning execution of the selected workload task by scheduling the selected workload task with the one or more computing resources based on the calculated available capacity to execute workload tasks at each of the one or more computing resources and based further on the calculated virtual resource capacity in support of execution of the workload tasks. 20. The non-transitory computer readable storage media of claim 19, wherein the instructions, when executed by the processor, cause the scheduler to perform at least the following additional operations: initiating execution of the selected workload task at the one or more computing resources pursuant to the planned execution; and removing from the list of the workload tasks to be executed as represented at the cache any of the pending workload tasks for which execution is initiated. 21. A system to implement a scheduling service, wherein the system comprises: a processor and a memory to execute instructions at the system; a cache allocated within the memory of the system to store information on behalf of a compute resource discovery engine and a workload discovery engine and a virtual capacity discovery engine and a scheduler; wherein the workload discovery engine is to identify pending workload tasks to be scheduled for execution from one or more workload queues and update the cache with the identified workload tasks; and wherein the compute resource discovery engine is to identify a plurality of computing resources available to execute workload tasks and update the cache specifying the identified computing resources; wherein the virtual capacity discovery engine is to identify a plurality of virtual resources available to the scheduler in support of executing the workload tasks and update the cache specifying the identified computing resources; wherein the scheduler is to retrieve information from the cache specifying (i) the one or more computing resources available to execute the workload tasks and (ii) the plurality of workload tasks to be scheduled for execution and (iii) the plurality of virtual resources available; wherein the scheduler is further to determine, for each of the plurality of workload tasks to be scheduled, any virtual resource requirements to execute the respective workload task; wherein the scheduler is further to select one of the plurality of workload tasks for execution based on both (i) a computing resource being available to execute the selected workload task and based further on (ii) a virtual resource required for execution of the selected workload task being available within the virtual resource pool; and wherein the scheduler is to schedule the selected workload task for execution with the computing resource and allocating the virtual resource exclusively to the computing resource for the duration of execution of the selected workload task. 22. The system of claim 21, wherein the scheduler performs at least the following additional operations: producing a list of the workload tasks to be executed based on the information retrieved from the cache; calculating available compute capacity to execute workload tasks at each of the one or more computing resources based on the information retrieved from the cache; calculating available virtual resource capacity to in support of execution of the workload tasks based on the information retrieved from the cache; selecting the workload task for execution via the one or more computing resources based on the information retrieved from the cache; and planning execution of the selected workload task by scheduling the selected workload task with the one or more computing resources based on the calculated available capacity to execute workload tasks at each of the one or more computing resources and based further on the calculated virtual resource capacity in support of execution of the workload tasks. 23. The system of claim 22, wherein the scheduler performs at least the following additional operations: initiating execution of the selected workload task at the one or more computing resources pursuant to the planned execution; and removing from the list of the workload tasks to be executed as represented at the cache any of the pending workload tasks for which execution is initiated.

FIG. 36 depicts a flow diagram illustrating a method 3600 for implementing a scheduler and workload manager with scheduling redundancy and site fault isolation supported by a processor and a memory to execute such functionality. Method 3600 may be performed by processing logic that may include hardware (e.g., circuitry, dedicated logic, programmable logic, microcode, etc.), software (e.g., instructions run on a processing device) to perform various operations such as executing, identifying, defining, terminating, evicting, scheduling, producing, creating, selecting, planning, assigning, receiving, generating, maintaining, returning, presenting, interfacing, communicating, transmitting, querying, processing, providing, determining, triggering, displaying, updating, sending, etc., in pursuance of the systems and methods as described herein. For example, the hosted computing environment 361, the scheduling service 145, and its scheduler 125 and discovery engine(s) 192 as depicted at FIG. 1, and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 3600 depicted at FIG. 36, at block 3605, processing logic allocates a cache within the memory of the system.

At block 3610, processing logic identifies, via a workload discovery engine, pending workload tasks to be scheduled for execution from one or more workload queues and updating the cache.

At block 3615, processing logic identifies, via a compute resource discovery engine, a plurality of computing resources available to execute the workload tasks and updating the cache.

At block 3620, processing logic executes a scheduler via the processor of the system, wherein the scheduler performs at least the following operations: retrieving information from the cache specifying the one or more computing resources available to execute workload tasks and specifying the plurality of workload tasks to be scheduled for execution.

At block 3625, processing logic rates the pending workload tasks based on one or more of a workload type, a specified priority, and current available compute capacity and updating the cache with a rating for each of the pending workload tasks.

At block 3630, processing logic identifies one of the pending workload tasks as a critical workload task based on the information from the cache and initiates a redundant execution process for the critical workload task including at least replicating the critical workload task into multiple workload copies and enqueuing the multiple workload copies with one of the workload queues.

At block 3635, processing logic schedules the multiple workload copies for execution on different computing resources.

It is therefore in accordance with the described embodiments that, there described and claimed: 1. A method performed by a system having at least a processor and a memory therein, wherein the method comprises: allocating a cache within the memory of the system; identifying, via a workload discovery engine, pending workload tasks to be scheduled for execution from one or more workload queues and updating the cache; identifying, via a compute resource discovery engine, a plurality of computing resources available to execute the workload tasks and updating the cache; executing a scheduler via the processor of the system, wherein the scheduler performs at least the following operations: retrieving information from the cache specifying the one or more computing resources available to execute workload tasks and specifying the plurality of workload tasks to be scheduled for execution; rating the pending workload tasks based on one or more of a workload type, a specified priority, and current available compute capacity and updating the cache with a rating for each of the pending workload tasks; identifying one of the pending workload tasks as a critical workload task based on the information from the cache; initiating a redundant execution process for the critical workload task including at least replicating the critical workload task into multiple workload copies and enqueuing the multiple workload copies with one of the workload queues; and scheduling the multiple workload copies for execution on different computing resources. 2. The method of claim 1, further comprising: updating the information in the cache specifying a requirement to execute each of the multiple workload copies on different computing resources and prohibiting any of the multiple workload copies from executing on a same computing resource. 3. The method of claim 1, wherein scheduling the multiple workload copies for execution on different computing resources comprises: scheduling a first one of the multiple workload copies for execution on a datacenter operated by a host organization within which the system operates; and scheduling a second one of the multiple workload copies for execution on a third party compute cloud operated by an entity other than the host organization. 4. The method of claim 1, wherein scheduling the multiple workload copies for execution on different computing resources comprises: scheduling each of the multiple workload copies for execution on different computing resources having different compute footprints; wherein the different compute footprints are selected from the group comprising: a compute footprint optimized for CPU bandwidth; a compute footprint optimized for GPU bandwidth; a compute footprint optimized for Input/Output (I/O) throughput; a compute footprint optimized for memory; a compute footprint utilizing AMD CPU architecture; a compute footprint utilizing Intel CPU architecture; compute footprints utilizing different sized Virtual Machines (VMs); compute footprints utilizing different operating systems; and compute footprints utilizing different CPU core quantities. 5. The method of claim 1, wherein scheduling the multiple workload copies for execution on different computing resources comprises: scheduling each of the multiple workload copies for execution with datacenters in different geographical regions. 6. The method of claim 1, wherein initiating the redundant execution process for the critical workload task includes operations further comprising: determining a safety factor based on the information in the cache, wherein the safety factor defines at least a quantity of replicated copies of the critical workload task to schedule for execution; replicating the critical workload task to generate the determined quantity of replicated copies; and enqueuing the generated replicated copies with one of the workload queues. 7. The method of claim 6, wherein the safety factor further defines: how many different compute clouds upon which to schedule the multiple workload copies for redundant execution; and how many different compute footprints upon which to schedule the multiple workload copies for redundant execution. 8. The method of claim 1, wherein the method further comprises: determining one of the multiple workload copies successfully completed execution; dequeuing any of the multiple workload copies not yet scheduled for execution; and terminating processing of any of the multiple workload copies currently executing and not yet complete. 9. The method of claim 1, wherein the method further comprises: determining two or more of the multiple workload copies successfully completed execution; and validating successful completion of the multiple workload copies by comparing output from each of two or more multiple workload copies, wherein validation is confirmed when the output from each match. 10. The method of claim 1, wherein identifying one of the pending workload tasks as a critical workload task based on the information from the cache further comprises: escalating a pending workload task to a critical workload task based on a pending queue time for the pending workload task and based further on a deadline for completion of the pending workload task in compliance with an SLT. 11. The method of claim 1, wherein identifying one of the pending workload tasks as a critical workload task based on the information from the cache further comprises: escalating a medium or high priority workload task to a critical workload task based on current unused compute capacity being above an excessive compute availability threshold; and replicating the medium or high priority workload task for redundant execution via the redundant execution process. 12. The method of claim 1, wherein identifying one of the pending workload tasks as a critical workload task based on the information from the cache further comprises: determining if redundant execution for the critical workload task is optional or required based on an SLT objective for the critical workload task; and wherein the method further comprises: determining available compute capacity is below a threshold or in an oversubscribed state; and force bypassing the redundant execution process for the critical workload task when (i) redundant execution is determined to be optional pursuant to the SLT objective for the critical workload task and (ii) the determined available compute capacity is below the threshold or determined to be in the oversubscribed state. 13. The method of claim 1, wherein executing the scheduler via the processor of the system comprises the scheduler to perform at least the following additional operations: producing a list of the workload tasks to be executed based on the information retrieved from the cache; computing available compute capacity to execute workload tasks at each of the one or more computing resources based on the information retrieved from the cache; selecting the multiple workload copies for execution via the one or more computing resources based on the information retrieved from the cache; and planning execution of the multiple workload copies by scheduling the multiple workload copies for execution via the different computing resources based on the computed available capacity to execute workload tasks at each of the one or more computing resources and based further on identification of the critical workload task amongst the pending workload tasks. 14. The method of claim 13, wherein the scheduler to further perform at least the following additional operations: initiating execution of the multiple workload copies at the different computing resources pursuant to the planned execution; and removing from the list of the workload tasks to be executed as represented at the cache any of the multiple workload copies for which execution is initiated. 15. The method of claim 1, further comprising: operating, from the system, an external cloud interface to communicatively link the system with one or more third-party private and/or public computing clouds via a public Internet. 16. The method of claim 1, wherein identifying the plurality of computing resources available to execute workload tasks and updating the cache specifying the identified computing resources, comprises: the compute resource discovery engine to autonomously discover any one of: one or more third-party compute clouds accessible to the scheduler; one or more private on-demand compute clouds accessible to the scheduler; one or more public on-demand compute clouds accessible to the scheduler; one or more computing pods within a local host organization within which a scheduling service of the system operates when the one or more computing pods are accessible to the scheduler; one or more remote computing pods within a remote host organization separate from the local host organization within which the scheduling service operates when the one or more remote computing pods are accessible to the scheduling service through the remote host organization; an OpenStack computing cloud accessible to the scheduler; a VMWare computing cloud accessible to the scheduler; an Amazon Web Services (AWS) public computing cloud accessible to the scheduler; a Microsoft Azure public computing cloud accessible to the scheduler; an AWS Direct Connect privately leased computing space accessible to the scheduler; and an Azure ExpressRoute privately leased computing space accessible to the scheduler. 17. The method of claim 1, wherein the system comprises a multi-tenant database system having customer data stored therein for a plurality of distinct customer organizations; wherein each customer organization is an entity selected from the group consisting of: a separate and distinct remote organization, an organizational group within the host organization, a business partner of the host organization, or a customer organization that subscribes to cloud computing services provided by the host organization; wherein the system operates at a host organization as a cloud-based service provider to the plurality of distinct customer organizations; and wherein the cloud-based service provider receives inputs from the plurality of distinct customer organizations to schedule workload tasks for execution the plurality of computing resources. 18. Non-transitory computer readable storage media having instructions stored thereupon that, when executed by a system having at least a processor and a memory therein, the instructions cause the system to perform operations including: allocating a cache within the memory of the system; identifying, via a workload discovery engine, pending workload tasks to be scheduled for execution from one or more workload queues and updating the cache; identifying, via a compute resource discovery engine, a plurality of computing resources available to execute the workload tasks and updating the cache; executing a scheduler via the processor of the system, wherein the scheduler performs at least the following operations: retrieving information from the cache specifying the one or more computing resources available to execute workload tasks and specifying the plurality of workload tasks to be scheduled for execution; rating the pending workload tasks based on one or more of a workload type, a specified priority, and current available compute capacity and updating the cache with a rating for each of the pending workload tasks; identifying one of the pending workload tasks as a critical workload task based on the information from the cache; initiating a redundant execution process for the critical workload task including at least replicating the critical workload task into multiple workload copies and enqueuing the multiple workload copies with one of the workload queues; and scheduling the multiple workload copies for execution on different computing resources. 19. The non-transitory computer readable storage media of claim 18, wherein the instructions cause the system to perform operations further comprising: updating the information in the cache specifying a requirement to execute each of the multiple workload copies on different computing resources and prohibiting any of the multiple workload copies from executing on a same computing resource. 20. The non-transitory computer readable storage media of claim 18, wherein scheduling the multiple workload copies for execution on different computing resources comprises: scheduling a first one of the multiple workload copies for execution on a datacenter operated by a host organization within which the system operates; and scheduling a second one of the multiple workload copies for execution on a third party compute cloud operated by an entity other than the host organization. 21. A system to implement a scheduling service, wherein the system comprises: a processor and a memory to execute instructions at the system; a cache allocated within the memory of the system to store information on behalf of a compute resource discovery engine and a workload discovery engine and a scheduler; wherein the compute resource discovery engine is to identify a plurality of computing resources available to execute the workload tasks and update the cache specifying the identified computing resources; wherein the workload discovery engine is to identify pending workload tasks to be scheduled for execution from one or more workload queues and update the cache with the identified workload tasks; and wherein the scheduler is to retrieve information from the cache specifying the one or more computing resources available to execute workload tasks and specifying the plurality of workload tasks to be scheduled for execution; wherein the scheduler is further to rate the pending workload tasks based on one or more of a workload type, a specified priority, and current available compute capacity and updating the cache with a rating for each of the pending workload tasks; wherein the scheduler is further to identify one of the pending workload tasks as a critical workload task based on the information from the cache; wherein the scheduler is further to initiate a redundant execution process for the critical workload task including at least replicating the critical workload task into multiple workload copies and enqueuing the multiple workload copies with one of the workload queues; and wherein the scheduler is to schedule the multiple workload copies for execution on different computing resources. 22. The system of claim 21, wherein the scheduler further is to update the information in the cache specifying a requirement to execute each of the multiple workload copies on different computing resources and prohibiting any of the multiple workload copies from executing on a same computing resource. 23. The system of claim 21, wherein the scheduler to schedule the multiple workload copies for execution on different computing resources comprises: the scheduler scheduling a first one of the multiple workload copies for execution on a datacenter operated by a host organization within which the system operates; and the scheduler scheduling a second one of the multiple workload copies for execution on a third party compute cloud operated by an entity other than the host organization.

FIG. 37 depicts a flow diagram illustrating a method 3700 for implementing a scheduler and workload manager with cyclical Service Level Target (SLT) optimization supported by a processor and a memory to execute such functionality. Method 3700 may be performed by processing logic that may include hardware (e.g., circuitry, dedicated logic, programmable logic, microcode, etc.), software (e.g., instructions run on a processing device) to perform various operations such as executing, identifying, defining, terminating, evicting, scheduling, producing, creating, selecting, planning, assigning, receiving, generating, maintaining, returning, presenting, interfacing, communicating, transmitting, querying, processing, providing, determining, triggering, displaying, updating, sending, etc., in pursuance of the systems and methods as described herein. For example, the hosted computing environment 371, the scheduling service 145, and its scheduler 125 and discovery engine(s) 192 as depicted at FIG. 1, and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 3700 depicted at FIG. 37, at block 3705, there is a method for updating Service Level Targets (SLTs) of a scheduling service, by performing the following operations.

At block 3710, processing logic allocates a cache within the memory of the system.

At block 3715, processing logic identifies, via a workload discovery engine, pending workload tasks to be scheduled for execution from one or more workload queues and updating the cache.

At block 3720, processing logic identifies, via a compute resource discovery engine, a plurality of computing resources available to execute the workload tasks and updating the cache.

At block 3725, processing logic executes an SLT updater via the processor of the system, wherein the SLT updater performs at least the following operations: (i) identifying multiple SLTs for each of the pending workload tasks based on a current time period, (ii) selecting one of the multiple SLTs to apply to each of the pending workload tasks based on which of the multiple SLTs is determined to be most restrictive, and (iii) updating the cache with information specifying the selected SLT for each pending workload task.

At block 3730, processing logic executes a scheduler via the processor of the system, wherein the scheduler performs at least the following operations: (i) retrieving information from the cache specifying the one or more computing resources available to execute workload tasks and specifying the plurality of workload tasks to be scheduled for execution and specifying the selected SLT for each pending workload task and (ii) scheduling the pending workload tasks to execute via the one or more computing resources in compliance with the selected SLT specified for each of the pending workload tasks.

It is therefore in accordance with the described embodiments that, there described and claimed: 1. A method for updating Service Level Targets (SLTs) of a scheduling service, the method performed by a system having at least a processor and a memory therein, wherein the method comprises: allocating a cache within the memory of the system; identifying, via a workload discovery engine, pending workload tasks to be scheduled for execution from one or more workload queues and updating the cache; identifying, via a compute resource discovery engine, a plurality of computing resources available to execute the workload tasks and updating the cache; executing an SLT updater via the processor of the system, wherein the SLT updater performs at least the following operations: (i) identifying multiple SLTs for each of the pending workload tasks based on a current time period, (ii) selecting one of the multiple SLTs to apply to each of the pending workload tasks based on which of the multiple SLTs is determined to be most restrictive, and (iii) updating the cache with information specifying the selected SLT for each pending workload task; and executing a scheduler via the processor of the system, wherein the scheduler performs at least the following operations: (i) retrieving information from the cache specifying the one or more computing resources available to execute workload tasks and specifying the plurality of workload tasks to be scheduled for execution and specifying the selected SLT for each pending workload task and (ii) scheduling the pending workload tasks to execute via the one or more computing resources in compliance with the selected SLT specified for each of the pending workload tasks. 2. The method of claim 1: wherein each of the pending workload tasks has a defined workload type; and wherein identifying the multiple SLTs for each of the pending workload tasks is based on the workload type for each of the pending workload tasks, wherein the multiple SLTs are associated with the pending workload tasks according to the workload type. 3. The method of claim 1: wherein identifying the multiple SLTs for each of the pending workload tasks based on a current time period comprises: identifying a current time period at the scheduling service; and determining the multiple SLTs are active for the current time period according to metadata in the SLT. 4. The method of claim 3, wherein the current time period defined by each of the multiple SLTs is selected from the group comprising: a time of day; a range of time of day; an hour of day; a day of the week; an hour of the week; a week of the month; a week of the year; a month of the year; a year; a custom defined start time and date or a custom defined end time and date or both; a number of hours preceding a defined fiscal quarter end; a number of hours preceding a defined fiscal year end; and a number of hours preceding a calendar year end. 5. The method of claim 1, further comprising: determining a different SLT applies to a pending workload task based on a change in the current time period; applying the different SLT to the pending workload task when the different SLT for the changed current time period is more restrictive than a previously applied SLT for the pending workload task. 6. The method of claim 1, further comprising: determining a different SLT applies to a newly enqueued workload task having a same workload type as a previously enqueued pending workload task based on a change in the current time period; applying the different SLT to the newly enqueued workload task; and maintaining the previously applied SLT for the previously enqueued pending workload task. 7. The method of claim 1, wherein selecting one of the multiple SLTs to apply to each of the pending workload tasks based on which of the multiple SLTs is determined to be most restrictive comprises: selecting the one SLT from among the multiple SLTs based on which SLT defines a shortest permissible time to completion for the pending workload task. 8. The method of claim 1, wherein selecting one of the multiple SLTs to apply to each of the pending workload tasks based on which of the multiple SLTs is determined to be most restrictive comprises: selecting the one SLT from among the multiple SLTs based on which SLT defines a highest quantity of distribution of a distributable workload corresponding to the pending workload task. 9. The method of claim 1, wherein selecting one of the multiple SLTs to apply to each of the pending workload tasks based on which of the multiple SLTs is determined to be most restrictive comprises: analyzing the multiple SLTs to determine which will require the greatest number of concurrent CPU cores per hour from the computing resource to complete execution of the pending workload task in compliance with each of the multiple SLTs; and selecting the one SLT from among the multiple SLTs based on the analysis. 10. The method of claim 1, wherein selecting one of the multiple SLTs to apply to each of the pending workload tasks based on which of the multiple SLTs is determined to be most restrictive comprises: selecting the one SLT from among the multiple SLTs based on which SLT defines a highest priority for the pending workload task. 11. The system of claim 1: wherein the workload discovery engine to further identify a plurality of associated workload task requirements for each of the pending workload tasks; and wherein the scheduler is to schedule the pending workload tasks based further on the associated workload task requirements and which of the plurality of computing resources available to execute workload tasks satisfies the associated workload task requirements and is estimated to meet SLT objectives defined by the selected SLT for each pending workload task. 12. The method of claim 1, wherein executing the scheduler via the processor of the system comprises the scheduler to perform at least the following additional operations: producing a list of the workload tasks to be executed based on the information retrieved from the cache; calculating available compute capacity to execute workload tasks in compliance with the selected SLT for each of the pending workload tasks at one or more of the computing resources based on the information retrieved from the cache; selecting the pending workload tasks for execution via the one or more computing resources based on the information retrieved from the cache; and planning execution of the pending workload tasks by scheduling the pending workload tasks to execute via the one or more computing resources based on the computed available capacity to execute workload tasks at each of the one or more computing resources and which of the one or more computing resources will complete execution of the pending workload tasks in compliance with the selected SLT. 13. The method of claim 12, wherein the scheduler to further perform at least the following additional operations: initiating execution of the pending workload tasks at the one or more computing resources pursuant to the planned execution; and removing from the list of the workload tasks to be executed as represented at the cache any of the pending workload tasks for which execution is initiated. 14. The method of claim 1, further comprising: operating, from the system, an external cloud interface to communicatively link the system with one or more third-party private and/or public computing clouds via a public Internet. 15. The method of claim 1, wherein identifying the plurality of computing resources available to execute workload tasks and updating the cache specifying the identified computing resources, comprises: the compute resource discovery engine to autonomously discover any one of: one or more third-party compute clouds accessible to the scheduler; one or more private on-demand compute clouds accessible to the scheduler; one or more public on-demand compute clouds accessible to the scheduler; one or more computing pods within a local host organization within which a scheduling service of the system operates when the one or more computing pods are accessible to the scheduler; one or more remote computing pods within a remote host organization separate from the local host organization within which the scheduling service operates when the one or more remote computing pods are accessible to the scheduling service through the remote host organization; an OpenStack computing cloud accessible to the scheduler; a VMWare computing cloud accessible to the scheduler; an Amazon Web Services (AWS) public computing cloud accessible to the scheduler; a Microsoft Azure public computing cloud accessible to the scheduler; an AWS Direct Connect privately leased computing space accessible to the scheduler; and an Azure ExpressRoute privately leased computing space accessible to the scheduler. 16. The method of claim 1, wherein the system comprises a multi-tenant database system having customer data stored therein for a plurality of distinct customer organizations; wherein each customer organization is an entity selected from the group consisting of: a separate and distinct remote organization, an organizational group within the host organization, a business partner of the host organization, or a customer organization that subscribes to cloud computing services provided by the host organization; wherein the system operates at a host organization as a cloud-based service provider to the plurality of distinct customer organizations; and wherein the cloud-based service provider receives inputs from the plurality of distinct customer organizations to schedule workload tasks for execution the plurality of computing resources. 17. Non-transitory computer readable storage media having instructions stored thereupon that, when executed by a system having at least a processor and a memory therein, the instructions cause the system to perform operations including: allocating a cache within the memory of the system; identifying, via a workload discovery engine, pending workload tasks to be scheduled for execution from one or more workload queues and updating the cache; identifying, via a compute resource discovery engine, a plurality of computing resources available to execute the workload tasks and updating the cache; executing an SLT updater via the processor of the system, wherein the SLT updater performs at least the following operations: (i) identifying multiple SLTs for each of the pending workload tasks based on a current time period, (ii) selecting one of the multiple SLTs to apply to each of the pending workload tasks based on which of the multiple SLTs is determined to be most restrictive, and (iii) updating the cache with information specifying the selected SLT for each pending workload task; and executing a scheduler via the processor of the system, wherein the scheduler performs at least the following operations: (i) retrieving information from the cache specifying the one or more computing resources available to execute workload tasks and specifying the plurality of workload tasks to be scheduled for execution and specifying the selected SLT for each pending workload task and (ii) scheduling the pending workload tasks to execute via the one or more computing resources in compliance with the selected SLT specified for each of the pending workload tasks. 18. The non-transitory computer readable storage media of claim 17: wherein each of the pending workload tasks has a defined workload type; and wherein identifying the multiple SLTs for each of the pending workload tasks is based on the workload type for each of the pending workload tasks, wherein the multiple SLTs are associated with the pending workload tasks according to the workload type. 19. The non-transitory computer readable storage media of claim 17, wherein selecting one of the multiple SLTs to apply to each of the pending workload tasks based on which of the multiple SLTs is determined to be most restrictive comprises one of: (i) selecting the one SLT from among the multiple SLTs based on which SLT defines a shortest permissible time to completion for the pending workload task; (ii) selecting the one SLT from among the multiple SLTs based on which SLT defines a highest quantity of distribution of a distributable workload corresponding to the pending workload task; (iii) analyzing the multiple SLTs to determine which will require the greatest number of concurrent CPU cores per hour from the computing resource to complete execution of the pending workload task in compliance with each of the multiple SLTs and selecting the one SLT from among the multiple SLTs based on the analysis; and (iv) selecting the one SLT from among the multiple SLTs based on which SLT defines a highest priority for the pending workload task. 20. A system to implement a scheduling service, wherein the system comprises: a processor and a memory to execute instructions at the system; a cache allocated within the memory of the system to store information on behalf of a compute resource discovery engine and a workload discovery engine and a SLT updater and a scheduler; wherein the compute resource discovery engine is to identify a plurality of computing resources available to execute the workload tasks and update the cache specifying the identified computing resources; wherein the workload discovery engine is to identify pending workload tasks to be scheduled for execution from one or more workload queues and update the cache with the identified workload tasks; wherein the SLT updater is to identify multiple SLTs for each of the pending workload tasks based on a current time period and select one of the multiple SLTs to apply to each of the pending workload tasks based on which of the multiple SLTs is determined to be most restrictive, and update the cache with information specifying the selected SLT for each pending workload task; wherein the scheduler is to retrieve information from the cache specifying the one or more computing resources available to execute workload tasks and specifying the plurality of workload tasks to be scheduled for execution and specifying the selected SLT for each pending workload task; and wherein the scheduler is further to schedule the pending workload tasks to execute via the one or more computing resources in compliance with the selected SLT specified for each of the pending workload tasks. 21. The system of claim 20: wherein each of the pending workload tasks has a defined workload type; and wherein the SLT updater identifies the multiple SLTs for each of the pending workload tasks based on the workload type for each of the pending workload tasks, wherein the multiple SLTs are associated with the pending workload tasks according to the workload type. 22. The system of claim 20, wherein the SLT updater selects one of the multiple SLTs to apply to each of the pending workload tasks by one of the following operations: (i) selecting the one SLT from among the multiple SLTs based on which SLT defines a shortest permissible time to completion for the pending workload task; (ii) selecting the one SLT from among the multiple SLTs based on which SLT defines a highest quantity of distribution of a distributable workload corresponding to the pending workload task; (iii) analyzing the multiple SLTs to determine which will require the greatest number of concurrent CPU cores per hour from the computing resource to complete execution of the pending workload task in compliance with each of the multiple SLTs and selecting the one SLT from among the multiple SLTs based on the analysis; and (iv) selecting the one SLT from among the multiple SLTs based on which SLT defines a highest priority for the pending workload task.

FIG. 38 depicts a flow diagram illustrating a method 3800 for implementing a scheduler and workload manager with dynamic workload termination based on cost-benefit analysis supported by a processor and a memory to execute such functionality. Method 3800 may be performed by processing logic that may include hardware (e.g., circuitry, dedicated logic, programmable logic, microcode, etc.), software (e.g., instructions run on a processing device) to perform various operations such as executing, identifying, defining, terminating, evicting, scheduling, producing, creating, selecting, planning, assigning, receiving, generating, maintaining, returning, presenting, interfacing, communicating, transmitting, querying, processing, providing, determining, triggering, displaying, updating, sending, etc., in pursuance of the systems and methods as described herein. For example, the hosted computing environment 381, the scheduling service 145, and its scheduler 125 and discovery engine(s) 192 as depicted at FIG. 1, and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 3800 depicted at FIG. 38, at block 3805, processing logic allocates a cache within the memory of the system.

At block 3810, processing logic identifies, via a workload discovery engine, pending workload tasks to be scheduled for execution from one or more workload queues and updating the cache.

At block 3815, processing logic identifies, via a compute resource discovery engine, a plurality of computing resources available to execute the workload tasks and updating the cache.

At block 3820, processing logic executes a scheduler via the processor of the system, wherein the scheduler performs at least the following operations: retrieving information from the cache specifying the one or more computing resources available to execute workload tasks and specifying the plurality of workload tasks to be scheduled for execution.

At block 3825, processing logic analyzes each of the plurality of workload tasks to be scheduled to determine if a Return On Investment (ROI) for each respective workload task exceeds a threshold.

At block 3830, processing logic cancels any of the plurality of workload tasks to be scheduled having an ROI below the threshold.

At block 3835, processing logic schedules the plurality of workload tasks having an ROI which exceeds the threshold for execution via the plurality of computing resources available to execute the workload tasks.

It is therefore in accordance with the described embodiments that, there described and claimed: 1. A method performed by a system having at least a processor and a memory therein, wherein the method comprises: allocating a cache within the memory of the system; identifying, via a workload discovery engine, pending workload tasks to be scheduled for execution from one or more workload queues and updating the cache; identifying, via a compute resource discovery engine, a plurality of computing resources available to execute the workload tasks and updating the cache; executing a scheduler via the processor of the system, wherein the scheduler performs at least the following operations: retrieving information from the cache specifying the one or more computing resources available to execute workload tasks and specifying the plurality of workload tasks to be scheduled for execution; analyzing each of the plurality of workload tasks to be scheduled to determine if a Return On Investment (ROI) for each respective workload task exceeds a threshold; canceling any of the plurality of workload tasks to be scheduled having an ROI below the threshold; and scheduling the plurality of workload tasks having an ROI which exceeds the threshold for execution via the plurality of computing resources available to execute the workload tasks. 2. The method of claim 1: wherein the scheduler performs a produce operation to identify the plurality of workload tasks to be scheduled for execution; and wherein the scheduler further performs a plan operation to determine which of the plurality of workload tasks will be allocated for execution via the plurality of computing resources and wherein the plan phase further initiates the determination of ROI for each respective workload task and performs the canceling of the plurality of workload tasks having the ROI below the threshold before execution of the respective plurality of workload tasks begins. 3. The method of claim 1, further comprising: executing a watchdog ROI engine via the processor of the system, wherein the watchdog ROI engine performs at least the following operations: (i) identifying a plurality of currently executing workloads; (ii) analyzing each of the currently executing workloads to determine if a ROI for each respective currently executing workload has fallen below a threshold; and (iii) terminating any of the currently executing workloads for which the ROI has fallen below the threshold. 4. The method of claim 3, wherein terminating any of the currently executing workloads for which the ROI has fallen below the threshold comprises: updating the cache indicating the terminated workloads were affirmatively terminated by the watchdog ROI engine to prevent the scheduler from re-scheduling the terminated workloads for re-execution by any subsequent scheduling heartbeat iteration. 5. The method of claim 1, wherein canceling any of the plurality of workload tasks to be scheduled having an ROI below the threshold comprises: dequeuing the canceled workload tasks from the one or more workload queues and updating the cache; and wherein the dequeued workload tasks will not be produced, selected, planned, or scheduled for execution in any subsequent scheduling heartbeat iteration. 6. The method of claim 1, wherein canceling any of the plurality of workload tasks to be scheduled having an ROI below the threshold comprises: canceling one of the of the plurality of workload tasks on the basis that a completion deadline specified by an SLT for the workload task has been missed or will be missed. 7. The method of claim 1, wherein canceling any of the plurality of workload tasks to be scheduled having an ROI below the threshold comprises: canceling one of the of the plurality of workload tasks on the basis that a maximum cost specified by an SLT for the workload task is less than a minimum cost to perform the workload task at any of the plurality of computing resources available to execute the workload task. 8. The method of claim 1, wherein canceling any of the plurality of workload tasks to be scheduled having an ROI below the threshold comprises: canceling one of the of the plurality of workload tasks on the basis that a subsequently scheduled workload of a same workload type has completed before the workload task which remains pending and renders the workload task which remains pending obsolete in accordance with an SLT for the workload task. 9. The method of claim 1, wherein terminating any of the currently executing workloads for which the ROI has fallen below the threshold via the watchdog ROI engine comprises: identifying a distributable workload having one or more workload sub-parts currently executing; wherein an SLT for the distributable workload specifies that any failure of any workload sub-part renders the entirety of the distributable workload and all of its workload sub-parts worthless; and terminating all currently executing workload sub-parts on the basis that one of the workload sub-parts has failed. 10. The method of claim 9, further comprising: canceling all pending workload sub-parts associated with the distributable workload on the basis that one of the workload sub-parts has failed; and wherein the distributable workload creates an artifact which requires that all sub-parts execute successfully to be valid. 11. The method of claim 1, wherein executing the scheduler via the processor of the system comprises the scheduler to perform at least the following additional operations: producing a list of the workload tasks to be executed based on the information retrieved from the cache; calculating available compute capacity to execute workload tasks in compliance with a selected SLT for each of the pending workload tasks at one or more of the computing resources based on the information retrieved from the cache; selecting the pending workload tasks for execution via the one or more computing resources based on the information retrieved from the cache; and planning execution of the pending workload tasks by first (i) analyzing each of the plurality of workload tasks to be scheduled to determine if the ROI for each respective workload task exceeds the threshold and by second (ii) scheduling the plurality of workload tasks for which the ROI exceeds the threshold for execution via the plurality of computing resources available to execute the workload tasks. 12. The method of claim 11, wherein the scheduler to further perform at least the following additional operations: initiating execution of the pending workload tasks at the one or more computing resources pursuant to the planned execution; removing from the list of the workload tasks to be executed as represented at the cache any of the pending workload tasks for which execution is initiated; and executing a watchdog ROI engine via the processor of the system to (i) identify a plurality of currently executing workloads, (ii) determine if the ROI for each respective currently executing workload has fallen below a threshold, and (iii) terminate any of the currently executing workloads for which the ROI has fallen below the threshold. 13. The method of claim 1, further comprising: operating, from the system, an external cloud interface to communicatively link the system with one or more third-party private and/or public computing clouds via a public Internet. 14. The method of claim 1, wherein identifying the plurality of computing resources available to execute workload tasks and updating the cache specifying the identified computing resources, comprises: the compute resource discovery engine to autonomously discover any one of: one or more third-party compute clouds accessible to the scheduler; one or more private on-demand compute clouds accessible to the scheduler; one or more public on-demand compute clouds accessible to the scheduler; one or more computing pods within a local host organization within which a scheduling service of the system operates when the one or more computing pods are accessible to the scheduler; one or more remote computing pods within a remote host organization separate from the local host organization within which the scheduling service operates when the one or more remote computing pods are accessible to the scheduling service through the remote host organization; an OpenStack computing cloud accessible to the scheduler; a VMWare computing cloud accessible to the scheduler; an Amazon Web Services (AWS) public computing cloud accessible to the scheduler; a Microsoft Azure public computing cloud accessible to the scheduler; an AWS Direct Connect privately leased computing space accessible to the scheduler; and an Azure ExpressRoute privately leased computing space accessible to the scheduler. 15. The method of claim 1, wherein the system comprises a multi-tenant database system having customer data stored therein for a plurality of distinct customer organizations; wherein each customer organization is an entity selected from the group consisting of: a separate and distinct remote organization, an organizational group within the host organization, a business partner of the host organization, or a customer organization that subscribes to cloud computing services provided by the host organization; wherein the system operates at a host organization as a cloud-based service provider to the plurality of distinct customer organizations; and wherein the cloud-based service provider receives inputs from the plurality of distinct customer organizations to schedule workload tasks for execution the plurality of computing resources. 16. Non-transitory computer readable storage media having instructions stored thereupon that, when executed by a system having at least a processor and a memory therein, the instructions cause the system to perform operations including: allocating a cache within the memory of the system; identifying, via a workload discovery engine, pending workload tasks to be scheduled for execution from one or more workload queues and updating the cache; identifying, via a compute resource discovery engine, a plurality of computing resources available to execute the workload tasks and updating the cache; executing a scheduler via the processor of the system, wherein the scheduler performs at least the following operations: retrieving information from the cache specifying the one or more computing resources available to execute workload tasks and specifying the plurality of workload tasks to be scheduled for execution; analyzing each of the plurality of workload tasks to be scheduled to determine if a Return On Investment (ROI) for each respective workload task exceeds a threshold; canceling any of the plurality of workload tasks to be scheduled having an ROI below the threshold; and scheduling the plurality of workload tasks having an ROI which exceeds the threshold for execution via the plurality of computing resources available to execute the workload tasks. 17. The non-transitory computer readable storage media of claim 16: wherein the scheduler performs a produce operation to identify the plurality of workload tasks to be scheduled for execution; and wherein the scheduler further performs a plan operation to determine which of the plurality of workload tasks will be allocated for execution via the plurality of computing resources and wherein the plan phase further initiates the determination of ROI for each respective workload task and performs the canceling of the plurality of workload tasks having the ROI below the threshold before execution of the respective plurality of workload tasks begins. 18. The non-transitory computer readable storage media of claim 16, wherein the instructions when executed by the processor of the system, cause the system to perform operations further comprising: executing a watchdog ROI engine via the processor of the system, wherein the watchdog ROI engine performs at least the following operations: (i) identifying a plurality of currently executing workloads; (ii) analyzing each of the currently executing workloads to determine if a ROI for each respective currently executing workload has fallen below a threshold; and (iii) terminating any of the currently executing workloads for which the ROI has fallen below the threshold; wherein terminating any of the currently executing workloads for which the ROI has fallen below the threshold comprises updating the cache indicating the terminated workloads were affirmatively terminated by the watchdog ROI engine to prevent the scheduler from re-scheduling the terminated workloads for re-execution by any subsequent scheduling heartbeat iteration. 19. The non-transitory computer readable storage media of claim 16, wherein canceling any of the plurality of workload tasks to be scheduled having an ROI below the threshold comprises: canceling one of the of the plurality of workload tasks on the basis that a maximum cost specified by an SLT for the workload task is less than a minimum cost to perform the workload task at any of the plurality of computing resources available to execute the workload task. 20. A system to implement a scheduling service, wherein the system comprises: a processor and a memory to execute instructions at the system; a cache allocated within the memory of the system to store information on behalf of a compute resource discovery engine and a workload discovery engine and a scheduler; wherein the compute resource discovery engine is to identify a plurality of computing resources available to execute the workload tasks and update the cache specifying the identified computing resources; wherein the workload discovery engine is to identify pending workload tasks to be scheduled for execution from one or more workload queues and update the cache with the identified workload tasks; wherein the scheduler is to retrieve information from the cache specifying the one or more computing resources available to execute workload tasks and specifying the plurality of workload tasks to be scheduled for execution; wherein the scheduler is further to analyze each of the plurality of workload tasks to be scheduled to determine if a Return On Investment (ROI) for each respective workload task exceeds a threshold; wherein the scheduler is further to cancel any of the plurality of workload tasks to be scheduled having an ROI below the threshold; and wherein the scheduler is further to schedule the plurality of workload tasks having an ROI which exceeds the threshold for execution via the plurality of computing resources available to execute the workload tasks. 21. The system of claim 20, further comprising: a watchdog ROI engine to execute via the processor of the system, wherein the watchdog ROI engine is to perform at least the following operations: (i) identifying a plurality of currently executing workloads; (ii) analyzing each of the currently executing workloads to determine if a ROI for each respective currently executing workload has fallen below a threshold; and (iii) terminating any of the currently executing workloads for which the ROI has fallen below the threshold; wherein terminating any of the currently executing workloads for which the ROI has fallen below the threshold comprises updating the cache indicating the terminated workloads were affirmatively terminated by the watchdog ROI engine to prevent the scheduler from re-scheduling the terminated workloads for re-execution by any subsequent scheduling heartbeat iteration. 22. The system of claim 20: wherein the scheduler is to perform a produce operation to identify the plurality of workload tasks to be scheduled for execution; and wherein the scheduler further is to perform a plan operation to determine which of the plurality of workload tasks will be allocated for execution via the plurality of computing resources and wherein the plan phase further initiates the determination of ROI for each respective workload task and performs the canceling of the plurality of workload tasks having the ROI below the threshold before execution of the respective plurality of workload tasks begins.

FIG. 39 depicts a flow diagram illustrating a method 3900 for implementing a scheduler and workload manager with workload re-execution functionality for bad execution runs supported by a processor and a memory to execute such functionality. Method 3900 may be performed by processing logic that may include hardware (e.g., circuitry, dedicated logic, programmable logic, microcode, etc.), software (e.g., instructions run on a processing device) to perform various operations such as executing, identifying, defining, terminating, evicting, scheduling, producing, creating, selecting, planning, assigning, receiving, generating, maintaining, returning, presenting, interfacing, communicating, transmitting, querying, processing, providing, determining, triggering, displaying, updating, sending, etc., in pursuance of the systems and methods as described herein. For example, the hosted computing environment 391, the scheduling service 145, and its scheduler 125 and discovery engine(s) 192 as depicted at FIG. 1, and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 3900 depicted at FIG. 39, at block 3905, processing logic allocates a cache within the memory of the system.

At block 3910, processing logic identifies, via a workload discovery engine, pending workload tasks to be scheduled for execution from one or more workload queues and updating the cache.

At block 3915, processing logic identifies, via a compute resource discovery engine, a plurality of computing resources available to execute the workload tasks and updating the cache.

At block 3920, processing logic identifies, via an external services monitor, a plurality of external services accessible to the workload tasks and updating the cache.

At block 3925, processing logic executing a scheduler via the processor of the system, wherein the scheduler performs at least the following operations: scheduling the workload tasks for execution on the plurality of computing resources.

At block 3930, processing logic identifies a failure condition for one of the plurality of external services accessible to the workload tasks and identifies any of the workload tasks potentially affected by the failure condition of the external service based on the workload tasks specifying the external service as a dependency and based further on execution of the workload tasks overlapping in time with a time frame associated with the failure condition.

At block 3935, processing logic scheduling the workload tasks potentially affected by the failure condition of the external service for a repeated execution on the plurality of computing resources.

It is therefore in accordance with the described embodiments that, there described and claimed: 1. A method performed by a system having at least a processor and a memory therein, wherein the method comprises: allocating a cache within the memory of the system; identifying, via a workload discovery engine, pending workload tasks to be scheduled for execution from one or more workload queues and updating the cache; identifying, via a compute resource discovery engine, a plurality of computing resources available to execute the workload tasks and updating the cache; identifying, via an external services monitor, a plurality of external services accessible to the workload tasks and updating the cache; executing a scheduler via the processor of the system, wherein the scheduler performs at least the following operations: scheduling the workload tasks for execution on the plurality of computing resources; identifying a failure condition for one of the plurality of external services accessible to the workload tasks; identifying any of the workload tasks potentially affected by the failure condition of the external service based on the workload tasks specifying the external service as a dependency and based further on execution of the workload tasks overlapping in time with a time frame associated with the failure condition; and scheduling the workload tasks potentially affected by the failure condition of the external service for a repeated execution on the plurality of computing resources. 2. The method of claim 1, wherein the external services monitor listens to and monitors the health and operational status of the plurality of external services accessible to the workload tasks and updates the information in the cache specifying the timeframe of any service degradation, failure mode, or service outage associated with any of the plurality of external services monitored. 3. The method of claim 1, wherein identifying any of the workload tasks potentially affected by the failure condition of the external service further comprises: marking results of the workload tasks as unsatisfactory in the cache; and wherein the scheduler on a subsequent scheduling heartbeat iteration schedules the workload tasks having results marked as unsatisfactory for a repeated execution. 4. The method of claim 1, wherein identifying any of the workload tasks potentially affected by the failure condition of the external service further comprises: identifying all currently executing workload tasks potentially affected by the failure condition of the external service; terminating execution of the currently executing workload tasks potentially affected by the failure condition of the external service; marking results of the workload tasks as unsatisfactory in the cache; and wherein the scheduler schedules the workload tasks having been terminated for a repeated execution. 5. The method of claim 1, wherein identifying any of the workload tasks potentially affected by the failure condition of the external service further comprises: identifying all previously completed workload tasks potentially affected by the failure condition of the external service; marking results of the previously completed workload tasks as unsatisfactory in the cache; and wherein the scheduler schedules the previously completed workload tasks for a repeated execution. 6. The method of claim 5, further comprising: saving results from the previously completed workload tasks and marked as unsatisfactory concurrently with new results generated by the repeated execution of the previously completed workload tasks; and returning both the results marked as unsatisfactory and the new results to a submitter of the workload task, wherein identifying any of the workload tasks potentially affected by 7. The method of claim 1, wherein identifying any of the workload tasks potentially affected by the failure condition of the external service comprises: identifying the failure condition of the external service and the time frame associated with the failure condition based on the information in the cache as updated by the external services monitor. 8. The method of claim 1, wherein scheduling the workload tasks potentially affected by the failure condition of the external service for a repeated execution comprises: scheduling the repeated execution on a compute cloud which is different than a compute cloud having executed the workload tasks potentially affected by the failure condition of the external service. 9. The method of claim 1, wherein scheduling the workload tasks potentially affected by the failure condition of the external service for a repeated execution comprises: scheduling the repeated execution on a different one of the plurality of computing resources having a different compute footprint than a compute resource having executed the workload tasks potentially affected by the failure condition of the external service; wherein the computing resources having the different compute footprint is selected from the group comprising: a compute footprint optimized for CPU bandwidth; a compute footprint optimized for GPU bandwidth; a compute footprint optimized for Input/Output (I/O) throughput; a compute footprint optimized for memory; a compute footprint utilizing AMD CPU architecture; a compute footprint utilizing Intel CPU architecture; compute footprints utilizing different sized Virtual Machines (VMs); compute footprints utilizing different operating systems; and compute footprints utilizing different CPU core quantities. 10. The method of claim 1, wherein scheduling the workload tasks potentially affected by the failure condition of the external service for a repeated execution comprises: scheduling the repeated execution with a datacenter in different geographical regions and having a different compute footprint than the compute resource having initially executed the workload tasks potentially affected by the failure condition of the external service; 11. The method of claim 1, wherein executing the scheduler via the processor of the system comprises the scheduler to perform at least the following additional operations: producing a list of the workload tasks to be executed based on the information retrieved from the cache; computing available compute capacity to execute workload tasks at each of the one or more computing resources based on the information retrieved from the cache; selecting the workload tasks for execution via the one or more computing resources based on the information retrieved from the cache; and planning execution of the workload tasks by scheduling the workload tasks for execution the computing resources based on the computed available capacity to execute workload tasks at each of the one or more computing resources. 12. The method of claim 11, wherein the scheduler to further perform at least the following additional operations: initiating execution of the workload tasks at the one or more computing resources pursuant to the planned execution; and removing from the list of the workload tasks to be executed as represented at the cache any of the workload tasks for which execution is initiated. 13. The method of claim 1, further comprising: operating, from the system, an external cloud interface to communicatively link the system with one or more third-party private and/or public computing clouds via a public Internet. 14. The method of claim 1, wherein identifying the plurality of computing resources available to execute workload tasks and updating the cache specifying the identified computing resources, comprises: the compute resource discovery engine to autonomously discover any one of: one or more third-party compute clouds accessible to the scheduler; one or more private on-demand compute clouds accessible to the scheduler; one or more public on-demand compute clouds accessible to the scheduler; one or more computing pods within a local host organization within which a scheduling service of the system operates when the one or more computing pods are accessible to the scheduler; one or more remote computing pods within a remote host organization separate from the local host organization within which the scheduling service operates when the one or more remote computing pods are accessible to the scheduling service through the remote host organization; an OpenStack computing cloud accessible to the scheduler; a VMWare computing cloud accessible to the scheduler; an Amazon Web Services (AWS) public computing cloud accessible to the scheduler; a Microsoft Azure public computing cloud accessible to the scheduler; an AWS Direct Connect privately leased computing space accessible to the scheduler; and an Azure ExpressRoute privately leased computing space accessible to the scheduler. 15. The method of claim 1, wherein the system comprises a multi-tenant database system having customer data stored therein for a plurality of distinct customer organizations; wherein each customer organization is an entity selected from the group consisting of: a separate and distinct remote organization, an organizational group within the host organization, a business partner of the host organization, or a customer organization that subscribes to cloud computing services provided by the host organization; wherein the system operates at a host organization as a cloud-based service provider to the plurality of distinct customer organizations; and wherein the cloud-based service provider receives inputs from the plurality of distinct customer organizations to schedule workload tasks for execution the plurality of computing resources. 16. Non-transitory computer readable storage media having instructions stored thereupon that, when executed by a system having at least a processor and a memory therein, the instructions cause the system to perform operations including: allocating a cache within the memory of the system; identifying, via a workload discovery engine, pending workload tasks to be scheduled for execution from one or more workload queues and updating the cache; identifying, via a compute resource discovery engine, a plurality of computing resources available to execute the workload tasks and updating the cache; identifying, via an external services monitor, a plurality of external services accessible to the workload tasks and updating the cache; executing a scheduler via the processor of the system, wherein the scheduler performs at least the following operations: scheduling the workload tasks for execution on the plurality of computing resources; identifying a failure condition for one of the plurality of external services accessible to the workload tasks; identifying any of the workload tasks potentially affected by the failure condition of the external service based on the workload tasks specifying the external service as a dependency and based further on execution of the workload tasks overlapping in time with a time frame associated with the failure condition; and scheduling the workload tasks potentially affected by the failure condition of the external service for a repeated execution on the plurality of computing resources. 17. The non-transitory computer readable storage media of claim 16, wherein identifying any of the workload tasks potentially affected by the failure condition of the external service further comprises: identifying all currently executing workload tasks potentially affected by the failure condition of the external service; terminating execution of the currently executing workload tasks potentially affected by the failure condition of the external service; marking results of the workload tasks as unsatisfactory in the cache; and wherein the scheduler schedules the workload tasks having been terminated for a repeated execution. 18. The non-transitory computer readable storage media of claim 16, wherein identifying any of the workload tasks potentially affected by the failure condition of the external service further comprises: identifying all previously completed workload tasks potentially affected by the failure condition of the external service; marking results of the previously completed workload tasks as unsatisfactory in the cache; and wherein the scheduler schedules the previously completed workload tasks for a repeated execution. 19. A system to implement a scheduling service, wherein the system comprises: a processor and a memory to execute instructions at the system; a cache allocated within the memory of the system to store information on behalf of a compute resource discovery engine and a workload discovery engine and an external services monitor and a scheduler; wherein the compute resource discovery engine is to identify a plurality of computing resources available to execute the workload tasks and update the cache specifying the identified computing resources; wherein the workload discovery engine is to identify pending workload tasks to be scheduled for execution from one or more workload queues and update the cache with the identified workload tasks; wherein the external services monitor is to identify a plurality of external services accessible to the workload tasks and update the cache with the plurality of external services; wherein the scheduler is to schedule the workload tasks for execution on the plurality of computing resources; wherein the scheduler is to schedule identify a failure condition for one of the plurality of external services accessible to the workload tasks; wherein the scheduler is to schedule identify any of the workload tasks potentially affected by the failure condition of the external service based on the workload tasks specifying the external service as a dependency and based further on execution of the workload tasks overlapping in time with a time frame associated with the failure condition; and wherein the scheduler is further to schedule the workload tasks potentially affected by the failure condition of the external service for a repeated execution on the plurality of computing resources. 20. The system of claim 19, wherein the scheduler further is to: identify all currently executing workload tasks potentially affected by the failure condition of the external service; terminate execution of the currently executing workload tasks potentially affected by the failure condition of the external service; mark results of the workload tasks as unsatisfactory in the cache; and wherein the scheduler is to schedule the workload tasks having been terminated for a repeated execution. 21. The system of claim 19, wherein the scheduler further is to: identify any of the workload tasks potentially affected by the failure condition of the external service further comprises: identify all previously completed workload tasks potentially affected by the failure condition of the external service; mark results of the previously completed workload tasks as unsatisfactory in the cache; and wherein the scheduler is to schedule the previously completed workload tasks for a repeated execution.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a system having at least a processor and a memory therein, wherein the method comprises:
    allocating a cache within the memory of the system;
    identifying, via a workload discovery engine, pending workload tasks to be scheduled for execution from one or more workload queues and updating the cache;
    identifying, via a compute resource discovery engine, a plurality of computing resources available to execute the workload tasks and updating the cache;
    executing a scheduler via the processor of the system, wherein the scheduler performs at least the following operations:
        retrieving information from the cache specifying the plurality of computing resources available to execute workload tasks and specifying the pending workload tasks to be scheduled for execution;
        analyzing each of the pending workload tasks to be scheduled to determine if a Return On Investment (ROI) for each respective workload task exceeds a threshold;
        canceling any of the pending workload tasks to be scheduled having an ROI below the threshold; and
        scheduling the pending workload tasks having an ROI which exceeds the threshold for execution via the plurality of computing resources available to execute the workload tasks.

2. The method of claim 1:
    wherein the scheduler performs a produce operation to identify the pending workload tasks to be scheduled for execution; and
    wherein the scheduler further performs a plan operation to determine which of the pending workload tasks will be allocated for execution via the plurality of computing resources and wherein the plan phase further initiates the determination of ROI for each respective workload task and performs the canceling of the pending workload tasks having the ROI below the threshold before execution of the respective pending workload tasks begins.

3. The method of claim 1, further comprising:
    executing a watchdog ROI engine via the processor of the system, wherein the watchdog ROI engine performs at least the following operations:
        (i) identifying a plurality of currently executing workloads;
        (ii) analyzing each of the currently executing workloads to determine if a ROI for each respective currently executing workload has fallen below a threshold; and
        (iii) terminating any of the currently executing workloads for which the ROI has fallen below the threshold.

4. The method of claim 3, wherein terminating any of the currently executing workloads for which the ROI has fallen below the threshold comprises:

updating the cache indicating the terminated workloads were affirmatively terminated by the watchdog ROI engine to prevent the scheduler from re-scheduling the terminated workloads for re-execution by any subsequent scheduling heartbeat iteration.

5. The method of claim 1, wherein canceling any of the pending workload tasks to be scheduled having an ROI below the threshold comprises:

dequeuing the canceled workload tasks from the one or more workload queues and updating the cache; and wherein the dequeued workload tasks will not be produced, selected, planned, or scheduled for execution in any subsequent scheduling heartbeat iteration.

6. The method of claim 1, wherein canceling any of the pending workload tasks to be scheduled having an ROI below the threshold comprises:

canceling one of the pending workload tasks on the basis that a completion deadline specified by an SLT for the workload task has been missed or will be missed.

7. The method of claim 1, wherein canceling any of the pending workload tasks to be scheduled having an ROI below the threshold comprises:

canceling one of the pending workload tasks on the basis that a maximum cost specified by an SLT for the workload task is less than a minimum cost to perform the workload task at any of the plurality of computing resources available to execute the workload task.

8. The method of claim 1, wherein canceling any of the pending workload tasks to be scheduled having an ROI below the threshold comprises:

canceling one of the pending workload tasks on the basis that a subsequently scheduled workload of a same workload type has completed before the workload task which remains pending and renders the workload task which remains pending obsolete in accordance with an SLT for the workload task.

9. The method of claim 1, wherein terminating any of the currently executing workloads for which the ROI has fallen below the threshold via the watchdog ROI engine comprises:

identifying a distributable workload having one or more workload sub-parts currently executing;

wherein an SLT for the distributable workload specifies that any failure of any workload sub-part renders the entirety of the distributable workload and all of its workload sub-parts worthless; and terminating all currently executing workload sub-parts on the basis that one of the workload sub-parts has failed.

10. The method of claim 9, further comprising:

canceling all pending workload sub-parts associated with the distributable workload on the basis that one of the workload sub-parts has failed; and wherein the distributable workload creates an artifact which requires that all sub-parts execute successfully to be valid.

11. The method of claim 1, wherein executing the scheduler via the processor of the system comprises the scheduler to perform at least the following additional operations:

producing a list of the workload tasks to be executed based on the information retrieved from the cache;

calculating available compute capacity to execute workload tasks in compliance with a selected SLT for each of the pending workload tasks at one or more of the plurality of computing resources based on the information retrieved from the cache;

selecting the pending workload tasks for execution via the plurality of computing resources based on the information retrieved from the cache; and planning execution of the pending workload tasks by first (i) analyzing each of the pending workload tasks to be scheduled to determine if the ROI for each respective workload task exceeds the threshold and by second (ii) scheduling the pending workload tasks for which the ROI exceeds the threshold for execution via the plurality of computing resources available to execute the workload tasks.

12. The method of claim 11, wherein the scheduler to further perform at least the following additional operations:

initiating execution of the pending workload tasks at the plurality of computing resources pursuant to the planned execution;

removing from the list of the workload tasks to be executed as represented at the cache any of the pending workload tasks for which execution is initiated; and executing a watchdog ROI engine via the processor of the system to (i) identify a plurality of currently executing workloads, (ii) determine if the ROI for each respective currently executing workload has fallen below a threshold, and (iii) terminate any of the currently executing workloads for which the ROI has fallen below the threshold.

13. The method of claim 1, further comprising:

operating, from the system, an external cloud interface to communicatively link the system with one or more third-party private and/or public computing clouds via a public Internet.

14. The method of claim 1, wherein identifying the plurality of computing resources available to execute workload tasks and updating the cache specifying the identified computing resources, comprises:

the compute resource discovery engine to autonomously discover any one of:

one or more third-party compute clouds accessible to the scheduler; one or more private on-demand compute clouds accessible to the scheduler;

one or more public on-demand compute clouds accessible to the scheduler;

one or more computing pods within a local host organization within which a scheduling service of the system operates when the one or more computing pods are accessible to the scheduler;

one or more remote computing pods within a remote host organization separate from the local host organization within which the scheduling service operates when the one or more remote computing pods are accessible to the scheduling service through the remote host organization;

an OpenStack computing cloud accessible to the scheduler;

a VMWare computing cloud accessible to the scheduler;

an Amazon Web Services (AWS) public computing cloud accessible to the scheduler;

a Microsoft Azure public computing cloud accessible to the scheduler;

an AWS Direct Connect privately leased computing space accessible to the scheduler; and an Azure ExpressRoute privately leased computing space accessible to the scheduler.

15. The method of claim 1, wherein the system comprises a multi-tenant database system having customer data stored therein for a plurality of distinct customer organizations;
   wherein each customer organization is an entity selected from the group consisting of: a separate and distinct remote organization, an organizational group within the host organization, a business partner of the host organization, or a customer organization that subscribes to cloud computing services provided by the host organization;
   wherein the system operates at a host organization as a cloud-based service provider to the plurality of distinct customer organizations; and
   wherein the cloud-based service provider receives inputs from the plurality of distinct customer organizations to schedule workload tasks for execution via the plurality of computing resources.

16. Non-transitory computer readable storage media having instructions stored thereupon that, when executed by a system having at least a processor and a memory therein, the instructions cause the system to perform operations including:
   allocating a cache within the memory of the system;
   identifying, via a workload discovery engine, pending workload tasks to be scheduled for execution from one or more workload queues and updating the cache;
   identifying, via a compute resource discovery engine, a plurality of computing resources available to execute the workload tasks and updating the cache;
   executing a scheduler via the processor of the system, wherein the scheduler performs at least the following operations:
      retrieving information from the cache specifying the plurality of computing resources available to execute workload tasks and specifying the pending workload tasks to be scheduled for execution;
      analyzing each of the pending workload tasks to be scheduled to determine if a Return On Investment (ROI) for each respective workload task exceeds a threshold;
      canceling any of the pending workload tasks to be scheduled having an ROI below the threshold; and
      scheduling the pending workload tasks having an ROI which exceeds the threshold for execution via the plurality of computing resources available to execute the workload tasks.

17. The non-transitory computer readable storage media of claim 16:
   wherein the scheduler performs a produce operation to identify the pending workload tasks to be scheduled for execution; and
   wherein the scheduler further performs a plan operation to determine which of the pending workload tasks will be allocated for execution via the plurality of computing resources and wherein the plan phase further initiates the determination of ROI for each respective workload task and performs the canceling of the pending workload tasks having the ROI below the threshold before execution of the respective pending workload tasks begins.

18. The non-transitory computer readable storage media of claim 16, wherein the instructions when executed by the processor of the system, cause the system to perform operations further comprising:
   executing a watchdog ROI engine via the processor of the system, wherein the watchdog ROI engine performs at least the following operations:
      (i) identifying a plurality of currently executing workloads;
      (ii) analyzing each of the currently executing workloads to determine if a ROI for each respective currently executing workload has fallen below a threshold; and
      (iii) terminating any of the currently executing workloads for which the ROI has fallen below the threshold;
   wherein terminating any of the currently executing workloads for which the ROI has fallen below the threshold comprises updating the cache indicating the terminated workloads were affirmatively terminated by the watchdog ROI engine to prevent the scheduler from re-scheduling the terminated workloads for re-execution by any subsequent scheduling heartbeat iteration.

19. The non-transitory computer readable storage media of claim 16, wherein canceling any of the pending workload tasks to be scheduled having an ROI below the threshold comprises:
   canceling one of the pending workload tasks on the basis that a maximum cost specified by an SLT for the workload task is less than a minimum cost to perform the workload task at any of the plurality of computing resources available to execute the workload task.

20. A system to implement a scheduling service, wherein the system comprises:
   a processor and a memory to execute instructions at the system;
   a cache allocated within the memory of the system to store information on behalf of a compute resource discovery engine and a workload discovery engine and a scheduler;
   wherein the compute resource discovery engine is to identify a plurality of computing resources available to execute the workload tasks and update the cache specifying the identified computing resources;
   wherein the workload discovery engine is to identify pending workload tasks to be scheduled for execution from one or more workload queues and update the cache with the identified workload tasks;
   wherein the scheduler is to retrieve information from the cache specifying the plurality of computing resources available to execute workload tasks and specifying the pending workload tasks to be scheduled for execution;
   wherein the scheduler is further to analyze each of the pending workload tasks to be scheduled to determine if a Return On Investment (ROI) for each respective workload task exceeds a threshold;
   wherein the scheduler is further to cancel any of the pending workload tasks to be scheduled having an ROI below the threshold; and
   wherein the scheduler is further to schedule the pending workload tasks having an ROI which exceeds the threshold for execution via the plurality of computing resources available to execute the workload tasks.

21. The system of claim 20, further comprising:
   a watchdog ROI engine to execute via the processor of the system, wherein the watchdog ROI engine is to perform at least the following operations:
      (i) identifying a plurality of currently executing workloads;
      (ii) analyzing each of the currently executing workloads to determine if a ROI for each respective currently executing workload has fallen below a threshold; and (iii) terminating any of the currently executing workloads for which the ROI has fallen below the threshold;

wherein terminating any of the currently executing workloads for which the ROI has fallen below the threshold comprises updating the cache indicating the terminated workloads were affirmatively terminated by the watchdog ROI engine to prevent the scheduler from re-scheduling the terminated workloads for re-execution by any subsequent scheduling heartbeat iteration.

22. The system of claim 20:

wherein the scheduler is to perform a produce operation to identify the pending workload tasks to be scheduled for execution; and wherein the scheduler further is to perform a plan operation to determine which of the pending workload tasks will be allocated for execution via the plurality of computing resources and wherein the plan phase further initiates the determination of ROI for each respective workload task and performs the canceling of the pending workload tasks having the ROI below the threshold before execution of the respective pending workload tasks begins.

* * * * *